US012693828B2

(12) United States Patent  (10) Patent No.:  US 12,693,828 B2

Carrigan et al.  (45) Date of Patent:  Jul. 28, 2026

(54) DEVICES, METHODS, AND USER INTERFACES FOR CONTROLLING OPERATION OF WIRELESS ELECTRONIC ACCESSORIES

(71) Applicant: Apple Inc., Cupertino, CA (US)

(72) Inventors: Taylor G. Carrigan, San Francisco, CA (US); Hugo D. Verweij, Portola Valley, CA (US); Mitchell R. Lerner, San Francisco, CA (US); Charles C. Hoyt, Pacifica, CA (US); Pavel Pivonka, San Francisco, CA (US); Vincenzo O. Giuliani, Thousand Oaks, CA (US); Patrick L. Coffman, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 56 days.

(21) Appl. No.: 18/241,778

(22) Filed: Sep. 1, 2023

(65) Prior Publication Data

US 2024/0078079 A1  Mar. 7, 2024

Related U.S. Application Data

(60) Provisional application No. 63/404,101, filed on Sep. 6, 2022.

(51) Int. Cl.
*G06F 3/16* (2006.01)
*G06F 3/01* (2006.01)
(Continued)

(52) U.S. Cl.
CPC .............. *G06F 3/165* (2013.01); *G06F 3/017* (2013.01); *G06F 3/044* (2013.01); *H04R 1/1016* (2013.01);
(Continued)

(58) Field of Classification Search
CPC .......... G06F 3/017; G06F 3/011; G06F 3/165; G06F 1/163; G06F 3/167; G06F 3/013;
(Continued)

(56) References Cited

U.S. PATENT DOCUMENTS 5,003,607 A    3/1991  Reed
8,126,399 B1   2/2012  Lee
(Continued)

FOREIGN PATENT DOCUMENTS

CN    102439972 A    5/2012
CN    104054323 A    9/2014
(Continued)

OTHER PUBLICATIONS

Notice of Allowance, dated Sep. 8, 2023, received in Japanese Patent Application No. 2022-018022, which corresponds with U.S. Appl. No. 17/306,898, 1 page.
(Continued)

*Primary Examiner* — Lun-See Lao
(74) *Attorney, Agent, or Firm* — Morgan, Lewis & Bockius LLP

(57)  ABSTRACT

A wearable audio output device includes a first portion configured to be inserted in a user's ear and a second portion that extends from the first portion and includes one or more input devices. The wearable audio output device detects an input via the one or more input devices. In response to detecting the input, and in accordance with a determination that the input is a swipe gesture along the second portion of the wearable audio output device, the wearable audio output device adjusts an output volume for the wearable audio output device based on movement of the swipe gesture along the second portion of the wearable audio output device.

39 Claims, 66 Drawing Sheets

(51) Int. Cl.

| | | |
|---|---|---|
| *G06F 3/044* | (2006.01) | |
| *H04R 1/10* | (2006.01) | |

(52) U.S. Cl.
CPC ......... *H04R 1/1041* (2013.01); *H04R 1/1083* (2013.01); *H04R 2420/07* (2013.01); *H04R 2430/01* (2013.01)

(58) Field of Classification Search
CPC .. G06F 3/015; G06F 3/016; G06F 2203/0381; G06F 3/014; G06F 3/0418; G06F 3/043; G06F 1/1686; G06F 1/1688; G06F 16/29; G06F 2200/1636; G06F 2203/011; G06F 2203/038; G06F 3/01; G06F 3/0304; G06F 3/044; G06F 3/0487; G06F 3/04883; G06F 3/16; G06F 3/162; G06F 40/58; G06F 2203/0339; G06F 2203/04808; G06F 3/0346; G06F 3/03547; G06F 3/04815; G06F 3/0482; G06F 3/04842; G06F 3/04847; G06F 3/0485; G06F 40/30; H04R 1/1041; H04R 1/1016; H04R 1/1083; H04R 2420/07; H04R 1/1091; H04R 2430/01; H04R 2460/01; H04R 2460/07; H04R 2499/15; H04R 25/55; H04R 25/558; H04R 25/603; H04R 2460/03; H04R 3/00; H04R 3/04; H04R 5/033; H04R 5/04; G10K 11/17881; G10K 11/1783; G10K 11/17885; G10K 2210/1081; G10K 2210/3026; G10K 2210/3027; G10L 25/51; H04M 1/6066; H04N 2007/145; H04N 21/4126; H04N 21/43078; H04N 7/147
USPC .......................................... 381/74, 312, 314
See application file for complete search history.

(56) References Cited

U.S. PATENT DOCUMENTS

| | | | |
|---|---|---|---|
| 8,290,537 | B2 | 10/2012 | Lee et al. |
| 8,831,238 | B2 | 9/2014 | Rashid et al. |
| 8,971,546 | B2 | 3/2015 | Millington et al. |
| 9,148,717 | B2 | 9/2015 | Shaffer |
| 9,210,498 | B1 | 12/2015 | Shaffer |
| 9,342,354 | B2 | 5/2016 | Banda |
| 9,344,801 | B2 | 5/2016 | Yoo et al. |
| 9,385,546 | B2 | 7/2016 | Wakayama et al. |
| 9,398,367 | B1 | 7/2016 | Scott et al. |
| 9,729,958 | B2 | 8/2017 | Jaques et al. |
| 9,807,491 | B2 | 10/2017 | Kim |
| 9,894,452 | B1 | 2/2018 | Termeulen et al. |
| 9,936,297 | B2 | 4/2018 | Dennis |
| 9,949,015 | B1 | 4/2018 | Minoo et al. |
| 9,949,021 | B1 | 4/2018 | Voigt et al. |
| 10,042,595 | B2 | 8/2018 | Behzadi et al. |
| 10,045,111 | B1 | 8/2018 | Bonner et al. |
| 10,133,358 | B1 | 11/2018 | Chen et al. |
| 10,136,214 | B2 | 11/2018 | Smus et al. |
| 10,142,577 | B1 | 11/2018 | Laird |
| 10,157,037 | B2 | 12/2018 | Patel et al. |
| 10,165,347 | B2 | 12/2018 | Pantfoerder et al. |
| 10,200,780 | B2 | 2/2019 | Steiner |
| 10,289,205 | B1* | 5/2019 | Sumter ................. G06F 3/0346 |
| 10,405,165 | B2 | 9/2019 | Llami et al. |
| 10,423,381 | B2 | 9/2019 | Utsuki et al. |
| 10,560,773 | B1 | 2/2020 | Roadley-Battin et al. |
| 10,616,726 | B1 | 4/2020 | Freeman, II et al. |
| 10,628,105 | B2 | 4/2020 | Behzadi et al. |
| 10,735,554 | B1 | 8/2020 | Jorgovanovic |
| 10,873,798 | B1 | 12/2020 | Jackson et al. |
| 10,951,043 | B2 | 3/2021 | Behzadi et al. |
| 11,006,201 | B2 | 5/2021 | Kumar et al. |
| 11,018,516 | B2 | 5/2021 | Cho et al. |
| 11,089,398 | B1 | 8/2021 | Venkatraman et al. |
| 11,115,746 | B1 | 9/2021 | Morrison et al. |
| 11,204,733 | B2 | 12/2021 | Behzadi et al. |
| 11,211,819 | B2 | 12/2021 | Ng et al. |
| 11,228,625 | B1 | 1/2022 | Libin |
| 11,240,583 | B1 | 2/2022 | DeMaio |
| 11,258,280 | B2 | 2/2022 | Li |
| 11,269,575 | B2 | 3/2022 | Behzadi et al. |
| 11,688,382 | B2 | 6/2023 | Hull et al. |
| 2003/0202341 | A1 | 10/2003 | McClanahan |
| 2003/0223604 | A1 | 12/2003 | Nakagawa |
| 2006/0135218 | A1 | 6/2006 | Son et al. |
| 2006/0166718 | A1 | 7/2006 | Seshadri et al. |
| 2006/0193487 | A1 | 8/2006 | Mok et al. |
| 2006/0200358 | A1 | 9/2006 | Ohnemus et al. |
| 2007/0206829 | A1 | 9/2007 | Weinans et al. |
| 2007/0213092 | A1 | 9/2007 | Geelen |
| 2007/0300063 | A1 | 12/2007 | Adams et al. |
| 2008/0065720 | A1 | 3/2008 | Brodersen et al. |
| 2008/0076489 | A1 | 3/2008 | Rosener et al. |
| 2008/0152160 | A1 | 6/2008 | Chew et al. |
| 2008/0166968 | A1 | 7/2008 | Tang et al. |
| 2008/0226094 | A1 | 9/2008 | Rutschman |
| 2008/0248748 | A1 | 10/2008 | Sangster et al. |
| 2008/0280655 | A1 | 11/2008 | Ozaki |
| 2009/0081999 | A1 | 3/2009 | Khasawneh et al. |
| 2009/0170431 | A1 | 7/2009 | Pering et al. |
| 2009/0280871 | A1 | 11/2009 | Hofer et al. |
| 2010/0041333 | A1 | 2/2010 | Ungari et al. |
| 2010/0074451 | A1 | 3/2010 | Usher et al. |
| 2010/0110368 | A1 | 5/2010 | Chaum |
| 2010/0172522 | A1* | 7/2010 | Mooring .............. H04R 1/1041 381/103 |
| 2010/0309284 | A1 | 12/2010 | Samadani et al. |
| 2010/0310087 | A1 | 12/2010 | Ishida |
| 2010/0320961 | A1 | 12/2010 | Castillo et al. |
| 2011/0040396 | A1 | 2/2011 | Kraemer et al. |
| 2011/0116643 | A1 | 5/2011 | Tiscareno et al. |
| 2011/0159959 | A1 | 6/2011 | Mallinson et al. |
| 2011/0222701 | A1 | 9/2011 | Donaldson et al. |
| 2011/0286615 | A1 | 11/2011 | Olodort et al. |
| 2012/0096188 | A1 | 4/2012 | Cohen et al. |
| 2012/0144473 | A1 | 6/2012 | Wyld |
| 2012/0215366 | A1 | 8/2012 | Redmond et al. |
| 2012/0262537 | A1 | 10/2012 | Baker et al. |
| 2012/0289157 | A1 | 11/2012 | Palin et al. |
| 2012/0317194 | A1 | 12/2012 | Tian |
| 2013/0010975 | A1 | 1/2013 | Tsingos et al. |
| 2013/0101140 | A1 | 4/2013 | Cho et al. |
| 2013/0121494 | A1 | 5/2013 | Johnston |
| 2013/0154917 | A1 | 6/2013 | Adermann et al. |
| 2013/0182867 | A1 | 7/2013 | Knowles |
| 2013/0300463 | A1 | 11/2013 | Gemmeke et al. |
| 2013/0311694 | A1 | 11/2013 | Bhamidipati et al. |
| 2013/0316679 | A1 | 11/2013 | Miller et al. |
| 2014/0016803 | A1 | 1/2014 | Puskarich |
| 2014/0037104 | A1 | 2/2014 | Seo et al. |
| 2014/0082496 | A1 | 3/2014 | Jung et al. |
| 2014/0126733 | A1 | 5/2014 | Gauger, Jr. et al. |
| 2014/0126734 | A1 | 5/2014 | Gauger, Jr. et al. |
| 2014/0143744 | A1 | 5/2014 | Dimond |
| 2014/0152235 | A1 | 6/2014 | Huang et al. |
| 2014/0247948 | A1 | 9/2014 | Goldstein |
| 2014/0270200 | A1 | 9/2014 | Usher et al. |
| 2014/0317242 | A1 | 10/2014 | Koo et al. |
| 2014/0341399 | A1 | 11/2014 | Dusse et al. |
| 2015/0045921 | A1 | 2/2015 | Stewart et al. |
| 2015/0054458 | A1 | 2/2015 | Yoon et al. |
| 2015/0102879 | A1 | 4/2015 | Jacobs et al. |
| 2015/0110263 | A1 | 4/2015 | Johnston |
| 2015/0121328 | A1 | 4/2015 | Segal |
| 2015/0200558 | A1 | 7/2015 | Castillo et al. |
| 2015/0230022 | A1 | 8/2015 | Sakai et al. |
| 2015/0245126 | A1 | 8/2015 | Shaffer |
| 2015/0245127 | A1 | 8/2015 | Shaffer |
| 2015/0281830 | A1 | 10/2015 | Gauger, Jr. et al. |
| 2015/0294662 | A1 | 10/2015 | Ibrahim |

(56) References Cited

U.S. PATENT DOCUMENTS

| | | |
|---|---|---|
| 2015/0310846 A1 | 10/2015 | Andersen et al. |
| 2015/0319554 A1 | 11/2015 | Blanche et al. |
| 2015/0331940 A1 | 11/2015 | Manning |
| 2015/0351143 A1 | 12/2015 | Seymour et al. |
| 2016/0007140 A1 | 1/2016 | Yae et al. |
| 2016/0014492 A1 | 1/2016 | McCarthy et al. |
| 2016/0029114 A1 | 1/2016 | Chen |
| 2016/0071409 A1 | 3/2016 | Suomela et al. |
| 2016/0072936 A1 | 3/2016 | Kim et al. |
| 2016/0073249 A1 | 3/2016 | Moore et al. |
| 2016/0077843 A1 | 3/2016 | Jakoboski et al. |
| 2016/0094934 A1 | 3/2016 | Yang et al. |
| 2016/0109931 A1 | 4/2016 | Kobayashi |
| 2016/0119708 A1 | 4/2016 | Rodzevski et al. |
| 2016/0134141 A1 | 5/2016 | Jentz et al. |
| 2016/0165381 A1 | 6/2016 | Kapoor et al. |
| 2016/0180806 A1 | 6/2016 | Sharp et al. |
| 2016/0219358 A1 | 7/2016 | Shaffer et al. |
| 2016/0241972 A1 | 8/2016 | Gobeli et al. |
| 2016/0291666 A1 | 10/2016 | Hosoya et al. |
| 2016/0327911 A1 | 11/2016 | Eim et al. |
| 2016/0351183 A1 | 12/2016 | Gauger, Jr. et al. |
| 2017/0013345 A1 | 1/2017 | Kumar et al. |
| 2017/0026509 A1 | 1/2017 | Rand |
| 2017/0048613 A1 | 2/2017 | Smus et al. |
| 2017/0078820 A1 | 3/2017 | Brandenburg et al. |
| 2017/0108906 A1 | 4/2017 | Chandra et al. |
| 2017/0134845 A1 | 5/2017 | Milam et al. |
| 2017/0140089 A1 | 5/2017 | Hathaway et al. |
| 2017/0180840 A1 | 6/2017 | Yamkovoy |
| 2017/0192746 A1 | 7/2017 | Jeong et al. |
| 2017/0193974 A1 | 7/2017 | Gadonniex et al. |
| 2017/0195466 A1 | 7/2017 | Chen |
| 2017/0214994 A1 | 7/2017 | Gadonniex et al. |
| 2017/0245039 A1 | 8/2017 | Chen |
| 2017/0251295 A1 | 8/2017 | Pergament et al. |
| 2017/0256978 A1 | 9/2017 | Sauterel et al. |
| 2017/0293577 A1 | 10/2017 | Gomzin et al. |
| 2017/0318374 A1 | 11/2017 | Dolenc et al. |
| 2017/0339483 A1 | 11/2017 | Ergezer et al. |
| 2018/0014973 A1 | 1/2018 | Echeverri et al. |
| 2018/0048960 A1 | 2/2018 | Jeffery et al. |
| 2018/0067712 A1 | 3/2018 | Behzadi et al. |
| 2018/0081453 A1 | 3/2018 | Ely |
| 2018/0088897 A1 | 3/2018 | Mathur |
| 2018/0091887 A1 | 3/2018 | Minoo et al. |
| 2018/0114518 A1 | 4/2018 | Scanlan et al. |
| 2018/0132088 A1 | 5/2018 | Lee |
| 2018/0152781 A1 | 5/2018 | Boyer et al. |
| 2018/0206022 A1 | 7/2018 | Hsieh |
| 2018/0206025 A1 | 7/2018 | Rule et al. |
| 2018/0242085 A1 | 8/2018 | Dohmen et al. |
| 2018/0249266 A1 | 8/2018 | Termeulen et al. |
| 2018/0277123 A1 | 9/2018 | Boesen et al. |
| 2018/0279063 A1 | 9/2018 | Sun et al. |
| 2018/0286428 A1 | 10/2018 | Seider |
| 2018/0295439 A1 | 10/2018 | Garrett |
| 2018/0295455 A1 | 10/2018 | Eichfeld et al. |
| 2018/0301134 A1 | 10/2018 | Le et al. |
| 2018/0310116 A1 | 10/2018 | Arteaga et al. |
| 2018/0341448 A1 | 11/2018 | Behzadi et al. |
| 2018/0376528 A1 | 12/2018 | Lee et al. |
| 2019/0007780 A1 | 1/2019 | Sheaffer et al. |
| 2019/0052951 A1 | 2/2019 | Kofman et al. |
| 2019/0075385 A1 | 3/2019 | Lee et al. |
| 2019/0081499 A1 | 3/2019 | Sun et al. |
| 2019/0124432 A1 | 4/2019 | Champy |
| 2019/0155487 A1 | 5/2019 | Zhao et al. |
| 2019/0179604 A1 | 6/2019 | Alexander et al. |
| 2019/0189106 A1 | 6/2019 | Hull et al. |
| 2019/0215611 A1 | 7/2019 | Lou et al. |
| 2019/0227536 A1 | 7/2019 | Cella et al. |
| 2019/0278556 A1 | 9/2019 | Usher et al. |
| 2019/0305591 A1 | 10/2019 | Ng et al. |
| 2019/0313178 A1 | 10/2019 | Mutlu et al. |
| 2019/0320282 A1 | 10/2019 | Moeller |
| 2019/0339825 A1 | 11/2019 | Anzures et al. |
| 2019/0341050 A1 | 11/2019 | Diamant et al. |
| 2019/0361666 A1 | 11/2019 | Oide et al. |
| 2019/0364371 A1* | 11/2019 | Han ..................... H04R 25/405 |
| 2019/0394607 A1 | 12/2019 | Laaksonen et al. |
| 2020/0007989 A1 | 1/2020 | Gong et al. |
| 2020/0014792 A1 | 1/2020 | Lyren et al. |
| 2020/0067340 A1 | 2/2020 | Batra et al. |
| 2020/0120384 A1 | 4/2020 | Armaly |
| 2020/0150740 A1 | 5/2020 | Zhang et al. |
| 2020/0169101 A1 | 5/2020 | Li |
| 2020/0177593 A1 | 6/2020 | Bender et al. |
| 2020/0204484 A1 | 6/2020 | Altman |
| 2020/0213705 A1 | 7/2020 | Ding et al. |
| 2020/0213799 A1 | 7/2020 | Lyren |
| 2020/0218486 A1 | 7/2020 | Behzadi et al. |
| 2020/0275223 A1 | 8/2020 | Usher et al. |
| 2020/0367006 A1 | 11/2020 | Beckhardt |
| 2021/0014610 A1 | 1/2021 | Carrigan et al. |
| 2021/0014611 A1 | 1/2021 | Carrigan et al. |
| 2021/0014612 A1 | 1/2021 | Carrigan |
| 2021/0014613 A1 | 1/2021 | Carrigan et al. |
| 2021/0076131 A1* | 3/2021 | Minich ................ H04R 1/1083 |
| 2021/0092543 A1 | 3/2021 | Salehin et al. |
| 2021/0126470 A1 | 4/2021 | Banerjee et al. |
| 2021/0210967 A1 | 7/2021 | Xiongbin |
| 2021/0218595 A1 | 7/2021 | Liu et al. |
| 2021/0255816 A1 | 8/2021 | Behzadi et al. |
| 2021/0258419 A1 | 8/2021 | Lyren et al. |
| 2021/0281943 A1 | 9/2021 | Lehnert |
| 2021/0319778 A1 | 10/2021 | Lerner et al. |
| 2021/0329367 A1 | 10/2021 | Fletcher et al. |
| 2021/0376880 A1 | 12/2021 | Carrigan et al. |
| 2021/0377663 A1 | 12/2021 | Carrigan et al. |
| 2021/0391739 A1 | 12/2021 | Venkatraman et al. |
| 2022/0019403 A1 | 1/2022 | Carrigan et al. |
| 2022/0078864 A1 | 3/2022 | Yang et al. |
| 2022/0103963 A1 | 3/2022 | Satongar et al. |
| 2022/0107771 A1 | 4/2022 | Behzadi et al. |
| 2022/0256275 A1 | 8/2022 | Bang et al. |
| 2022/0337969 A1 | 10/2022 | Seefeldt et al. |
| 2022/0374197 A1 | 11/2022 | Carrigan |
| 2023/0007398 A1 | 1/2023 | Carrigan |
| 2023/0020542 A1 | 1/2023 | Satongar et al. |
| 2023/0095263 A1 | 3/2023 | Satongar et al. |
| 2023/0246671 A1 | 8/2023 | Carrigan et al. |
| 2024/0184513 A1 | 6/2024 | Carrigan |
| 2025/0063303 A1 | 2/2025 | Carrigan et al. |
| 2025/0138767 A1 | 5/2025 | Behzadi et al. |
| 2025/0158660 A1 | 5/2025 | Carrigan et al. |
| 2025/0193629 A1 | 6/2025 | Satongar et al. |
| 2025/0315206 A1 | 10/2025 | Satongar et al. |
| 2026/0017010 A1 | 1/2026 | Carrigan |

FOREIGN PATENT DOCUMENTS

| | | |
|---|---|---|
| CN | 104365173 A | 2/2015 |
| CN | 106291121 A | 1/2017 |
| CN | 206759683 U | 12/2017 |
| EP | 2190213 A1 | 5/2010 |
| EP | 3188495 A1 | 7/2017 |
| EP | 3200423 A1 | 8/2017 |
| EP | 3001695 B1 | 7/2018 |
| EP | 3456299 A1 | 3/2019 |
| EP | 3599777 A1 | 1/2020 |
| EP | 3664092 A1 | 6/2020 |
| JP | S60-150899 A | 8/1985 |
| JP | 2006-093792 | 4/2006 |
| JP | 2009-532937 | 9/2009 |
| JP | 2011-521504 | 7/2011 |
| JP | 2012-524917 | 10/2012 |
| JP | 2013-051626 A | 3/2013 |
| JP | 2015-173369 A | 10/2015 |
| JP | 2015-537466 A | 12/2015 |
| JP | 2016-076202 A | 5/2016 |
| JP | 2017-126873 A | 7/2017 |
| JP | 2019-504346 A | 2/2019 |
| JP | 2022-078056 A | 5/2022 |

(56)  References Cited

FOREIGN PATENT DOCUMENTS

| KR | 101236167 B1 | 2/2013 |
| KR | 2014-0018701 A | 2/2014 |
| KR | 2015-0021803 A | 3/2015 |
| KR | 101518010 B1 | 5/2015 |
| KR | 2016-0098522 A | 8/2016 |
| KR | 2016-0103779 A | 9/2016 |
| KR | 2017-0138588 A | 12/2017 |
| KR | 2019-0013880 A | 2/2019 |
| WO | WO 2008/000304 A1 | 1/2008 |
| WO | WO 2012/170446 A2 | 12/2012 |
| WO | WO 2013/064747 A1 | 5/2013 |
| WO | WO 2015/006950 A1 | 1/2015 |
| WO | WO 2015/185123 A1 | 12/2015 |
| WO | WO 2016/036541 A2 | 3/2016 |
| WO | WO 2016/063143 A1 | 4/2016 |
| WO | WO 2016/066483 A1 | 5/2016 |
| WO | WO 2017203484 A1 | 11/2017 |
| WO | WO 2017/179409 A | 11/2018 |
| WO | WO 2019/053993 A1 | 3/2019 |
| WO | WO 2020/204611 A1 | 10/2020 |
| WO | WO 2021/136671 A1 | 7/2021 |
| WO | WO 2022/031260 A1 | 2/2022 |
| WO | WO 2013/030736 A1 | 3/2023 |

OTHER PUBLICATIONS

Final Office Action, dated Sep. 19, 2023, received in U.S. Appl. No. 17/898,735, 15 pages.

European Search Report, dated Sep. 1, 2023, received in European Patent Application No. 23175376.5, 16 pages.

Aguilera et al., "Spatial Audio for Audioconferencing in Mobile Devices: Investigating the Importance of Virtual Mobility and Private Communication and Optimizations", https://www.aes.og/e-lib=18138, 4 pages.

Anonymous, "RX-V3800AV Receiver Owner's Manual", Yamaha Music Manuals, Dec. 31, 2007, pp. 35, 36, 44-50.

Samsung Electronics America, Inc., "Gear Icon X SM-R150", User Manual, https://static.bhphtovideo.com/lit_files/268655.pdf, Aug. 6, 2016, 43 pages.

Innovation Patent, dated Aug. 16, 2017, received in Australian Patent Application No. 2017101032, which corresponds with U.S. Appl. No. 15/271,114, 4 pages.

Office Action, dated Nov. 6, 2017, received in Australian Patent Application No. 2017101032, which corresponds with U.S. Appl. No. 15/271,114, 5 pages.

Certificate of Exam, dated May 1, 2018, received in Australian Patent Application No. 2017101032, which corresponds with U.S. Appl. No. 15/271,114, 1 page.

Notice of Acceptance, dated Feb. 19, 2019, received in Australian Patent Application No. 2017324072, which corresponds with U.S. Appl. No. 15/271,114, 3 pages.

Certificate of Grant, dated Jun. 13, 2019, received in Australian Patent Application No. 2017324072, which corresponds with U.S. Appl. No. 15/271,114, 1 page.

Office Action, dated Sep. 25, 2019, received in Chinese Patent Application No. 201710741130.4, which corresponds with U.S. Appl. No. 15/271,114, 5 pages.

Office Action, dated Jun. 18, 2020, received in Chinese Patent Application No. 201710741130.4, which corresponds with U.S. Appl. No. 15/271,114, 10 pages.

Notice of Allowance, dated Nov. 27, 2020, received in Chinese Patent Application No. 201710741130.4, which corresponds with U.S. Appl. No. 15/271,114, 3 pages.

Patent, dated Jan. 22, 2021, received in Chinese Patent Application No. 201710741130.4, which corresponds with U.S. Appl. No. 15/271,114, 6 pages.

Office Action, dated Dec. 16, 2016, received in Danish Patent Application No. 201670727, which corresponds with U.S. Appl. No. 15/271,114, 7 pages.

Office Action, dated May 29, 2017, received in Danish Patent Application No. 201670727, which corresponds with U.S. Appl. No. 15/271,114, 6 pages.

Office Action, dated Dec. 13, 2017, received in Danish Patent Application No. 201670727, which corresponds with U.S. Appl. No. 15/271,114, 6 pages.

Office Action, dated Aug. 16, 2019, received in European Patent Application No. 17746593.7, which corresponds with U.S. Appl. No. 15/271,114, 6 pages.

Office Action, dated Jul. 5, 2019, received in Japanese Patent Application No. 2019-506652, which corresponds with U.S. Appl. No. 15/271,114, 4 pages.

Notice of Allowance, dated Oct. 18, 2019, received in Japanese Patent Application No. 2019-506652, which corresponds with U.S. Appl. No. 15/271,114, 5 pages.

Patent, dated Nov. 22, 2019, received in Japanese Patent Application No. 2019-506652, which corresponds with U.S. Appl. No. 15/271,114, 3 pages.

Office Action, dated Jun. 17, 2019, received in Korean Patent Application No. 2019-7004211, which corresponds with U.S. Appl. No. 15/271,114, 3 pages.

Notice of Allowance, dated Sep. 17, 2019, received in Korean Patent Application No. 2019-7004211, which corresponds with U.S. Appl. No. 15/271,114, 4 pages.

Patent, dated Dec. 4, 2019, received in Korean Patent Application No. 2019-7004211, which corresponds with U.S. Appl. No. 15/271,114, 4 pages.

Office Action, dated Oct. 3, 2019, received in U.S. Appl. No. 16/056,328, 11 pages.

Notice of Allowance, dated Jan. 15, 2020, received in U.S. Appl. No. 16/056,328, 7 pages.

Notice of Allowance, dated Feb. 22, 2021, received in Australian Patent Application No. 2019203626, which corresponds with U.S. Appl. No. 16/056,328, 3 pages.

Certificate of Grant, dated Jun. 24, 2021, received in Australian Patent Application No. 2019203626, which corresponds with U.S. Appl. No. 16/056,328, 3 pages.

Office Action, dated Jul. 2, 2021, received from Chinese Patent Application No. 202011538744.0, which corresponds with U.S. Appl. No. 16/056,328, 4 pages.

Office Action, dated Dec. 30, 2021, received from Chinese Patent Application No. 202011538744.0, which corresponds with U.S. Appl. No. 16/056,328, 2 pages.

Office Action, dated Mar. 29, 2022, received from Chinese Patent Application No. 202011538744.0, which corresponds with U.S. Appl. No. 16/056,328, 1 page.

Office Action, dated Jan. 19, 2023, received from Chinese Patent Application No. 202011538744.0, which corresponds with U.S. Appl. No. 16/056,328, 1 page.

Patent, dated Jun. 13, 2023, received from Chinese Patent Application No. 202011538744.0, which corresponds with U.S. Appl. No. 16/056,328, 6 pages.

Office Action, dated Jan. 12, 2021, received in Japanese Patent Application No. 2019-207313, which corresponds with U.S. Appl. No. 16/056,328, 5 pages.

Office Action, dated Oct. 18, 2021, received in Japanese Patent Application No. 2019-207313, which corresponds with U.S. Appl. No. 16/056,328, 2 pages.

Notice of Allowance, dated Mar. 11, 2022, received in Japanese Patent Application No. 2019-207313, which corresponds with U.S. Appl. No. 16/056,328, 2 pages.

Patent, dated Mar. 25, 2022, received in Japanese Patent Application No. 2019-207313, which corresponds with U.S. Appl. No. 16/056,328, 3 pages.

Office Action, dated Apr. 6, 2020, received in Korean Patent Application No. 2019-7035730, which corresponds with U.S. Appl. No. 16/056,328, 2 pages.

Notice of Allowance, dated Jun. 23, 2020, received in Korean Patent Application No. 2019-7035730, which corresponds with U.S. Appl. No. 16/056,328, 2 pages.

Patent, dated Sep. 14, 2020, received in Korean Patent Application No. 2019-7035730, which corresponds with U.S. Appl. No. 16/056,328, 3 pages.

(56) References Cited

OTHER PUBLICATIONS

Office Action, dated Jun. 24, 2021, received in U.S. Appl. No. 16/920,303, 5 pages.

Notice of Allowance, dated Sep. 14, 2021, received in U.S. Appl. No. 16/920,303, 7 pages.

Office Action, dated Sep. 10, 2021, received in Australian Patent Application No. 2020-239693, which corresponds with U.S. Appl. No. 16/920,303, 2 pages.

Notice of Allowance, dated Oct. 15, 2021, received in Australian Patent Application No. 2020-239693, which corresponds with U.S. Appl. No. 16/920,303, 3 pages.

Patent, dated Feb. 17, 2022, 2022, received in Australian Patent Application No. 2020-239693, which corresponds with U.S. Appl. No. 16/920,303, 3 pages.

Office Action, dated Dec. 21, 2020, received in Danish Patent Application No. 2020-70630, which corresponds with U.S. Appl. No. 16/920,303, 8 pages.

Intention to Grant, Action, dated Mar. 3, 2021, received in Danish Patent Application No. 2020-70630, which corresponds with U.S. Appl. No. 16/920,303, 2 pages.

Notice of Allowance, dated Jun. 10, 2021, received in Danish Patent Application No. 2020-70630, which corresponds with U.S. Appl. No. 16/920,303, 2 pages.

Patent, dated Oct. 14, 2021, received in Danish Patent Application No. 2020-70630, which corresponds with U.S. Appl. No. 16/920,303, 6 pages.

Office Action, dated Feb. 21, 2022, received in Indian Patent Application No. 202017041564, which corresponds with U.S. Appl. No. 16/920,303, 6 pages.

Office Action, dated Jan. 7, 2022, received in Japanese Patent Application No. 2020-550113, which corresponds with U.S. Appl. No. 16/920,303, 2 pages.

Office Action, dated Aug. 12, 2022, received in Japanese Patent Application No. 2020-550113, which corresponds with U.S. Appl. No. 16/920,303, 2 pages.

Notice of Allowance, dated Nov. 14, 2022, received in Japanese Patent Application No. 2020-550113, which corresponds with U.S. Appl. No. 16/920,303, 2 pages.

Patent, dated Dec. 8, 2022, received in Japanese Patent Application No. 2020-550113, which corresponds with U.S. Appl. No. 16/920,303, 3 pages.

Office Action, dated Apr. 13, 2022, received in Korean Patent Application No. 2020-7027641, which corresponds with U.S. Appl. No. 16/920,303, 7 pages.

Office Action, dated Oct. 26, 2022, received in Korean Patent Application No. 2020-7027641, which corresponds with U.S. Appl. No. 16/920,303, 3 pages.

Notice of Allowance, dated May 24, 2023, received in Korean Patent Application No. 2020-7027641, which corresponds with U.S. Appl. No. 16/920,303, 2 pages.

Office Action, dated Nov. 24, 2021, received in U.S. Appl. No. 17/023,265, 16 pages.

Final Office Action, dated Jun. 2, 2022, received in U.S. Appl. No. 17/023,265, 19 pages.

Notice of Allowance, dated Nov. 17, 2022, received in U.S. Appl. No. 17/023,265, 10 pages.

Notice of Allowance, dated Mar. 21, 2023, received in U.S. Appl. No. 17/023,265, 9 pages.

Office Action, dated Sep. 4, 2020, received in U.S. Appl. No. 16/824,506, 17 pages.

Final Office Action, dated Mar. 22, 2021, received in U.S. Appl. No. 16/824,506, 22 pages.

Office Action, dated Aug. 5, 2021, received in U.S. Appl. No. 16/824,506, 20 pages.

Notice of Allowance, dated Oct. 18, 2021, received in U.S. Appl. No. 16/824,506, 9 pages.

Intent to Grant, dated Sep. 29, 2021, received in Australian Patent Application No. 202120177, which corresponds with U.S. Appl. No. 16/824,506, 3 pages.

Notice of Acceptance, dated Nov. 29, 2021, received in Australian Patent Application No. 2021201777, which corresponds with U.S. Appl. No. 16/824,506, 3 pages.

Patent, dated Mar. 31, 2022, received in Australian Patent Application No. 2021201777, which corresponds with U.S. Appl. No. 16/824,506, 3 pages.

Office Action, dated Jun. 9, 2021, received in Chinese Patent Application No. 202011544171.2, which corresponds with U.S. Appl. No. 16/824,506, 1 page.

Office Action, dated Nov. 11, 2021, received in Chinese Patent Application No. 202011544171.2, which corresponds with U.S. Appl. No. 16/824,506. (English translation is provided.) 5 pages.

Office Action, dated Jun. 29, 2022, received in Chinese Patent Application No. 202011544171.2, which corresponds with U.S. Appl. No. 16/824,506, 5 pages.

Notice of Allowance, dated May 24, 2021, received in Korean Patent Application No. 2020-7026460, which corresponds with U.S. Appl. No. 16/824,506, 2 pages.

Notice of Allowance, dated Feb. 1, 2022, received in U.S. Appl. No. 17/031,637, 26 pages.

Notice of Allowance, dated Mar. 21, 2022, received in U.S. Appl. No. 17/031,637, 7 pages.

Notice of Allowance, dated Aug. 29, 2022, received in U.S. Appl. No. 17/483,741, 42 pages.

Office Action, dated Jan. 1, 2021, received in U.S. Appl. No. 17/028,936, 16 pages.

Final Office Action, dated Apr. 9, 2021, received in U.S. Appl. No. 17/028,936, 17 pages.

Notice of Allowance, dated Aug. 20, 2021, received in U.S. Appl. No. 17/028,936, 7 pages.

Notice of Allowance, dated Sep. 29, 2021, received in U.S. Appl. No. 17/028,936, 7 pages.

Office Action, dated Oct. 7, 2022, received in Australian Patent Application No. 2021245251, which corresponds with U.S. Appl. No. 17/028,936, 3 pages.

Office Action, dated Jan. 18, 2023, received in Australian Patent Application No. 2021245251, which corresponds with U.S. Appl. No. 17/028,936, 3 pages.

Office Action, dated Jan. 29, 2021, received in Danish Patent Application No. 2020-70718, which corresponds with U.S. Appl. No. 17/028,936, 7 pages.

Office Action, dated Oct. 22, 2021, received in Danish Patent Application No. 2020-70718, which corresponds with U.S. Appl. No. 17/028,936, 4 pages.

Intention to Grant, dated Jan. 7, 2022, received in Danish Patent Application No. 2020-70718, which corresponds with U.S. Appl. No. 17/028,936, 2 pages.

Notice of Allowance, dated Apr. 26, 2022, received in Danish Patent Application No. 2020-70718, which corresponds with U.S. Appl. No. 17/028,936, 2 pages.

Patent, dated Aug. 11, 2022, received in Danish Patent Application No. 2020-70718, which corresponds with U.S. Appl. No. 17/028,936, 3 pages.

Patent, dated Jul. 19, 2023. receoved om European Patent Application No. 23175376.5, which corresponds with U.S. Appl. No. 17/028,936, 3 pages.

Office Action, dated May 25, 2022, received in U.S. Appl. No. 17/028,943, 5 pages.

Notice of Allowance, dated Jun. 29, 2022, received in U.S. Appl. No. 17/028,943, 7 pages.

Office Action, dated Jan. 29, 2021, received in Danish Patent Application No. 2020-70719, which corresponds with U.S. Appl. No. 17/028,936, 7 pages.

Intention to Grant, dated Aug. 27, 2021, received in Danish Patent Application No. 2020-70719, which corresponds with U.S. Appl. No. 17/028,936, 2 pages.

Notice of Allowance, dated Dec. 16, 2021, received in Danish Patent Application No. 2020-70719, which corresponds with U.S. Appl. No. 17/028,936, 2 pages.

Patent, dated Mar. 21, 2022, received in Danish Patent Application No. 2020-70719, which corresponds with U.S. Appl. No. 17/028,936, 5 pages.

(56) References Cited

OTHER PUBLICATIONS

Intent to Grant, dated Feb. 1, 2023, received from European Patent Application No. 22161118.9, which corresponds with U.S. Appl. No. 17/028,936, 8 pages.

Decision to Grant, dated Jun. 22, 2023, received from European Patent Application No. 22161118.9, which corresponds with U.S. Appl. No. 17/028,936, 3 pages.

Office Action, dated Dec. 24, 2020, received in U.S. Appl. No. 17/028,947, 10 pages.

Final Office Action, dated Mar. 17, 2021, received in U.S. Appl. No. 17/028,947, 8 pages.

Office Action, dated Sep. 27, 2021, received in U.S. Appl. No. 17/028,947, 10 pages.

Notice of Allowance, dated Dec. 13, 2021, received in U.S. Appl. No. 17/028,947, 5 pages.

Office Action, dated Feb. 2, 2021, received in Danish Patent Application No. 202070720, which corresponds with U.S. Appl. No. 17/028,947, 3 pages.

Office Action, dated Nov. 4, 2021, received in Danish Patent Application No. 202070720, which corresponds with U.S. Appl. No. 17/028,947, 3 pages.

Intent to Grant, dated May 5, 2022, received in Danish Patent Application No. 202070720, which corresponds with U.S. Appl. No. 17/028,947, 2 pages.

Notice of Allowance, dated Jul. 28, 2022, received in Danish Patent Application No. 202070720, which corresponds with U.S. Appl. No. 17/028,947, 2 pages.

Patent, dated Oct. 6, 2022, received in Danish Patent Application No. 202070720, which corresponds with U.S. Appl. No. 17/028,947, 5 pages.

Office Action, dated Sep. 1, 2022, received in U.S. Appl. No. 17/023,274, 16 pages.

Notice of Allowance, dated Mar. 9, 2023, received in U.S. Appl. No. 17/023,274, 10 pages.

Office Action, dated Oct. 21, 2022, received in Australian Patent Application No. 2021290349, 2 pages.

Office Action, dated Aug. 5, 2021, received in U.S. Appl. No. 17/306,898, 6 pages.

Notice of Allowance, dated Oct. 29, 2021, received in U.S. Appl. No. 17/306,898, 5 pages.

Office Action, dated Mar. 3, 2023, received in Japanese Patent Application No. 2022-018022, which corresponds with U.S. Appl. No. 17/306,898, 6 pages.

Office Action, dated Aug. 20, 2021, received in Korean Patent Application No. 2021-7022726, which corresponds with U.S. Appl. No. 17/306,898, 5 pages.

Final Office Action, dated Feb. 10, 2022, received in Korean Patent Application No. 2021-7022726, which corresponds with U.S. Appl. No. 17/306,898, 4 pages.

Office Action, dated Jan. 13, 2023, received in U.S. Appl. No. 17/379,864, 24 pages.

Notice of Allowance, dated Jul. 6, 2023, received in U.S. Appl. No. 17/379,864, 9 pages.

Final Office Action, dated Feb. 14, 2023, received in U.S. Appl. No. 17/553,018, 18 pages.

Office Action, dated Jun. 8, 2023, received in U.S. Appl. No. 17/553,018, 17 pages.

Office Action, dated Jun. 23, 2022, received in U.S. Appl. No. 17/553,018, 17 pages.

Office Action, dated Jun. 8, 2022, received in Korean Patent Application No. 2022-7016117, which corresponds with U.S. Appl. No. 17/553,018, 5 pages.

Office Action, dated Dec. 8, 2022, received in Korean Patent Application No. 2022-7016117, which corresponds with U.S. Appl. No. 17/553,018, 5 pages.

Office Action, dated Apr. 17, 2023, received in U.S. Appl. No. 17/898,735, 16 pages.

International Search Report and Written Opinion, dated Sep. 8, 2021, received in International Patent Application No. PCT/US2021/033200, which corresponds with U.S. Appl. No. 17/023,265, 17 pages.

Invitation to Pay Additional Fees, dated Nov. 18, 2021, received in International Patent Application No. PCT/2021/042402, which corresponds with U.S. Appl. No. 17/031,637, 22 pages.

International Search Report and Written Opinion, dated Jan. 11, 2022, received in International Patent Application No. US/2021/042402, which corresponds with U.S. Appl. No. 17/031,637, 22 pages.

Invitation to Pay Additional Fees, dated Mar. 9, 2022, received in International Patent Application No. PCT/US2021/052052, which corresponds with U.S. Appl. No. 17/483,741, 23 pages.

International Search Report and Written Opinion, dated May 3, 2022, received in International Patent Application No. PCT/US2021/052052, which corresponds with U.S. Appl. No. 17/483,741, 54 pages.

Extended European Search Report, dated Jul. 29, 2022, received in European Patent Application No. 22161118.9, which corresponds with U.S. Appl. No. 17/028,943, 8 pages.

Patent, dated Nov. 28, 2023, received in Chinese Patent Application No. 202011544171.2, which corresponds with U.S. Appl. No. 16/824,506, 6 pages.

Final Office Action, dated Jan. 16, 2024, received in U.S. Appl. No. 17/553,018, 17 pages.

Office Action, dated Jan. 8, 2024, received in U.S. Appl. No. 17/898,735, 16 pages.

Invitation to Pay Additional Fees, dated Dec. 13, 2023, received in International Patent Application No. PCT/US2023/032012, which corresponds with U.S. Appl. No. 18/241,778, 13 pages.

Patent, dated Jul. 23, 2024, received in Chinese Patent Application No. 202210183369.5, which corresponds with U.S. Appl. No. 16/920,303, 6 pages.

Intent to Grant, dated Sep. 24, 2024, received in European Patent Application No. 20745450.5, which corresponds with U.S. Appl. No. 16/920,303, 10 pages.

Decision to Grant, dated Mar. 5, 2025, received in European Patent Application No. 20745450.5, which corresponds with U.S. Appl. No. 16/920,303, 5 pages.

Patent, dated Mar. 5, 2025, received in European Patent Application No. 20745450.5, which corresponds with U.S. Appl. No. 16/920,303, 2 pages.

Patent, dated Oct. 23, 2024, received in Indian Patent Application No. 202017041564, which corresponds with U.S. Appl. No. 16/920,303, 6 pages.

Patent, dated Apr. 8, 2025, received in Ukranian Patent Application No. 20745450.5, 3 pages.

Final Office Action, dated Jan. 6, 2025, received in Japanese Patent Application No. 2023-172092, which corresponds with U.S. Appl. No. 16/824,506, 5 pages.

Notice of Allowance, dated Oct. 15, 2024, received in Japanese Patent Application No. 2022-194986, which corresponds with U.S. Appl. No. 17/028,936, 2 pages.

Patent, dated Dec. 16, 2024, received in Japanese Patent Application No. 2022-194986, which corresponds with U.S. Appl. No. 17/028,936, 3 pages.

Patent, dated Apr. 7, 2025, received in Korean Patent Application No. 2023-7028776, which corresponds with U.S. Appl. No. 17/028,936, 6 pages.

Office Action, dated Jul. 30, 2024, received in Australian Patent Application No. 2023285975, which corresponds with U.S. Appl. No. 17/028,943, 3 pages.

Notice of Allowance, dated Jan. 30, 2025, received in Australian Patent Application No. 2023285975, which corresponds with U.S. Appl. No. 17/028,943, 5 pages.

Office Action, dated Nov. 14, 2024, received in Australia Patent Application No. 2024200357, which corresponds with U.S. Appl. No. 17/553,018, 2 pages.

Notice of Allowance, dated Jan. 23, 2025, received in U.S. Appl. No. 17/947,042, 23 pages.

(56) References Cited

OTHER PUBLICATIONS

Notice of Allowance, dated Jun. 25, 2024, received in Chinese Patent Application No. 202210183369.5, which corresponds with U.S. Appl. No. 16/920,303, 2 pages.

Office Action, dated Jul. 1, 2024, received in Japanese Patent Application No. 2023-172092, which corresponds with U.S. Appl. No. 16/824,506, 6 pages.

Certificate of Grant, dated Feb. 1, 2024, received in Australian Patent Application No. 2021245251, which corresponds with U.S. Appl. No. 17/028,936, 4 pages.

Office Action, dated Jan. 12, 2024, received in Japanese Patent Application No. 2022-194986, which corresponds with U.S. Appl. No. 17/028,936, 2 pages.

Final Office Action, dated Jun. 10, 2024, received in Japanese Patent Application No. 2022-194986, which corresponds with U.S. Appl. No. 17/028,936, 9 pages.

Notice of Allowance, dated Jun. 24, 2024, received in Chinese Patent Application No. 202210183363.8, which corresponds with U.S. Appl. No. 17/028,942, 2 pages.

Patent, dated Jul. 23, 2024, received in Chinese Patent Application No. 202210183363.8, which corresponds with U.S. Appl. No. 17/028,942, 6 pages.

Certificate of Grant, dated Feb. 22, 2024, received in Australian Patent Application No. 2021290349, 4 pages.

Notice of Allowance, dated Apr. 19, 2024, received in U.S. Appl. No. 17/553,018, 10 pages.

Notice of Allowance, dated Mar. 4, 2024, received in Korean Patent Application No. 2022-7016117, which corresponds with U.S. Appl. No. 17/553,018, 3 pages.

Patent, dated May 17, 2024, received in Korean Patent Application No. 2022-7016117, which corresponds with U.S. Appl. No. 17/553,018, 3 pages.

Final Office Action, dated Apr. 18, 2024, received in U.S. Appl. No. 17/898,735, 15 pages.

Final Office Action, dated Mar. 7, 2024, received in U.S. Appl. No. 17/947,042, 33 pages.

Office Action, dated Jul. 2, 2014, received in U.S. Appl. No. 17/947,042, 37 pages.

Office Action, dated Mar. 7, 2024, received in U.S. Appl. No. 18/133,484, 10 pages.

International Search Report and Written Opinion, dated Feb. 5, 2024, received in International Patent Application No. PCT/US2023/032012, which corresponds with U.S. Appl. No. 18/241,778, 20 pages.

Office Action, dated Oct. 10, 2023, received in European Patent Application No. 20745450.5, which corresponds with U.S. Appl. No. 16/920,303, 9 pages.

Patent, dated Oct. 5, 2023, received in Japanese Patent Application No. 2022-018022, which corresponds with U.S. Appl. No. 17/306,898, 4 pages.

Notice of Allowance, dated Oct. 23, 2023, received in U.S. Appl. No. 17/379,864, 9 pages.

Final Office Action, dated Oct. 17, 2023, received in Korean Patent Application No. 2022-7016117, which corresponds with U.S. Appl. No. 17/553,018, 4 pages.

Office Action, dated Oct. 13, 2023, received in U.S. Appl. No. 17/947,042, 29 pages.

Notice of Allowance, dated May 16, 2025, received in Japanese Patent Application No. 2023-172092, which corresponds with U.S. Appl. No. 16/824,506, 2 pages.

Patent, dated May 15, 2025, received in Australian Patent Application No. 2023285975, which corresponds with U.S. Appl. No. 17/028,943, 3 pages.

Notice of Allowance, dated May 16, 2025, received in Australia Patent Application No. 2024200357, which corresponds with U.S. Appl. No. 17/553,018, 5 pages.

Patent, dated Jun. 18, 2025, received in Japanese Patent Application No. 2023-172092, which corresponds with U.S. Appl. No. 16/824,506, 5 pages.

International Preliminary Report on Patententability (IPRP), dated Jun. 12, 2024, received in International Patent Application No. PCT/US2023/032012, which corresponds with U.S. Appl. No. 18/241,778, 39 pages.

Written Opinion of the International Preliminary Examining Authority, dated May 16, 2024, received in International Patent Application No. PCT/US2023/032012, which corresponds with U.S. Appl. No. 18/241,778, 11 pages.

Notice of Allowance, dated Aug. 22, 2025, received in Japanese Patent Application No. 2024-217686, 2 pages.

Grant Certificate, dated Sep. 11, 2025, received in Australia Patent Application No. 2024200357, which corresponds with U.S. Appl. No. 17/553,018, 3 pages.

Extended European Search Report, dated Oct. 7, 2025, received in European Application No. 17/028,943, which corresponds with U.S. Appl. No. 17/028,943, 13 pages.

Office Action, dated Dec. 9, 2025, received in European Patent Application No. 23175376.5, which corresponds with U.S. Appl. No. 17,028,936, 11 pages.

Office Action, dated Mar. 25, 2026, received in Australian Patent Application No. 2025202678, 4 pages.

Office Action, dated Mar. 4, 2026, received in U.S. Appl. No. 18/639,759, 31 Pages.

* cited by examiner

Event Sorter
170

| Event Monitor | 171 |
| Hit View Determination Module | 172 |
| Active Event Recognizer Determination Module | 173 |
| Event Dispatcher Module | 174 |

Application 136-1

Portable Multifunction Device 100

208
206
210
212

Speaker 111

Optical Sensor 164

Proximity Sensor 166

200

210 is SIM card slot
212 is headphone jack

202

Touch Screen 112

Contact Intensity Sensor(s) 165

Tactile Output Generator(s) 167

203

Microphone 113

Home 204

Accelerometer(s) 168

External Port 124

Device 300

Electronic Accessory
Case 342

Electronic Accessory
Case 342 ambient sound outside ear ambient sound inside ear antiphase ambient sound perceived

Figure 3F

Portable Multifunction Device 100

Touch Screen 112

450

468

470

453

451

460

462

Tactile Output
Generator(s) 357

Contact Intensity
Sensor(s) 359

452

Portable Multifunction Device 100

Touch Screen 112

Portable Multifunction Device 100

Portable Multifunction Device 100

Portable Multifunction Device 100

574

346

480

345

5026

Pairing Started

574

346

480

345

5028

Pairing Complete

574

346

480

345

574

346

480

345

5024

Portable Multifunction Device 100

164  111

5121

5126 — Do Not Disturb  •••

5128 — Personal  •••

5130 — Sleep  •••

5119

480

345

5108

Portable Multifunction Device 100

164  111

5119

5132
5126 — Do Not Disturb  •••

5128 — Personal  •••

5130 — Sleep  •••

480

345

5108

Portable Multifunction Device 100

516-1

301-1

516-2

301-2

Max's Earbuds    40% — 5262

Live Listen — 5234
Off

Reduce Loud Sounds — 5235
On 85 decibels — 5266
As loud as heavy city traffic — 5268

Ambient Noise Setting — 5236
Transparency

5244 — Live Listen    Background    Conversation — 5248
Off    Sounds    Boost
Off    On

5246

600

602 Detect an input via one or more input devices

604 The one or more input devices include a sequence of capacitive sensors arranged to detect user gestures 606 The wearable audio output device includes a housing with one or more physically distinguished portions at a location corresponding to the sequence of capacitive sensors 608 In response to detecting the input, in accordance with a determination that the input is a swipe gesture along a second portion of a wearable audio output device, adjust an output volume for the wearable audio output device based on movement of the swipe gesture along the second portion of the wearable audio output device 610 The second portion is a stem of the wearable audio output device and the swipe gesture includes movement of one or more fingers along a length of the stem 612 A first portion of the wearable audio output device includes an audio output device configured to be inserted in the user's ear and one or more positioning elements configured to maintain the audio output device in the user's ear after insertion The second portion of the wearable audio output device is an elongated portion extending from the first portion 614 The wearable audio output device is in communication with a second wearable audio output device to form a pair of wearable audio output devices Adjusting the output volume for the wearable audio output device includes adjusting the output volume for both the wearable audio output device and the second wearable audio output device

Figure 6A

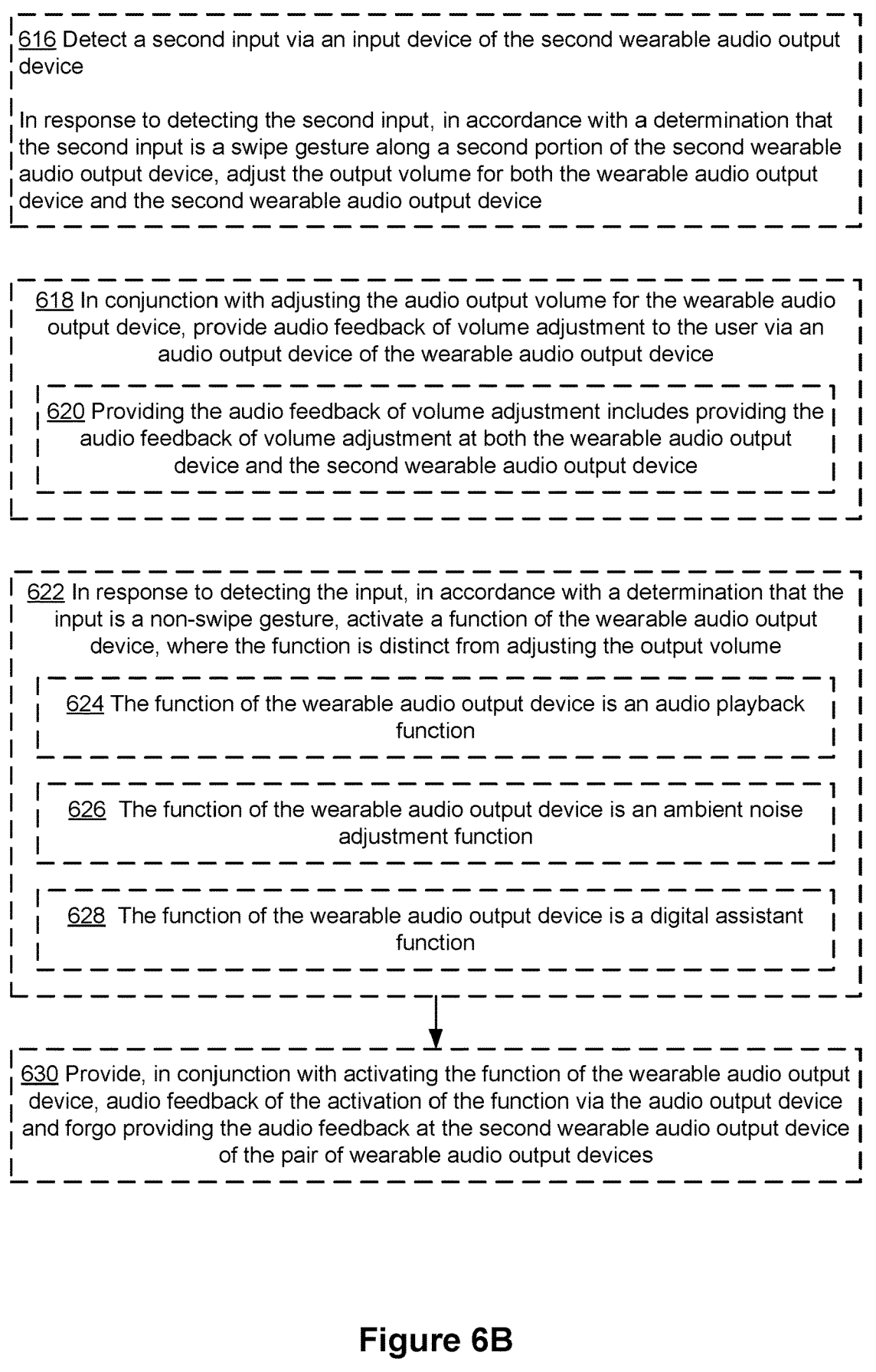

616 Detect a second input via an input device of the second wearable audio output device In response to detecting the second input, in accordance with a determination that the second input is a swipe gesture along a second portion of the second wearable audio output device, adjust the output volume for both the wearable audio output device and the second wearable audio output device 618 In conjunction with adjusting the audio output volume for the wearable audio output device, provide audio feedback of volume adjustment to the user via an audio output device of the wearable audio output device 620 Providing the audio feedback of volume adjustment includes providing the audio feedback of volume adjustment at both the wearable audio output device and the second wearable audio output device 622 In response to detecting the input, in accordance with a determination that the input is a non-swipe gesture, activate a function of the wearable audio output device, where the function is distinct from adjusting the output volume 624 The function of the wearable audio output device is an audio playback function 626 The function of the wearable audio output device is an ambient noise adjustment function 628 The function of the wearable audio output device is a digital assistant function 630 Provide, in conjunction with activating the function of the wearable audio output device, audio feedback of the activation of the function via the audio output device and forgo providing the audio feedback at the second wearable audio output device of the pair of wearable audio output devices

Figure 6B

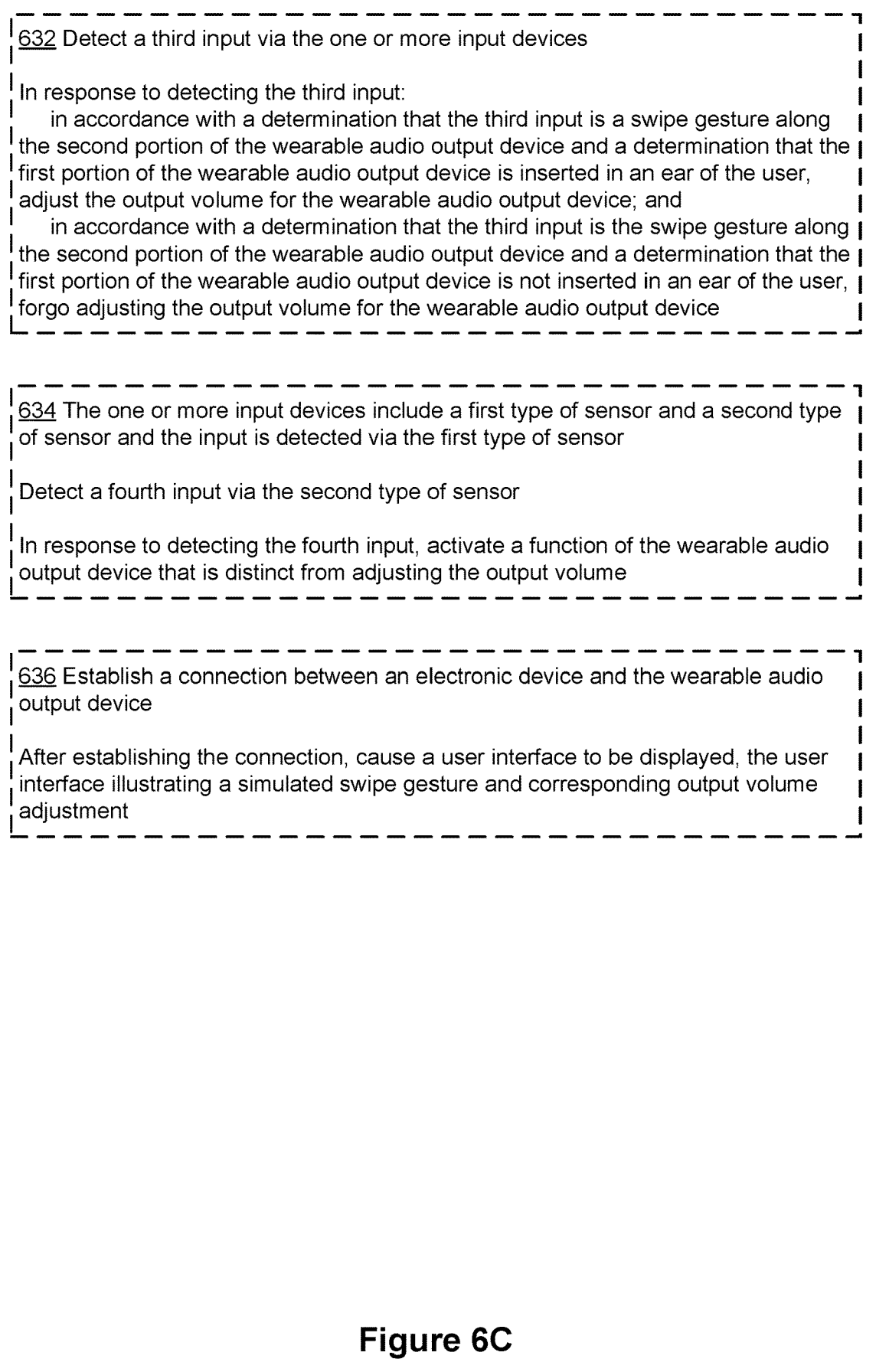

632 Detect a third input via the one or more input devices

In response to detecting the third input:
    in accordance with a determination that the third input is a swipe gesture along the second portion of the wearable audio output device and a determination that the first portion of the wearable audio output device is inserted in an ear of the user, adjust the output volume for the wearable audio output device; and
    in accordance with a determination that the third input is the swipe gesture along the second portion of the wearable audio output device and a determination that the first portion of the wearable audio output device is not inserted in an ear of the user, forgo adjusting the output volume for the wearable audio output device 634 The one or more input devices include a first type of sensor and a second type of sensor and the input is detected via the first type of sensor Detect a fourth input via the second type of sensor In response to detecting the fourth input, activate a function of the wearable audio output device that is distinct from adjusting the output volume 636 Establish a connection between an electronic device and the wearable audio output device After establishing the connection, cause a user interface to be displayed, the user interface illustrating a simulated swipe gesture and corresponding output volume adjustment

Figure 6C

700

702 Detect, at an electronic device, occurrence of a respective condition associated with an electronic accessory, distinct from the electronic device, the electronic accessory in communication with the electronic device 704 The occurrence of the respective condition includes a wireless coupling event between the electronic device and the electronic accessory 706 The occurrence of the respective condition includes a proximity-based communication between the electronic device and the electronic accessory 708 The occurrence of the respective condition includes a status change event at the electronic accessory A user interface corresponding to the respective condition includes status information corresponding to the status change event 710 The status change event includes a change in an opened or closed state of the electronic accessory 712 The status change event includes an electrical charging event at the electronic accessory 714 The occurrence of the respective condition includes an error event A user interface corresponding to the respective condition includes error information corresponding to the error event

716 In response to detecting the occurrence of the respective condition, cause a user interface corresponding to the respective condition to be displayed via the display generation component, the user interface including a representation of the electronic accessory 718 Causing the user interface to be displayed includes:
in accordance with a determination that the electronic accessory includes a first physical marking, causing a representation of the first physical marking to be displayed in the user interface; and
in accordance with a determination that the electronic accessory includes a second physical marking that is different from the first physical marking, causing a representation of the second physical marking to be displayed in the user interface 720 The first physical marking is specified or selected by a user while purchasing the electronic accessory 722 In accordance with a determination that the electronic accessory does not include the first physical marking, cause the user interface that includes the representation of the electronic accessory to be displayed without the representation of the first physical marking 724 The representation of the electronic accessory is a three-dimensional representation of the electronic accessory 726 The user interface includes one or more animated movements of the representation of the electronic accessory

Figure 7B

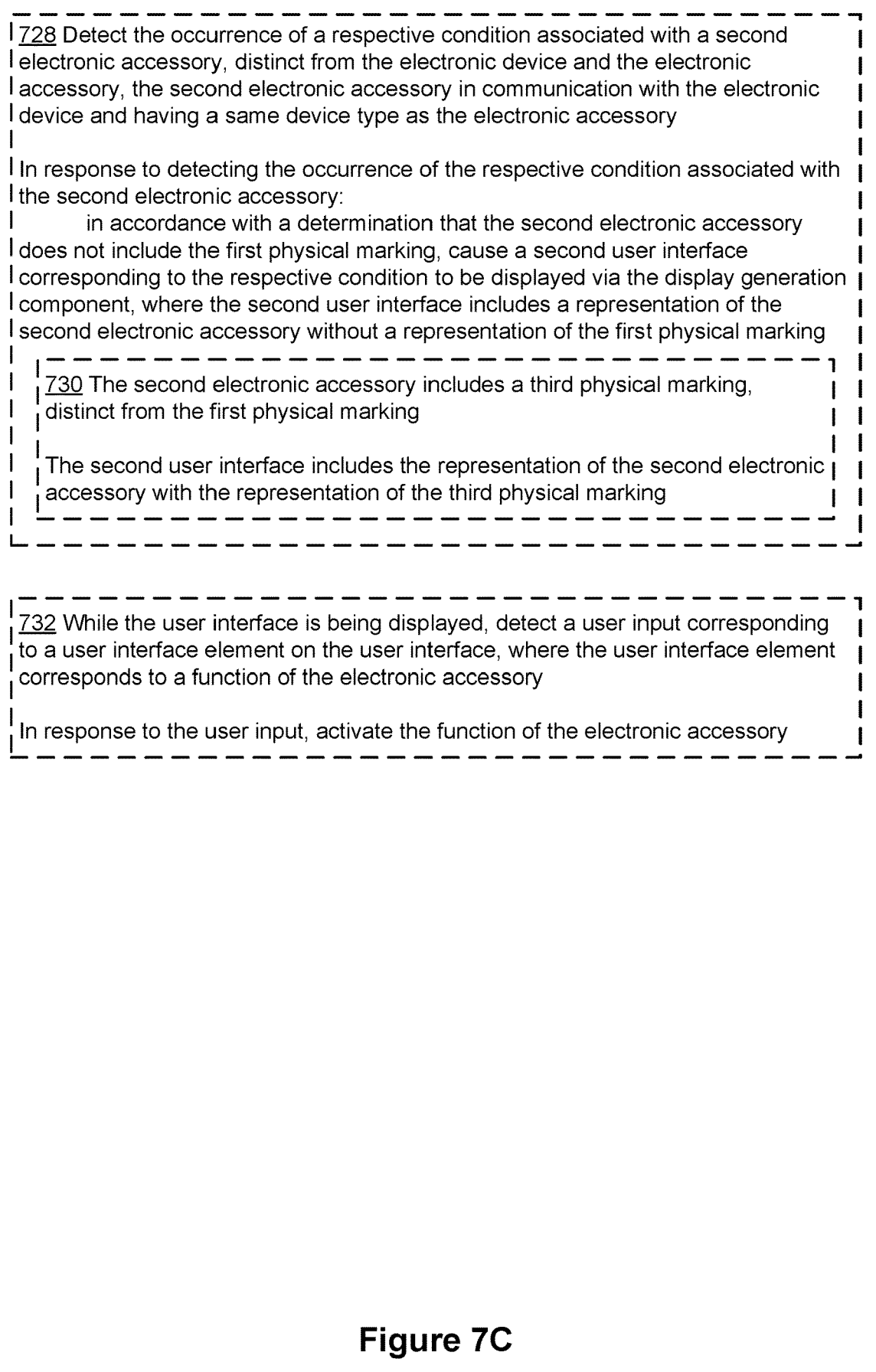

728 Detect the occurrence of a respective condition associated with a second electronic accessory, distinct from the electronic device and the electronic accessory, the second electronic accessory in communication with the electronic device and having a same device type as the electronic accessory In response to detecting the occurrence of the respective condition associated with the second electronic accessory:
   in accordance with a determination that the second electronic accessory does not include the first physical marking, cause a second user interface corresponding to the respective condition to be displayed via the display generation component, where the second user interface includes a representation of the second electronic accessory without a representation of the first physical marking 730 The second electronic accessory includes a third physical marking, distinct from the first physical marking The second user interface includes the representation of the second electronic accessory with the representation of the third physical marking 732 While the user interface is being displayed, detect a user input corresponding to a user interface element on the user interface, where the user interface element corresponds to a function of the electronic accessory In response to the user input, activate the function of the electronic accessory

Figure 7C

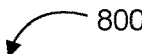 800

802 Detect a first event that includes a change in an opened or closed state of an accessory charging case

804 In response to detecting the change in the opened or closed state of the accessory charging case, cause a speaker of the accessory charging case to generate an audio notification corresponding to a status for at least one of the accessory charging case and one or more accessories associated with the accessory charging case > 806 The audio notification includes one or more words describing the status for at least one of the accessory charging case and the one or more accessories associated with the accessory charging case > 808 The status corresponds to a charge state of at least one of the one or more accessories associated with the accessory charging case > 810 The status includes a state of communicatively coupling between the accessory charging case and at least one of the one or more accessories associated with the accessory charging case > 812 The accessory charging case is configured to concurrently hold a plurality of accessories
>
> The first event includes a closure of the accessory charging case
>
> The status corresponds to a determination that the accessory charging case contains only a subset of the plurality of accessories > 814 The status corresponds to a reset event for the accessory charging case > 815 The status includes a charge state of the accessory charging case not meeting one or more preset criteria

Figure 8A

804 In response to detecting the change in the opened or closed state of the accessory charging case, cause a speaker of the accessory charging case to generate an audio notification corresponding to a status for at least one of the accessory charging case and one or more accessories associated with the accessory charging case

818 The status corresponds to a determination that the accessory charging case contains a plurality of accessory devices and a determination that the plurality of accessory devices are mismatched 820 The first event includes an opening of the accessory charging case 822 The accessory charging case is in communication with a display generation component Cause a user interface to be displayed via a display generation component, the user interface including a mismatch notification.

824 The user interface further includes a representation of the accessory charging case and respective representations of the plurality of accessory devices 826 The determination that the plurality of accessory devices are mismatched includes a determination that individual accessories of the plurality of accessory devices have different owners The user interface further includes ownership information for the plurality of accessory devices 828 The determination that the plurality of accessory devices are mismatched includes a determination that individual accessories of the plurality of accessory devices have different hardware and/or software versions The user interface further includes version information for the plurality of accessory devices

Figure 8B

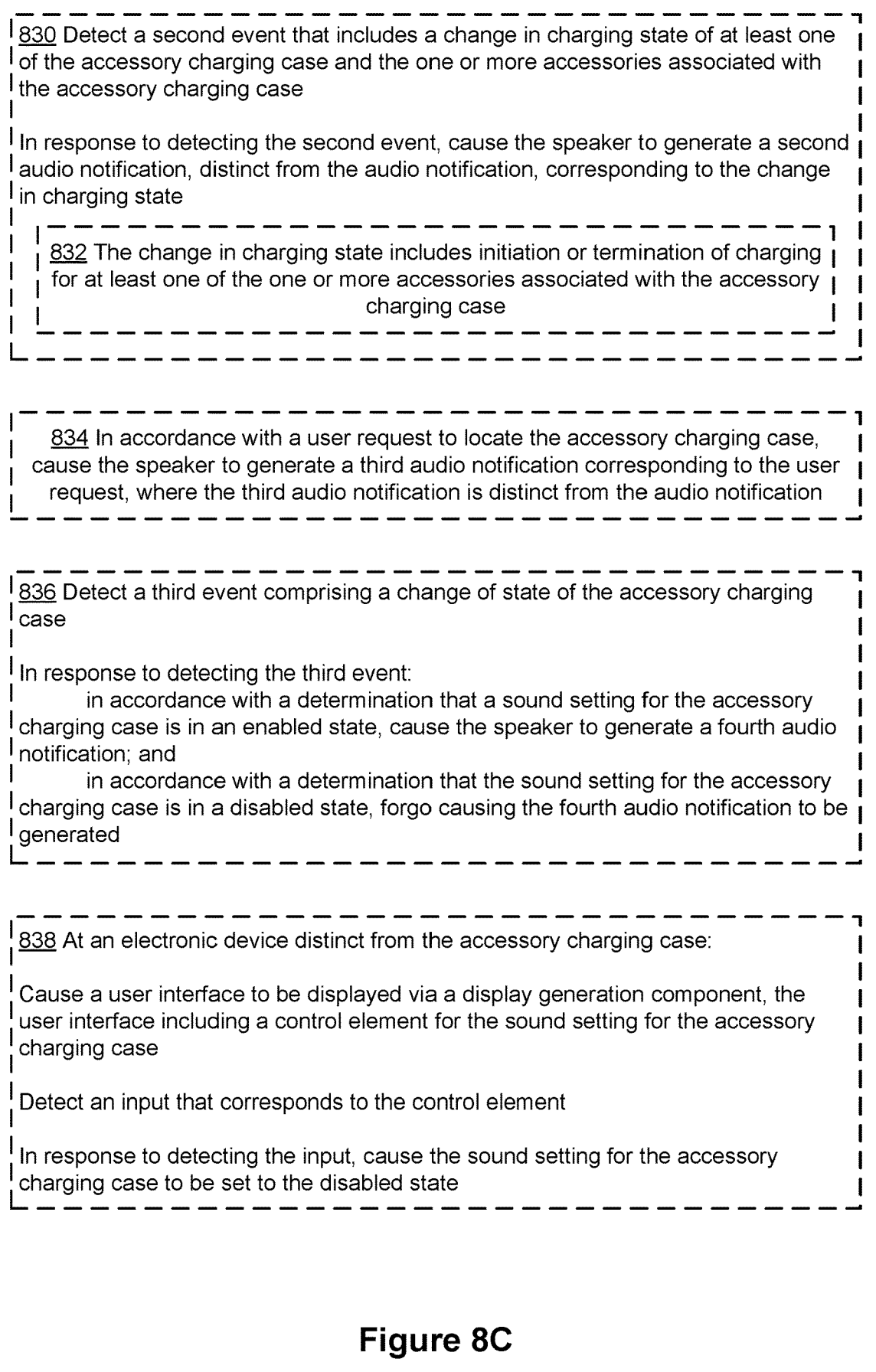

830 Detect a second event that includes a change in charging state of at least one of the accessory charging case and the one or more accessories associated with the accessory charging case In response to detecting the second event, cause the speaker to generate a second audio notification, distinct from the audio notification, corresponding to the change in charging state 832 The change in charging state includes initiation or termination of charging for at least one of the one or more accessories associated with the accessory charging case 834 In accordance with a user request to locate the accessory charging case, cause the speaker to generate a third audio notification corresponding to the user request, where the third audio notification is distinct from the audio notification 836 Detect a third event comprising a change of state of the accessory charging case In response to detecting the third event:
   in accordance with a determination that a sound setting for the accessory charging case is in an enabled state, cause the speaker to generate a fourth audio notification; and
   in accordance with a determination that the sound setting for the accessory charging case is in a disabled state, forgo causing the fourth audio notification to be generated 838 At an electronic device distinct from the accessory charging case:

Cause a user interface to be displayed via a display generation component, the user interface including a control element for the sound setting for the accessory charging case Detect an input that corresponds to the control element In response to detecting the input, cause the sound setting for the accessory charging case to be set to the disabled state

Figure 8C

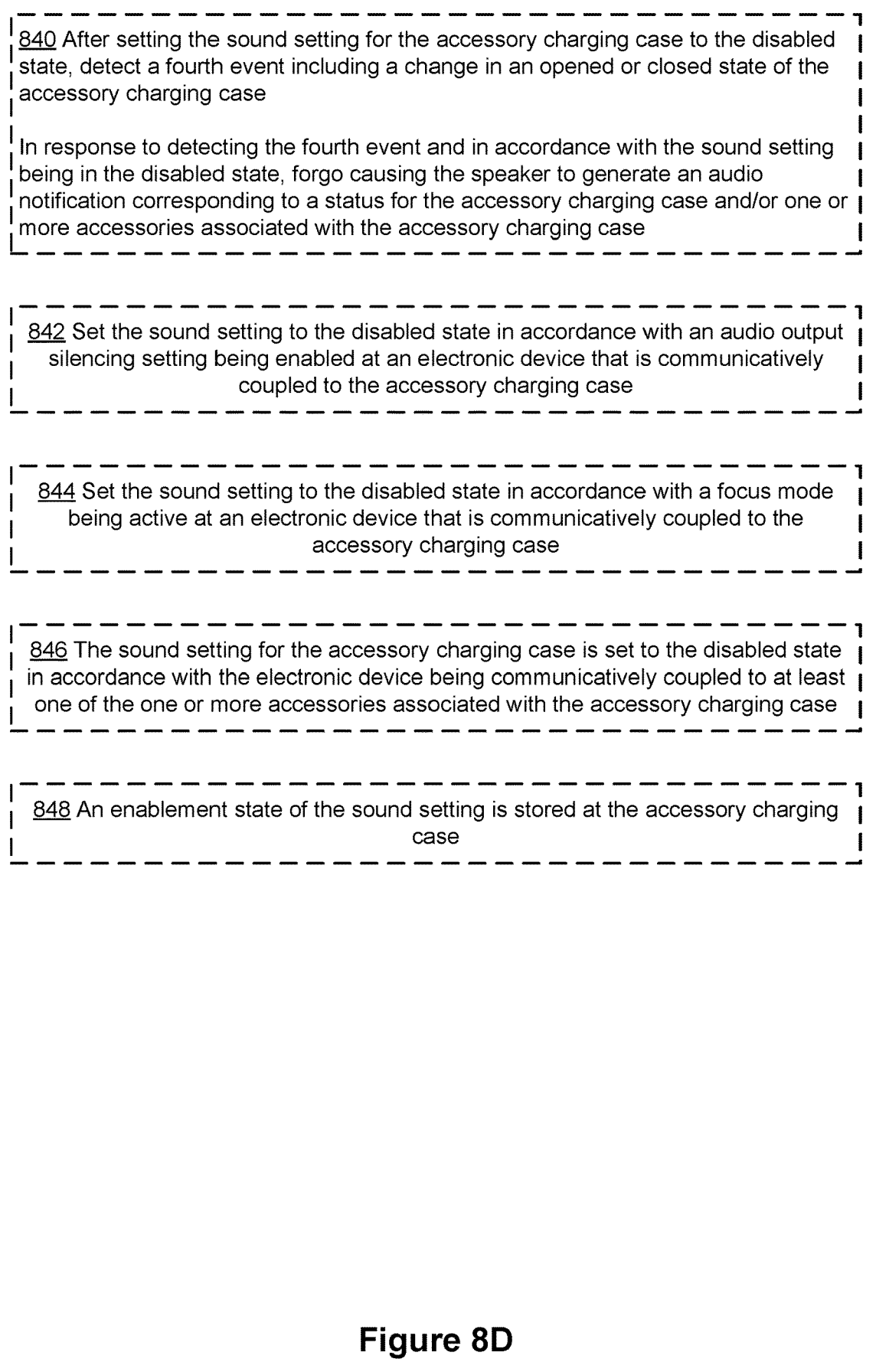

840 After setting the sound setting for the accessory charging case to the disabled state, detect a fourth event including a change in an opened or closed state of the accessory charging case In response to detecting the fourth event and in accordance with the sound setting being in the disabled state, forgo causing the speaker to generate an audio notification corresponding to a status for the accessory charging case and/or one or more accessories associated with the accessory charging case 842 Set the sound setting to the disabled state in accordance with an audio output silencing setting being enabled at an electronic device that is communicatively coupled to the accessory charging case 844 Set the sound setting to the disabled state in accordance with a focus mode being active at an electronic device that is communicatively coupled to the accessory charging case 846 The sound setting for the accessory charging case is set to the disabled state in accordance with the electronic device being communicatively coupled to at least one of the one or more accessories associated with the accessory charging case 848 An enablement state of the sound setting is stored at the accessory charging case

Figure 8D

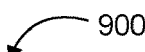
900

902 Cause a user interface to be displayed, the user interface including a volume control element for one or more wearable audio output devices 904 Detect an input that corresponds to the volume control element 906 In response to detecting the input:
    in accordance with a determination that the input is a first type of gesture, adjust a volume of the audio output of the one or more wearable audio output devices; and
    in accordance with a determination that the input is a second type of gesture, cause display of a conversation boost element for the one or more wearable audio output devices that, when selected, initiates a process for adjusting audio output of the one or more wearable audio output devices to boost conversation audio, corresponding to conversations with audio that is accessible to the one or more wearable audio output devices, relative to other audio being output by the one or more wearable audio output devices > 908  Selection of the conversation boost element initiates the process for adjusting audio output of the one or more wearable audio output devices to boost conversation audio while active noise cancellation for ambient noise is disabled at the one or more wearable audio output devices > 910  The first type of gesture is a swipe gesture at a location that corresponds to the volume control element and the volume is adjusted in accordance with movement of the swipe gesture
>
> The second type of gesture is a press gesture at the location that corresponds to the volume control element 912 In response to detecting the input, in accordance with a determination that the input is a third type of gesture, activate an audio function that is distinct from the volume adjustment and the display of the conversation boost element

Figure 9A

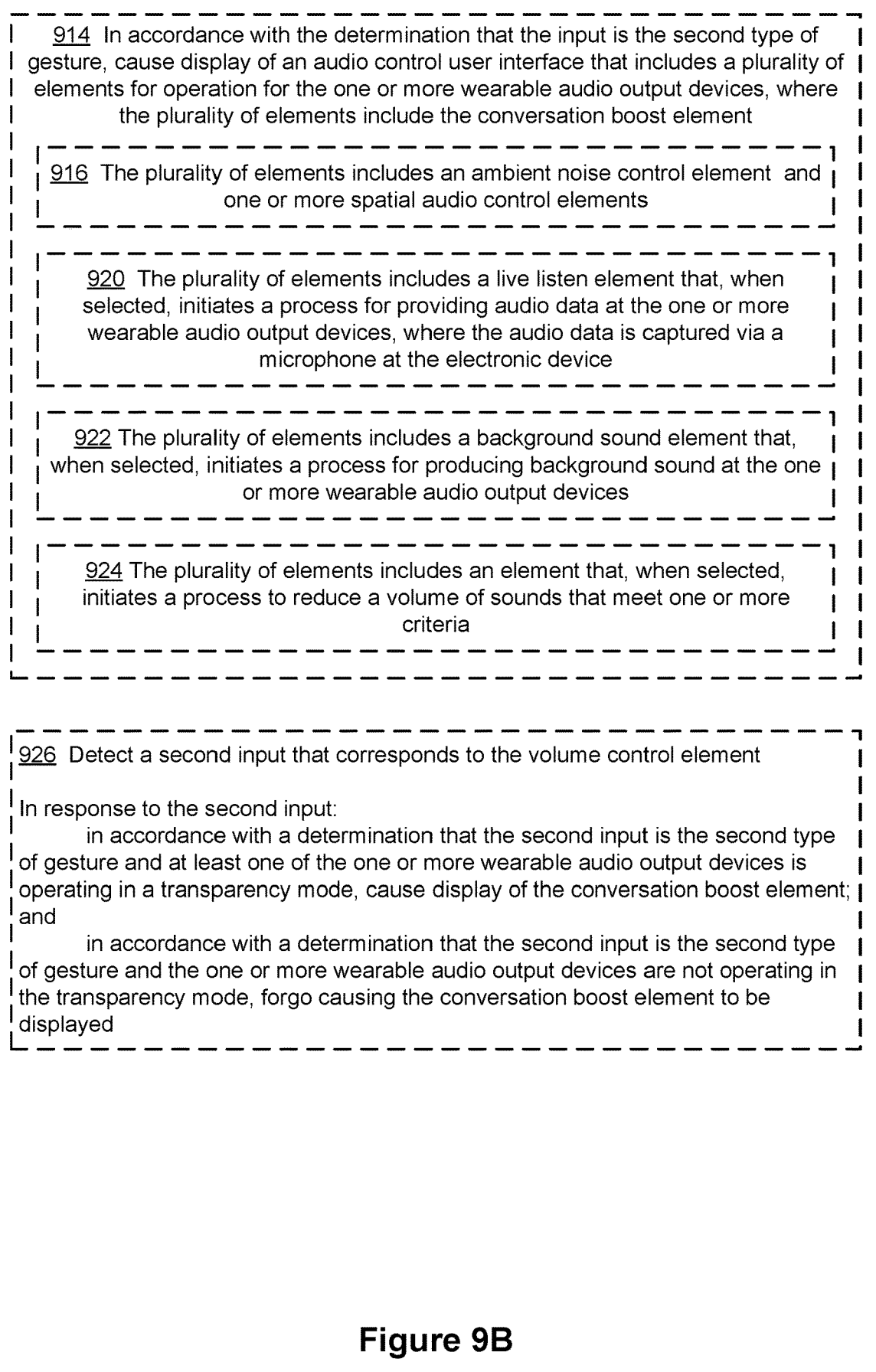

914 In accordance with the determination that the input is the second type of gesture, cause display of an audio control user interface that includes a plurality of elements for operation for the one or more wearable audio output devices, where the plurality of elements include the conversation boost element 916 The plurality of elements includes an ambient noise control element and one or more spatial audio control elements 920 The plurality of elements includes a live listen element that, when selected, initiates a process for providing audio data at the one or more wearable audio output devices, where the audio data is captured via a microphone at the electronic device 922 The plurality of elements includes a background sound element that, when selected, initiates a process for producing background sound at the one or more wearable audio output devices 924 The plurality of elements includes an element that, when selected, initiates a process to reduce a volume of sounds that meet one or more criteria 926 Detect a second input that corresponds to the volume control element In response to the second input:
        in accordance with a determination that the second input is the second type of gesture and at least one of the one or more wearable audio output devices is operating in a transparency mode, cause display of the conversation boost element; and
        in accordance with a determination that the second input is the second type of gesture and the one or more wearable audio output devices are not operating in the transparency mode, forgo causing the conversation boost element to be displayed

Figure 9B

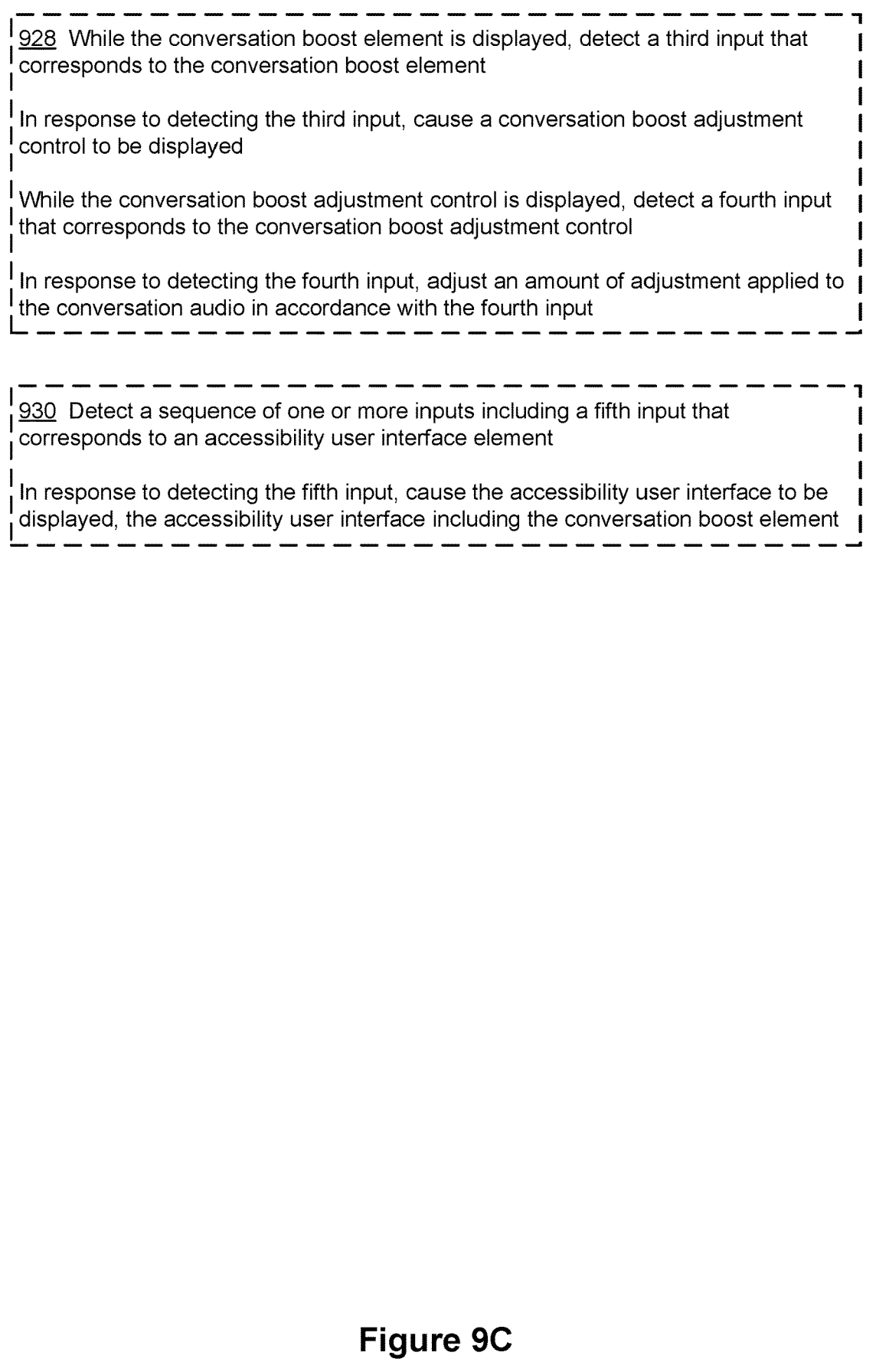

928 While the conversation boost element is displayed, detect a third input that corresponds to the conversation boost element In response to detecting the third input, cause a conversation boost adjustment control to be displayed While the conversation boost adjustment control is displayed, detect a fourth input that corresponds to the conversation boost adjustment control In response to detecting the fourth input, adjust an amount of adjustment applied to the conversation audio in accordance with the fourth input 930 Detect a sequence of one or more inputs including a fifth input that corresponds to an accessibility user interface element In response to detecting the fifth input, cause the accessibility user interface to be displayed, the accessibility user interface including the conversation boost element

Figure 9C

DEVICES, METHODS, AND USER INTERFACES FOR CONTROLLING OPERATION OF WIRELESS ELECTRONIC ACCESSORIES

RELATED APPLICATIONS

This application claims priority to U.S. Provisional Patent Application No. 63/404,101, filed Sep. 6, 2022, which is hereby incorporated by reference in its entirety.

TECHNICAL FIELD

This relates generally to electronic accessories such as wearable audio output devices and accessory charging cases, including but not limited to systems for controlling wearable audio output devices with input devices, electronic accessories with physical markings, and accessory cases with speakers.

BACKGROUND

Electronic accessories, including wearable audio output devices such as headphones, earbuds, and earphones, as well as charging cases, watches, and styluses are widely used to receive inputs from and provide outputs to a user. But conventional methods of controlling and interacting with such devices are cumbersome, inefficient, and limited.

In some cases, limited control over audio outputs is given to inputs provided at the wearable audio output devices; for example, an input may be limited to having control over a single predefined feature of audio output, such as toggling power or a feature on or off In some cases, limited control over audio outputs interferes with a user's ability to control the volume of audio content being played back by the wearable audio output devices and/or control the amount of conversational sound that the user is able to hear from the surrounding physical environment while wearing the wearable audio output devices. In some cases, user interfaces for controlling the wearable audio output devices, as well as other accessory devices, do not provide users with sufficient information for the users to be able to quickly distinguish between multiple devices of the same type, such as multiple sets of earbuds or multiple charging cases.

In some cases, user interfaces for controlling audio output settings provide too few controls, for example by providing controls for only one audio output device, thus requiring a user to provide numerous inputs and navigate through different menus or user interfaces to perform a particular operation, or provide too many controls, thus cluttering the user interface and increasing the likelihood that the user will mistakenly interact with the wrong control, particularly for implementations where display area is limited.

In addition, conventional methods take longer and require more user interaction than necessary to operate the electronic accessories, thereby wasting energy. This latter consideration is particularly important in battery-operated devices.

Furthermore, accessory cases for electronic accessories have typically been configured only to charge and/or store the electronic accessories. While some electronic accessories include output mechanisms (e.g., a speaker or display), accessory cases traditionally do not include means of providing output such as audio feedback to users. Instead, feedback, if provided at all, has traditionally been supplied by other devices, such as a smart phone, tablet, or computer paired or wirelessly connected with the accessory case.

Thus, conventional means of providing feedback require multiple devices and communication channels.

SUMMARY

Accordingly, there is a need for electronic accessories (e.g., wearable audio output devices and charging cases) and associated electronic devices with improved methods and interfaces for controlling and interacting with, such as adjusting volume, selecting between different audio output modes, and providing feedback to aid a user in operating such devices. Such methods and interfaces optionally complement or replace conventional methods for controlling operation of electronic accessories. Such methods and interfaces reduce the number, extent, and/or nature of the inputs from a user and produce a more efficient human-machine interface. For battery-operated systems and devices, such methods and interfaces conserve power and increase the time between battery charges.

The above deficiencies and other problems associated with user interfaces for electronic devices and accessories are reduced or eliminated by the disclosed computer systems and electronic accessories. In some embodiments, the computer system includes a desktop computer. In some embodiments, the computer system is portable (e.g., a notebook computer, tablet computer, or handheld device). In some embodiments, the computer system includes a personal electronic device (e.g., a wearable electronic device, such as a watch). In some embodiments, the computer system includes (and/or is in communication with) the wearable audio output devices (e.g., in-ear earphones, earbuds, over-ear headphones, etc.). In some embodiments, the computer system has (and/or is in communication with) a touch-sensitive surface (also known as a "touchpad"). In some embodiments, the computer system has (and/or is in communication with) a display device, which in some embodiments is a touch-sensitive display (also known as a "touch screen" or "touch-screen display"). In some embodiments, the computer system has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, audio output device pairing and calibration, digital music/audio playing, note taking, and/or digital video playing. Executable instructions for performing these functions are, optionally, included in a non-transitory computer readable storage medium or other computer program product configured for execution by one or more processors.

In accordance with some embodiments, a method is performed at a wearable audio output device that includes a first portion configured to be inserted in a user's ear and a second portion that extends from the first portion of the wearable audio output device, the second portion including one or more input devices. The method includes detecting an input via the one or more input devices; and, in response to detecting the input, in accordance with a determination that the input is a swipe gesture along the second portion of the wearable audio output device, adjusting an output volume for the wearable audio output device based on movement of the swipe gesture along the second portion of the wearable audio output device.

In accordance with some embodiments, a method is performed at an electronic device that includes or is in communication with a display generation component. The method includes detecting occurrence of a respective condition associated with an electronic accessory, distinct from the electronic device, the electronic accessory in communication with the electronic device; and, in response to detecting the occurrence of the respective condition, causing a user interface corresponding to the respective condition to be displayed via the display generation component, the user interface including a representation of the electronic accessory. Causing the user interface to be displayed includes, in accordance with a determination that the electronic accessory includes a first physical marking, causing a representation of the first physical marking to be displayed in the user interface; and, in accordance with a determination that the electronic accessory includes a second physical marking that is different from the first physical marking, causing a representation of the second physical marking to be displayed in the user interface.

In accordance with some embodiments, a method performed at an accessory charging case that includes a speaker. The method includes detecting a first event comprising a change in an opened or closed state of the accessory charging case; and, in response to detecting the change in the opened or closed state of the accessory charging case, causing the speaker to generate an audio notification corresponding to a status for at least one of the accessory charging case and one or more accessories associated with the accessory charging case.

In accordance with some embodiments, a method performed at an electronic device that is in communication with a display generation component and one or more wearable audio output devices. The method includes causing a user interface to be displayed via the display generation component, the user interface including a volume control element for the one or more wearable audio output devices; and detecting an input that corresponds to the volume control element. The method further includes, in response to detecting the input, and in accordance with a determination that the input is a first type of gesture, adjusting a volume of the audio output of the one or more wearable audio output devices. The method also includes, in response to detecting the input, and in accordance with a determination that the input is a second type of gesture, causing display of a conversation boost element for the one or more wearable audio output devices that, when selected, initiates a process for adjusting audio output of the one or more wearable audio output devices to boost conversation audio, corresponding to conversations with audio that is accessible to the one or more wearable audio output devices, relative to other audio being output by the one or more wearable audio output devices.

In accordance with some embodiments, an electronic device (e.g., a multifunction device, an electronic accessory, or electronic accessory case) includes one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions that, when executed by an electronic device cause the device to perform or cause performance of the operations of any of the methods described herein. In accordance with some embodiments, a graphical user interface on an electronic device with a display, a touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes means for performing or causing performance of the operations of any of the methods described herein. In accordance with some embodiments, an information processing apparatus, for use in an electronic device includes means for performing or causing performance of the operations of any of the methods described herein.

Thus, electronic devices that include or are in communication with one or more display devices, one or more input devices, one or more audio output devices, and/or one or more electronic accessories are provided with improved methods and interfaces for controlling operation of wireless electronic accessories, thereby increasing the effectiveness, efficiency, and user satisfaction with such devices. Such methods and interfaces may complement or replace conventional methods for controlling operation of wireless electronic accessories.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3F illustrates example audio control by a wearable audio output device in accordance with some embodiments.

FIGS. 5S-5BI illustrate example user interfaces and user interactions for various features associated with an electronic accessory case in accordance with some embodiments.

FIGS. 5BJ-5CB illustrate example user interfaces and user interactions for adjusting the audio output of wearable audio output devices in accordance with some embodiments.

FIGS. 6A-6C are flow diagrams of a process for adjusting audio output of one or more wearable audio output devices in accordance with some embodiments.

FIGS. 7A-7C are flow diagrams of a process for displaying status information of an electronic accessory in accordance with some embodiments.

FIGS. 8A-8D are flow diagrams of a process for presenting status information at an accessory charging case in accordance with some embodiments.

FIGS. 9A-9C are flow diagrams of a process for adjusting audio output of a wearable audio output device in accordance with some embodiments.

DESCRIPTION OF EMBODIMENTS

Figure 1A:
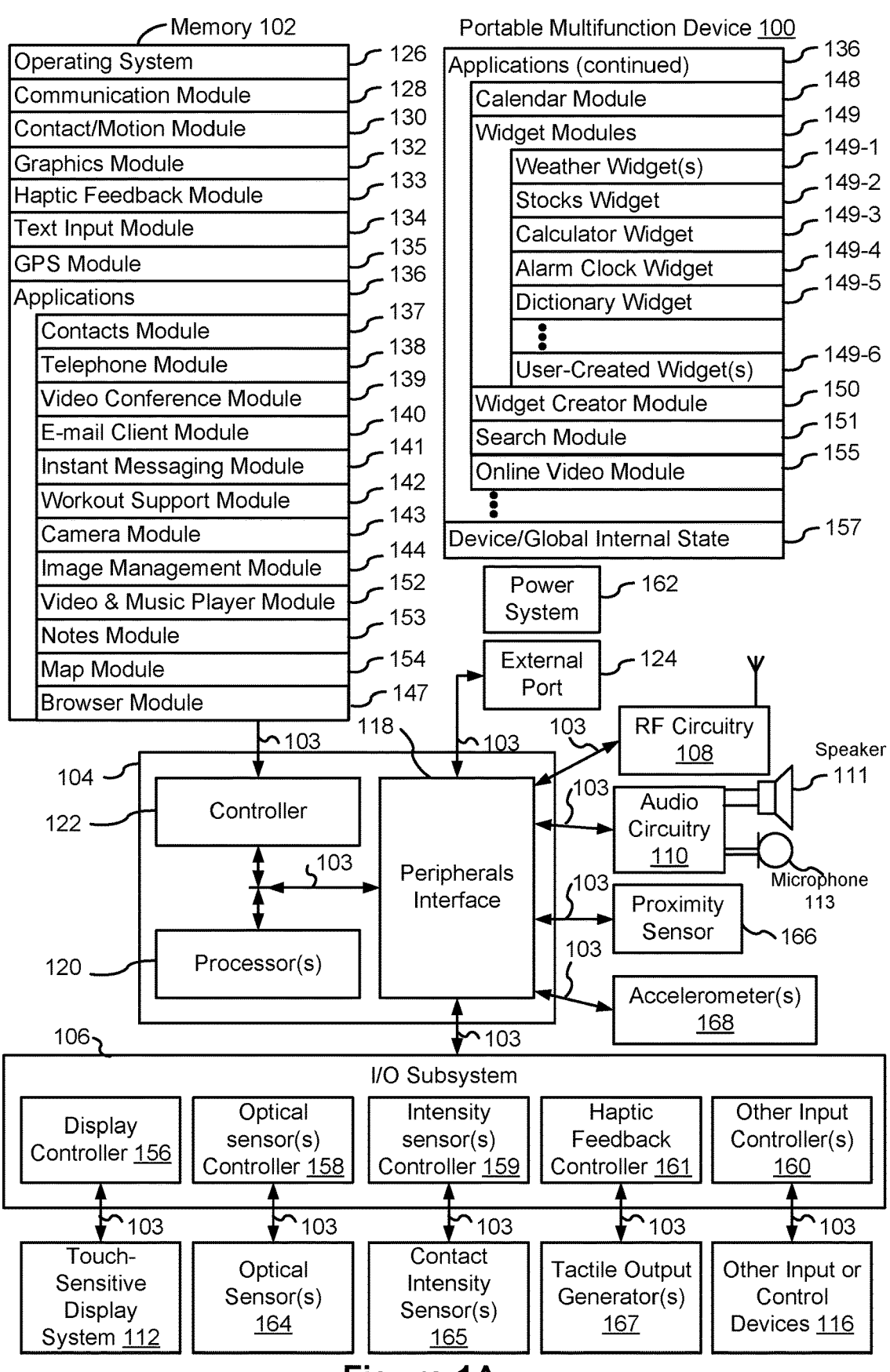
FIG. 1A is a block diagram illustrating a portable multifunction device with a touch-sensitive display in accordance with some embodiments.

As noted above, electronic accessories, including wearable audio output devices such as headphones, earbuds, and earphones, as well as charging cases, watches, and styluses are widely used to provide outputs to a user. Many computer systems that include or are in communication with wearable audio output devices give a user only limited control over outputs in response to inputs at the wearable audio output devices, or provide user interfaces with too few or too many output controls. The methods, systems, and user interfaces/interactions described herein improve how outputs are provided in multiple ways. For example, embodiments disclosed herein describe improved ways to control audio outputs using inputs at the wearable audio output devices and to provide improved user interfaces for controlling audio output settings.

As also noted above, electronic accessory cases are commonly passive devices used to store and/or charge electronic accessories. While some electronic accessories include output mechanisms (e.g., a speaker or display), accessory cases traditionally do not include means of providing output such as audio feedback to users. The methods, systems, and user interfaces/interactions described herein improve the functionality of an electronic accessory case. For example, embodiments disclosed herein describe improved ways of providing status information and/or feedback to a user at the electronic accessory case.

The processes described below enhance the operability of devices and make the user-device interfaces more efficient (e.g., by helping the user to provide proper inputs and reducing user mistakes when operating/interacting with the device) through various techniques, including by providing improved visual, audio, and/or tactile feedback to the user, reducing the number of inputs needed to perform an operation, providing control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

Below, FIGS. 1A-1B, 2, and 3A-3F, 4A-4C illustrate example devices. FIGS. 5A-5CB illustrate example user interfaces and device interactions for controlling the example devices. FIGS. 6A-6C illustrate a flow diagram of a process for adjusting audio output of one or more wearable audio output devices. FIGS. 7A-7C illustrate a flow diagram of a process for displaying status information of an electronic accessory. FIGS. 8A-8D illustrate a flow diagram of a process for presenting status information at an accessory charging case. FIGS. 9A-9C illustrate a flow diagram of a process for adjusting audio output of a wearable audio output device. The user interfaces and device interactions in FIGS. 5A-5CB are used to illustrate the processes in FIGS. 6A-6C, 7A-7C, 8A-8D, and 9A-9C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touch-pads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random-access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164 (e.g., as part of one or more cameras). FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California. In some embodiments, the external port is a USB Type-C connector that is the same as, or similar to and/or compatible with the USB Type-C connector used in some electronic devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:

contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on touch-sensitive display system 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
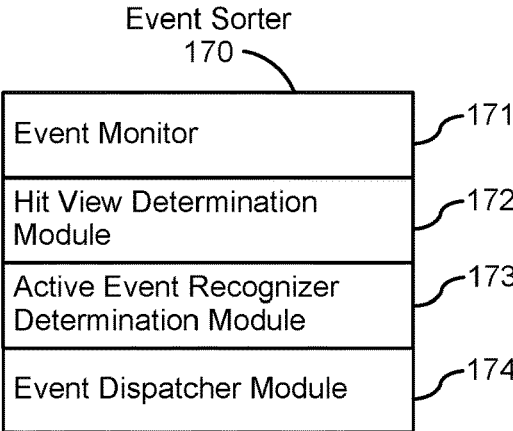
FIG. 1B is a block diagram illustrating example components for event handling in accordance with some embodiments.
Figure 1B:
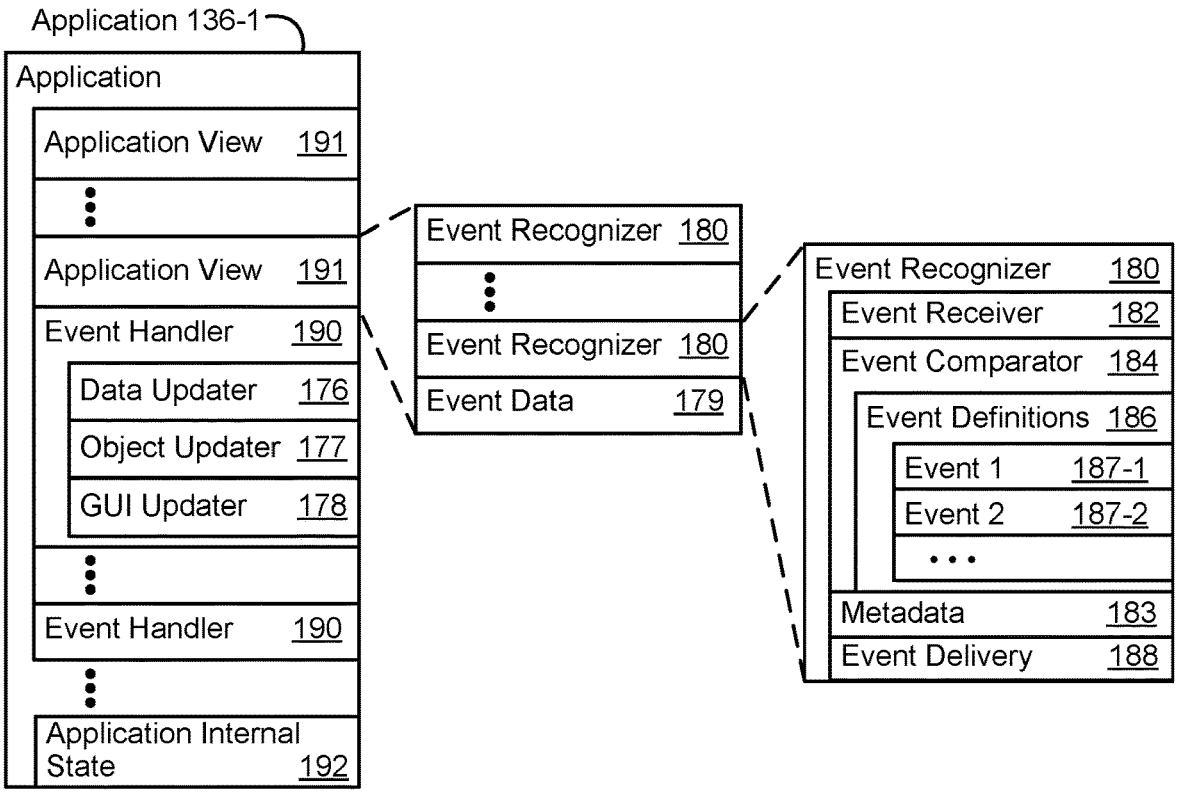

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher-level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancelation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event-to-event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
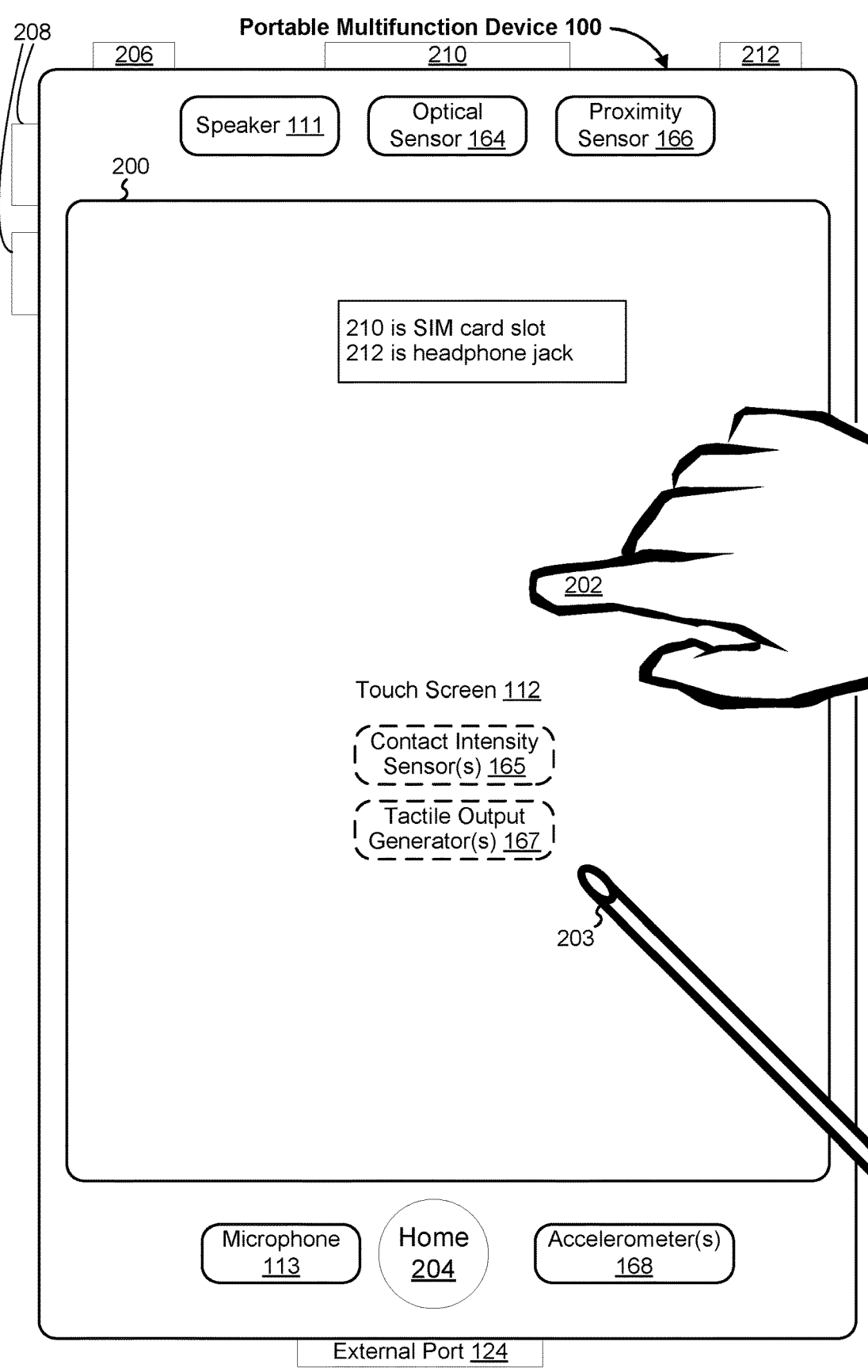
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

Figure 3A:
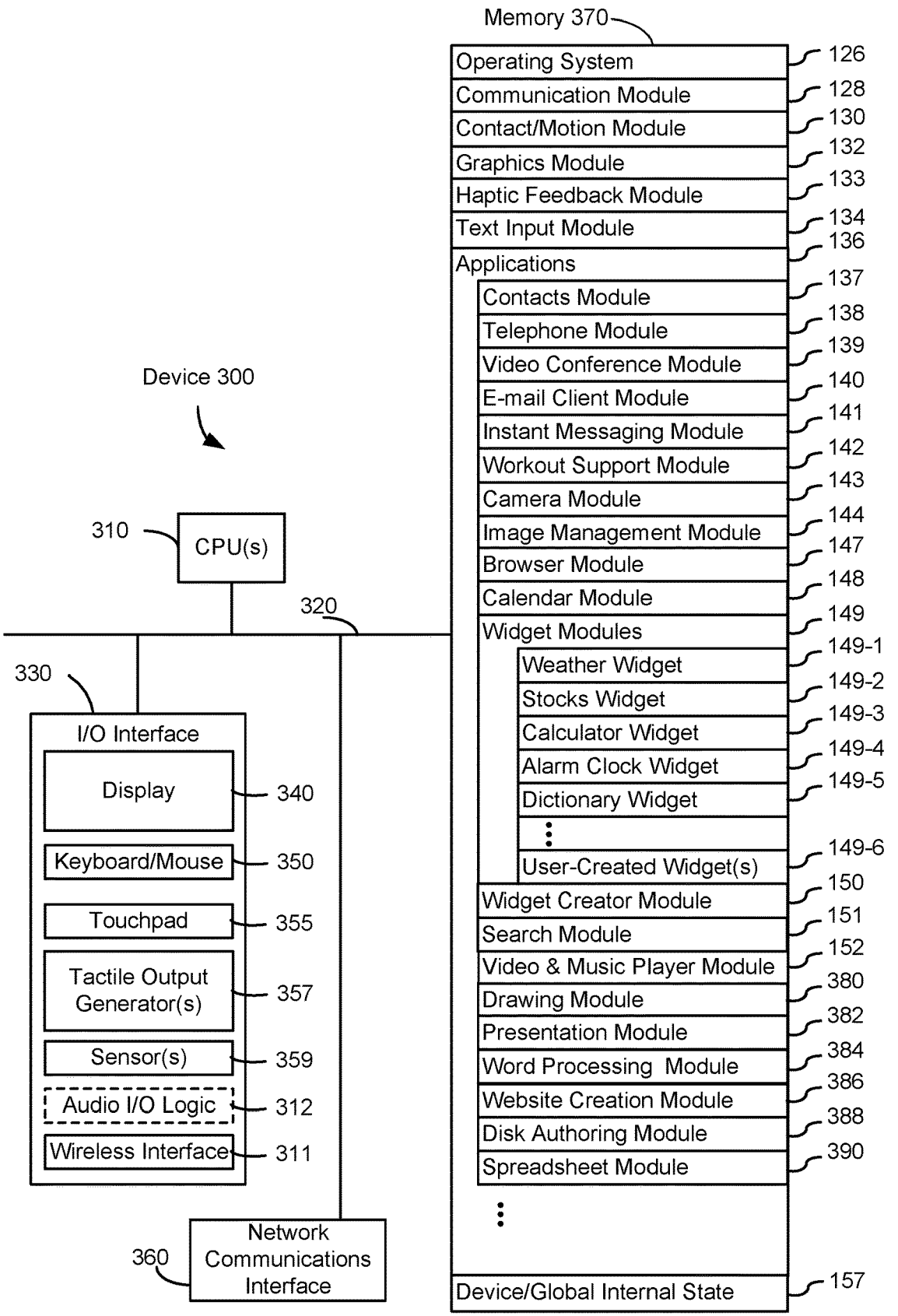
FIG. 3A is a block diagram of an example multifunction device with a display and a touch-sensitive surface in accordance with some embodiments.

FIG. 3A is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). In some embodiments, device 300 includes a wireless interface 311 for communication with one or more wearable audio output devices 301 and/or an electronic accessory case 342 (e.g., FIG. 3E). In some embodiments, device 300 includes a network communications interface 360 for communication with remote devices (e.g., in conjunction with communication module 128).

Memory 370 includes high-speed random-access memory, such as DRAM, SRAM, DDR RAM or other random access solid-state memory devices; and optionally includes non-volatile memory, such as one or more magnetic disk storage devices, optical disk storage devices, flash memory devices, or other non-volatile solid-state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3A are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3B:
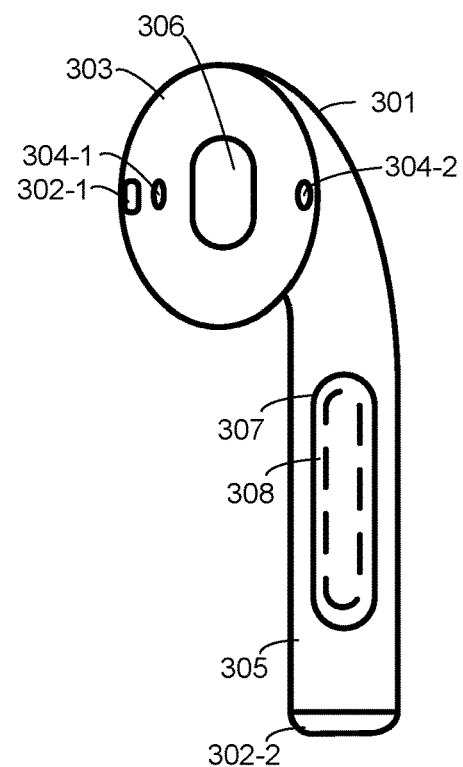
FIG. 3B illustrates physical features of an example wearable audio output device in accordance with some embodiments.

FIG. 3B illustrates physical features of an example wearable audio output device 301 in accordance with some embodiments. In some embodiments, the wearable audio output device 301 is one or more in-ear earphone(s), earbud(s), over-ear headphone(s), or the like. In the example of FIG. 3B, wearable audio output device 301 is an earbud. In some embodiments, wearable audio output device 301 includes a head portion 303 and a stem portion 305. In some embodiments, head portion 303 is configured to be inserted into a user's ear. In some embodiments, stem portion 305 physically extends from head portion 303 (e.g., is an elongated portion extending from head portion 303). For example, head portion 303 physically extends downward, in front of, and/or past a user's earlobe while head portion 303 is inserted into a user's ear.

In some embodiments, wearable audio output device 301 includes one or more audio speakers 306 (e.g., in head portion 303) for providing audio output (e.g., to a user's ear). In some embodiments, wearable audio output device 301 includes one or more placement sensors 304 (e.g., placement sensors 304-1 and 304-2 in head portion 303) to detect positioning or placement of wearable audio output device 301 relative to a user's ear, such as to detect placement of wearable audio output device 301 in a user's ear.

In some embodiments, wearable audio output device 301 includes one or more microphones 302 for receiving audio input. In some embodiments, one or more microphones 302 are included in head portion 303 (e.g., microphone 302-1). In some embodiments, one or more microphones 302 are included in stem portion 305 (e.g., microphone 302-2). In some embodiments, microphone(s) 302 detect speech from a user wearing wearable audio output device 301 and/or ambient noise around wearable audio output device 301. In some embodiments, multiple microphones of microphones 302 are positioned at different locations on wearable audio output device 301 to measure speech and/or ambient noise at different locations around wearable audio output device 301.

In some embodiments, wearable audio output device 301 includes one or more input devices 308 (e.g., in stem portion 305). In some embodiments, input device(s) 308 includes a pressure-sensitive (e.g., intensity-sensitive) input device. In some embodiments, the pressure-sensitive input device detects inputs from a user in response to the user squeezing the input device (e.g., by pinching stem portion 305 of wearable audio output device 301 between two fingers). In some embodiments, input device(s) 308 include a touch-sensitive surface (e.g., a capacitive sensor) for detecting touch inputs, accelerometer(s), and/or attitude sensor(s) (e.g., for determining an attitude of wearable audio output device 301 relative to a physical environment and/or changes in attitude of the device), and/or other input device by which a user can interact with and provide inputs to wearable audio output device 301. In some embodiments, input device(s) 308 include one or more capacitive sensors, one or more force sensors, one or more motion sensors, and/or one or more orientation sensors. FIG. 3B shows input device(s) 308 at a location in stem portion 305, however in some embodiments one or more of input device(s) 308 are located at other positions within wearable audio output device 301 (e.g., other positions within stem portion 305 and/or head portion 303). In some embodiments, wearable audio output device 301 includes a housing with one or more physically distinguished portions 307 at locations that correspond to input device(s) 308 (e.g., to assist a user in locating and/or interacting with input device(s) 308). In some embodiments, physically distinguished portion(s) 307 include indent(s), raised portion(s), and/or portions with different textures. In some embodiments, physically distinguished portion(s) 307 include a single distinguished portion that spans multiple input devices 308. For example, input devices 308 include a set of touch sensors configured to detect swipe gestures and a single distinguished portion (e.g., a depression or groove) spans the set of touch sensors. In some embodiments, physically distinguished portion(s) 307 include a respective distinguished portion for each input device of input device(s) 308.

Figure 3C:
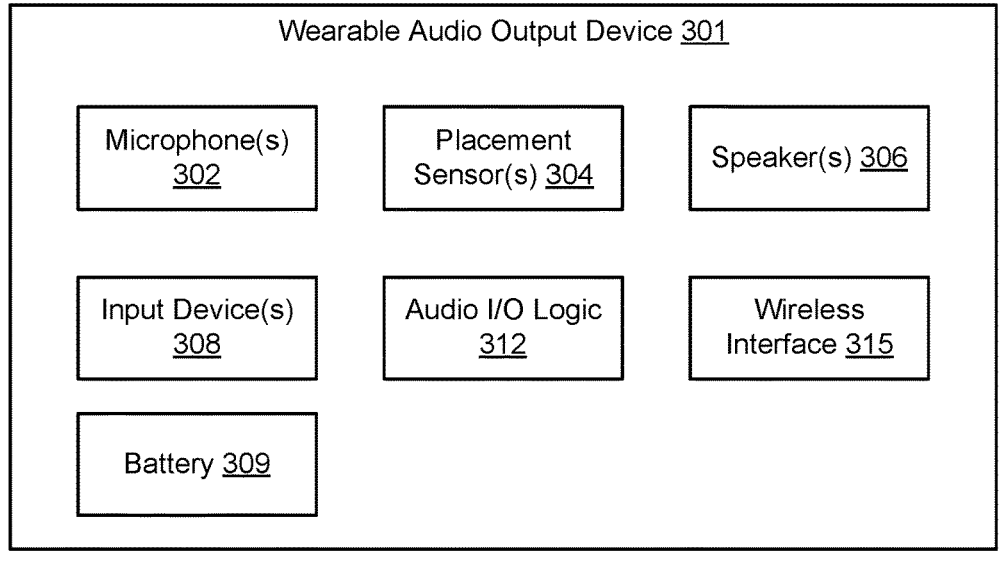
FIG. 3C is a block diagram of an example wearable audio output device in accordance with some embodiments.

FIG. 3C is a block diagram of an example wearable audio output device 301 in accordance with some embodiments. In some embodiments, wearable audio output device 301 is one or more in-ear earphone(s), earbud(s), over-ear headphone(s), or the like. In some examples, wearable audio output device 301 includes a pair of earphones or earbuds (e.g., one for each of a user's ears). In some examples, wearable audio output device 301 includes over-ear headphones (e.g., headphones with two over-ear earcups to be placed over a user's ears and optionally connected by a headband). In some embodiments, wearable audio output device 301 includes one or more audio speakers 306 for providing audio output (e.g., to a user's ear). In some embodiments, wearable audio output device 301 includes one or more placement sensors 304 to detect positioning or placement of wearable audio output device 301 relative to a user's ear, such as to detect placement of wearable audio output device 301 in a user's ear. In some embodiments, wearable audio output device 301 conditionally outputs audio based on whether wearable audio output device 301 is in or near a user's ear (e.g., wearable audio output device 301 forgoes outputting audio when not in a user's ear, to reduce power usage). In some embodiments where wearable audio output device 301 includes multiple (e.g., a pair) of wearable audio output components (e.g., earphones, earbuds, or earcups), each component includes one or more respective placement sensors, and wearable audio output device 301 conditionally outputs audio based on whether one or both components is in or near a user's ear, as described herein. In some embodiments, wearable audio output device 301 furthermore includes an internal rechargeable battery 309 for providing power to the various components of wearable audio output device 301.

In some embodiments, wearable audio output device 301 includes audio I/O logic 312, which determines the positioning or placement of wearable audio output device 301 relative to a user's ear based on information received from placement sensor(s) 304, and, in some embodiments, audio I/O logic 312 controls the resulting conditional outputting of audio. In some embodiments, wearable audio output device 301 includes a wireless interface 315 for communication with one or more multifunction devices, such as device 100 (FIG. 1A) or device 300 (FIG. 3A), and electronic accessory case 342 (see FIG. 3E). In some embodiments, interface 315 includes a wired interface for connection with a multifunction device, such as device 100 (FIG. 1A) or device 300 (FIG. 3A) (e.g., via a headphone jack or other audio port). In some embodiments, a user can interact with and provide inputs (e.g., remotely) to wearable audio output device 301 via interface 315. In some embodiments, wearable audio output device 301 is in communication with multiple devices (e.g., multiple multifunction devices, and/or an audio output device case), and audio I/O logic 312 determines, which of the multifunction devices from which to accept instructions for outputting audio.

In some embodiments, wearable audio output device 301 includes one or more microphones 302 for receiving audio input. In some embodiments where wearable audio output device 301 includes multiple (e.g., a pair) of wearable audio output components (e.g., earphones or earbuds), each component includes one or more respective microphones. In some embodiments, audio I/O logic 312 detects or recognizes speech or ambient noise based on information received from microphone(s) 302.

In some embodiments, wearable audio output device 301 includes one or more input devices 308. In some embodiments where wearable audio output device 301 includes multiple (e.g., a pair) of wearable audio output components (e.g., earphones, earbuds, or earcups), each component includes one or more respective input devices. In some embodiments, input device(s) 308 include one or more volume control hardware elements (e.g., an up/down button for volume control, or an up button and a separate down button, as described herein with reference to FIG. 1A) for volume control (e.g., locally) of wearable audio output device 301. In some embodiments, inputs provided via input device(s) 308 are processed by audio I/O logic 312. In some embodiments, audio I/O logic 312 is in communication with a separate device (e.g., device 100, FIG. 1A, or device 300, FIG. 3A) that provides instructions or content for audio output, and that optionally receives and processes inputs (or information about inputs) provided via microphone(s) 302, placement sensor(s) 304, and/or input device(s) 308, or via one or more input devices of the separate device. In some embodiments, audio I/O logic 312 is located in device 100 (e.g., as part of peripherals interface 118, FIG. 1A) or device 300 (e.g., as part of I/O interface 330, FIG. 3A), instead of device 301, or alternatively is located in part in device 100 and in part in device 301, or in part in device 300 and in part in device 301.

Figure 3D:
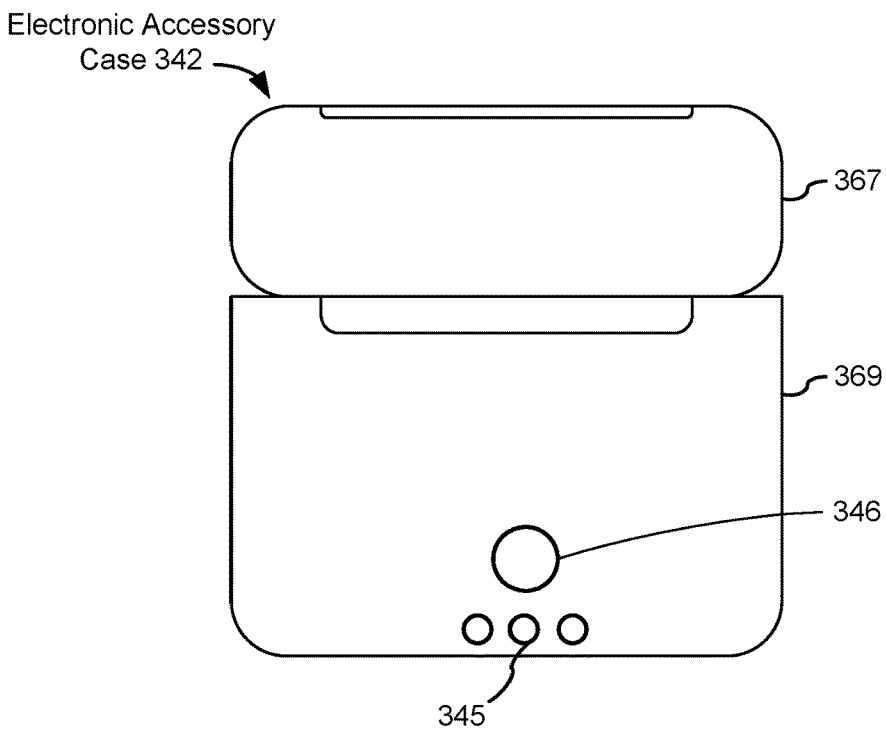
FIG. 3D illustrates physical features of an example electronic accessory case in accordance with some embodiments.

FIG. 3D illustrates physical features of an example electronic accessory case 342 in accordance with some embodiments. In some embodiments, electronic accessory case 342 includes a lid 367 and a container 369. In some embodiments, electronic accessory case 342 includes one or more sensors to detect if lid 367 is opened, closed, and/or moving. In some embodiments, electronic accessory case 342 is configured to house and/or charge one or more electronic accessories, such as headphones, a smartwatch, an electronic stylus, a fitness tracker, and/or earbuds. In some embodiments, electronic accessory case 342 includes one or more audio output devices (e.g., speaker(s) 345) (e.g., to providing status and/or event information to a user). In some embodiments, electronic accessory case 342 includes one or more input device(s).

Figure 3E:
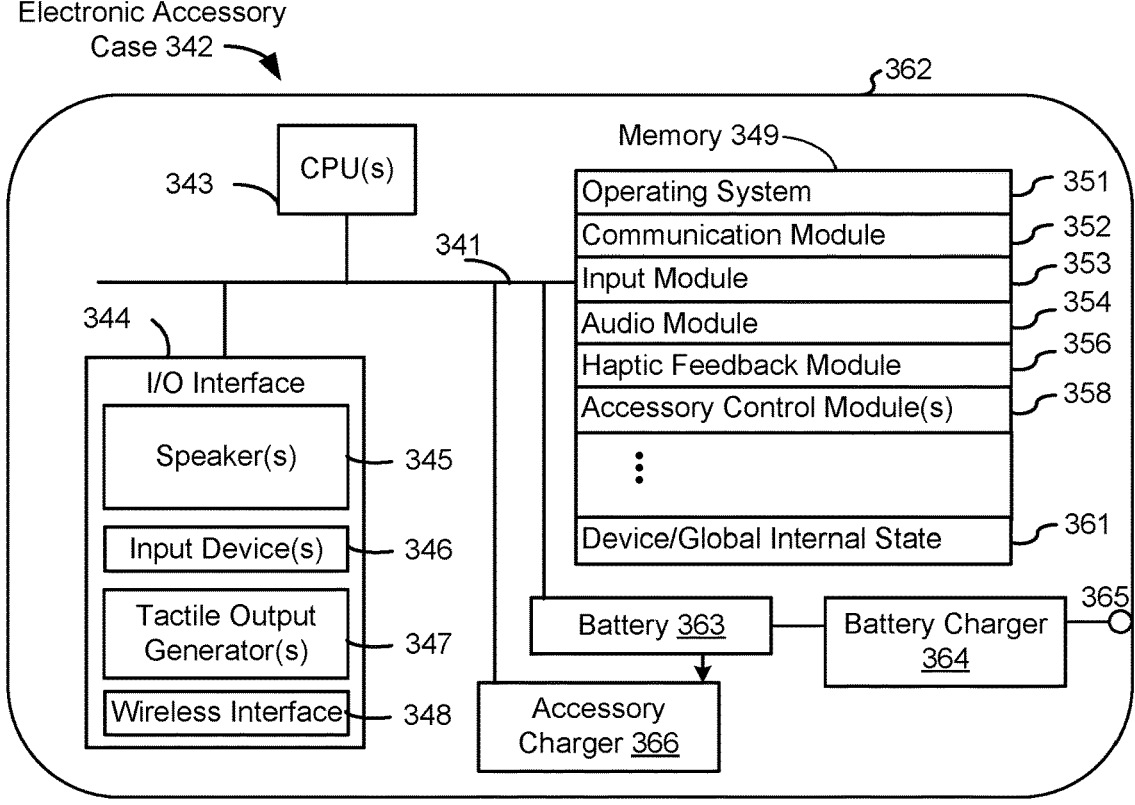
FIG. 3E is a block diagram of an example electronic accessory case in accordance with some embodiments.

FIG. 3E is a block diagram illustrating an electronic accessory case 342 in accordance with some embodiments. In some embodiments, electronic accessory case 342 a headphone case (e.g., a wireless headphone case). In some embodiments, electronic accessory case 342 an accessory charging case configured to charge one or more accessories while the accessories are positioned (e.g., mounted, inserted, and/or attached) to the accessory charging case. Electronic accessory case 342 includes memory 349 (which optionally includes one or more computer readable storage mediums), one or more processing units (CPUs) 343, and peripherals interface 344. In some embodiments, peripherals interface 344 includes one or more speakers 345, one or more input devices 346 (e.g., one or more buttons, switches, and/or levers), and one or more communication components 348 (e.g., a wireless interface) for communicating with devices such as one or more wearable audio output devices 301, and one or more electronic devices such as a smart phone, tablet, computer or the like. In some embodiments, peripherals interface 344 includes a set of LEDs and/or display elements capable of displaying icons and/or other visual information. In some embodiments, peripherals interface 344 includes one or more tactile output generators 347 for generating tactile outputs (also called haptic feedback), e.g., via an external case 362 (also called the housing) of the electronic accessory case 342.

In accordance with some embodiments, electronic accessory case 342 includes an internal rechargeable battery 363 for providing power to the various components of electronic accessory case 342, as well as for charging the internal battery 309 (FIG. 3B) of one or more wearable audio output devices 301. In some embodiments, electronic accessory case 342 includes a battery charger 364 for charging internal battery 363 when battery charger 364 is connected to an external power source via a power connect port 365. In some embodiments, the internal battery 363 and/or battery charger 364 are configured to charge the internal battery 309 (FIG. 3B) of an audio output device (e.g., headphone or earbud) when the audio output device is connected to (e.g., properly positioned in) an accessory charger 366. These components optionally communicate over one or more communication buses or signal lines 341.

In some embodiments, external case 362, when closed (e.g., see FIG. 4C), has an extent (e.g., width or height) in a first dimension of between 1.5 and 3 inches, an extent (e.g., height or width) in a second dimension of between 1 and 2.5 inches, and an extent in a third dimension (e.g., depth) of between 0.5 and 1 inch.

In some embodiments, the software components stored in memory 349 include operating system 351 (or a BIOS), communication module (or set of instructions) 352, an input module (or set of instructions) 353, graphics module (or set of instructions) 354, haptic feedback module (or set of instructions) 356, and headphone control module(s) 358. Furthermore, in some embodiments, memory 349 stores a device/global internal state 361, which includes one or more of: active application state, indicating which applications, if any, are currently active; and sensor state, including information obtained from the device's various sensors and other input devices 346.

Figure 3F:
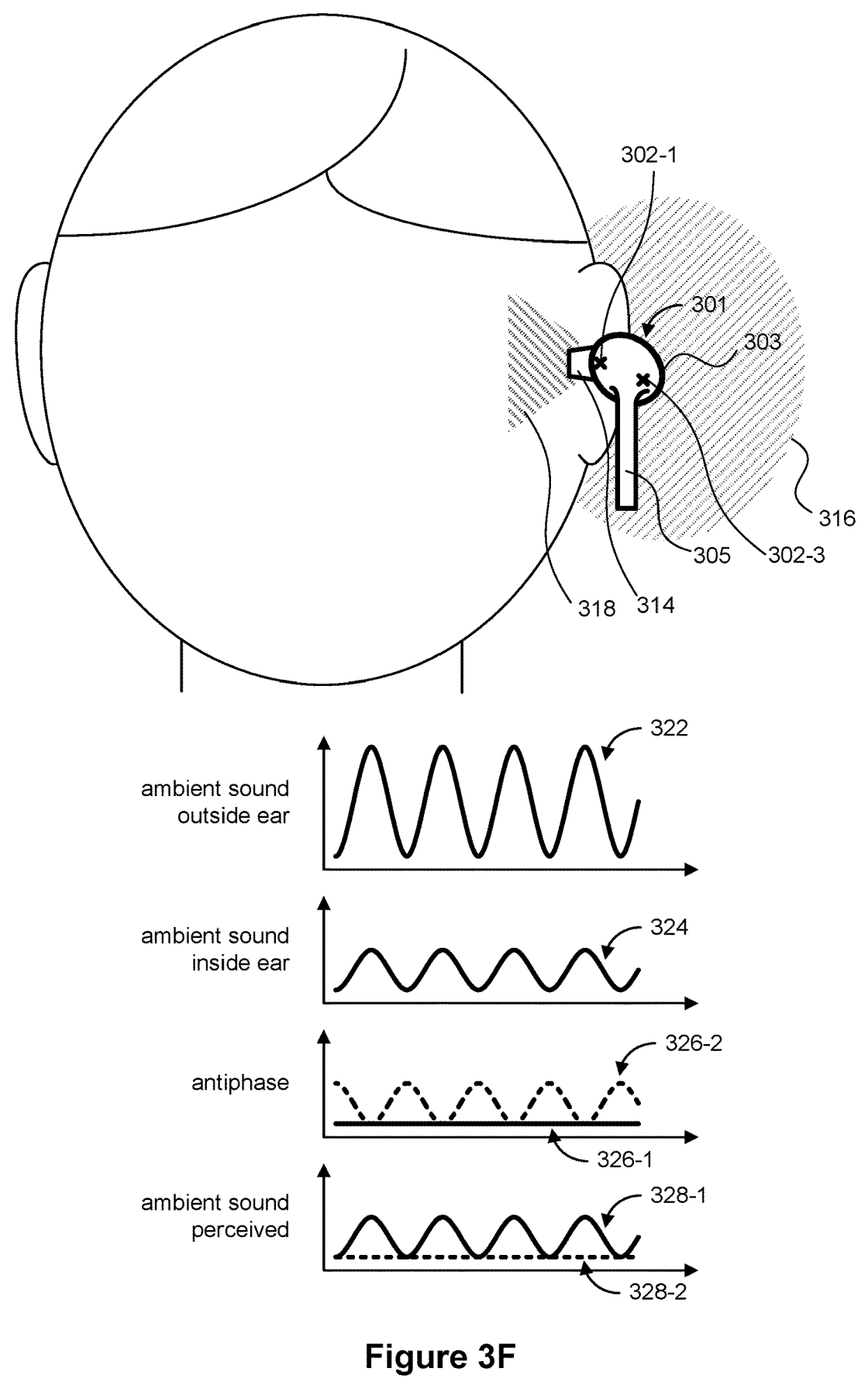

FIG. 3F illustrates example audio control by a wearable audio output device 301 in accordance with some embodiments. While the following example is explained with respect to implementations that include a wearable audio output device having earbuds to which interchangeable eartips (sometimes called silicon eartips or silicon seals) are attached, the methods, devices and user interfaces described herein are equally applicable to implementations in which the wearable audio output devices do not have eartips, and instead each have a portion of the main body shaped for insertion in the user's ears. In some embodiments, when a wearable audio output device having earbuds to which interchangeable eartips may be attached are worn in a user's ears, the earbuds and eartips together act as physical barriers that block at least some ambient sound from the surrounding physical environment from reaching the user's ear. For example, in FIG. 3F, wearable audio output device 301 is worn by a user such that head portion 303 and eartip 314 are in the user's left ear. Eartip 314 extends at least partially into the user's ear canal. Preferably, when head portion 303 and eartip 314 are inserted into the user's ear, a seal is formed between eartip 314 and the user's ear so as to isolate the user's ear canal from the surrounding physical environment. However, in some circumstances, head portion 303 and eartip 314 together block some, but not necessarily all, of the ambient sound in the surrounding physical environment from reaching the user's ear. Accordingly, in some embodiments, a first microphone (or, in some embodiments, a first set of one or more microphones) 302-1 (and optionally a third microphone 302-3) is located on wearable audio output device 301 so as to detect ambient sound, represented by waveform 322, in region 316 of a physical environment surrounding (e.g., outside of) head portion 303. In some embodiments, a second microphone (or, in some embodiments, a second set of one or more microphones) 302-2 (e.g., of microphones 302, FIG. 3C) is located on wearable audio output device 301 so as to detect any ambient sound, represented by waveform 324, that is not completely blocked by head portion 303 and eartip 314 and that can be heard in region 318 inside the user's ear canal. Accordingly, in some circumstances in which wearable audio output device 301 is not producing a noise-cancelling (also called "antiphase") audio signal to cancel (e.g., attenuate) ambient sound from the surrounding physical environment, as indicated by waveform 326-1, ambient sound waveform 324 is perceivable by the user, as indicated by waveform 328-1. In some circumstances in which wearable audio output device 301 is producing an antiphase audio signal to cancel ambient sound, as indicated by waveform 326-2, ambient sound waveform 324 is not perceivable by the user, as indicated by waveform 328-2.

In some embodiments, ambient sound waveform 322 is compared to attenuated ambient sound waveform 324 (e.g., by wearable audio output device 301 or a component of wearable audio output device 301, such as audio I/O logic 312, or by an electronic device that is in communication with wearable audio output device 301) to determine the passive attenuation provided by wearable audio output device 301. In some embodiments, the amount of passive attenuation provided by wearable audio output device 301 is taken into account when providing the antiphase audio signal to cancel ambient sound from the surrounding physical environment. For example, antiphase audio signal waveform 326-2 is configured to cancel attenuated ambient sound waveform 324 rather than unattenuated ambient sound waveform 322.

In some embodiments, wearable audio output device 301 is configured to operate in one of a plurality of available audio output modes, such as an active noise control audio output mode, an active pass-through audio output mode, and a bypass audio output mode (also sometimes called a noise control off audio output mode). In the active noise control mode (also called "ANC"), wearable audio output device 301 outputs one or more audio-cancelling audio components (e.g., one or more antiphase audio signals, also called "audio-cancelation audio components") to at least partially cancel ambient sound from the surrounding physical environment that would otherwise be perceivable to the user. In the active pass-through audio output mode, wearable audio output device 301 outputs one or more pass-through audio components (e.g., plays at least a portion of the ambient sound from outside the user's ear, received by microphone 302-1, for example) so that the user can hear a greater amount of ambient sound from the surrounding physical environment than would otherwise be perceivable to the user (e.g., a greater amount of ambient sound than would be audible with the passive attenuation of wearable audio output device 301 placed in the user's ear). In the bypass mode, active noise management is turned off, such that wearable audio output device 301 outputs neither any audio-cancelling audio components nor any pass-through audio components (e.g., such that any amount of ambient sound that the user perceives is due to physical attenuation by wearable audio output device 301).

Attention is now directed towards embodiments of user interfaces ("UI") that are, optionally, implemented on portable multifunction device 100.

Figure 4A:
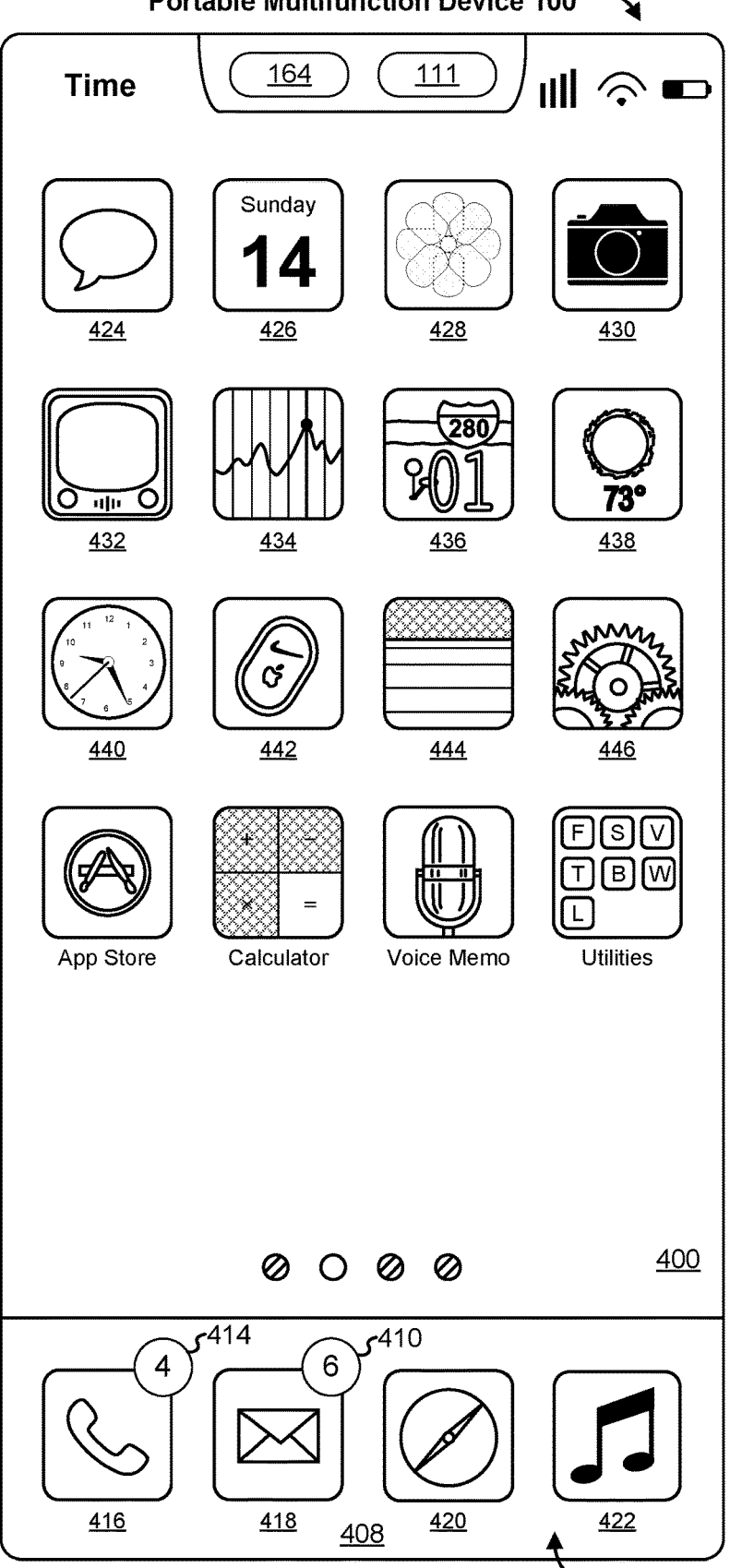
FIG. 4A illustrates an example user interface for a menu of applications on a portable multifunction device in accordance with some embodiments.
Figure 5A:
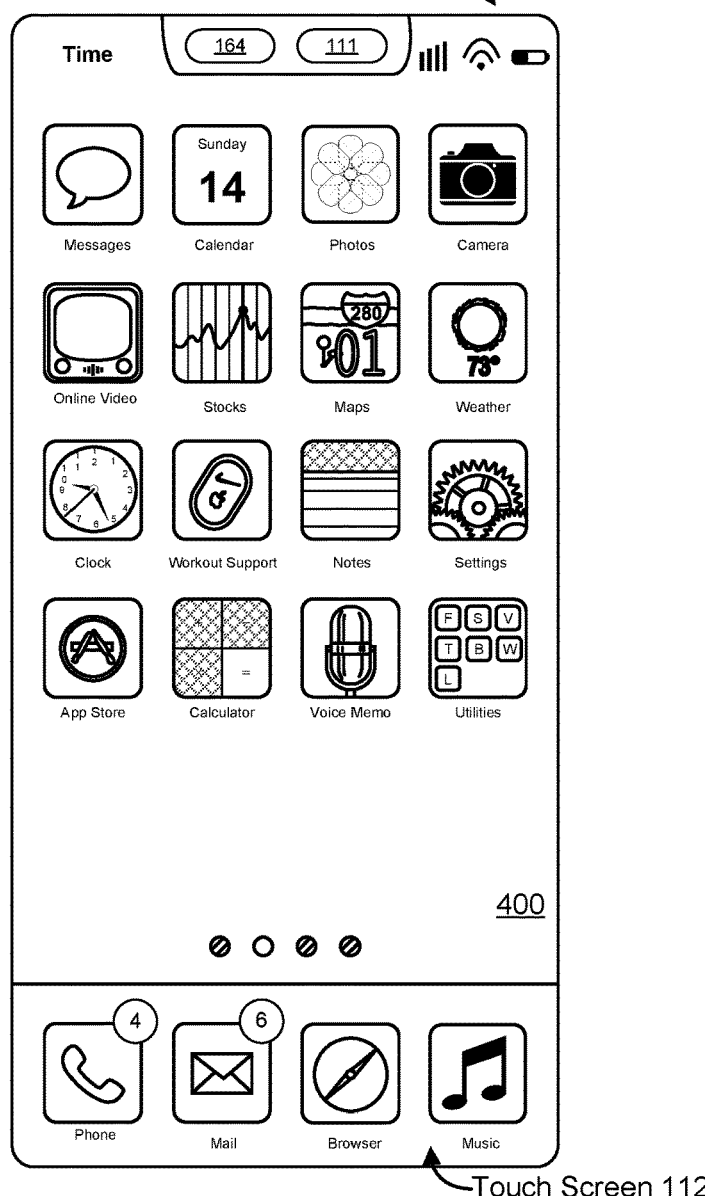
FIGS. 5A-5D illustrate example user interfaces for pairing electronic accessories in accordance with some embodiments.
Figure 5A:
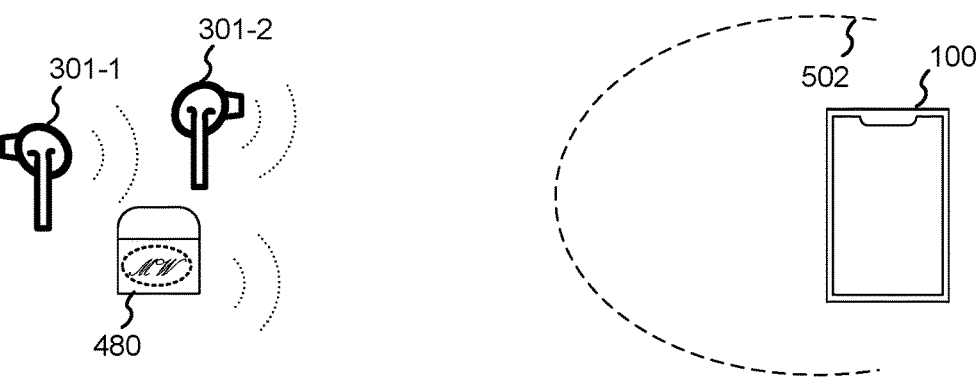
Figure 5B:
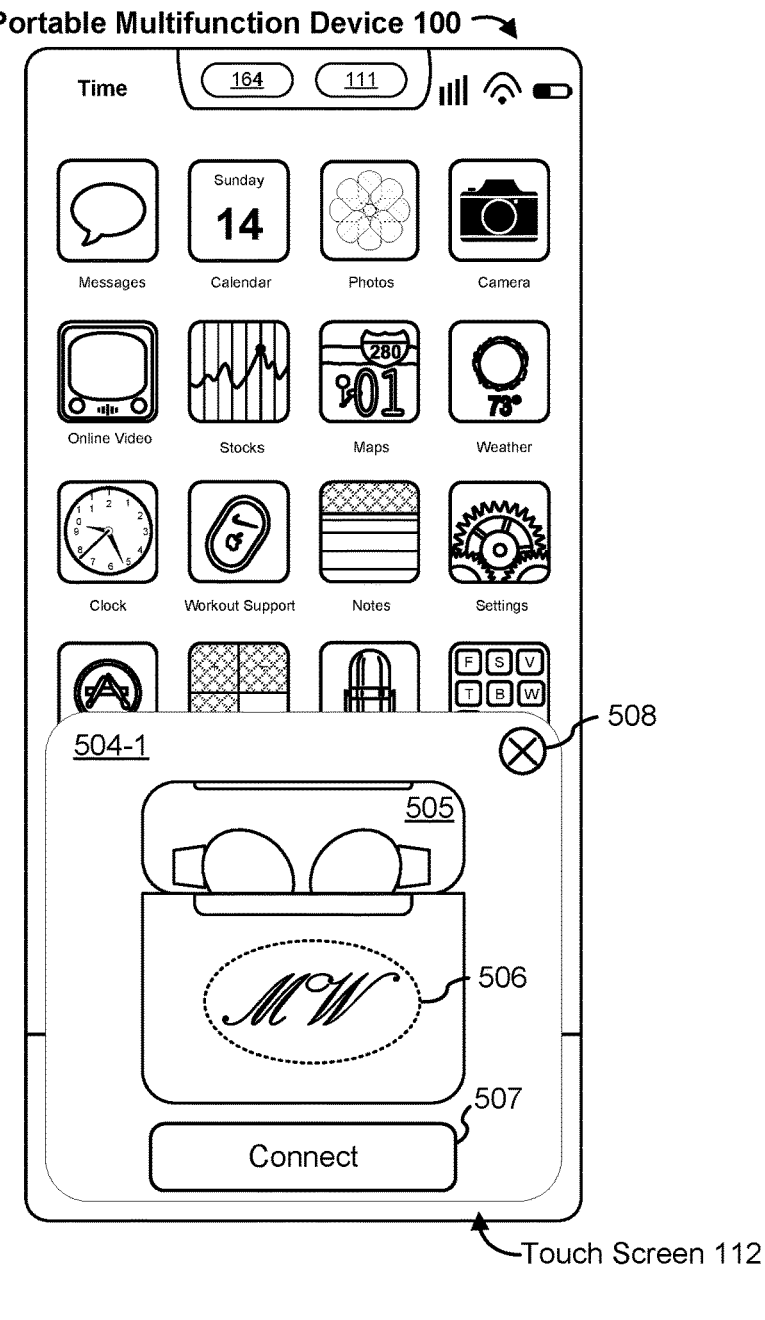
Figure 5B:
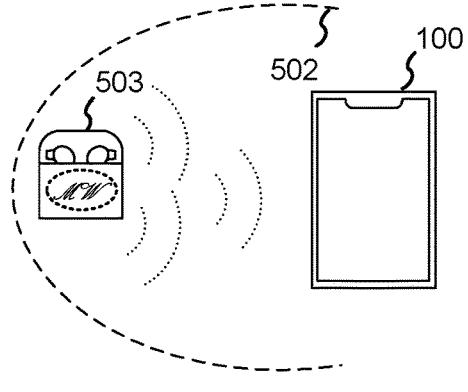
Figure 5C:
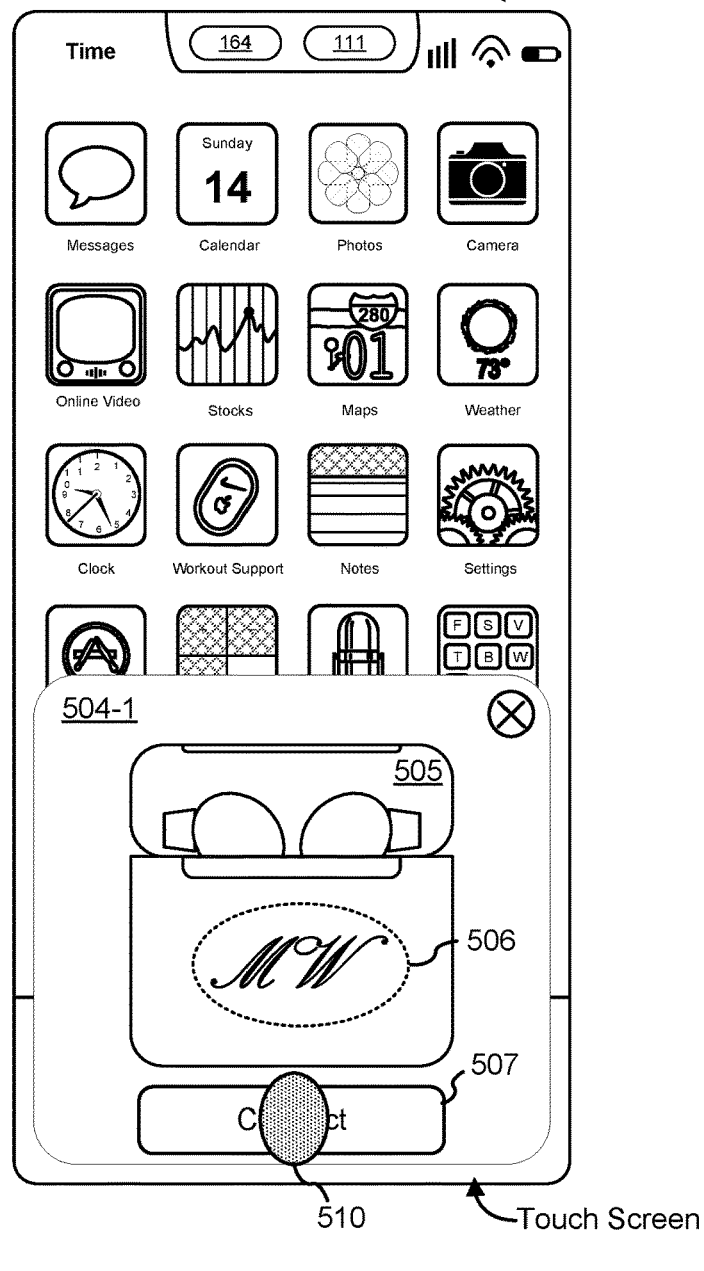
Figure 5C:
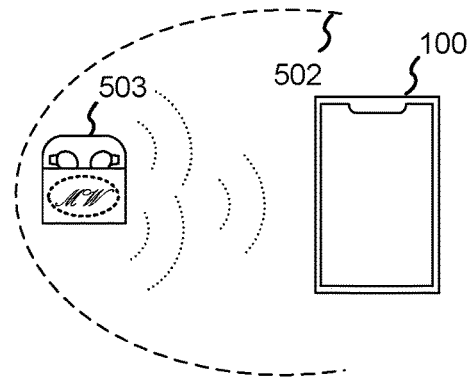

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:
  Signal strength indicator(s) for wireless communication(s), such as cellular and Wi-Fi signals;
  Time;
  a Bluetooth indicator;
  a Battery status indicator;
  Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser"; and Icon 422 for video and music player module 152, labeled "Music"; and
Icons for other applications, such as:
    Icon 424 for IM module 141, labeled "Messages";
    Icon 426 for calendar module 148, labeled "Calendar";
    Icon 428 for image management module 144, labeled "Photos";
    Icon 430 for camera module 143, labeled "Camera";
    Icon 432 for online video module 155, labeled "Online Video";
    Icon 434 for stocks widget 149-2, labeled "Stocks";
    Icon 436 for map module 154, labeled "Maps";
    Icon 438 for weather widget 149-1, labeled "Weather";
    Icon 440 for alarm clock widget 149-4, labeled "Clock";
    Icon 442 for workout support module 142, labeled "Workout Support";
    Icon 444 for notes module 153, labeled "Notes"; and
    Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
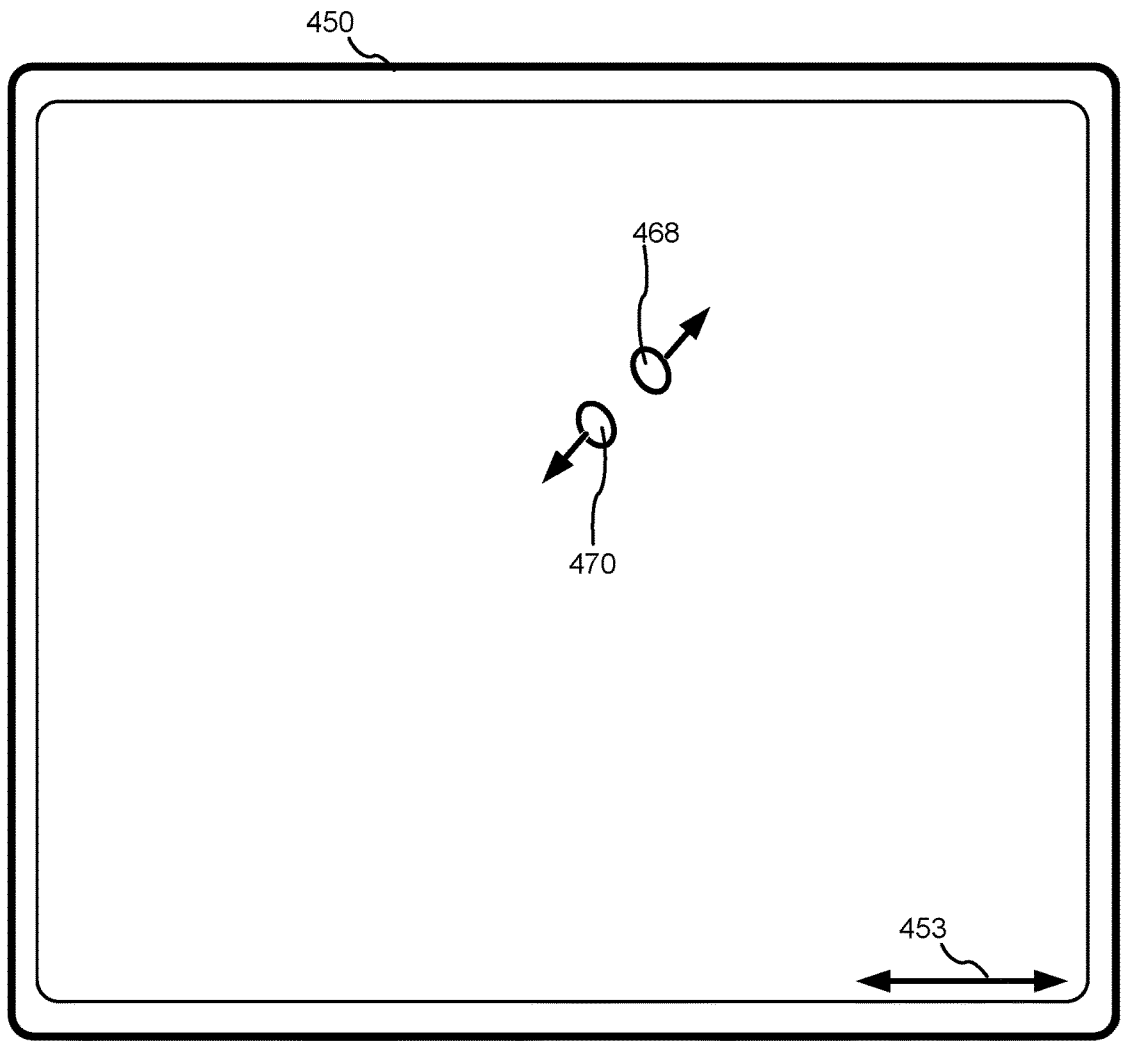
FIG. 4B illustrates an example user interface for a multifunction device with a touch-sensitive surface that is separate from the display in accordance with some embodiments.
Figure 4B:
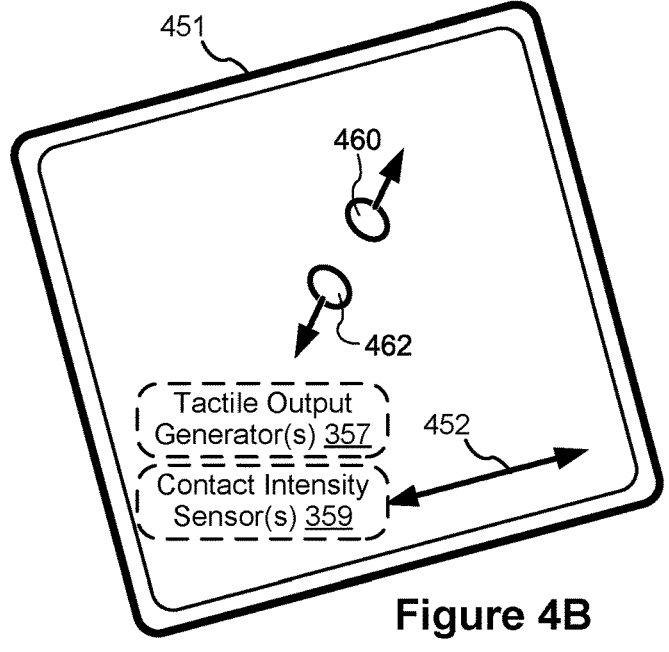

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch-sensitive display system 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse-based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
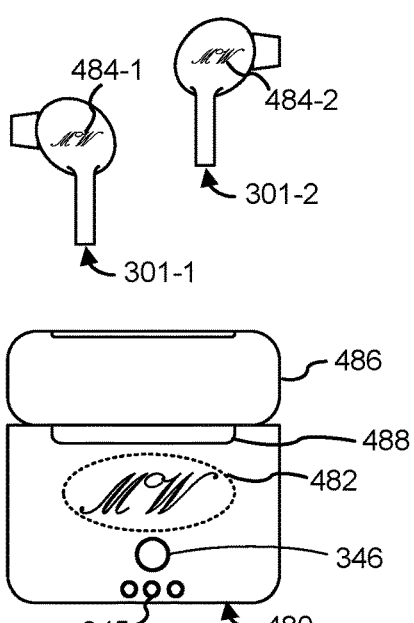
FIG. 4C illustrates example interactions between wearable audio output devices and an electronic accessory case in accordance with some embodiments.
Figure 4C:
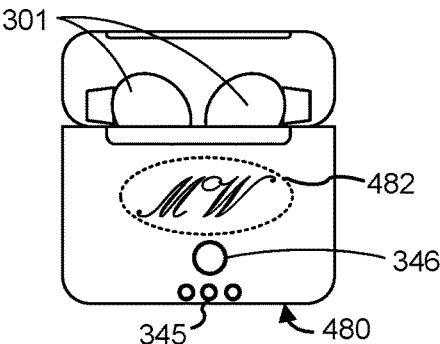
Figure 4C:
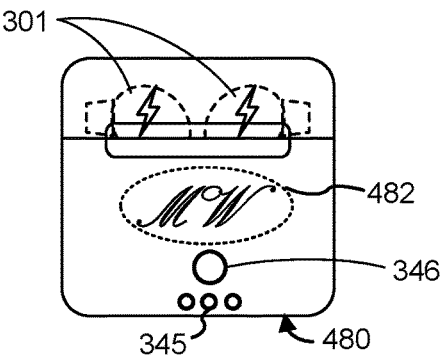

FIG. 4C illustrates physical features of an example wireless accessory case 480 (e.g., an electronic accessory case, such as electronic accessory case 342, FIG. 3E) that includes a physical marking 482 (e.g., an engraving, embossing, and/or printed, painted, or otherwise applied marking). The descriptions provided with respect FIGS. 3D and 3E are applicable to wireless accessory case 480 described herein. Wireless accessory case 480 is in wireless communication with (e.g., paired with) wearable audio output devices 301-1 and 301-2, an audio source, and/or a display device (e.g., multifunction device 100). In accordance with some embodiments, wearable audio output devices 301 in FIG. 4C include physical markings 484 (e.g., physical marking 484-1 on wearable audio output device 301-1 and physical marking 484-2 on wearable audio output device 301-2). In some embodiments, wireless accessory case 480 is configured to charge (e.g., charge internal batteries of) wearable audio output devices 301 when wearable audio output devices 301 are positioned inside wireless accessory case 480. In some embodiments, wireless accessory case 480 includes a battery (e.g., battery 363, FIG. 3E) for charging internal batteries (e.g., battery 309, FIG. 3C) of wearable audio output devices 301 and for powering functions of wireless accessory case 480 while the wireless accessory case 480 is not connected to an external power source. In some embodiments, as illustrated in FIG. 4C, wireless accessory case 480 has a hinged lid 486 to encase wearable audio output devices 301 while they are inside the wireless accessory case 480 and/or charging. In accordance with some embodiments, a frontside of the accessory case 480 includes apertures(s) for speaker(s) 345, an input device 346, physical marking 482, and a divot 488 for easing opening and closing of the hinged lid 486. In some embodiments, one or more of speaker(s) 345, input device 346, physical marking 482 are located on a different portion of wireless accessory case 480 (e.g., on a backside, top, and/or bottom). Further, although FIG. 4C illustrates wearable audio output devices 301 positioned within wireless accessory case 480 with respective eartips facing away from one another (e.g., facing outward), in some embodiments, wearable audio output devices 301 are positioned (e.g., mounted and/or coupled) differently within wireless accessory case 480 (e.g., with eartips facing toward one another). For example, wireless accessory case 480 optionally only charges wearable audio output devices 301 while wearable audio output devices 301 are positioned in a particular orientation within wireless accessory case 480.

User Interfaces and Associated Processes

Attention is now directed towards embodiments of user interfaces ("UI") and associated processes that may be implemented on an electronic device, such as portable multifunction device 100, device 300, wearable audio output devices 301, electronic accessory case 342, and/or wireless accessory case 480.

FIGS. 5A-5D illustrate example user interfaces for pairing electronic accessories in accordance with some embodiments. FIGS. 5E-5R illustrate example user interfaces and user interactions for adjusting the audio output of wearable audio output devices in accordance with some embodiments. FIGS. 5S-5BI illustrate example user interfaces and user interactions for various features associated with an electronic accessory case in accordance with some embodiments. FIGS. 5BJ-5CB illustrate example user interfaces and user interactions for adjusting the audio output of wearable audio output devices in accordance with some embodiments. The user interfaces and device interactions in these figures are used to illustrate the processes described below, including the processes in FIGS. 6A-6C, 7A-7C, 8A-8D, and 9A-9C. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector. Additionally, analogous operations are, optionally, performed on a device in communication with a display generation component (e.g., a wireless display device) that is separate from the device.

FIGS. 5A-5D illustrate example user interfaces for pairing electronic accessories in accordance with some embodiments.

FIG. 5A illustrates user interface 400 on touch-sensitive display system 112 of device 100. In some embodiments, (e.g., while displaying user interface 400) device 100 periodically and repeatedly listens for wireless broadcast signals (e.g., pairing requests) from one or more peripherals (e.g., wearable audio output devices 301-1 and 301-2 as well as wireless accessory case 480) to pair the peripheral(s) with device 100. In some embodiments, as illustrated throughout FIGS. 5A-5D, device 100 can detect pairing requests from peripherals when the peripheral is within threshold distance 502 of device 100 and cannot detect pairing requests from peripherals when the peripheral is outside of threshold distance 502. For example, at the bottom of FIG. 5A, FIG. 5A illustrates an example spatial relationship (e.g., physical distance) between device 100 and wearable audio output devices 301-1 and 301-2 as well as wireless accessory case 480, where wearable audio output devices 301-1 and 301-2 as well as wireless accessory case 480 are outside of threshold distance 502 of device 100. In contrast, FIG. 5B illustrates wearable audio output devices 301-1 and 301-2 as well as wireless accessory case 480 (illustrated and hereinafter referred to collectively as earbud set 503) are within threshold distance 502 of device 100, where the device is capable of detecting pairing requests from the peripherals.

FIG. 5B illustrates an example user interface 504 (e.g., a window), displayed subsequent to user interface 400 in FIG. 5A, and in some embodiments in response to detecting movement of a peripheral (e.g., wearable audio output device 301-1) or set of peripherals (e.g., earbud set 503), from outside of threshold distance 502 to within threshold distance 502, for initiating pairing of device 100 with the peripheral (e.g., wearable audio output device 301-1) or set of peripherals (e.g., earbud set 503). In FIG. 5B, device 100 detects a pairing request from a peripheral (e.g., wearable audio output device 301-1, which is shown in FIG. 5A and part of earbud set 503 in FIG. 5B) within threshold distance 502. In some embodiments, in response to detecting the pairing request from wearable audio output device 301-1, device 100 determines whether wearable audio output device 301-1 meets coupling criteria. In the example shown in FIG. 5B, coupling criteria is met when an earbud (e.g., wearable audio output device 301-1) is placed within and/or is electrically coupled to an earbud case (e.g., wireless accessory case 480) (e.g., to form earbud set 503). After device 100 determines that wearable audio output device 301-1 meets coupling criteria (e.g., in response to device 100 determining that wearable audio output device 301-1 meets the coupling criteria), device 100 displays window 504-1 overlaid on user interface 400 of FIG. 5A. Window 504-1 includes a representation 505 of earbud set 503 and button 507 (labeled "Connect"), which, when activated by a user input, initiates pairing of device 100 with the peripherals (e.g., wearable audio output devices 301-1 and 301-2 and wireless accessory case 480 shown in FIG. 5A) of earbud set 503. Window 504-1 further includes a representation 506 of physical marking 482 on wireless accessory case 480. In some embodiments, the user interface(s) shown in window 504-1 are instead displayed on the entirety (or substantially all, e.g., greater than 95%, 96%, 97%, 98%, or 99%) of touch-sensitive display system 112. Device 100 also displays an exit button 508 that, when activated by a user input, such as a tap gesture, causes window 504-1 to cease to be displayed so that the user can perform other operations on device 100. In some embodiments, where exit button 508 accompanies another user interface described herein (e.g., a user interface that is part of a usage tutorial), exit button 508, when activated by a user input, causes that user interface to cease to be displayed.

Figure 5D:
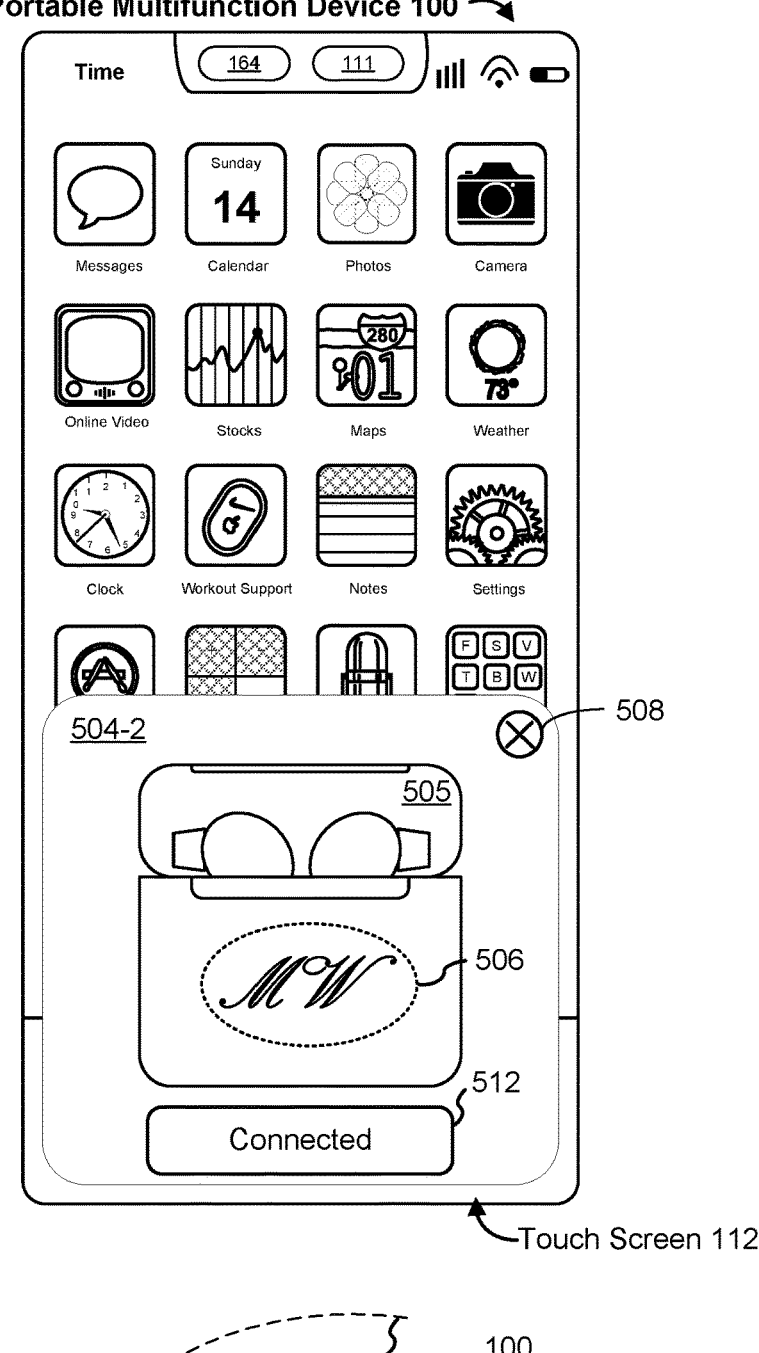
Figure 5D:
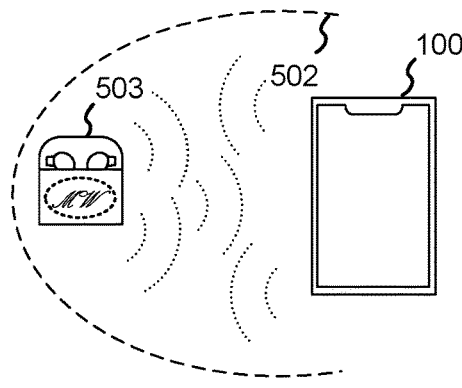
Figures 5E, 5F:
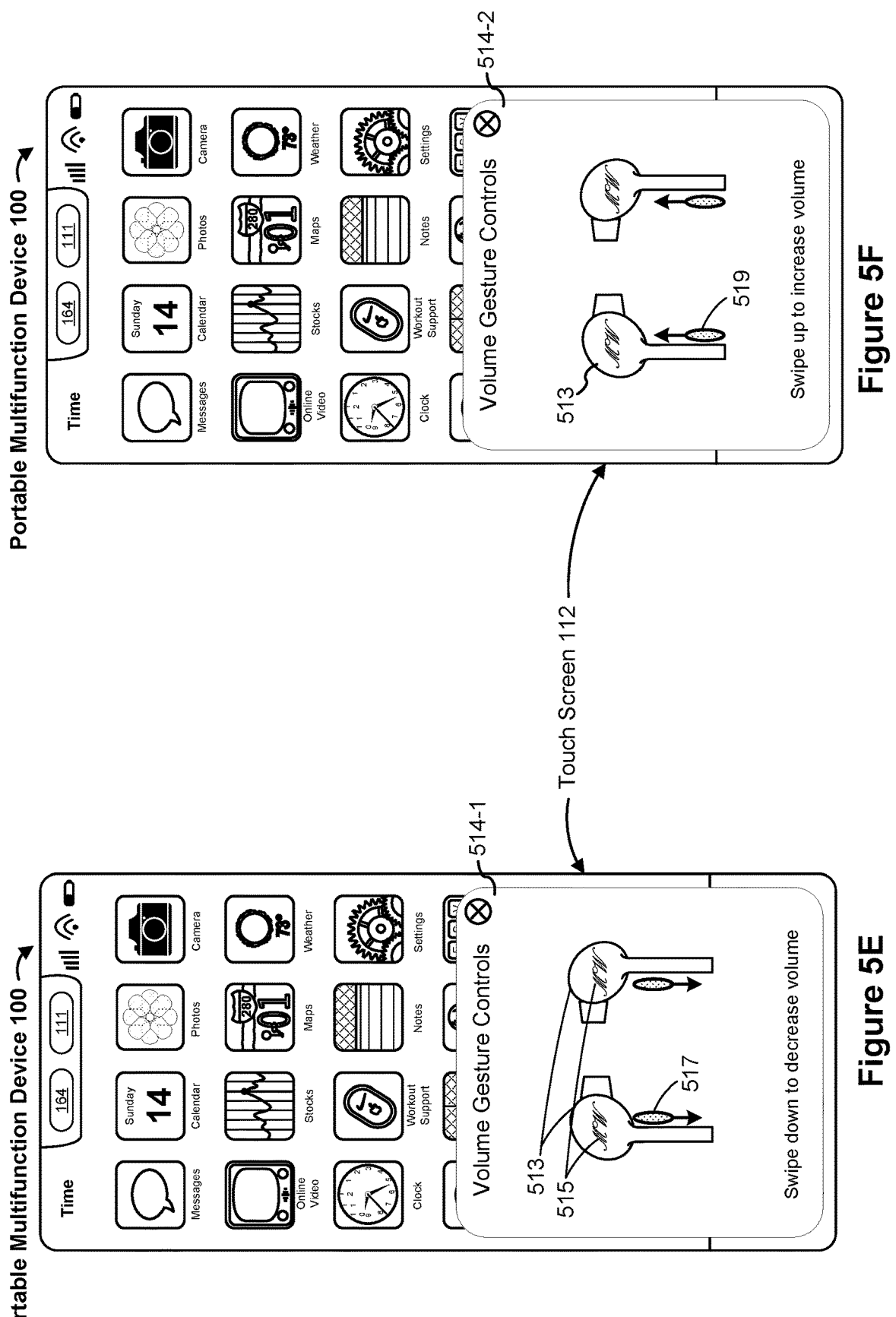
FIGS. 5E-5R illustrate example user interfaces and user interactions for adjusting the audio output of wearable audio output devices in accordance with some embodiments.

FIGS. 5C-5D illustrate transitions from FIG. 5B. In particular, FIG. 5C shows input 510 (e.g., a tap gesture) on button 507 in window 504-1. In response to detecting input 510, device 100 initiates pairing of device 100 with the peripherals of earbud set 503. In FIG. 5D, after device 100 has paired with the peripherals of earbud set 503, device 100 displays an indication 512 (labeled "Connected") in window 504-2 to indicate that device 100 is paired with (e.g., communicatively connected to) earbud set 503. In some embodiments, device 100 displays, in window 504-2, a button that, when activated, causes device 100 to proceed from the pairing process to a usage tutorial for wearable audio output devices 301.

FIGS. 5E-5R illustrate example user interfaces and user interactions for adjusting the audio output of wearable audio output devices in accordance with some embodiments. FIGS. 5E and 5F illustrate example user interface 514 showing available user interactions for wearable audio output devices 301. In particular, FIG. 5E shows user interface 514-1 with representations 513 of wearable audio output devices and illustrations of a user gesture 517 (e.g., a swipe along stem portion 305 away from head portion 303, see FIG. 3B) for decreasing volume of audio output at wearable audio output devices 301. FIG. 5F shows user interface 514-2 with representations 513 of wearable audio output devices and illustrations of a user gesture 519 (e.g., a swipe along stem portion 305 toward head portion 303) for increasing volume of audio output at wearable audio output devices 301. In the example of FIGS. 5E and 5F, the representations 513 of the wearable audio output devices include representations 515 of physical markings 484 (e.g., FIG. 4C) on wearable audio output devices 301.

Figure 5H:
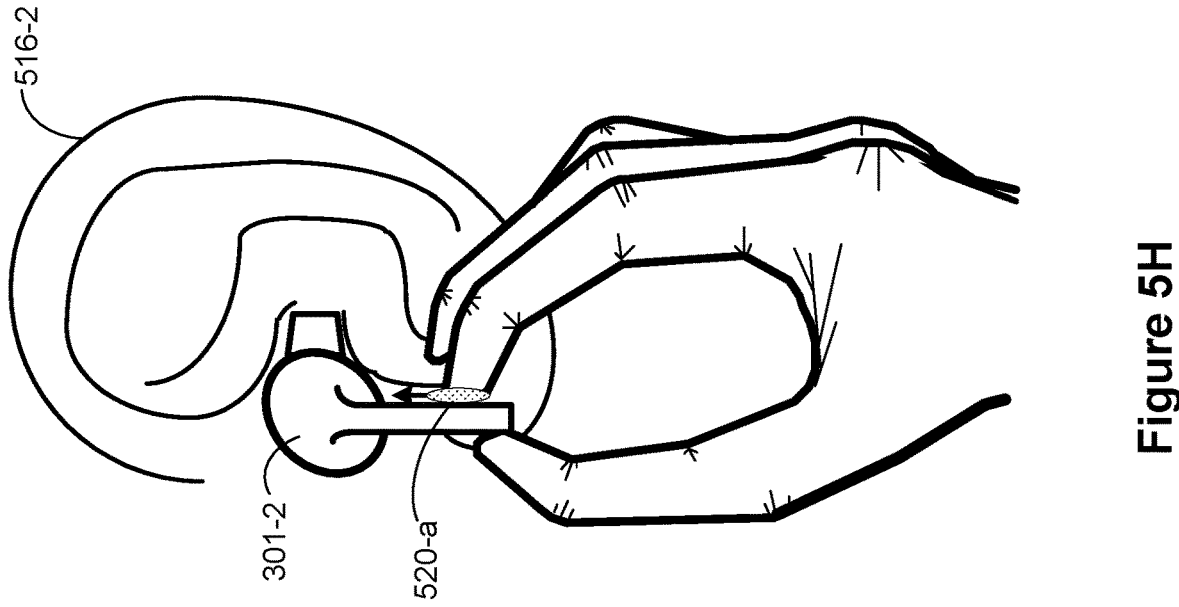
Figure 5G:
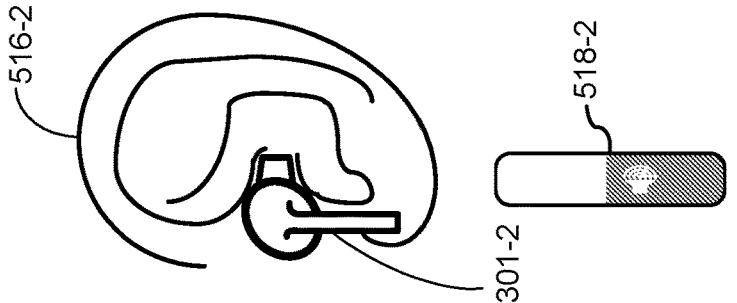
Figure 5G:
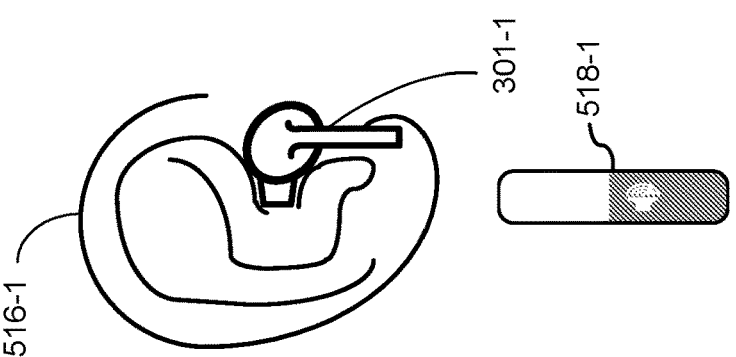
Figure 5J:
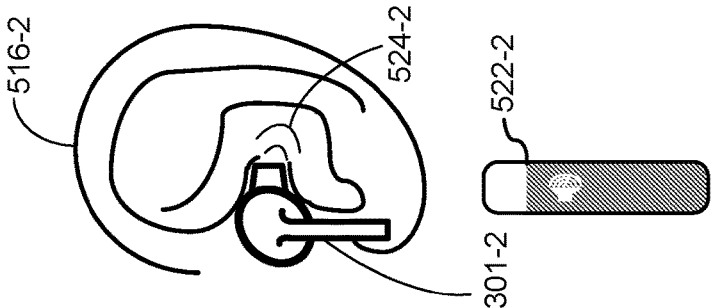
Figure 5J:
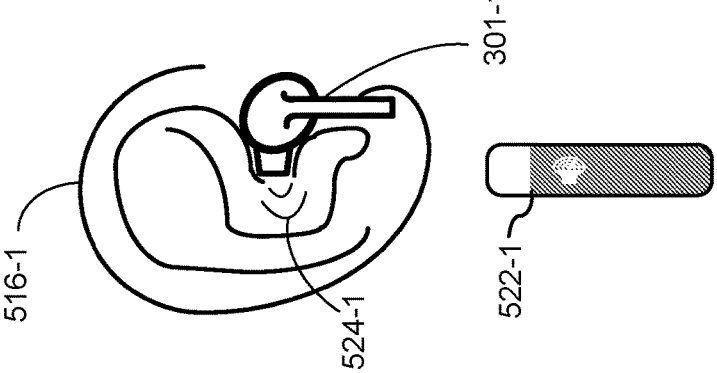
Figure 5I:
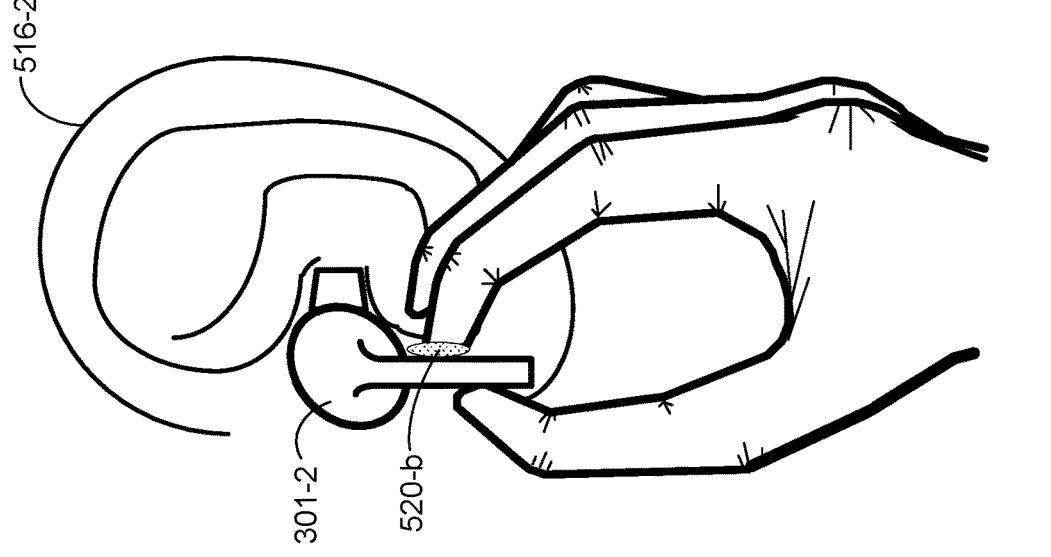
Figure 5L:
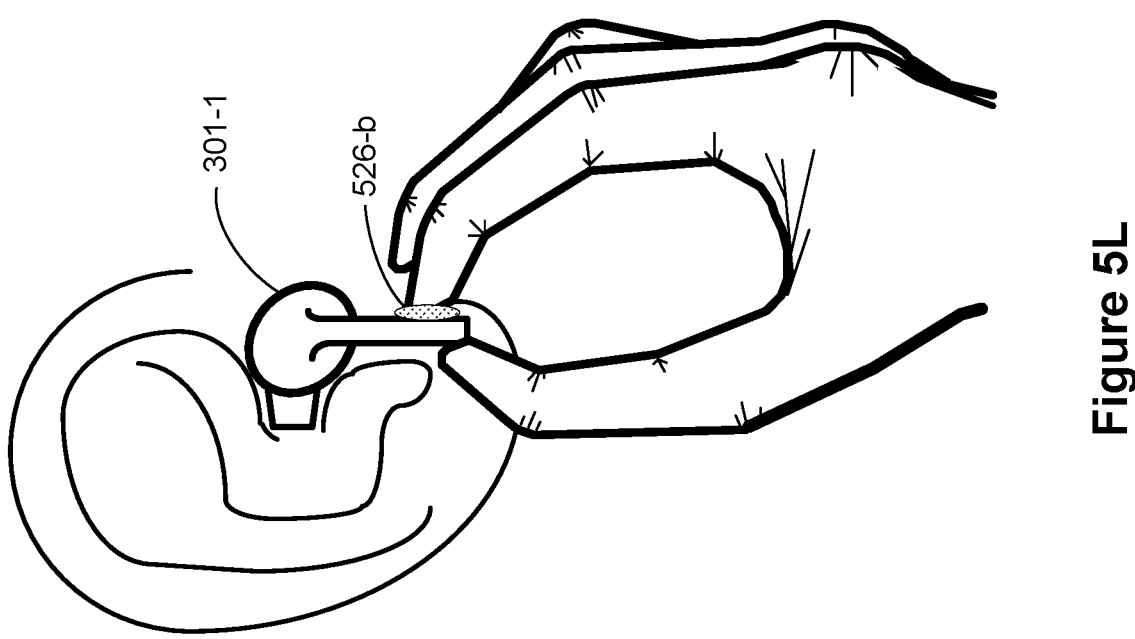
Figure 5K:
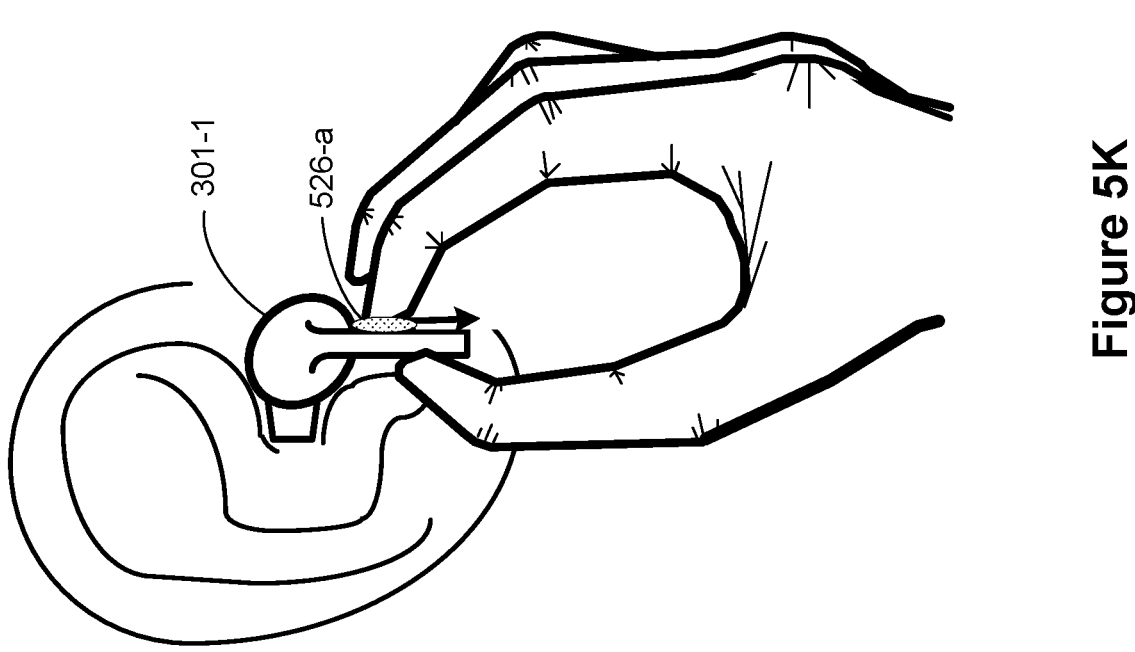
Figure 5N:
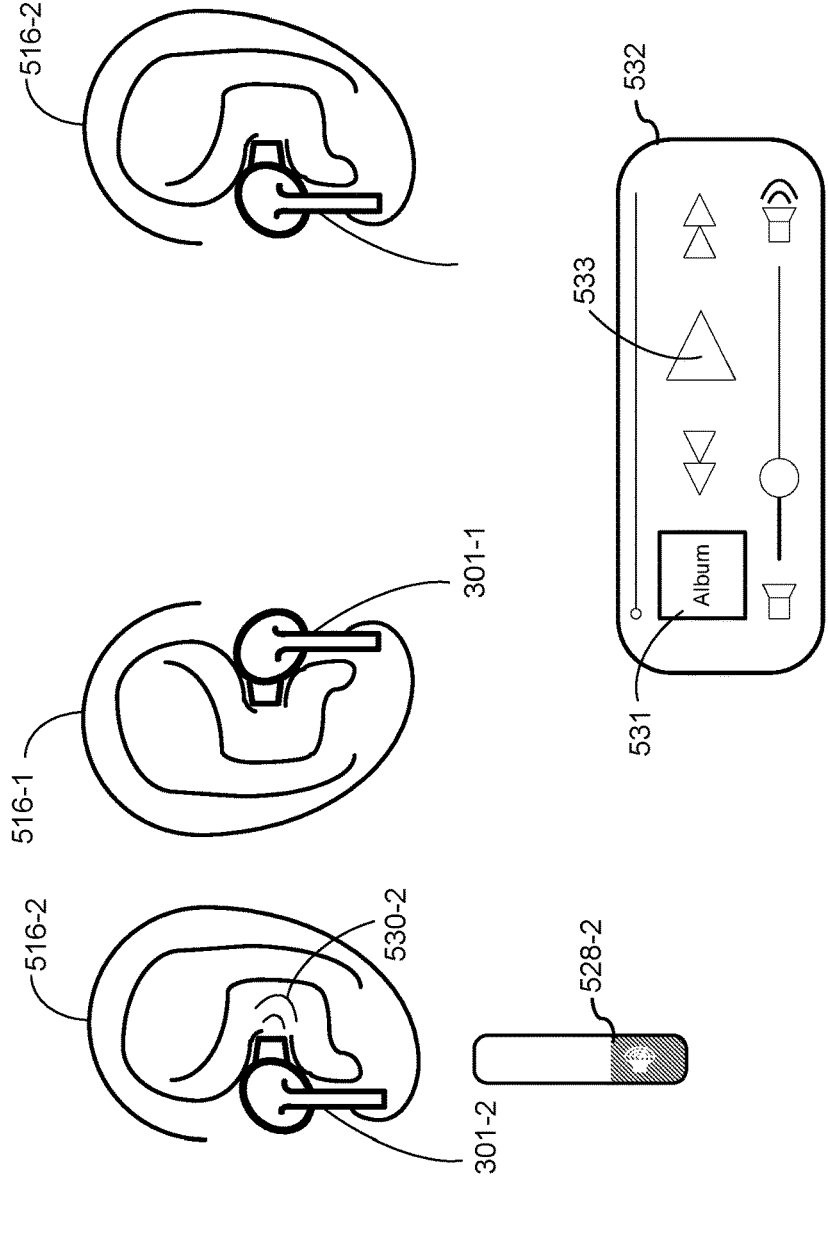
Figure 5M:
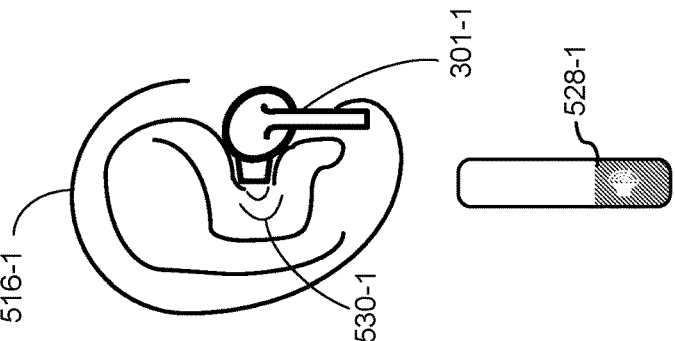
Figure 5P:
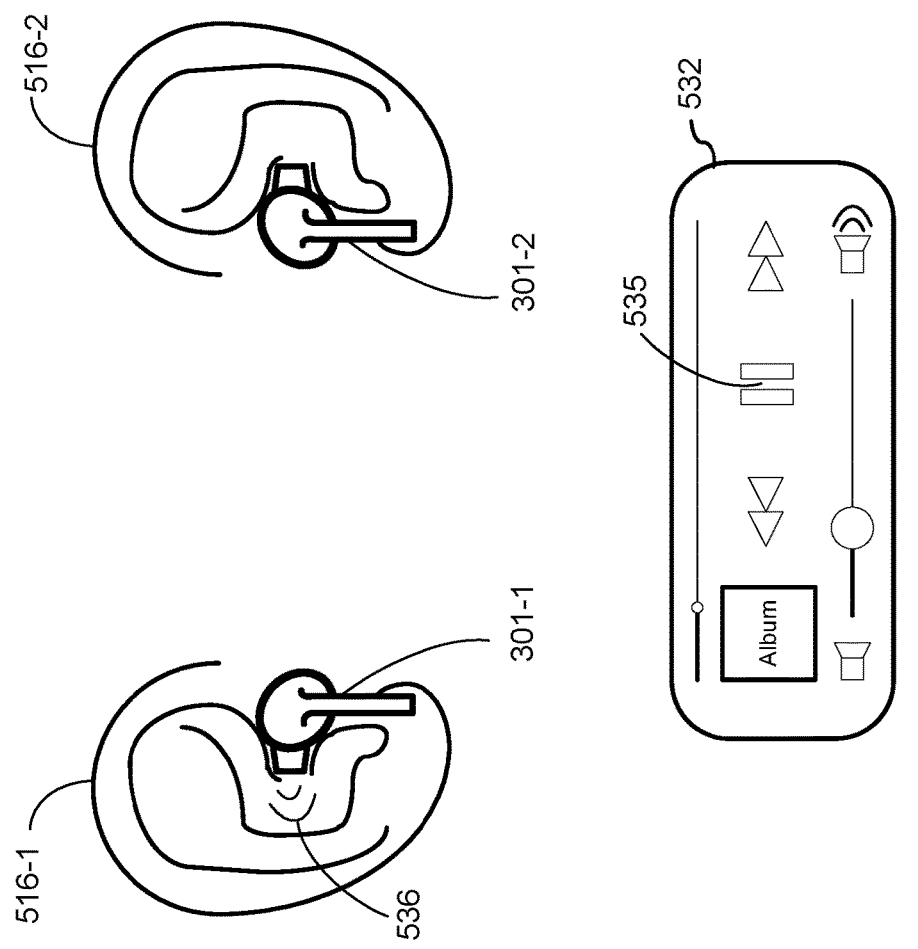
Figure 5O:
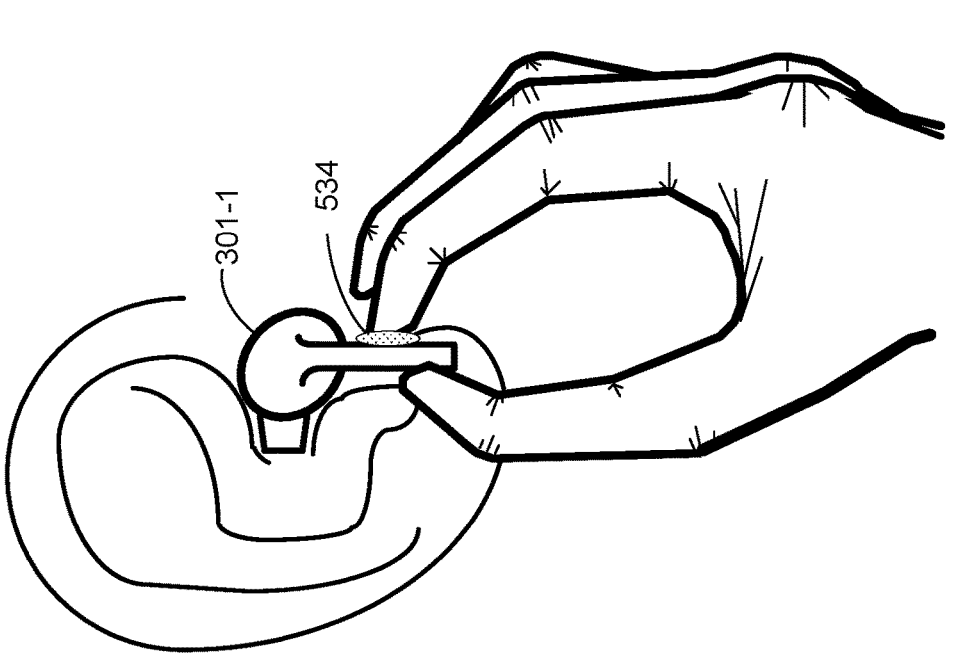
Figure 5R:
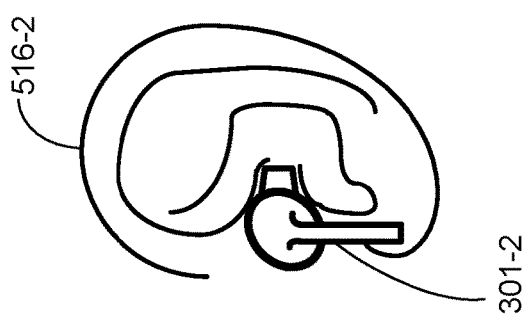
Figure 5R:
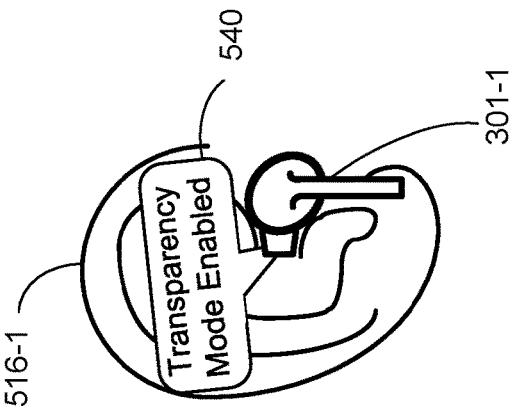

FIGS. 5G-5R illustrate example user interactions with wearable audio output devices 301 to control audio outputs in accordance with some embodiments. FIG. 5G shows wearable audio output devices 301-1 and 301-2 inserted in respective ears 516-1 and 516-2 of a user and having respective output volume levels 518-1 and 518-2. For example, wearable audio output devices 301 are configured to play back audio content via respective speakers 306 (e.g., FIG. 3B) with output volume levels 518.

In some embodiments, each of wearable audio output devices 301 include a stem portion 305 that the user can use to provide inputs to the wearable audio output devices (e.g., described with reference to FIG. 3B). In some embodiments, stem portion 305 is or includes input device(s) (e.g., input devices 308) that respond to user inputs applied to stem portion 305. In some embodiments, the input device(s) include a touch-sensitive input device that responds to touch inputs applied to stem portion 305, such as finger touches as illustrated in FIG. 5H. In some embodiments, the input device(s) include a pressure-sensitive input device that responds to press inputs applied to stem portion 305 when held and squeezed between two fingers as illustrated in FIG. 5O. Although only one wearable audio output device is shown in FIG. 5H, one of ordinary skill will recognize that wearable audio output device 301-1 can have an analogous structure with a corresponding stem, and that the same functionality described herein with reference to wearable audio output device 301-2 may be available using wearable audio output device 301-1 and its corresponding stem as well.

FIGS. 5H-5I illustrate an input 520 received at stem portion 305 of wearable audio output device 301-2. Input 520 has an initial location of 520-a and an ending location of 520-b. For example, input 520 is a swipe gesture toward head portion 303 detected based on a determination that the user's finger contact movement is greater than a predefined magnitude. In some embodiments, stem portion 305 includes a set of capacitive sensors arranged to detect movement of a contact along a length of stem portion 305. In some embodiments, stem portion 305 includes a housing with one or more physically distinguished portions at locations corresponding to the set of capacitive sensors (e.g., to guide the user's finger during the movement). In some embodiments, a user's finger contact movement that is less than the predefined magnitude does not change the volume of the audio output; e.g., the user's finger contact movement is ignored if the amount of the user's finger contact movement is less than the predefined magnitude.

FIG. 5J illustrates a transition from FIG. 5G in response to input 520. In response to input 520 (e.g., and in accordance with a determination that input 520 is a swipe gesture moving toward head portion 303), wearable audio output devices 301 adjust a volume of audio output to respective output levels 522-1 and 522-2. In some embodiments, audio feedback 524 is provided at each wearable audio output device 301 as the volume of audio output is adjusted (e.g., an audible tone is output to indicate an increase in volume level). In some embodiments, audio feedback 524 is adjusted based on one or more characteristics of input 520 (e.g., a speed of the swipe gesture and/or a distance of the swipe gesture). In some embodiments, audio feedback 524 includes a quantity of tones that corresponds to an amount of volume change due to input 520 (e.g., a tone for each increment of volume level change). In some embodiments, audio feedback is provided (e.g., the same or different from audio feedback 524) to indicate to a user that output volume is at a maximum or minimum level (e.g., as defined in software of wearable audio output devices 301). In some embodiments, wearable audio output device 301 includes one or more tactile output generators, optionally located in stem portion 305. In some such embodiments, an activation tactile output is output to indicate a detection of input 520.

FIGS. 5K-5L illustrate an input 526 received at stem portion 305 of wearable audio output device 301-1. Input 526 has an initial location of 526-a and an ending location of 526-b. For example, input 526 is a swipe gesture away from head portion 303 detected based on a determination that the user's finger contact movement is greater than a predefined magnitude.

FIG. 5M illustrates a transition from FIG. 5J in response to input 526. In response to input 526 (e.g., and in accordance with a determination that input 526 is a swipe gesture moving away from head portion 303), wearable audio output devices 301 adjust a volume of audio output to respective output levels 528-1 and 528-2. In some embodiments, audio feedback 530 is provided at each wearable audio output device 301 (e.g., an audible tone is output to indicate a decrease in volume level). In some embodiments, audio feedback 530 includes a quantity of tones that corresponds to an amount of volume change due to input 526 (e.g., a tone for each increment of volume level change). In some embodiments, audio feedback 530 is different from audio feedback 524 (e.g., so that a user can distinguish between volume increases and volume decreases).

FIG. 5N shows wearable audio output devices 301-1 and 301-2 inserted in respective ears 516-1 and 516-2 of a user. For example, wearable audio output devices 301 are configured to play back audio content via respective speakers 306. FIG. 5N also shows an example user interface 532 that includes a representation of an album 531 (e.g., an album having audio content) and audio playback controls such as a previous button for moving to the previous track or rewinding the audio being played, a play/pause button 533 for toggling audio playback between on and off, and a next button for moving to the next track or fast forwarding through the audio being played. In accordance with some embodiments, a volume control is also concurrently displayed with (e.g., below) the audio playback controls. In the example of FIG. 5N, play back of media content from album 531 is paused, as indicated by display of play button 533. In some embodiments, user interface 532 is presented at an electronic device (e.g., multifunction device 100 or device 300) that is communicatively coupled to wearable audio output devices 301. In some embodiments, the functionality associated with user interface 532 is available to the user via inputs and/or gestures at wearable audio output devices 301 (e.g., regardless of whether user interface 532 is presented to the user).

FIG. 5O illustrates an input 534 received at stem portion 305 of wearable audio output device 301-1. Input 534 is a different type of input from input 526, e.g., a non-swipe gesture, such as a tap (e.g., an input having a contact duration that is less than a threshold duration), press (e.g., an input having a contact intensity that is less than a threshold intensity), and/or squeeze gesture. FIG. 5P illustrates a transition from FIG. 5N in response to input 534. In response to input 534 (e.g., and in accordance with a determination that input 534 is a single squeeze gesture), playback of the media content from album 531 is active (e.g., unpaused and playing), as indicated by pause button 535 being displayed in FIG. 5P instead of play button 533 (FIG. 5N). In some embodiments, audio feedback 536 is provided at wearable audio output device 301-1. For example, audio feedback 536 is provided at the wearable audio output device where input 534 is detected and is not provided at the other wearable audio output device. In some embodiments, audio feedback 536 includes one or more words (e.g., the term "unpaused" or "playing"). In some embodiments, audio feedback 536 includes one or more tones and/or beeps. In some embodiments, audio feedback 536 is different from audio feedback 530 and audio feedback 524 (e.g., so that a user can distinguish between volume changes and play back changes).

Figure 5Q:
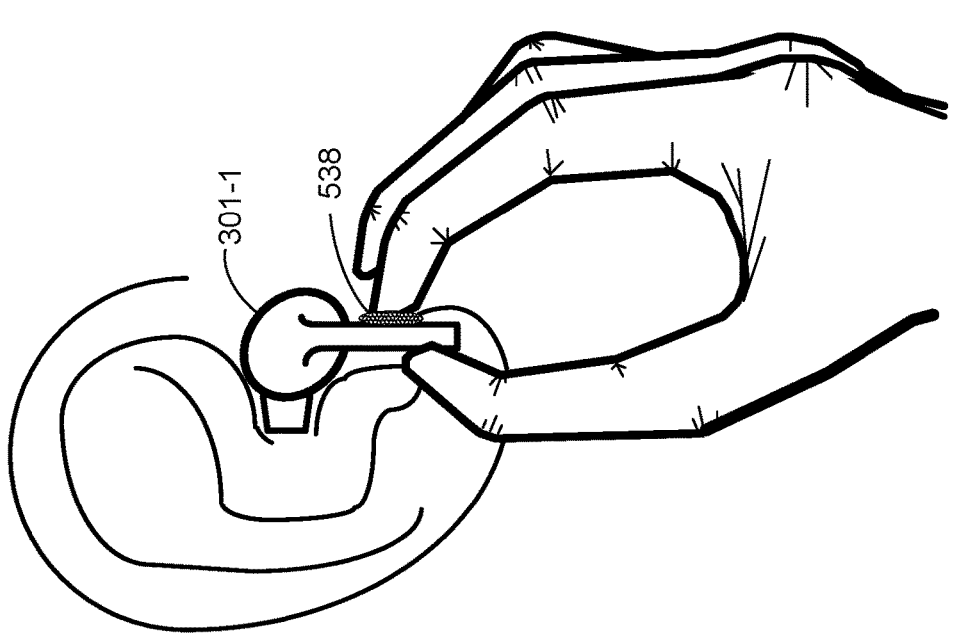

FIG. 5Q illustrates an input 538 received at stem portion 305 of wearable audio output device 301-1. Input 538 is a different type of input from input 534, e.g., a long press input (e.g., an input having a contact duration that is greater than a threshold duration), a deep press input (e.g., an input having a contact intensity that is greater than a threshold intensity), and/or a long (and/or deep) squeeze input (e.g., a squeeze gesture that includes a squeeze of stem portion 305 that is maintained for at least a threshold amount of time).

FIG. 5R illustrates a transition from FIG. 5P in response to input 538. In response to input 538 (e.g., and in accordance with a determination that input 538 is a long press and/or long squeeze gesture), wearable audio output devices 301 enable (e.g., switch to or activate) an active pass-through mode (also sometimes called a transparency mode). In the active pass-through audio output mode, wearable audio output device 301 outputs one or more pass-through audio components (e.g., plays at least a portion of the ambient sound from outside the user's ear, received by microphone 302-1, for example) so that the user can hear a greater amount of ambient sound from the surrounding physical environment than would otherwise be perceivable to the user (e.g., a greater amount of ambient sound than would be audible with the passive attenuation of wearable audio output device 301 placed in the user's ear). In some embodiments, a squeeze gesture is a gesture that involves pressing something (e.g., stem portion 305) between two or more fingers. In some embodiments, a squeeze is maintained for less than a threshold amount of time (e.g., 0.5 seconds, 1 second, 1.5 seconds, or 2 seconds). In some embodiments, a long squeeze gesture is a squeeze gesture that is maintained for at least the threshold amount of time.

In some embodiments, in combination with changing output mode, wearable audio output device 301-1 outputs an audible tone and/or one or more words, e.g., audio feedback 540, to indicate that the audio output mode has been changed. In some embodiments, wearable audio output devices 301 transition from a bypass mode or ANC (active noise cancelation) mode to the active pass-through mode in response to input 538. In some embodiments, wearable audio output devices 301 transition between modes to a next audio output mode in a predefined order, which in this example is the active pass-through mode, as indicated by audio feedback 540. In some embodiments, the predefined order of audio output modes is configurable using a settings menu.

In some embodiments, wearable audio output device 301 includes one or more tactile output generators, optionally located in stem portion 305. In some such embodiments, tactile outputs are output to indicate detection of user inputs and/or activation of functions of wearable audio output device 301, e.g., in addition to, or alternatively to, providing audio feedback. In some embodiments, the tactile outputs for different functions and/or user inputs have different tactile output amplitudes, frequencies, and/or patterns (e.g., so the user can differentiate between detection of different user inputs and/or activation of different functions).

FIGS. 5S-5BI illustrate example user interfaces and user interactions for various features associated with an electronic accessory case in accordance with some embodiments.

FIG. 5S illustrates an example spatial relationship (e.g., physical distance) between device 100 and wireless accessory cases 480-1, 480-2, and 480-3, where wireless accessory cases 480-1, 480-2, and 480-3 are inside of threshold distance 502 of device 100, e.g., where device 100 is capable of detecting pairing requests from peripherals and other devices. In the example of FIG. 5S, wireless accessory case 480-1 includes a physical marking 482-1, wireless accessory case 480-2 includes a physical marking 482-2 that is different from physical marking 482-1, and wireless accessory case 480-3 does not include a physical marking (e.g., a personalized physical marking such as a digital engraving and/or embossing).

Figure 5T:
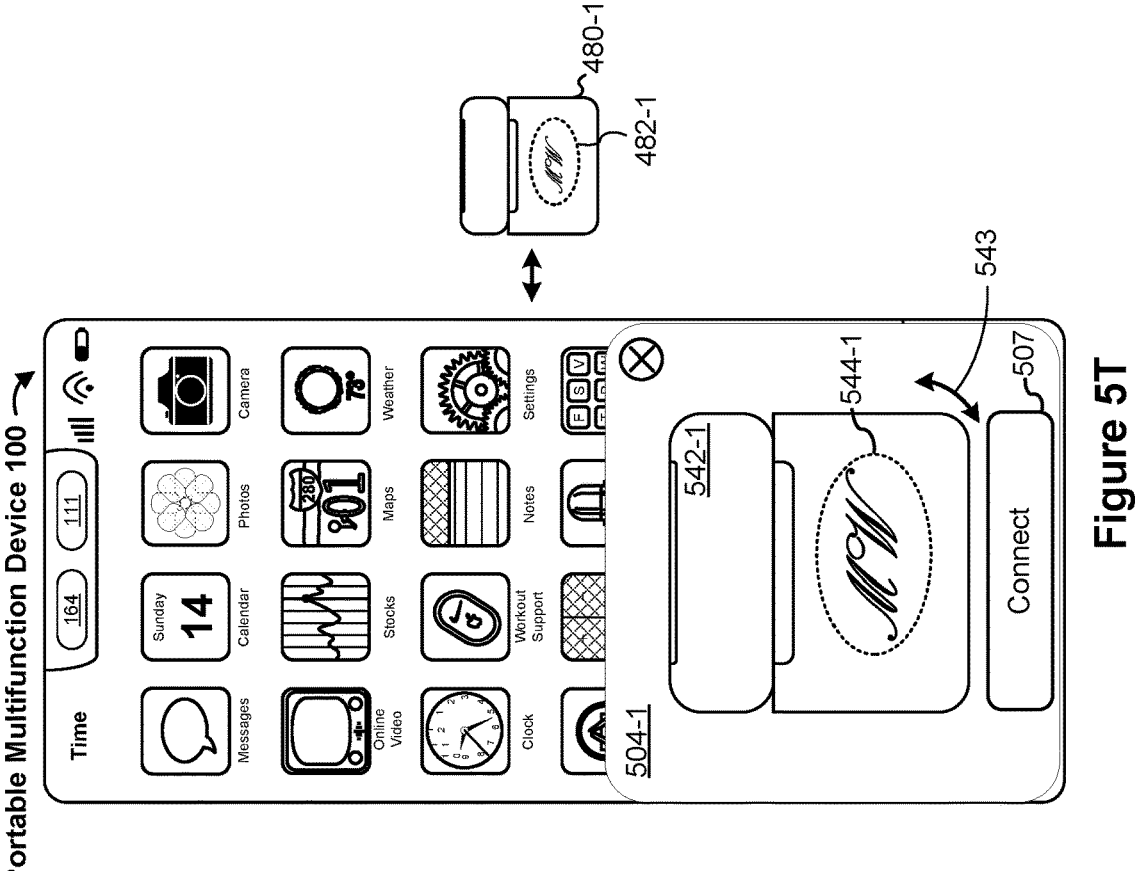
Figure 5S:
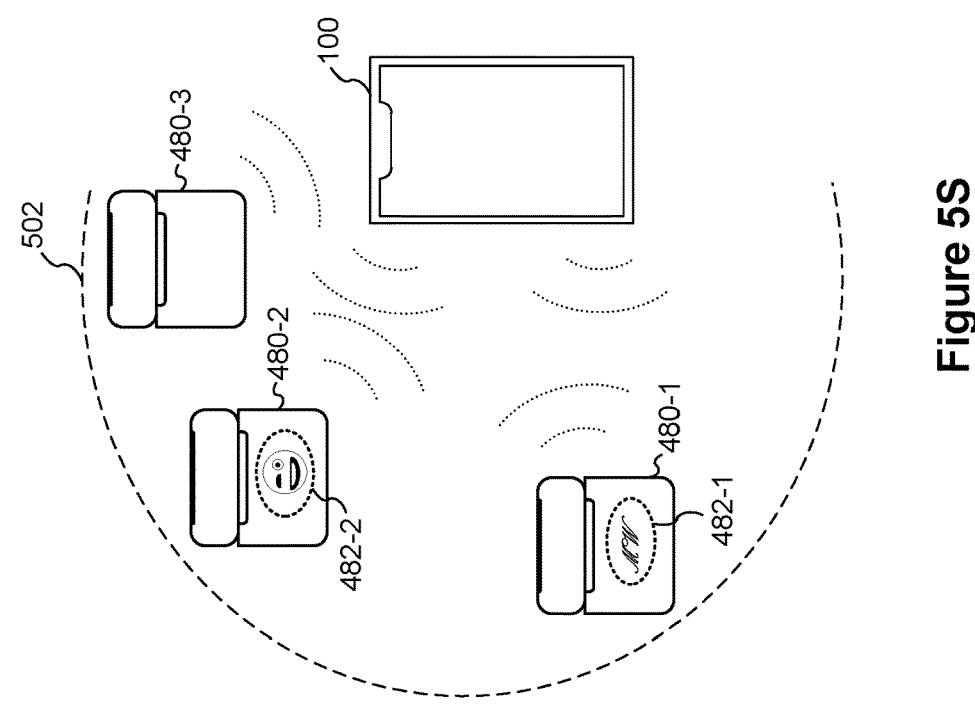

FIG. 5T illustrates an example user interface, e.g., displayed subsequent to user interface 400 in FIG. 5A, and in some embodiments in response to detecting a pairing request from wireless accessory case 480-1 for initiating pairing of device 100 with wireless accessory case 480-1. In FIG. 5T, device 100 detects a pairing request from wireless accessory case 480-1 while within threshold distance 502. Device 100 displays window 504-1 overlaid on user interface 400 of FIG. 5A. Window 504-1 includes a representation 542-1 of wireless accessory case 480-1 and button 507 (labeled "Connect"). Window 504-1 further includes a representation 544-1 of physical marking 482-1 on wireless accessory case 480-1. In some embodiments, representation 542-1 is a three-dimensional representation of wireless accessory case 480-1. In some embodiments, representation 542-1 includes one or more animated movements (e.g., rotating, shifting, and/or lateral movement) as indicated by arrows 543. In some embodiments, representation 542-1 is movable by a user (e.g., in response to detection of swipe or drag gestures at window 504-1.

Figures 5U, 5V:
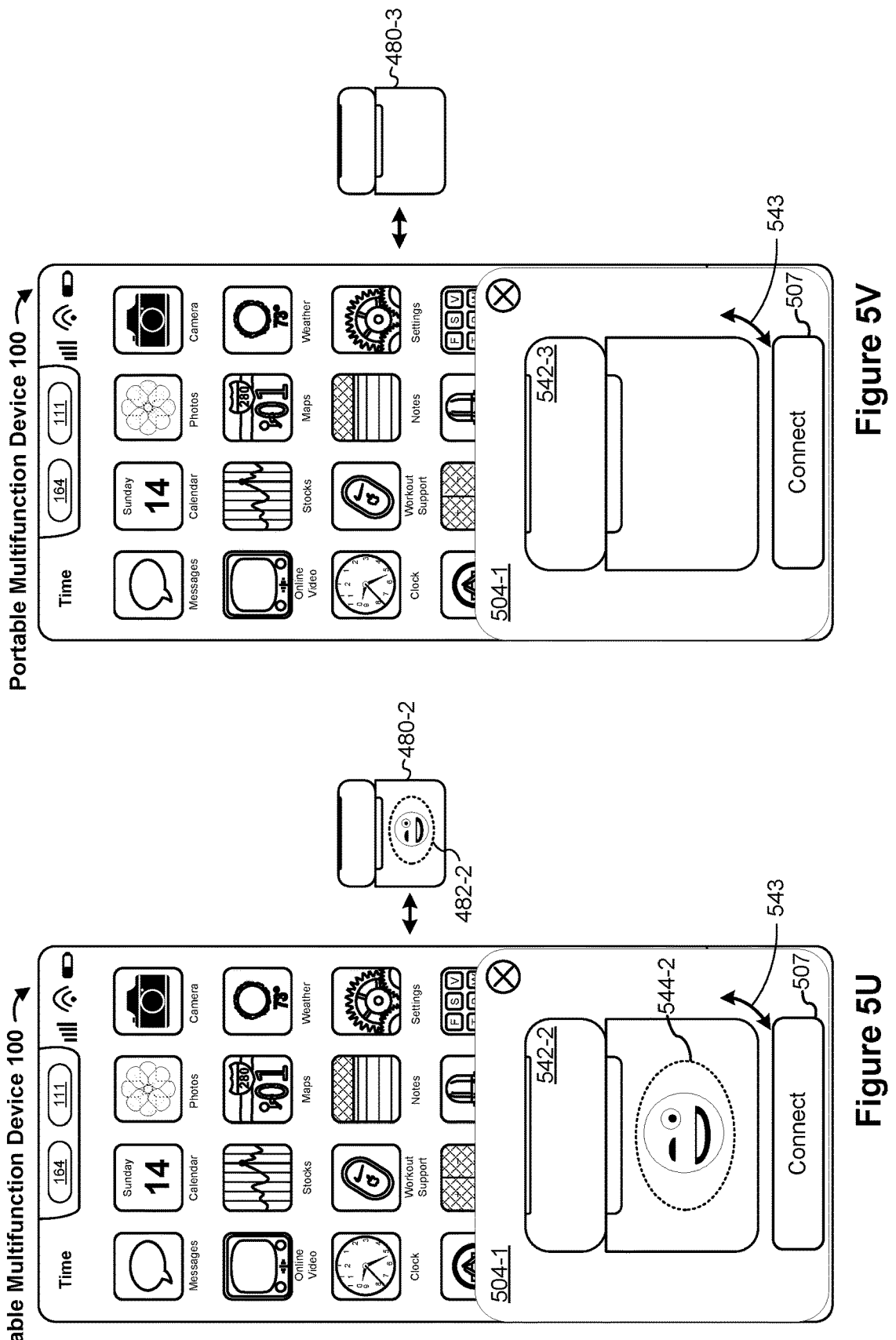

FIG. 5U illustrates an example user interface, e.g., displayed subsequent to user interface 400 in FIG. 5A, and in some embodiments in response to detecting a pairing request from wireless accessory case 480-2 for initiating pairing of device 100 with wireless accessory case 480-2. In FIG. 5U, device 100 detects a pairing request from wireless accessory case 480-2 while within threshold distance 502. Device 100 displays window 504-1 overlaid on user interface 400 of FIG. 5A. Window 504-1 includes a representation 542-2 of wireless accessory case 480-2 and button 507. Window 504-1 further includes a representation 544-2 of physical marking 482-2 on wireless accessory case 480-2. In this way, representations 544-1 and 544-2 enable or help a user to distinguish between wireless accessory case 480-1 and wireless accessory case 480-2.

FIG. 5V illustrates an example user interface, e.g., displayed subsequent to user interface 400 in FIG. 5A, and in some embodiments in response to detecting a pairing request from wireless accessory case 480-3 for initiating pairing of device 100 with wireless accessory case 480-3. In FIG. 5V, device 100 detects a pairing request from wireless accessory case 480-3 while within threshold distance 502. Device 100 displays window 504-1 overlaid on user interface 400 of FIG. 5A. Window 504-1 includes a representation 542-3 of wireless accessory case 480-3 and button 507. Wireless accessory case 480-3 does not include a physical marking 482 and, accordingly, window 504-1 does not include a representation 544 of a physical marking.

Figure 5W:
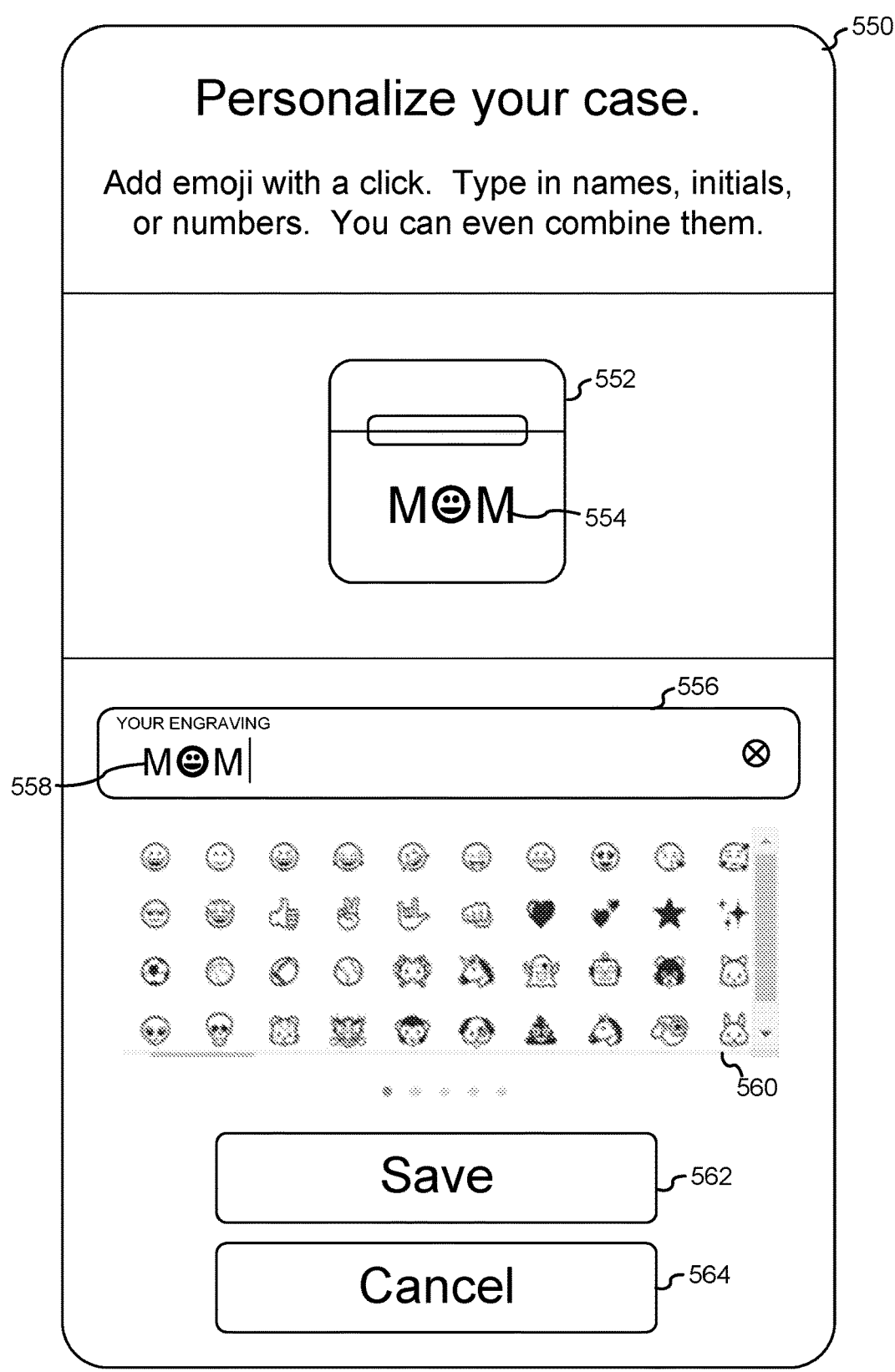

FIG. 5W illustrates an example user interface 550 for adding a physical marking to an electronic accessory (e.g., a wireless accessory case 480). In some embodiments, the electronic accessory is a set of headphones, a smart watch, a findable electronic device, a stylus, or an accessory case. In some embodiments, the physical marking is, or includes, an engraving, an embossing, and/or printed, painted, or otherwise applied, markings. In some embodiments, user interface 550 is presented to a user as part of a purchase (or update) process for the electronic accessory. User interface 550 includes a representation 552 of an electronic accessory including a preview 554 of a physical marking selected (e.g., inputted or accepted) by a user. User interface 550 further includes an input section 556 to accept user inputs such as inputs 558 (e.g., text and/or selection(s) from section 560 (e.g., emojis and/or symbols), a button 562 (labeled "Save") that, when activated by a user input, saves and/or confirms inputs 558 as a physical marking for the electronic accessory, and a button 564 (labeled "Cancel") that, when activated by a user input, removes inputs 558 and/or closes user interface 550 (e.g., returns to a previous user interface or advances to a new or next user interface). In some embodiments, user interface 550 includes an option (e.g., a button or other affordance) that, when activated by a user, changes a font for text inputs. In some embodiments, user interface 550 includes an option (e.g., a button or other affordance) that, when activated by a user, allows a user to input handwritten inputs (e.g., a signature, handwritten text, and/or a drawing).

Figure 5Y:
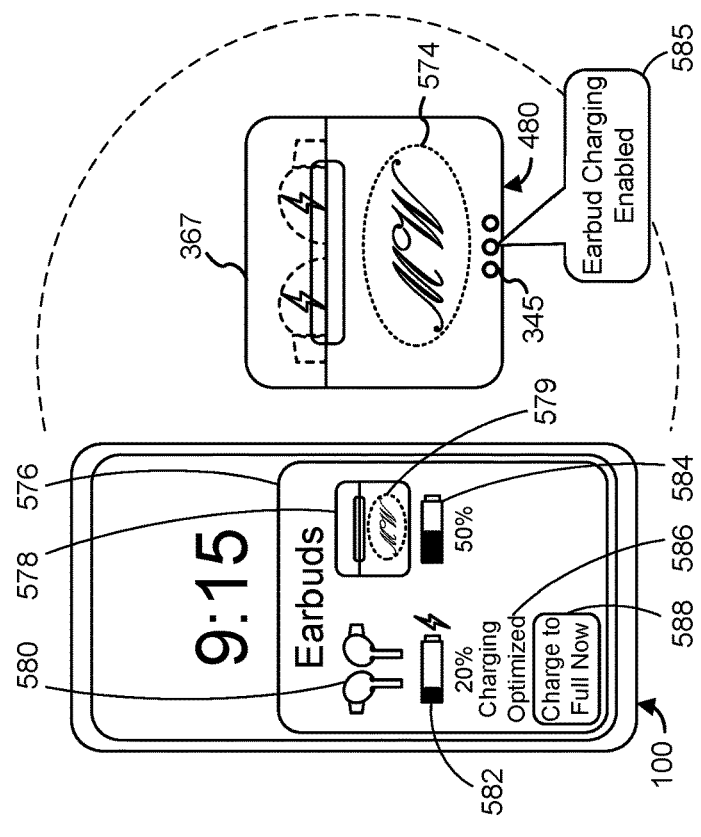
Figure 5X:
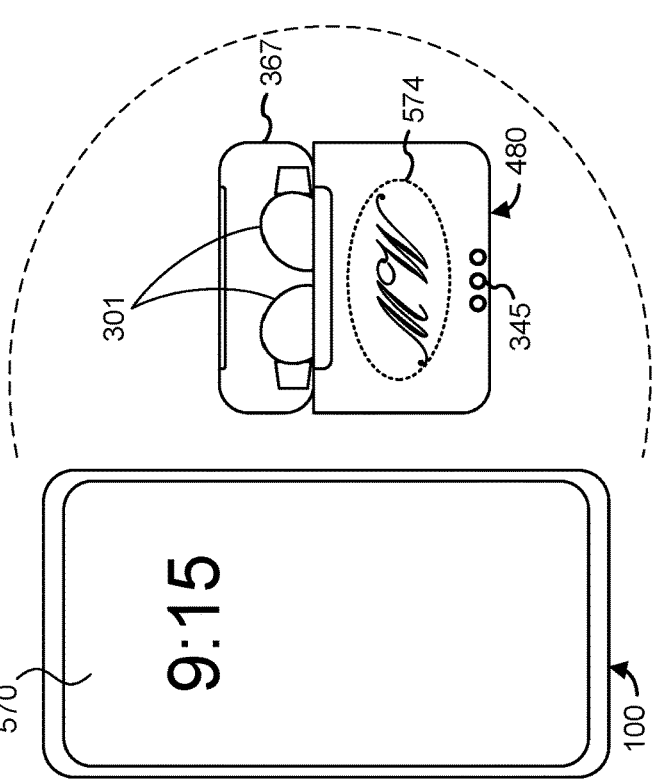
Figure 5A:
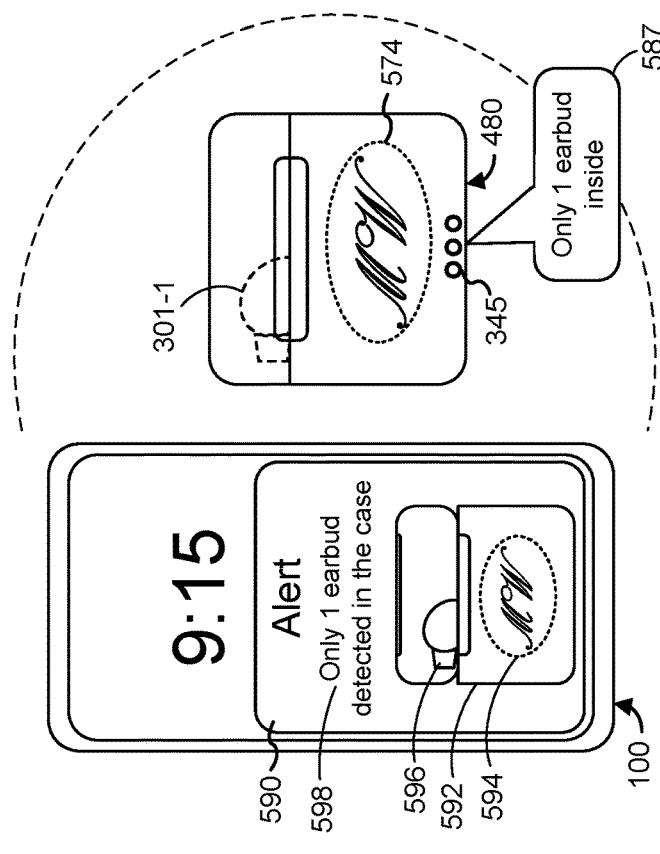

FIG. 5X shows wireless accessory case 480 and associated wearable audio output devices 301 within a threshold distance of device 100. Wireless accessory case 480 in FIG. 5X includes speaker(s) 345 (e.g., and associated apertures) and a physical marking 574. Device 100 includes a user interface 570 (e.g., a lock and/or sign-in screen). Wireless accessory case 480 is open (e.g., lid 367 is up) in FIG. 5X and wearable audio output devices 301 are inserted in case 480.

FIG. 5Y illustrates a transition from FIG. 5X in response to an occurrence of a condition associated with wireless accessory case 480 (e.g., a closure of lid 367). In response to closure of lid 367, wearable audio output devices 301 begin charging, audio feedback 585 is optionally provided via speaker(s) 345 indicating to the user that wearable audio output devices 301 are charging, and user interface 576 is presented on device 100 (e.g., optionally displayed over a portion of another user interface, such as user interface 570). In some embodiments, wearable audio output devices 301 begin charging in response to being inserted (e.g., mounted and/or secured) within wireless accessory case 480. In some embodiments, audio feedback 585 includes one or more tones and/or one or more spoken terms. User interface 576 includes a representation 578 of wireless accessory case 480, including a representation 579 of physical marking 574, and a representation 580 of wearable audio output devices 301. User interface 576 further includes an indication 582 of the charging status of wearable audio output devices 301. In the example shown in FIG. 5Y, wearable audio output devices 301 are 20% charged. User interface 576 also includes indication 584 of the charging status of case 480. In the example shown in FIG. 5Y, case 480 is 50% charged.

In addition, in the example shown in FIG. 5Y, optimization of the charging of wearable audio output devices 301 is enabled, as indicated by indication 586 (e.g., the text "Charging optimized") underneath representation 580 of wearable audio output devices 301. In some embodiments, charging of wearable audio output devices 301 by case 480 is performed under the control of device 100 (e.g., while device 100 is in communication with case 480 and/or wearable audio output devices 301). For example, device 100 sends instructions to case 480 and/or wearable audio output devices 301 to initiate charging of wearable audio output devices 301 by case 480, and optionally to limit charging to a threshold charge level in accordance with optimized charging being enabled, or alternatively, to permit charging to full (e.g., to the full storage capacity of wearable audio output devices 301) in accordance with optimized charging being disabled. User interface 576 also includes optimized charging override button 588 (e.g., labeled "Charge to Full Now"), which, when activated, disables the optimization of the charging of wearable audio output devices 301 and, if other charging criteria are met, initiates charging of wearable audio output devices 301 to a fully charged state. In the example shown in FIG. 5Y, optimized charging of case 480 is not enabled (e.g., is unavailable or has been disabled), so no optimized charging indication, nor any optimized charging override button, is displayed for case 480 (as opposed to optimized charging for the wearable audio output devices 301).

Figure 5Z:
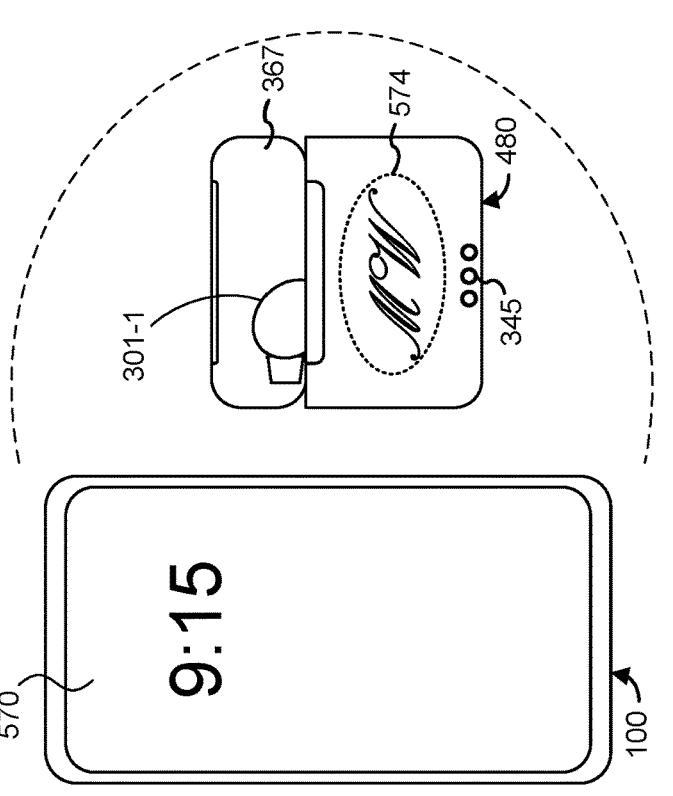
Figure 5A:
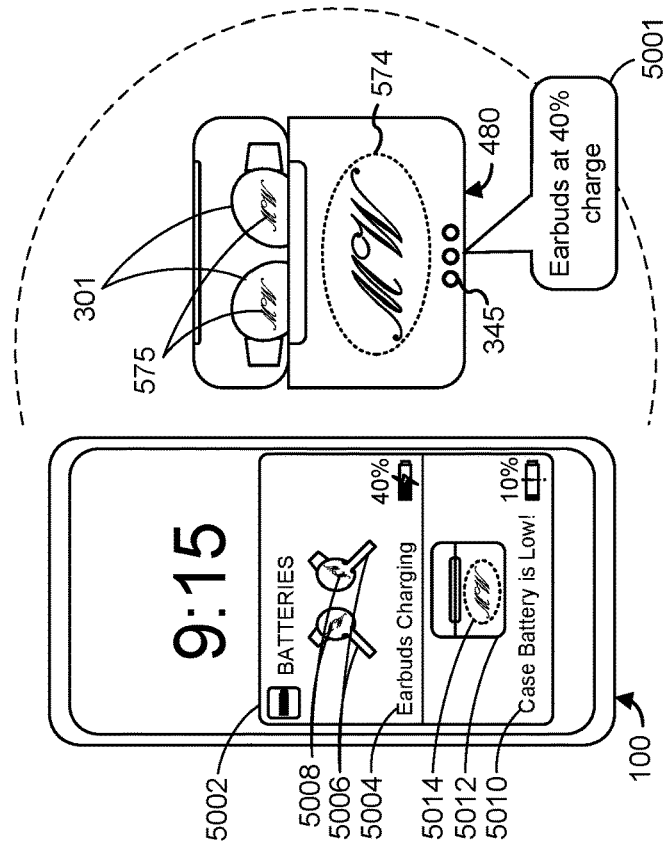
Figure 5A:
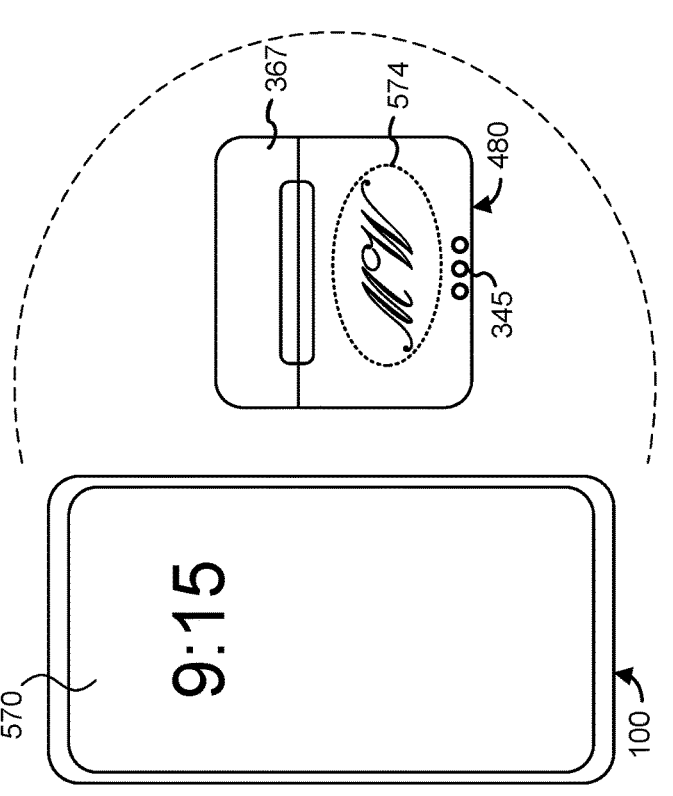
Figure 5A:
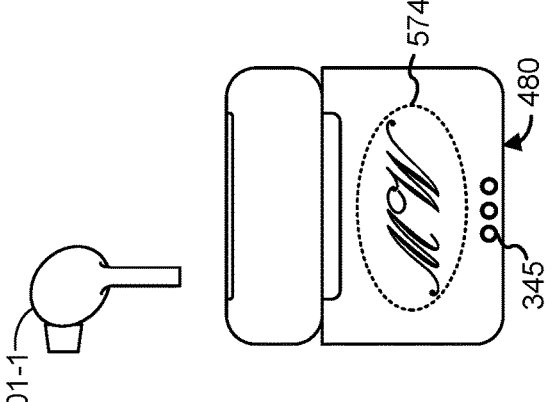
Figure 5A:
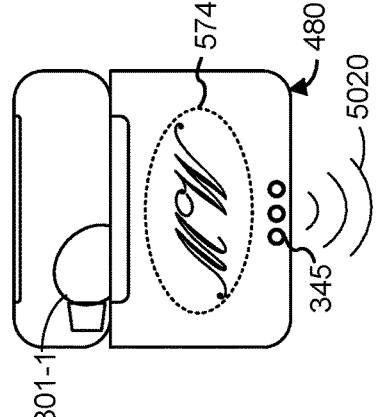
Figure 5A:
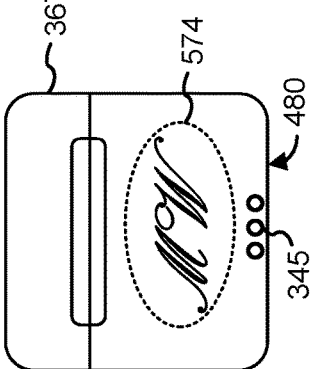
Figure 5A:
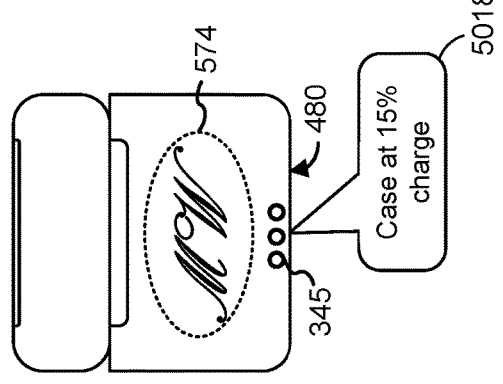
Figure 5A:
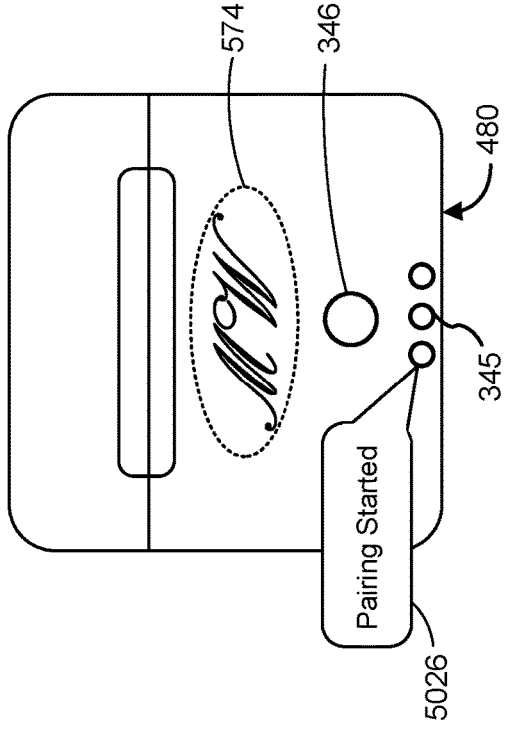
Figure 5A:
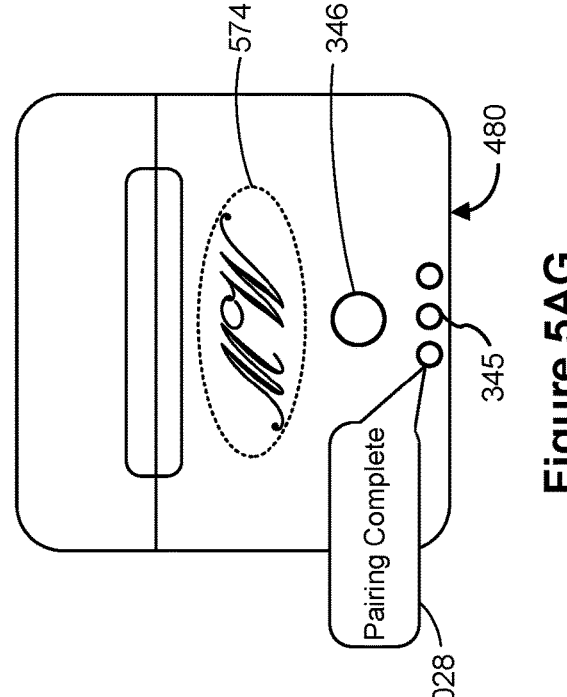
Figure 5A:
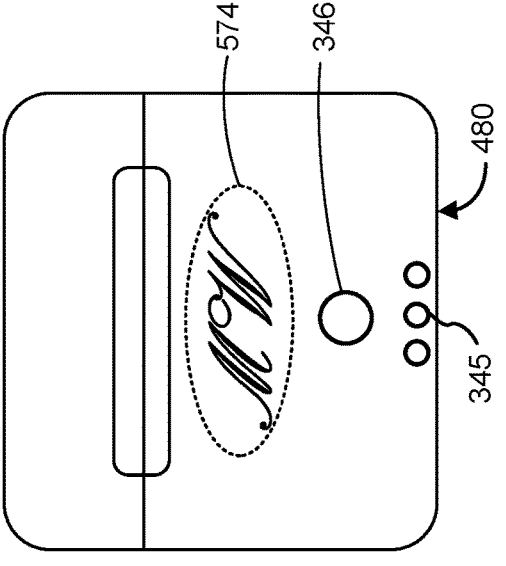
Figure 5A:
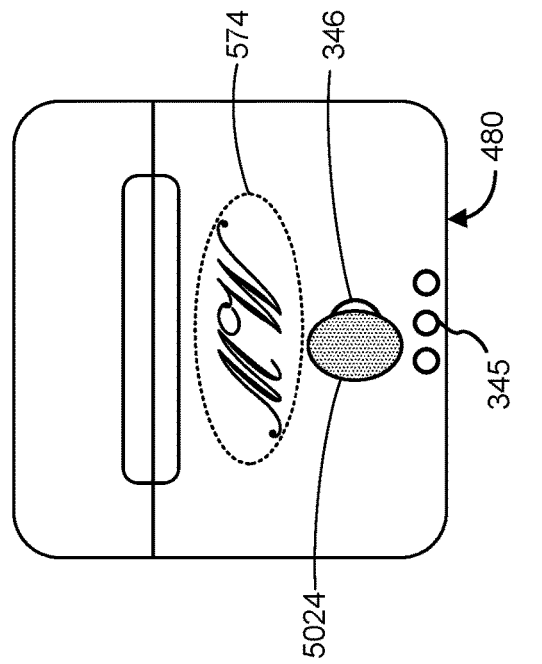
Figure 5A:
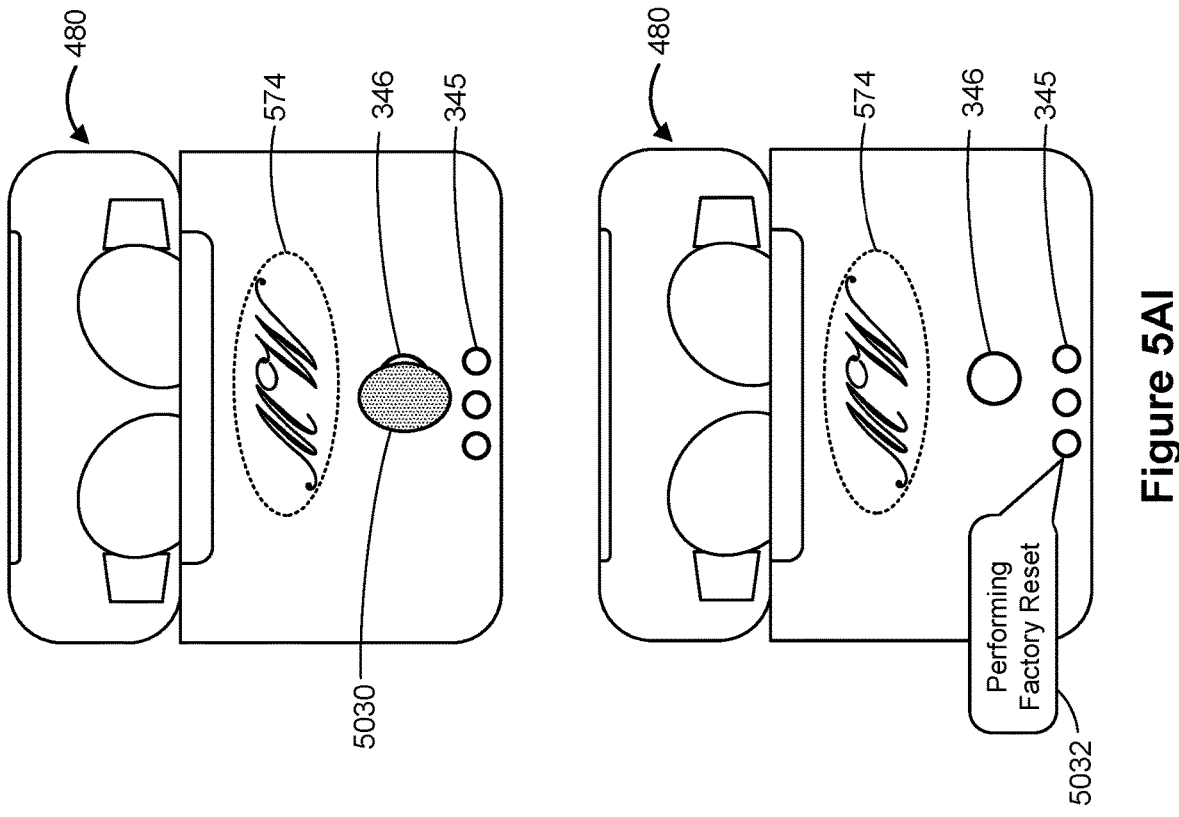
Figure 5A:
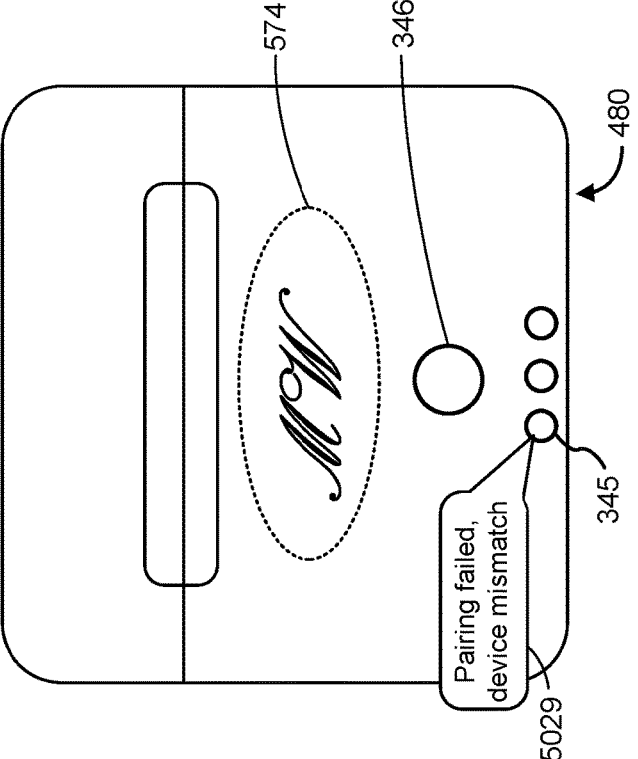
Figure 5A:
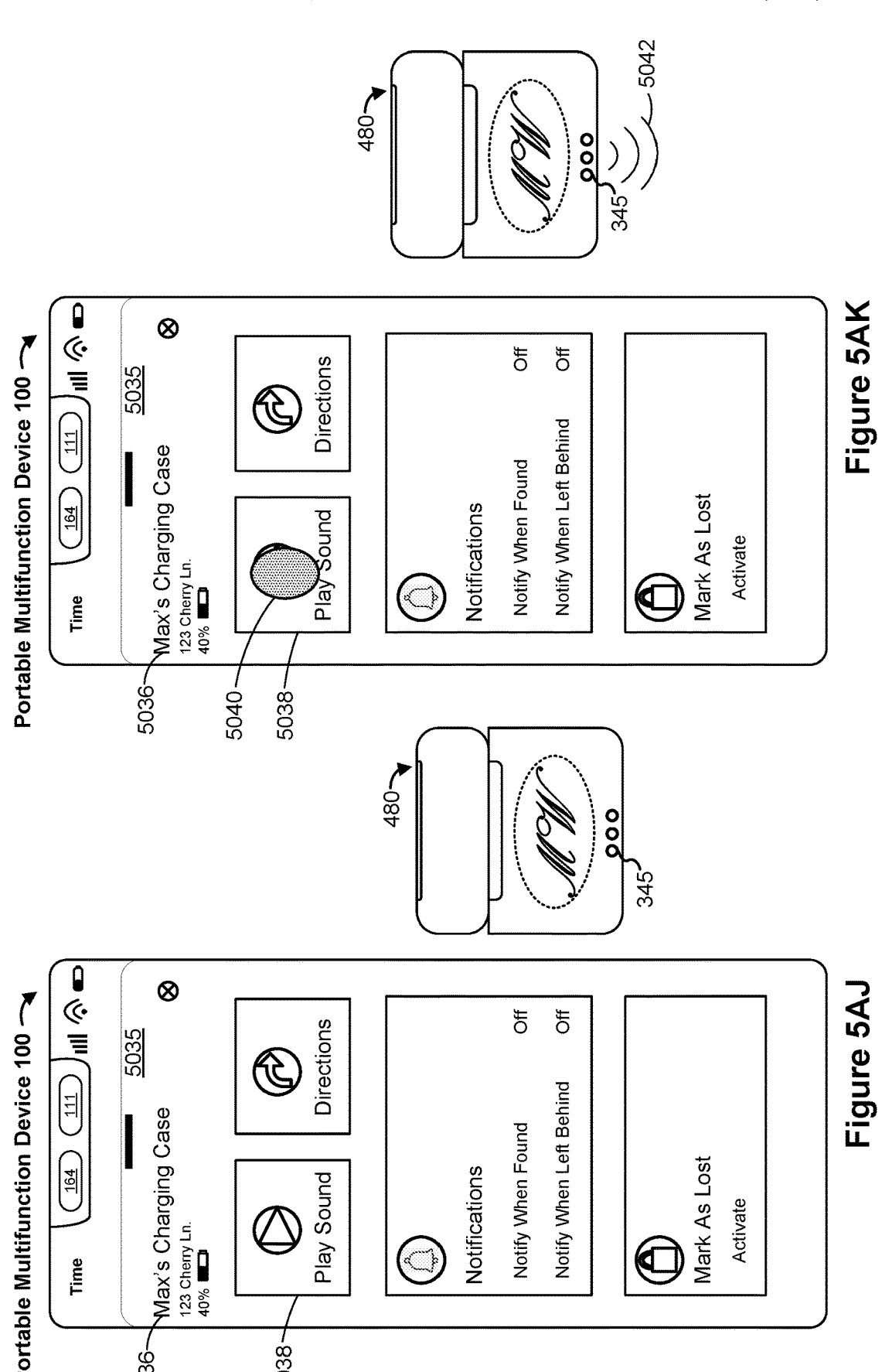
Figure 5A:
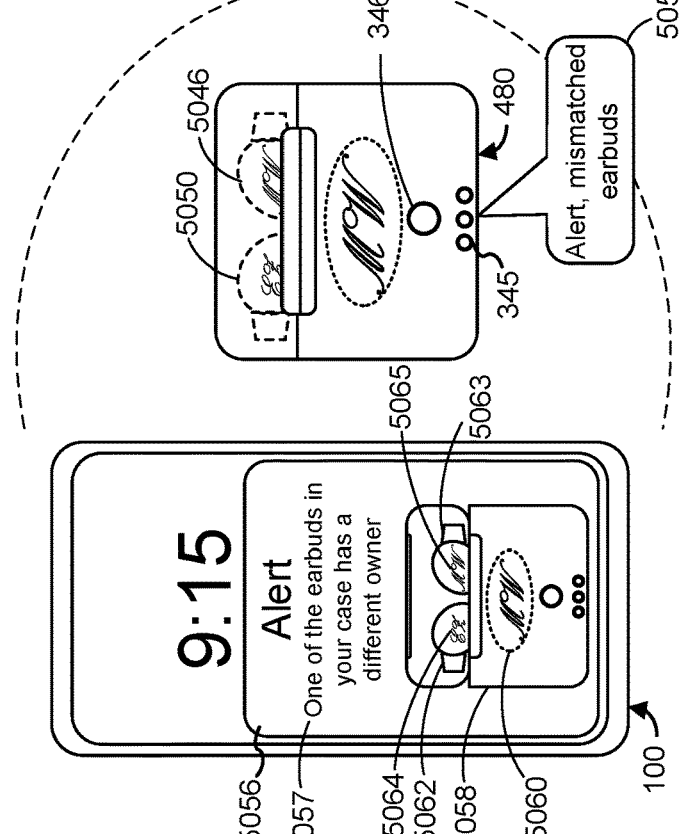
Figure 5A:
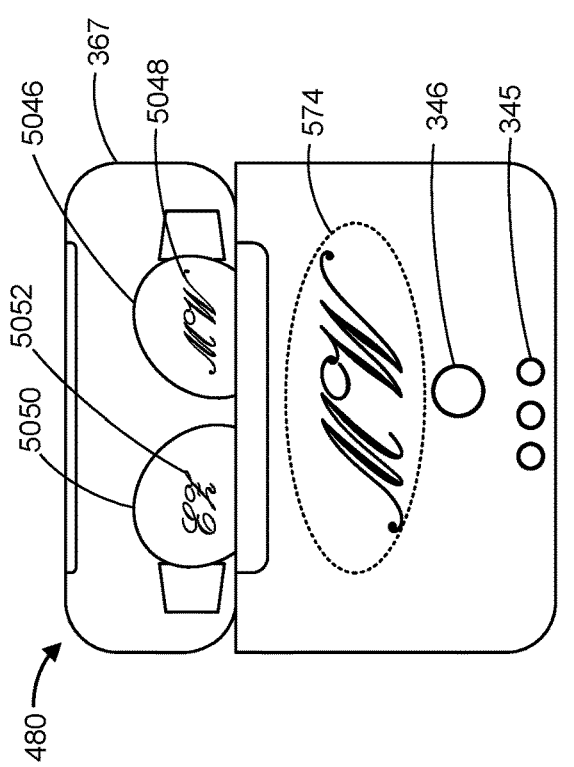
Figure 5A:
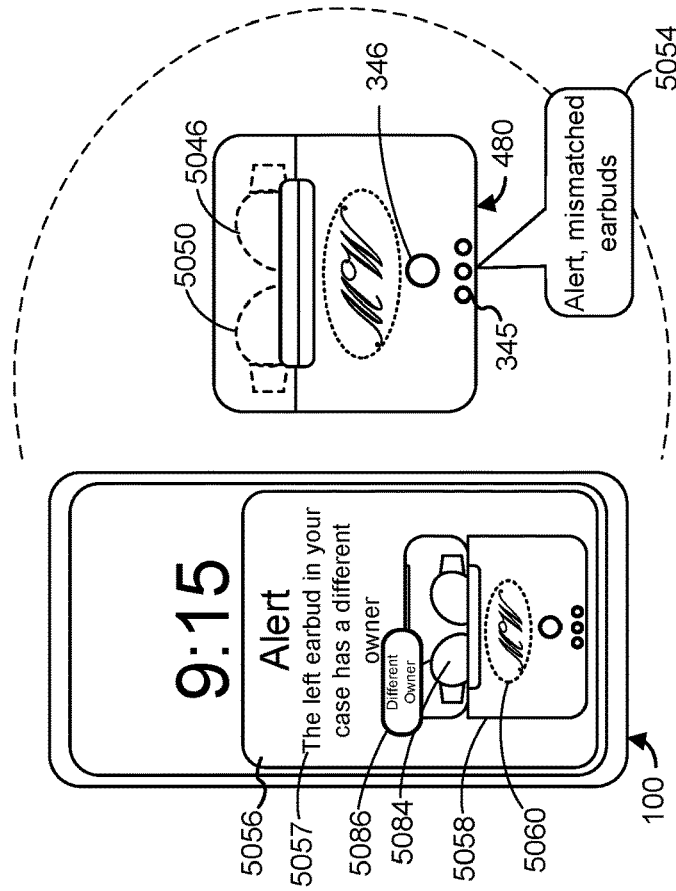
Figure 5A:
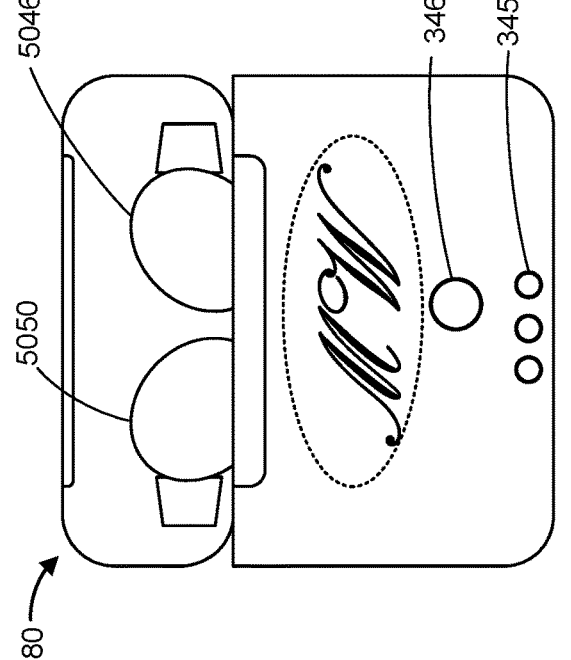
Figure 5A:
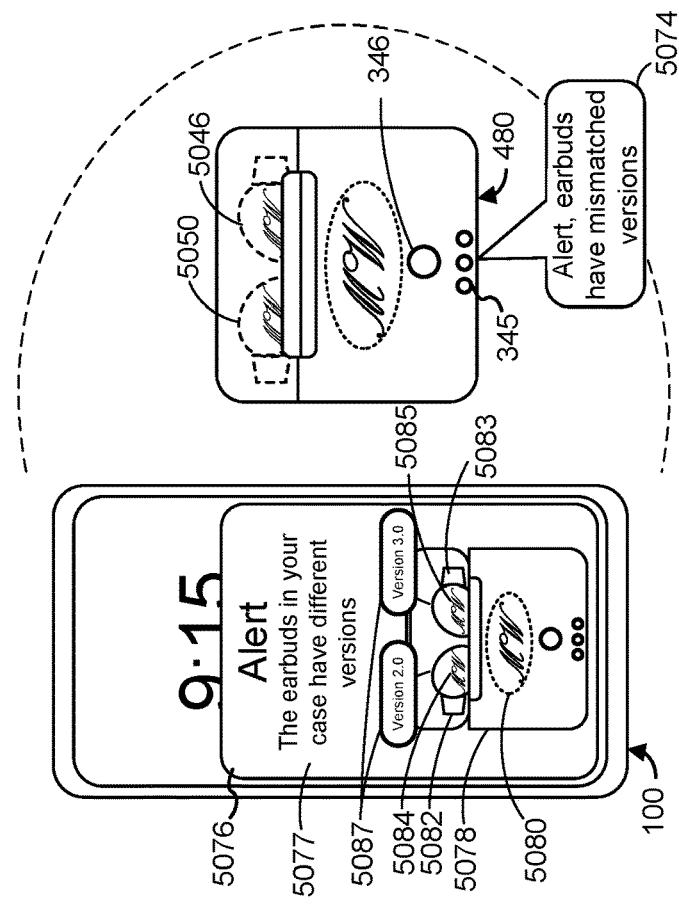
Figure 5A:
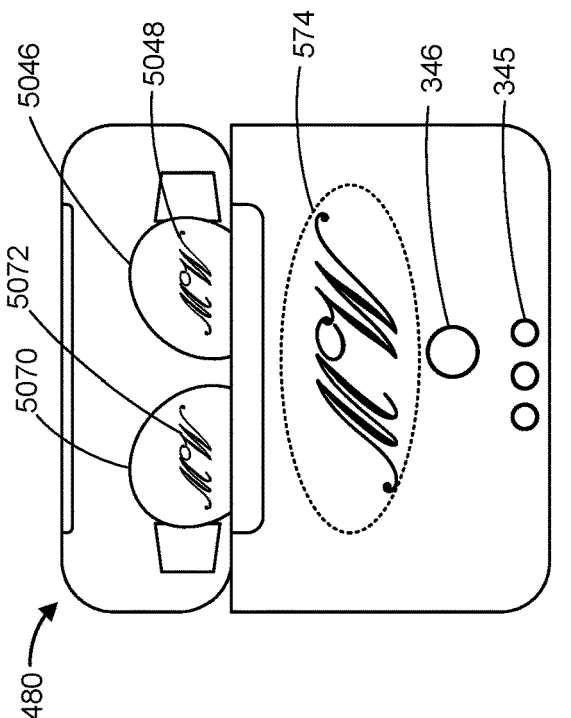
Figure 5A:
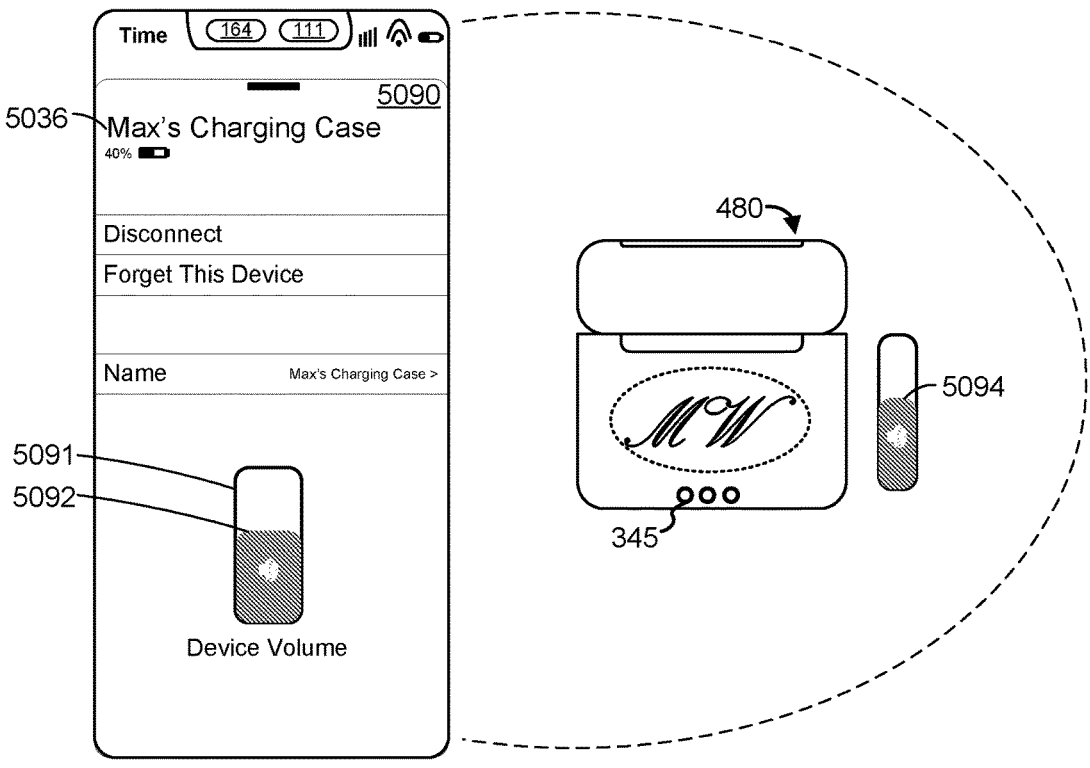
Figure 5A:
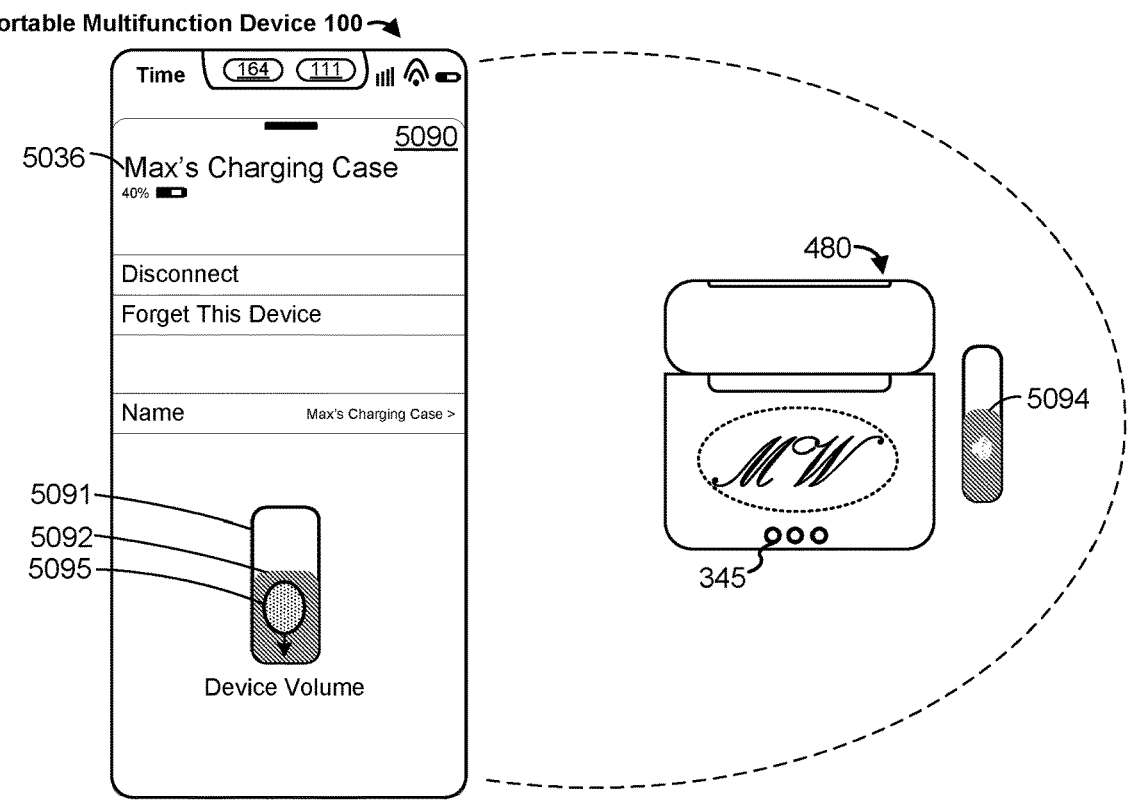
Figure 5A:
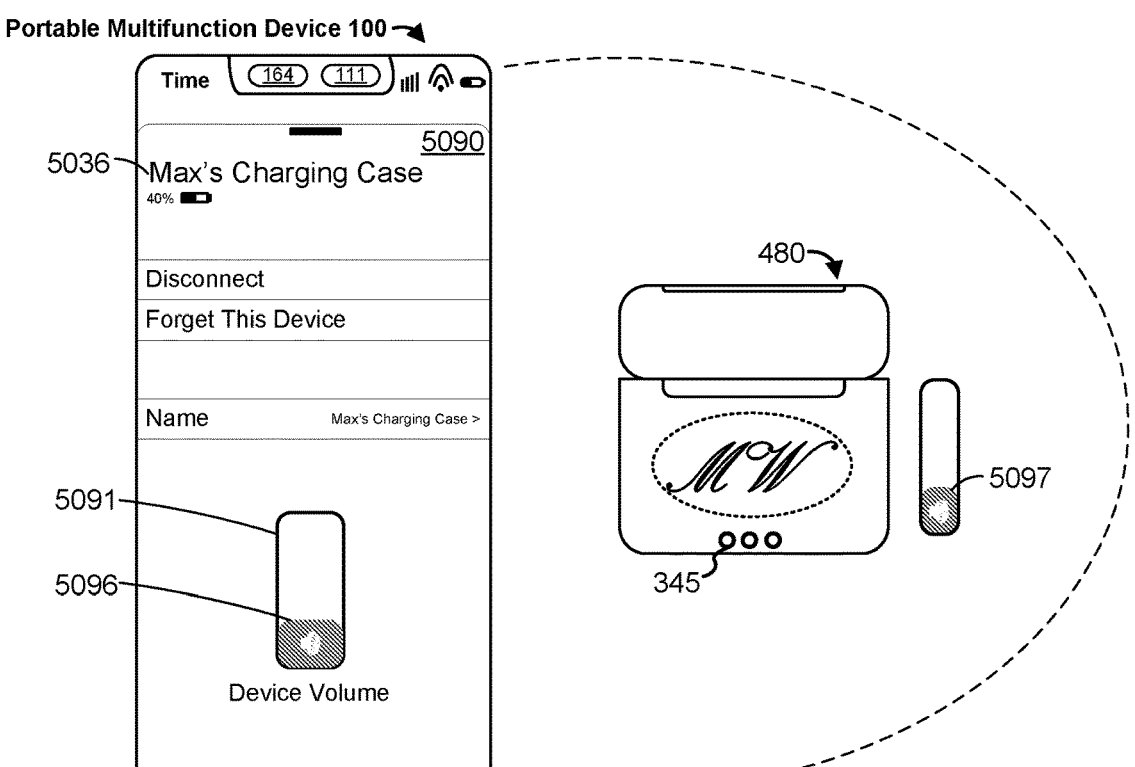
Figure 5A:
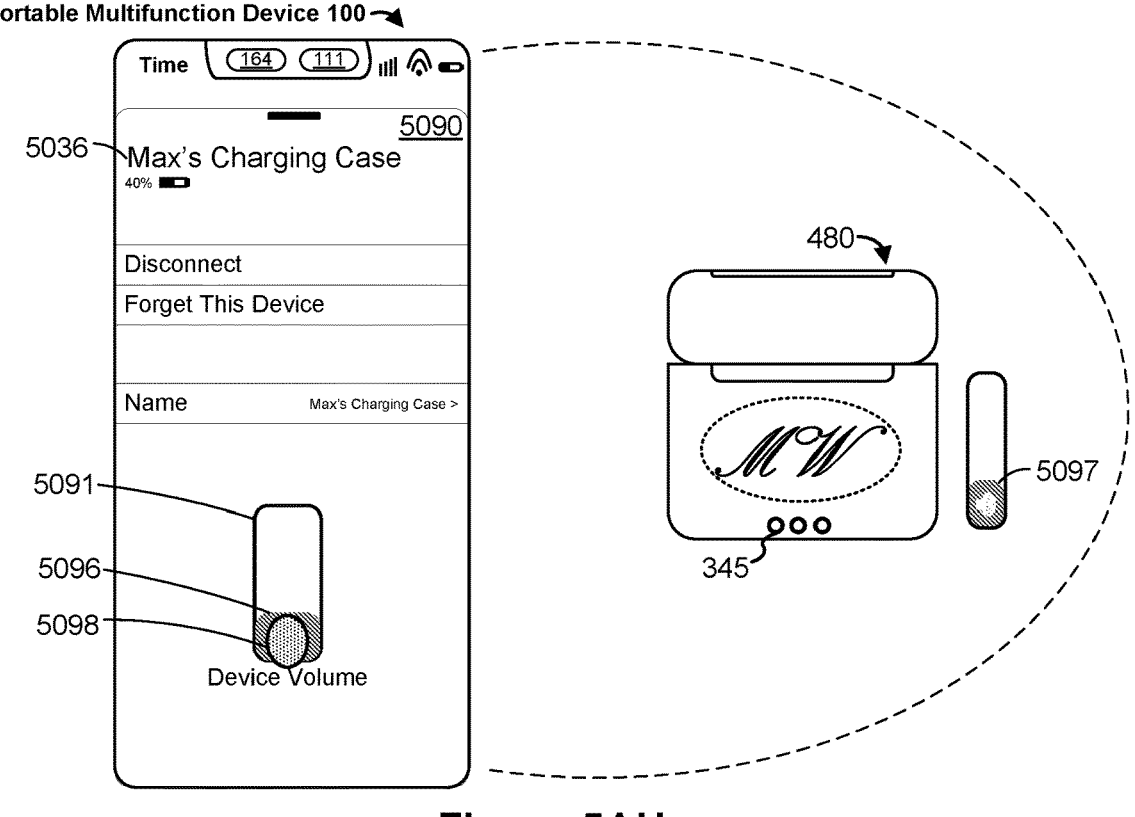
Figure 5A:
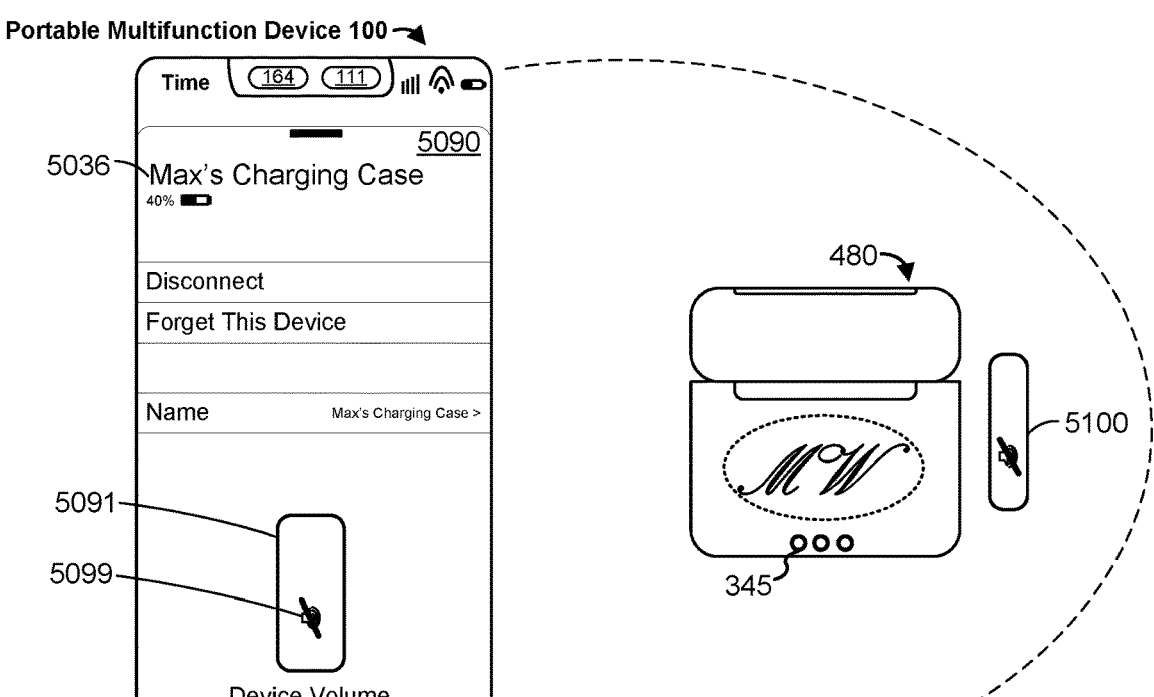
Figure 5A:
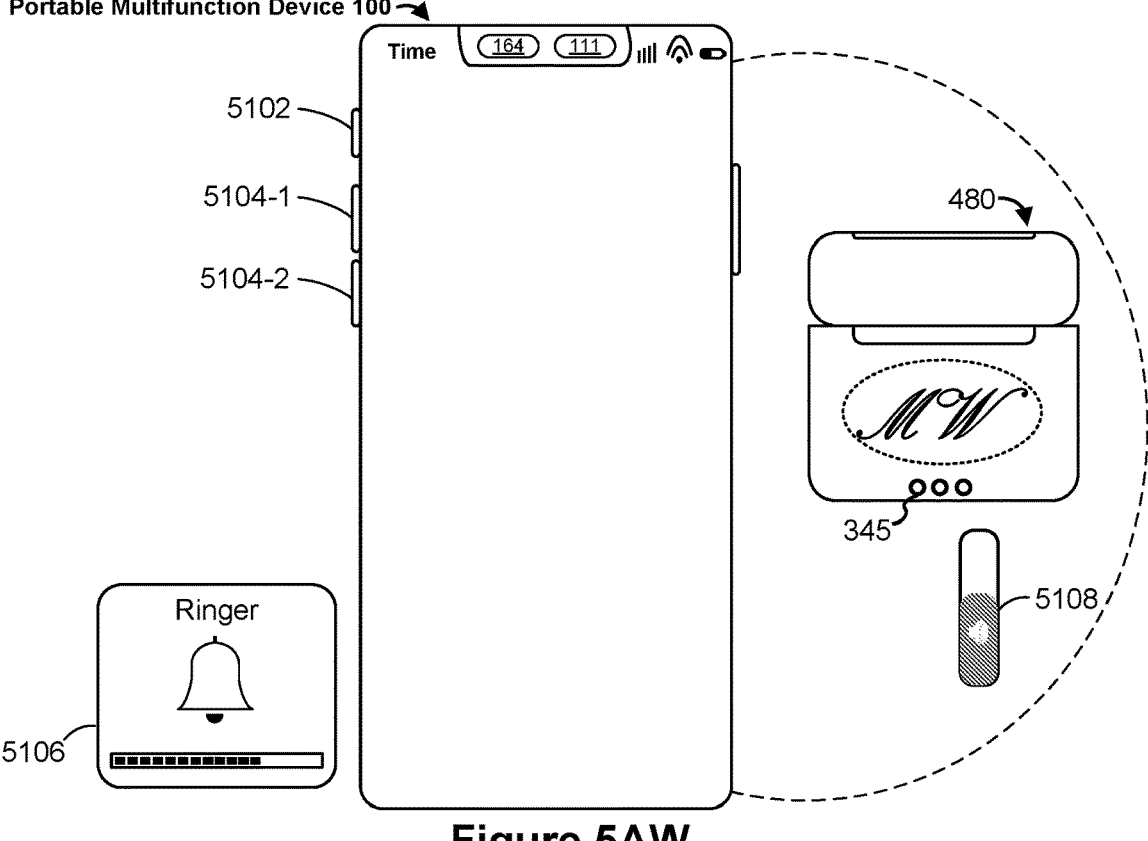
Figure 5A:
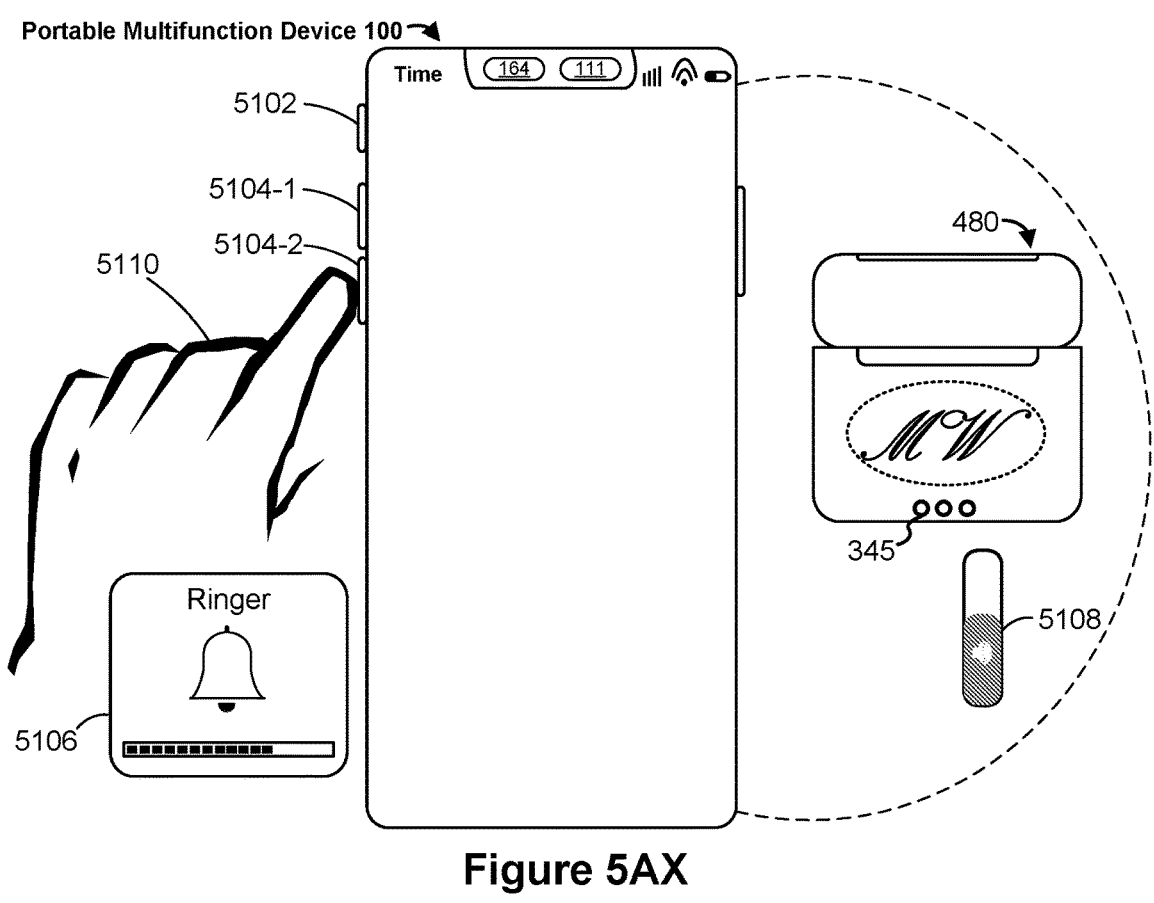
Figures 5A, 5B:
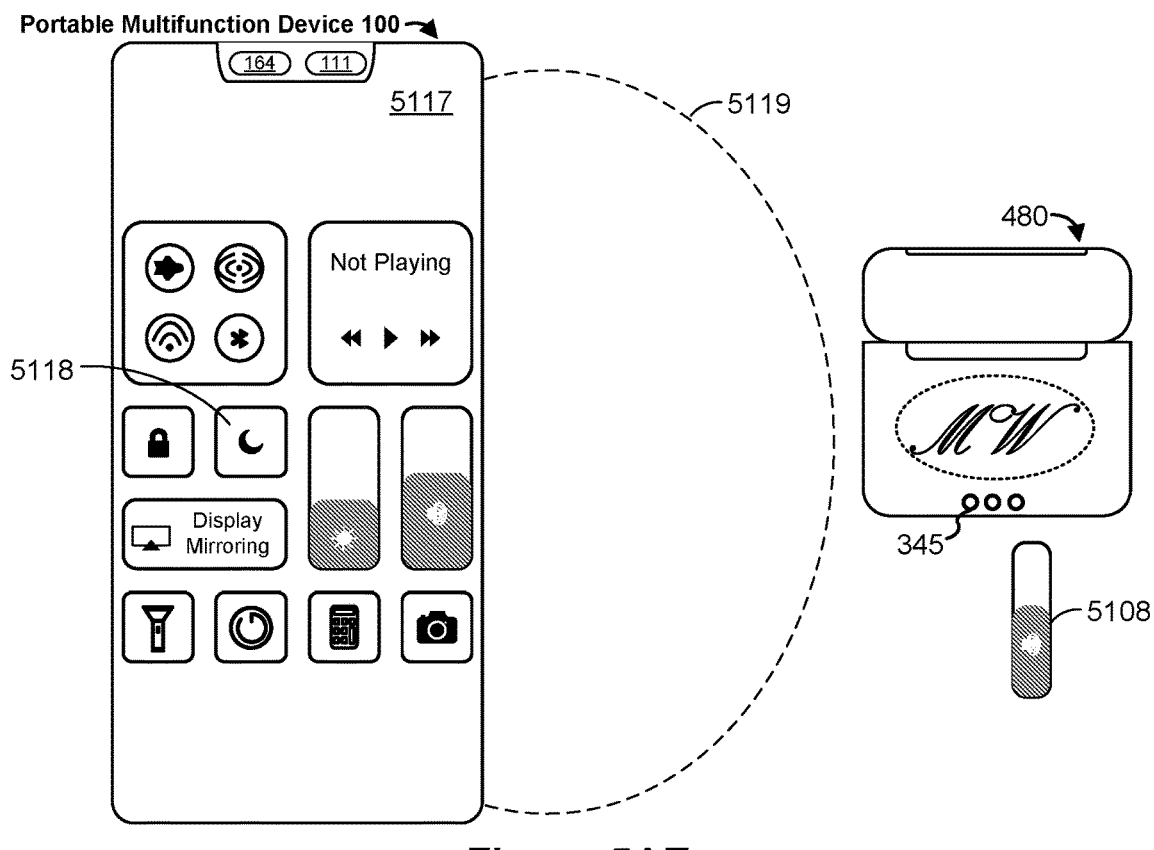
Figure 5B:
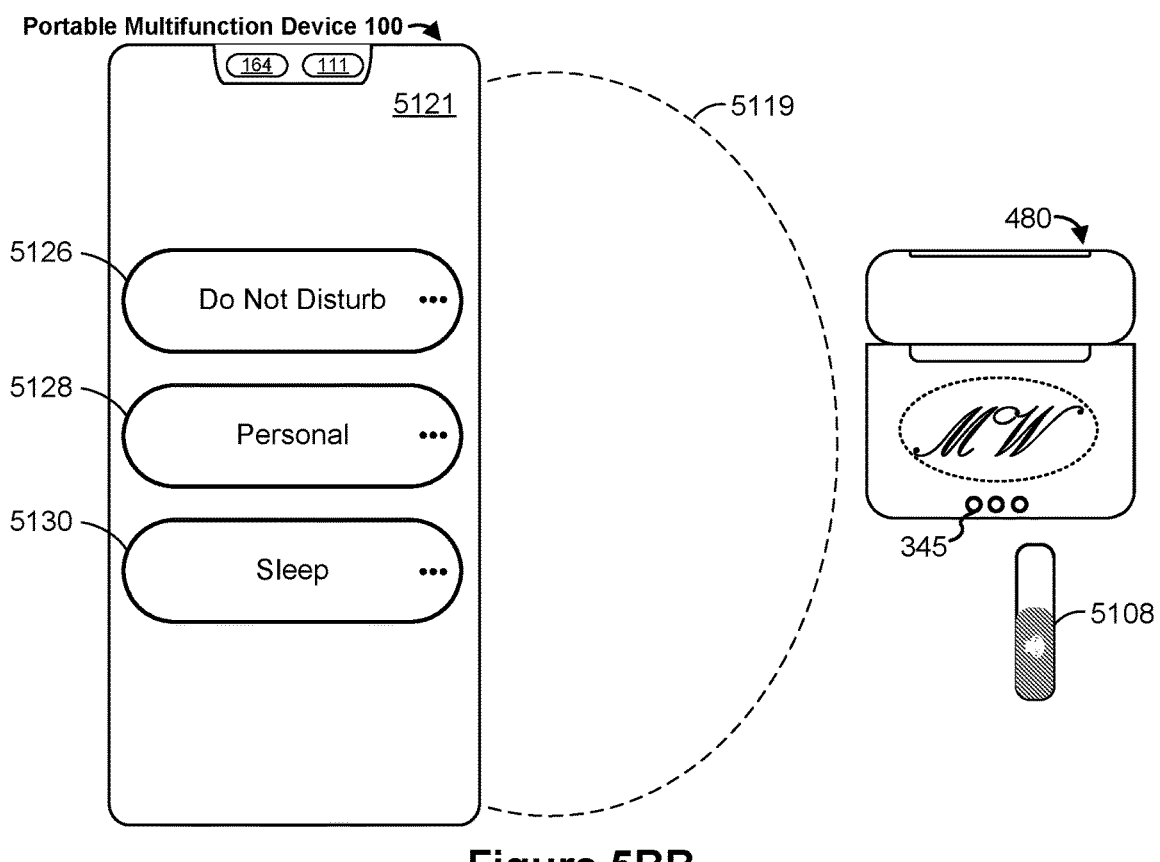
Figure 5B:
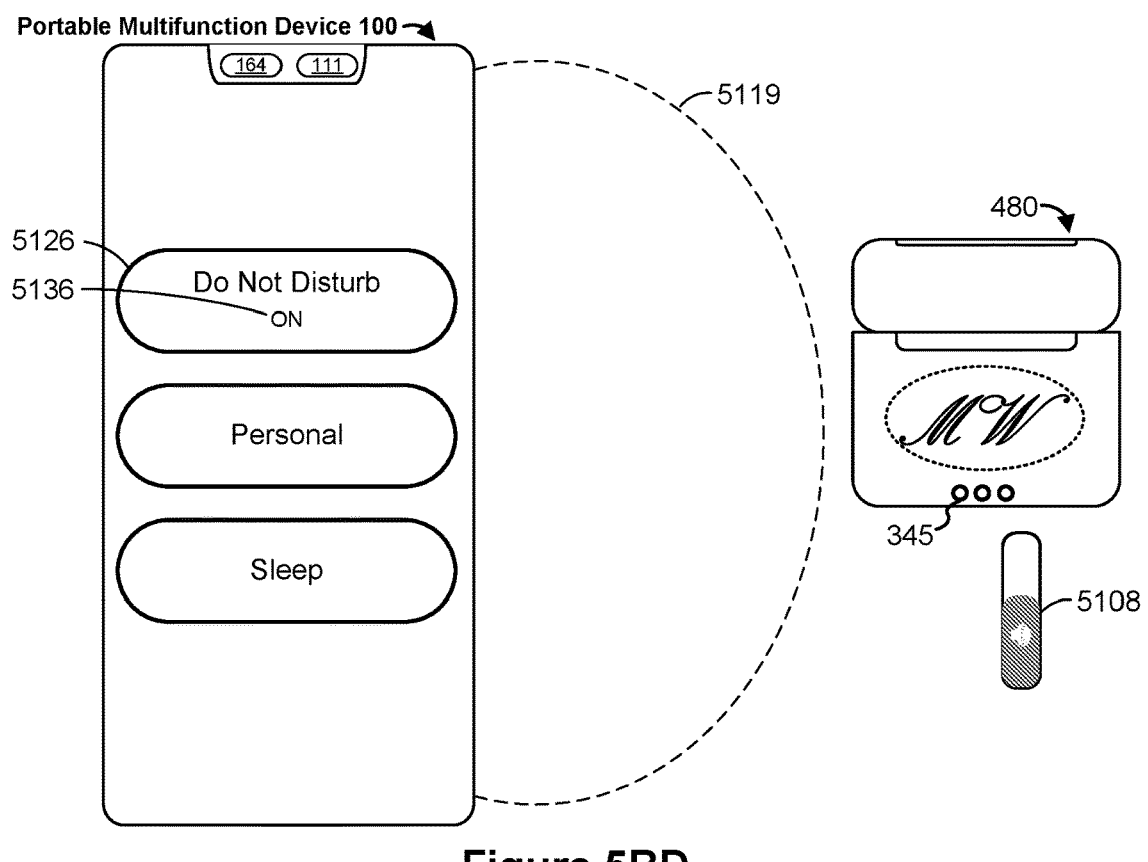
Figure 5B:
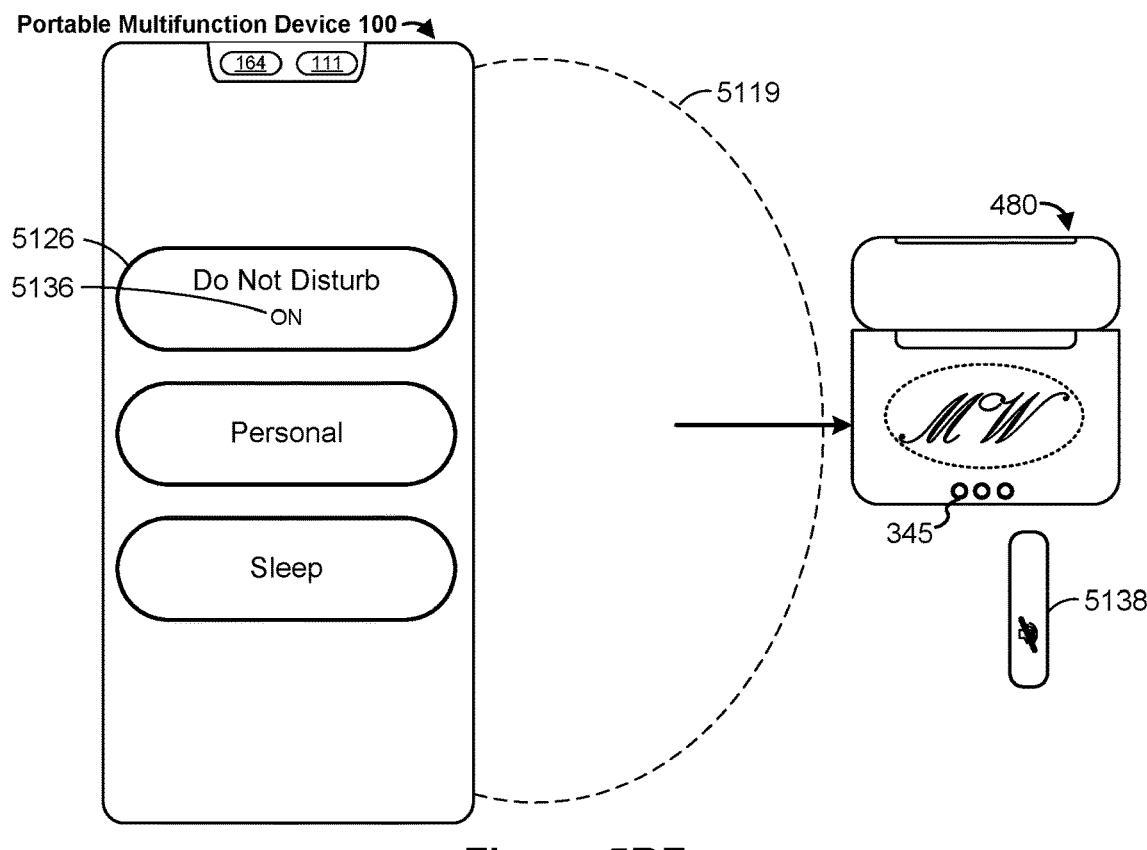
Figure 5B:
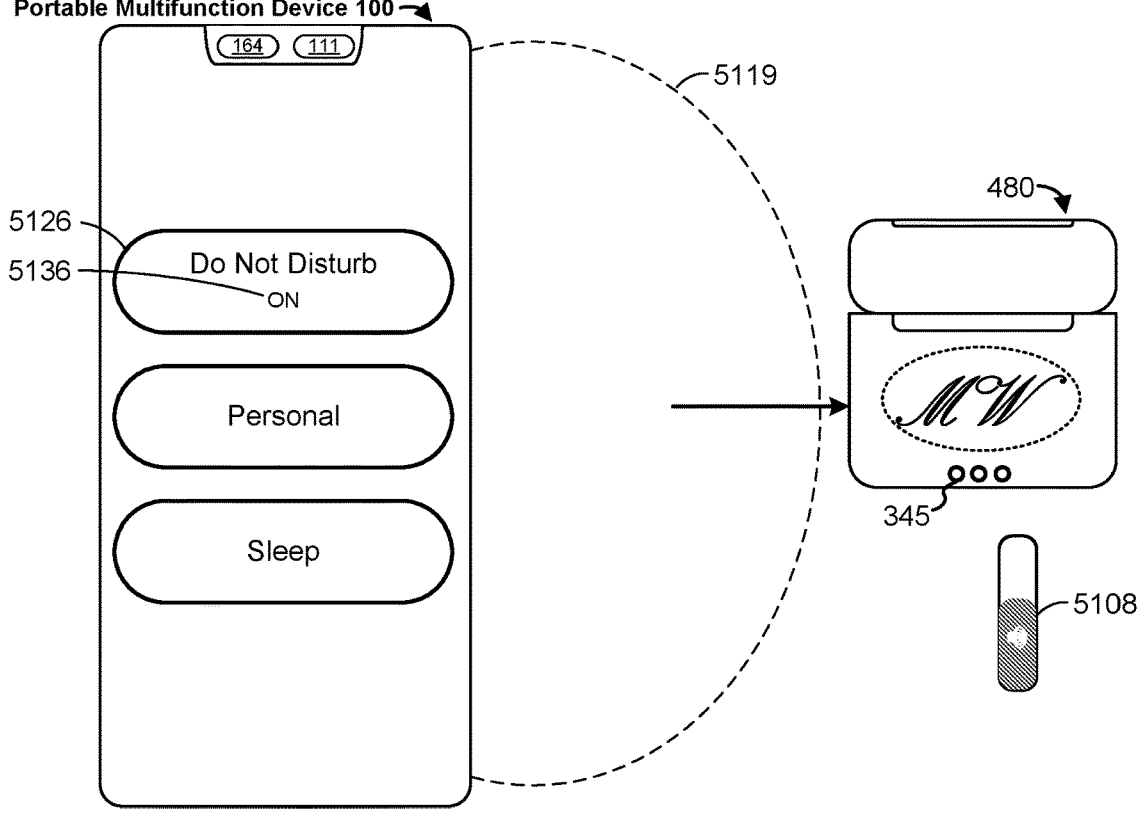
Figure 5B:
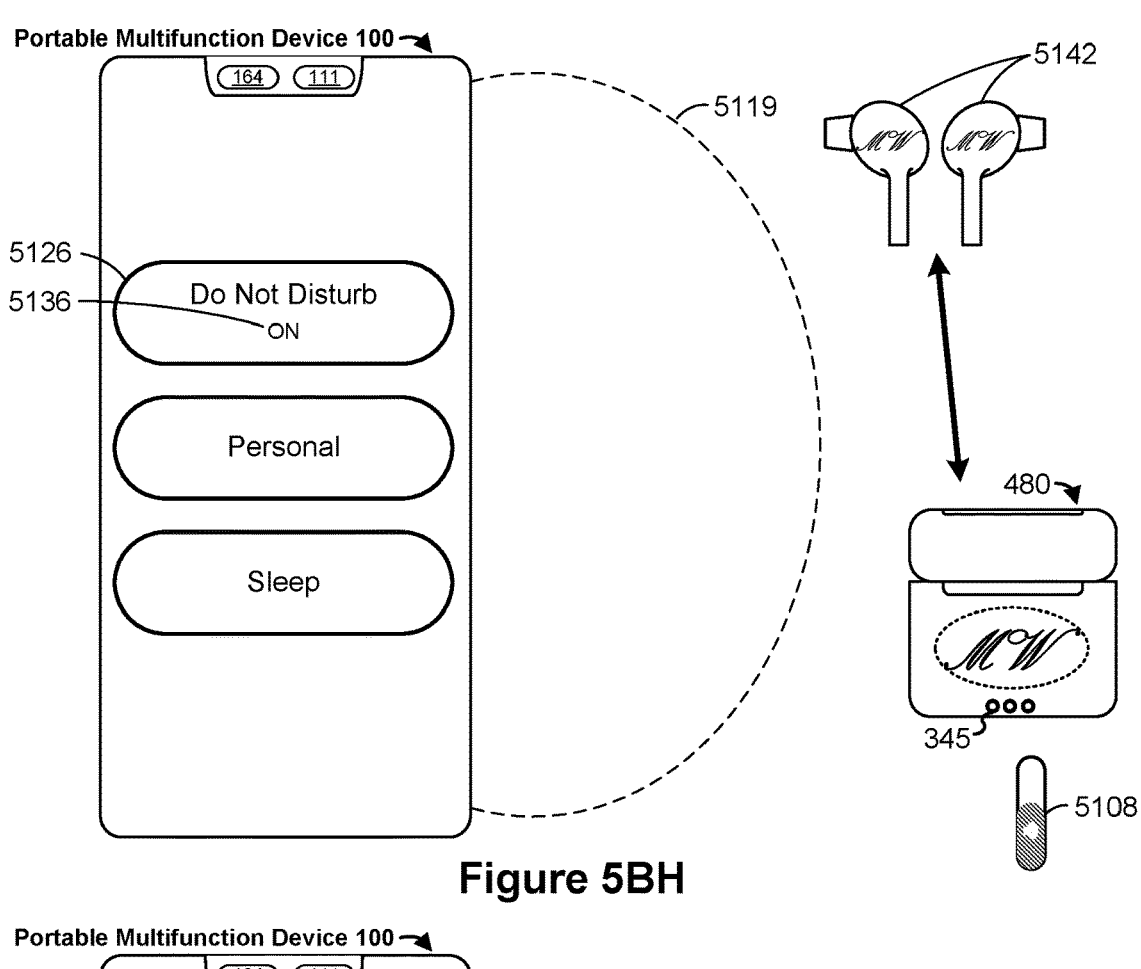
Figure 5B:
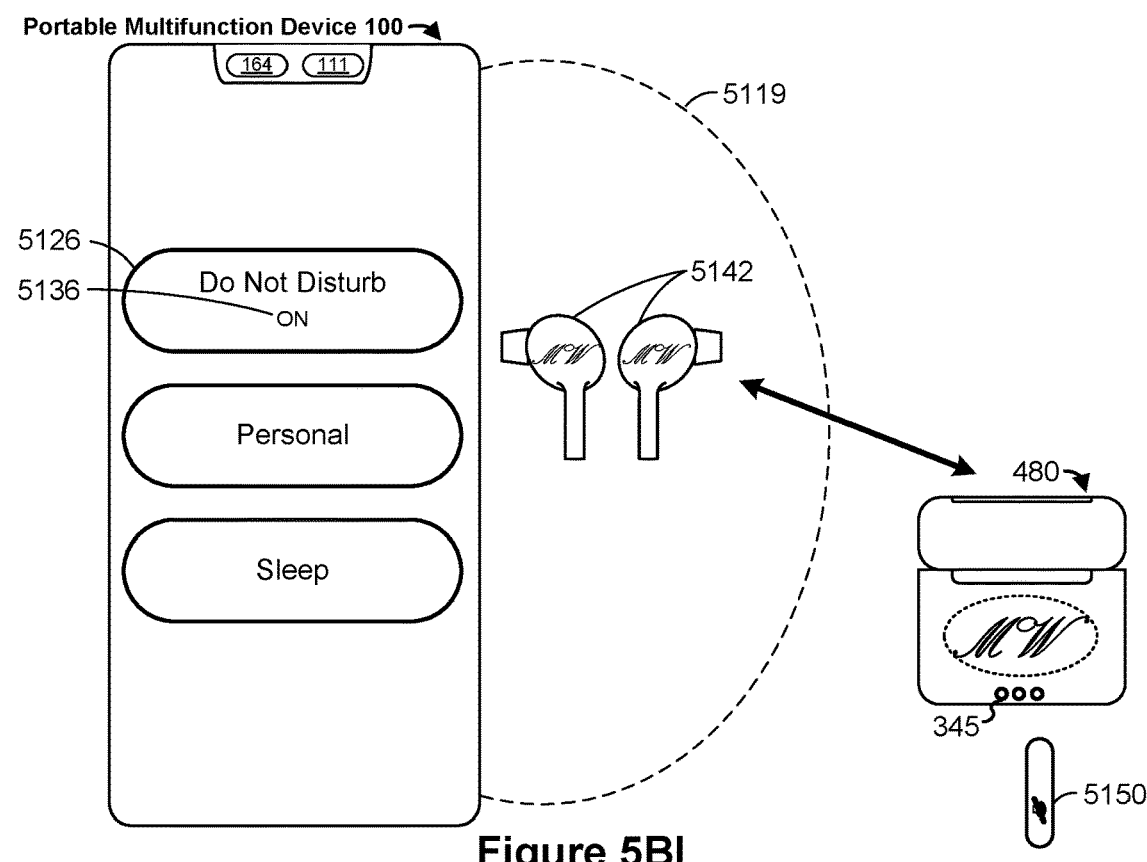
Figure 5B:
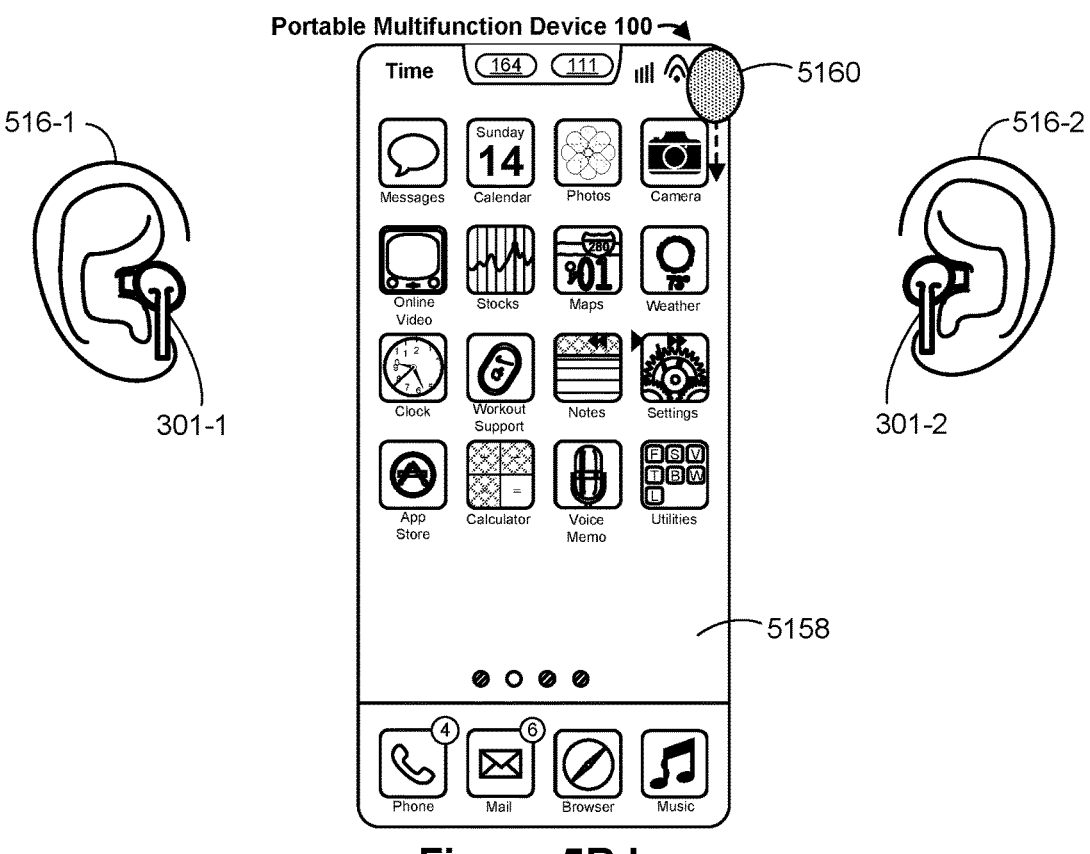
Figure 5B:
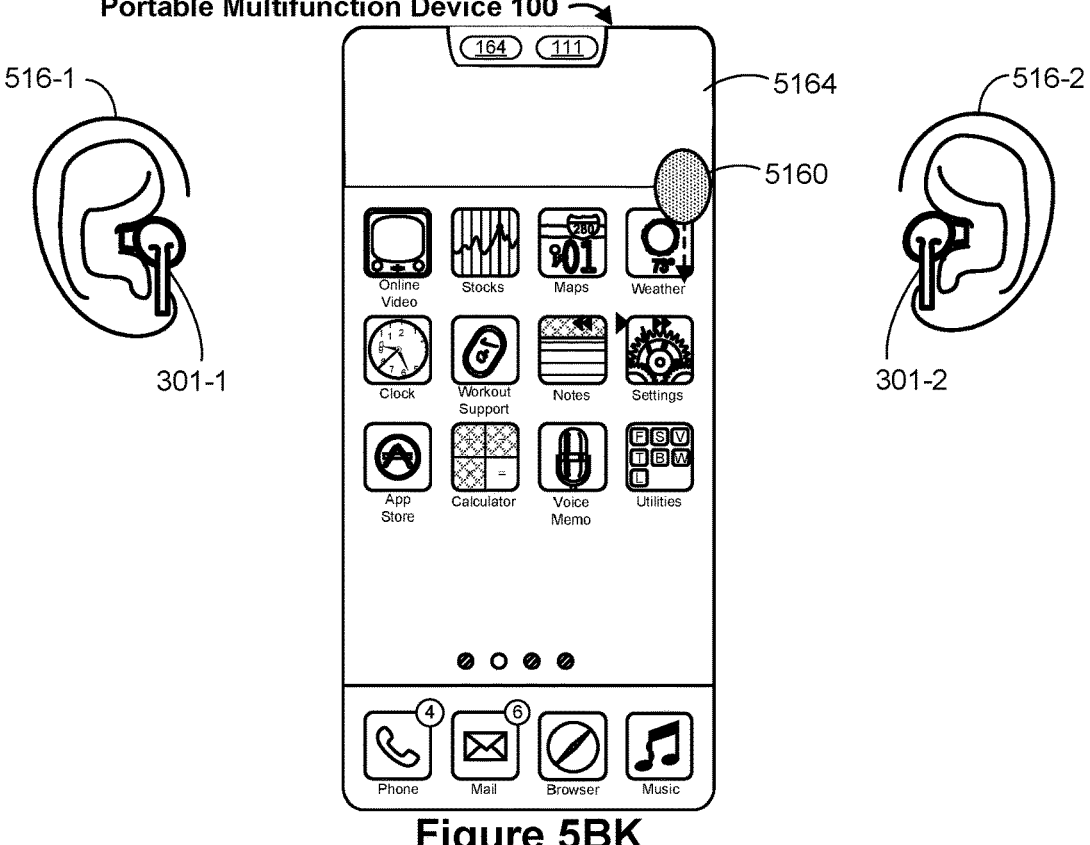
Figure 5B:
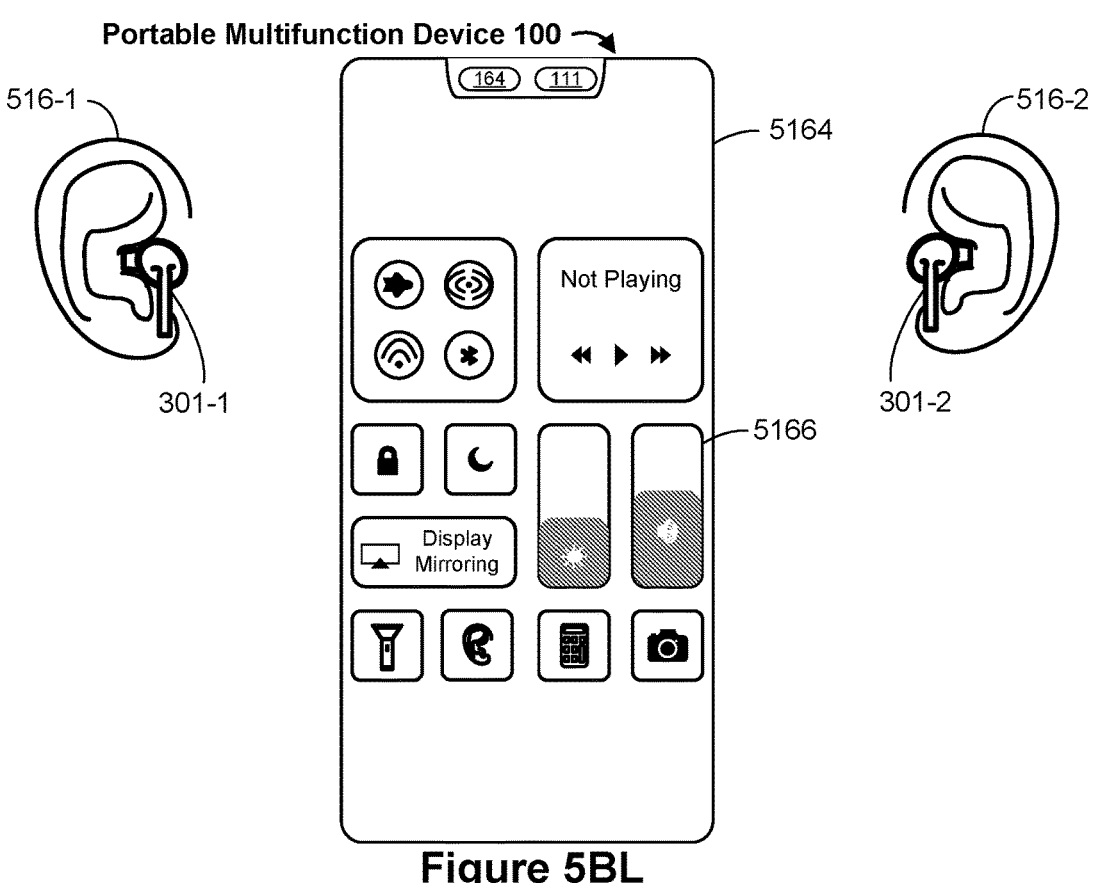
Figure 5B:
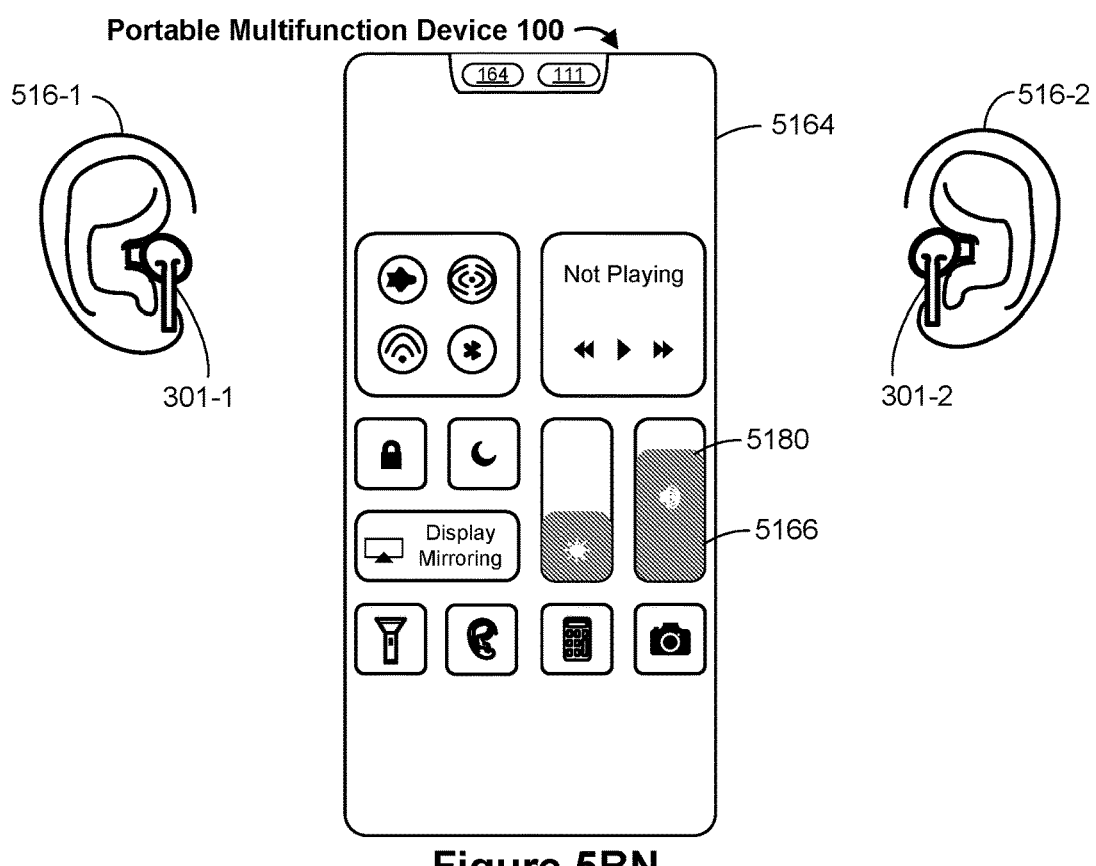
Figure 5B:
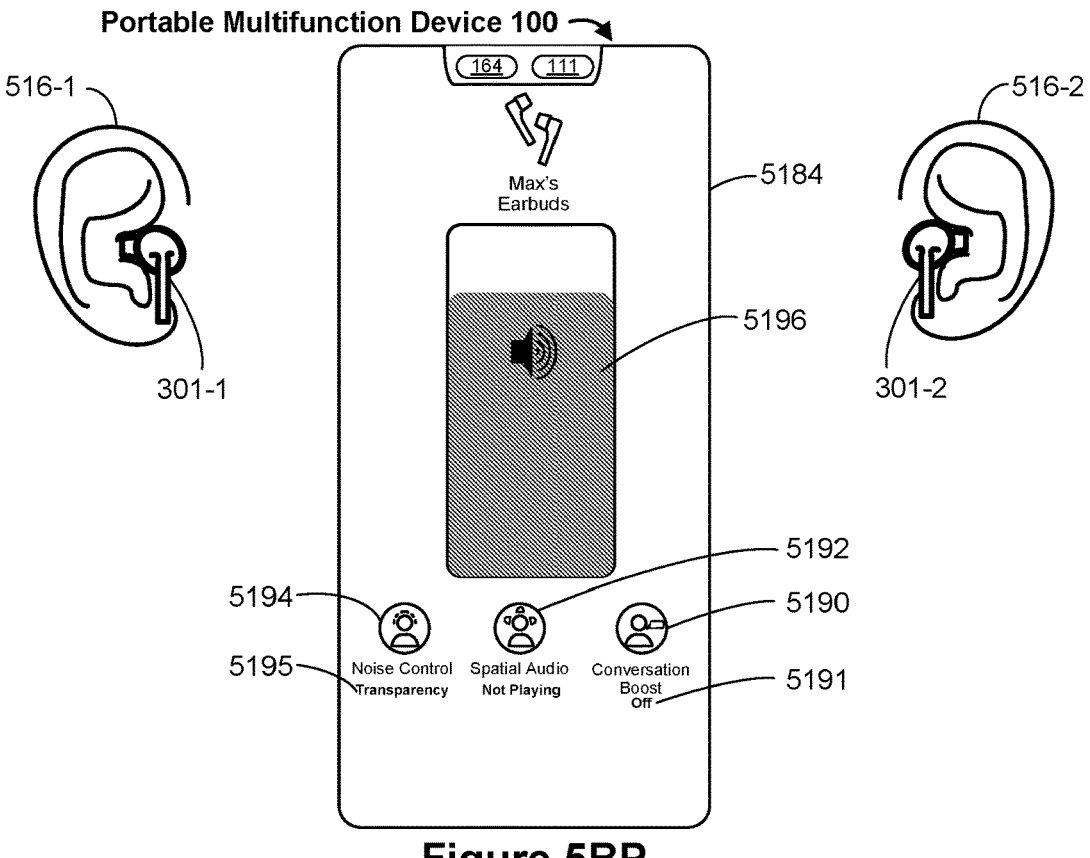
Figure 5B:
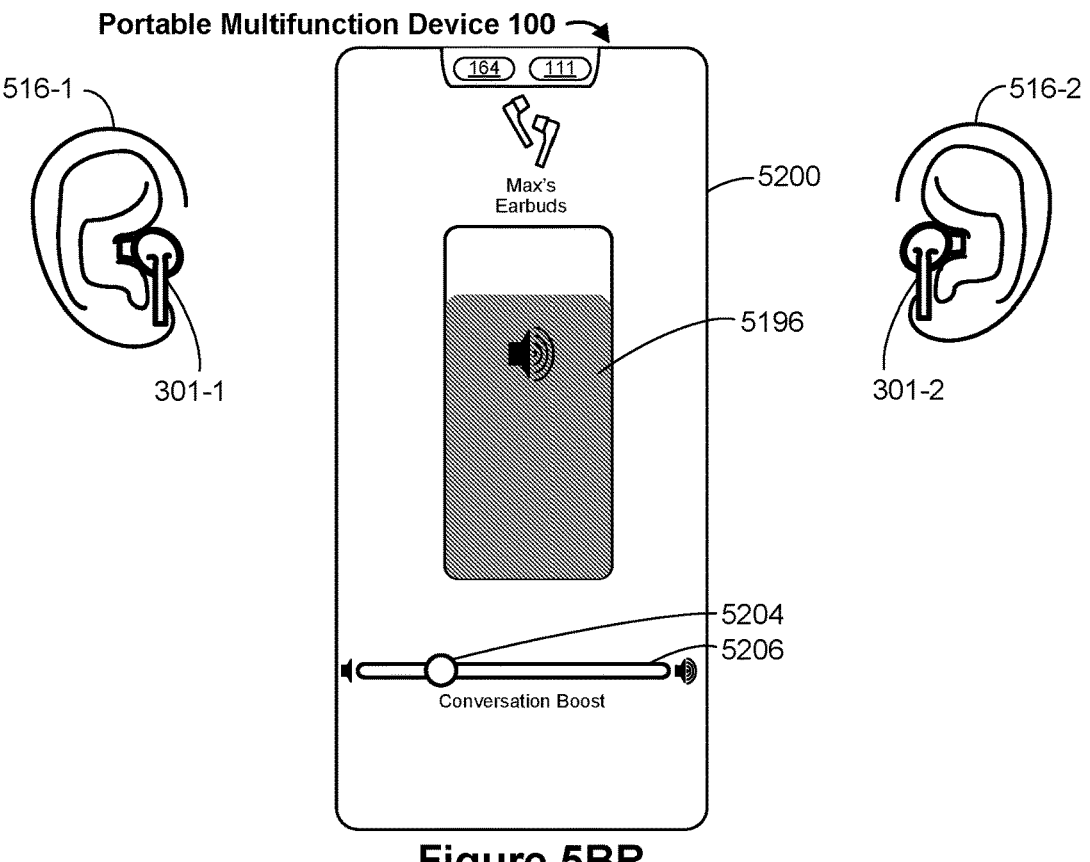
Figure 5B:
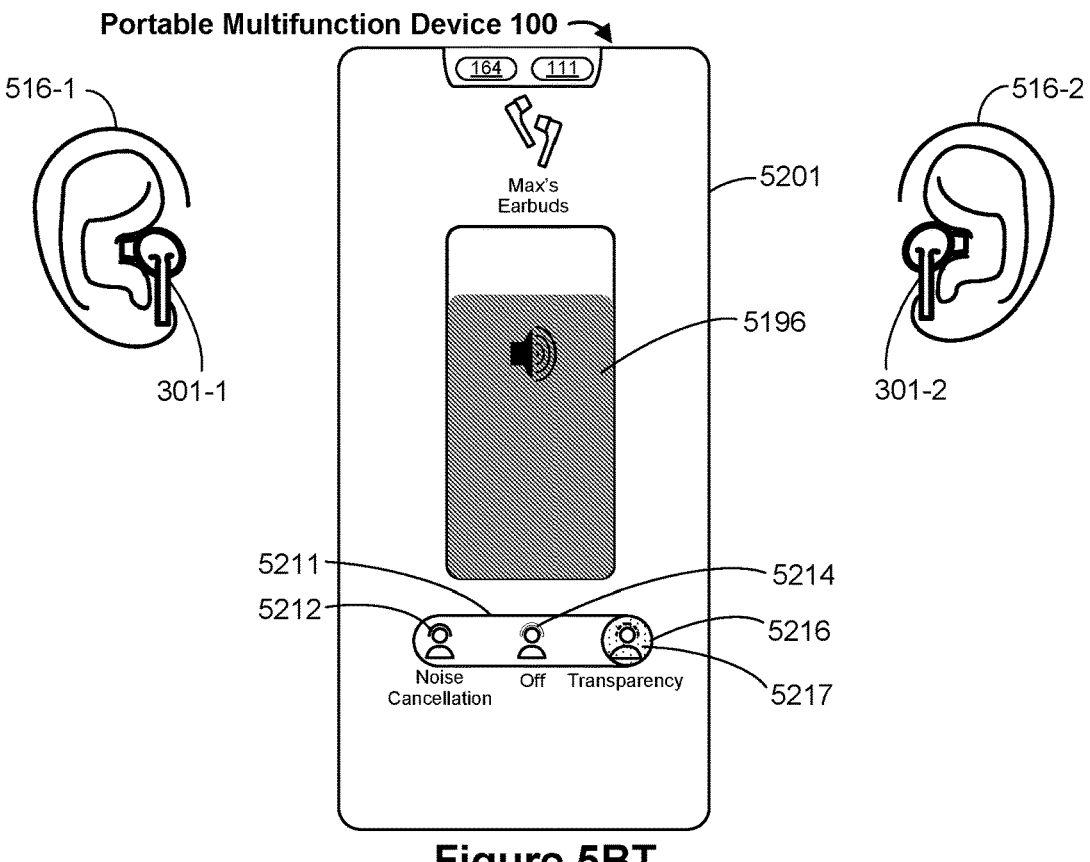
Figure 5B:
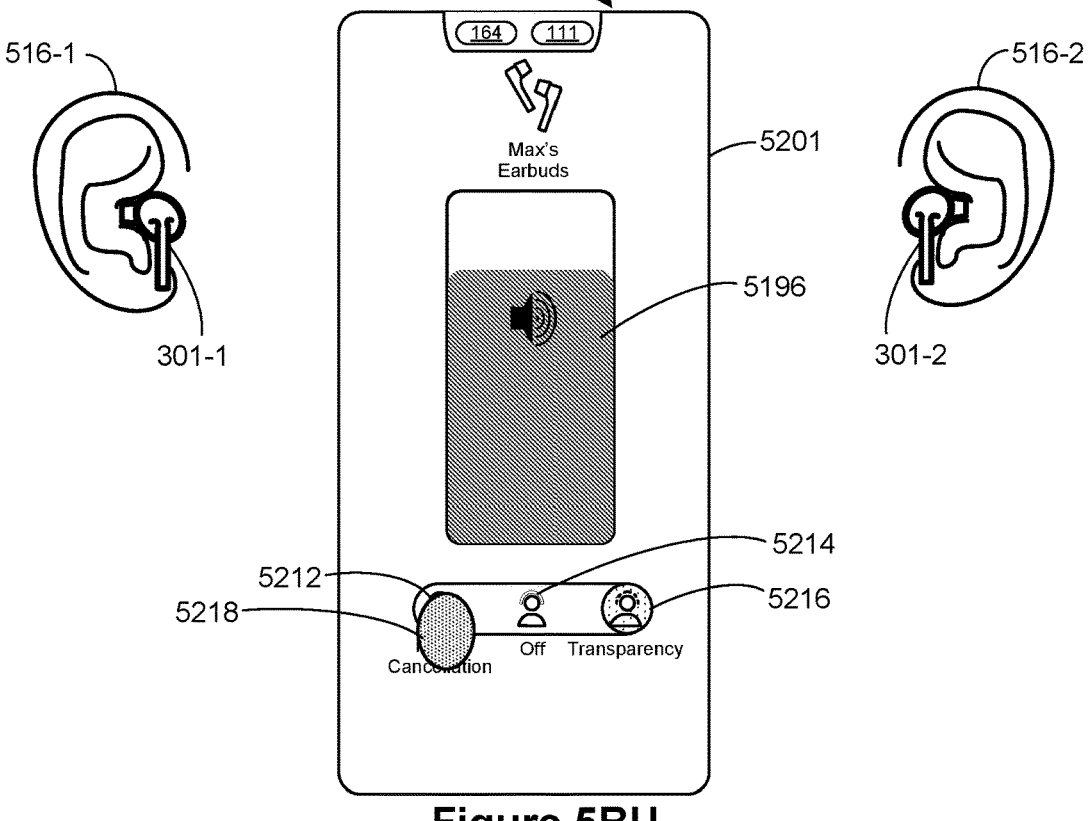
Figure 5B:
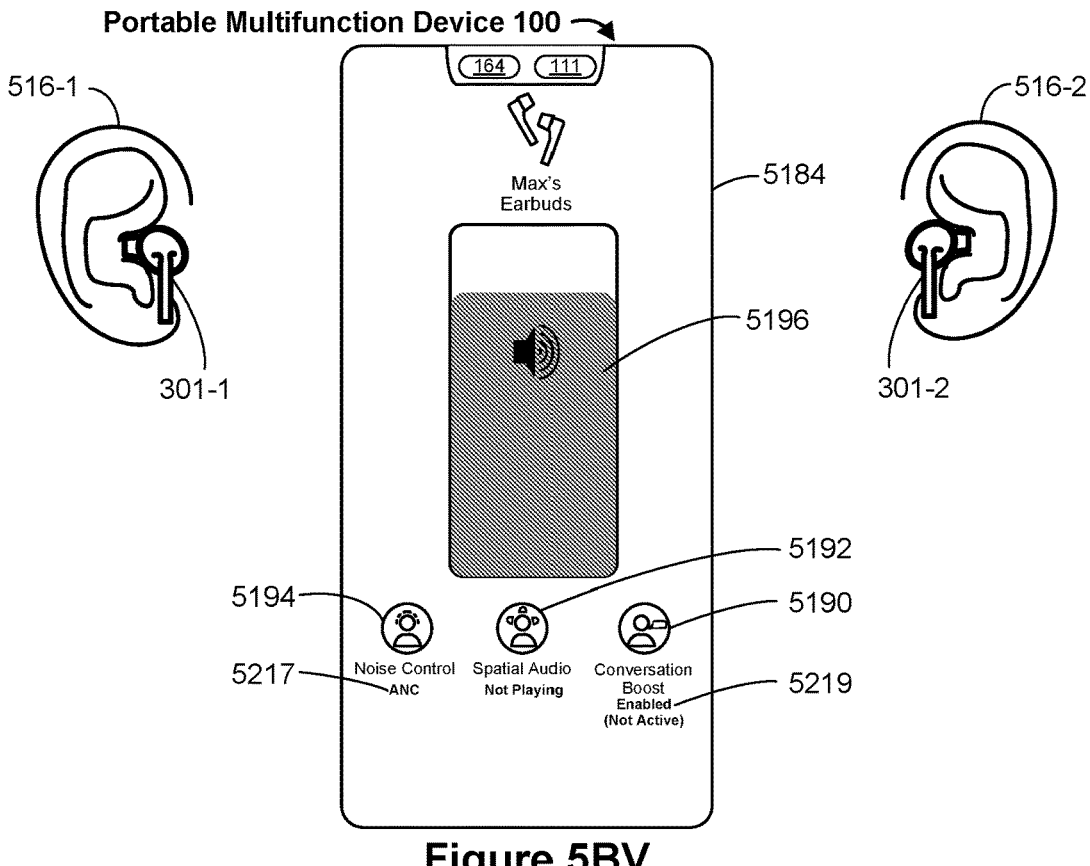
Figure 5B:
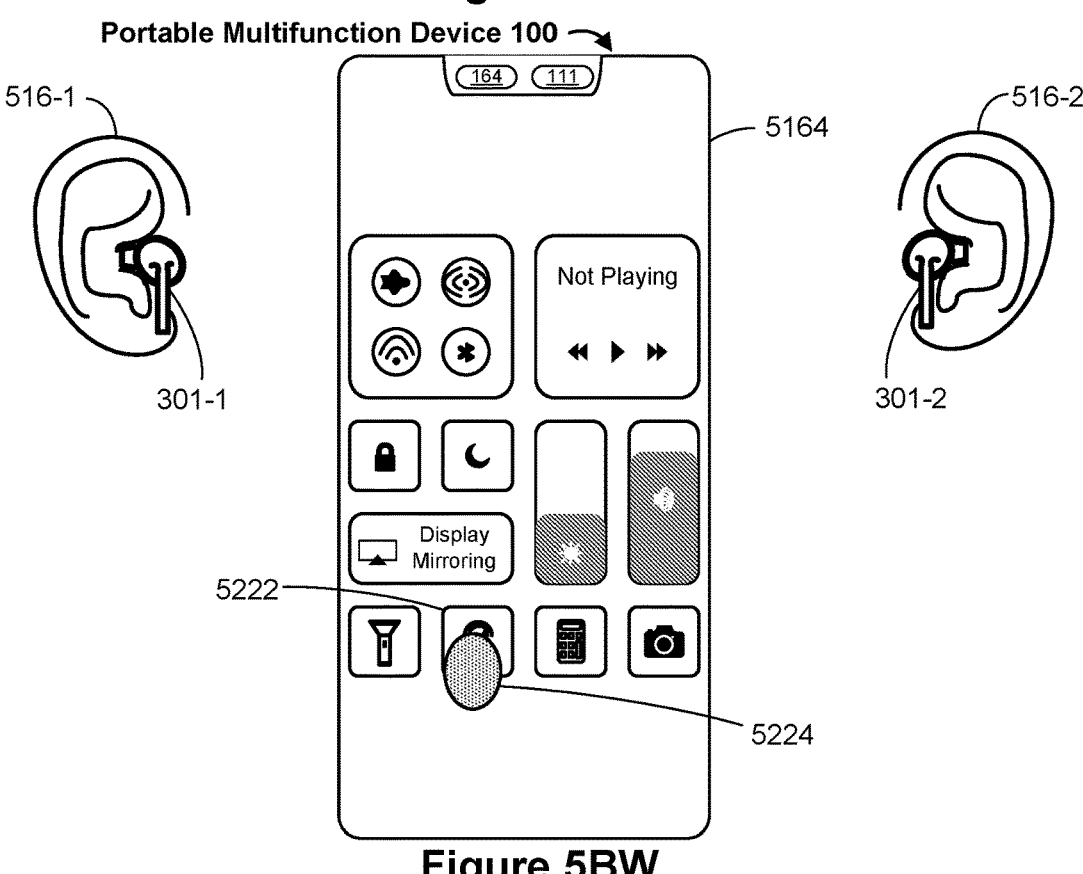
Figure 5B:
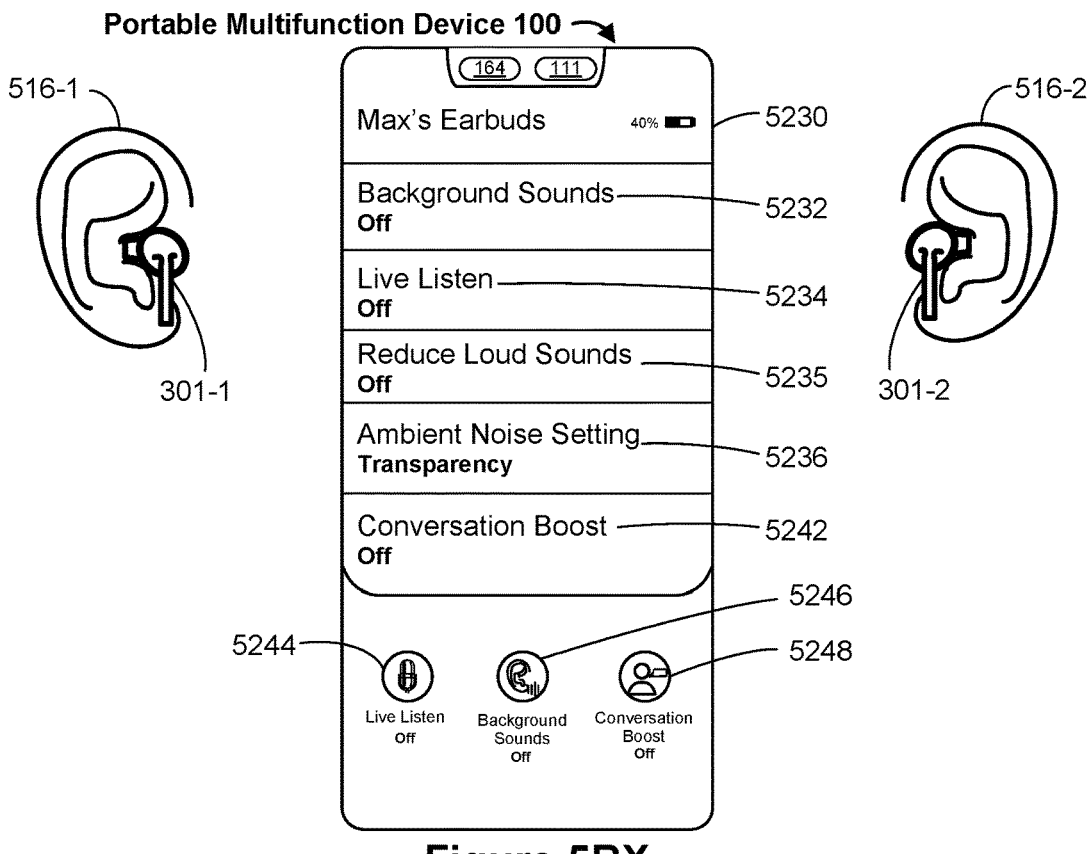
Figure 5B:
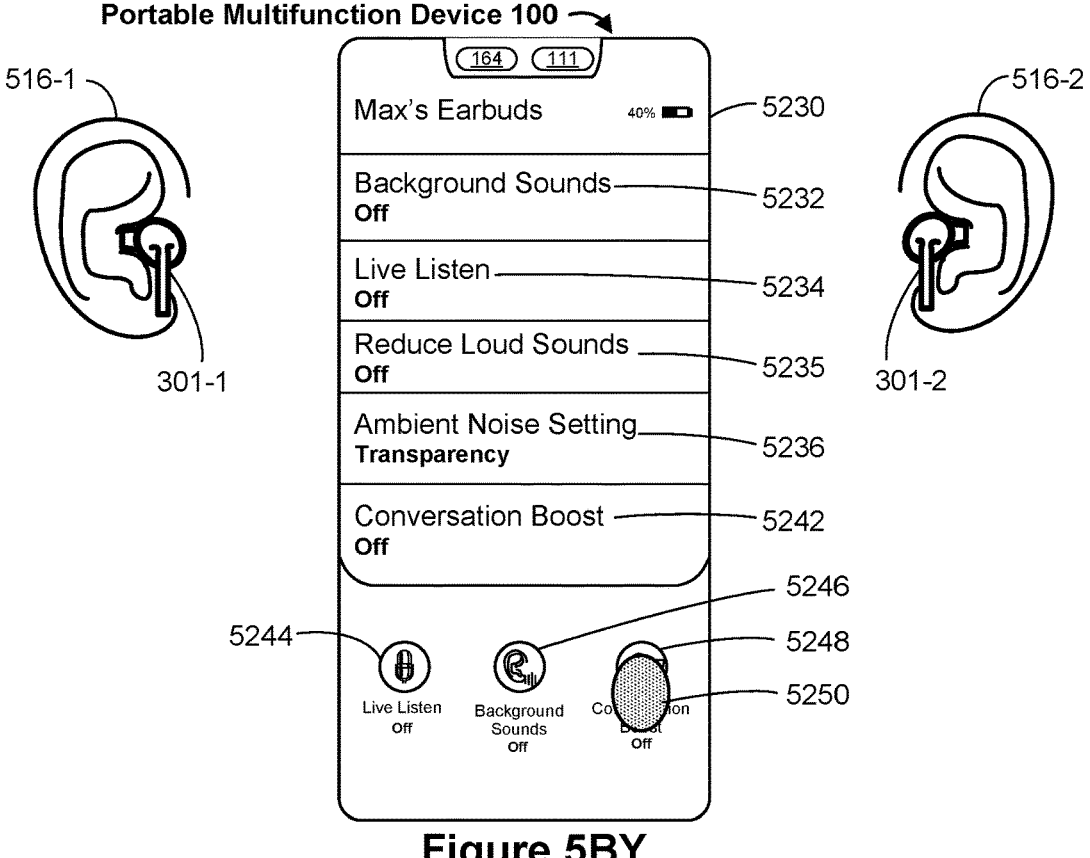
Figure 5B:
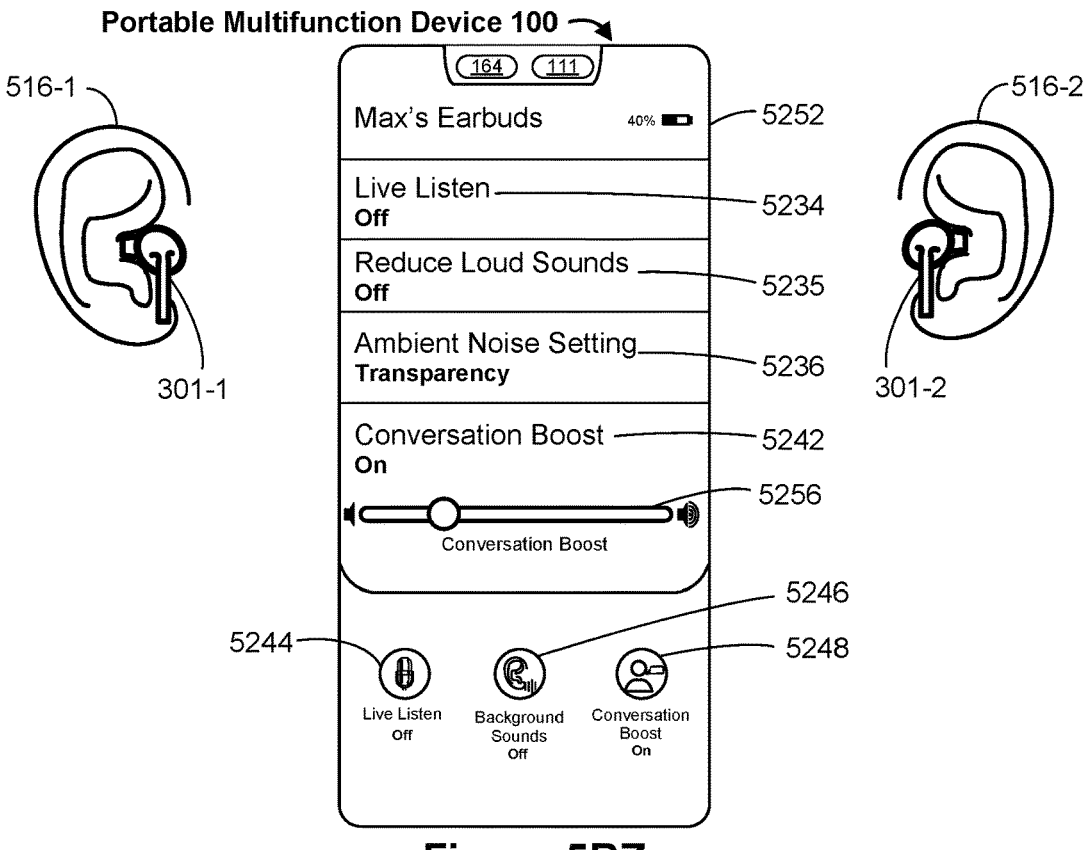
Figure 5C:
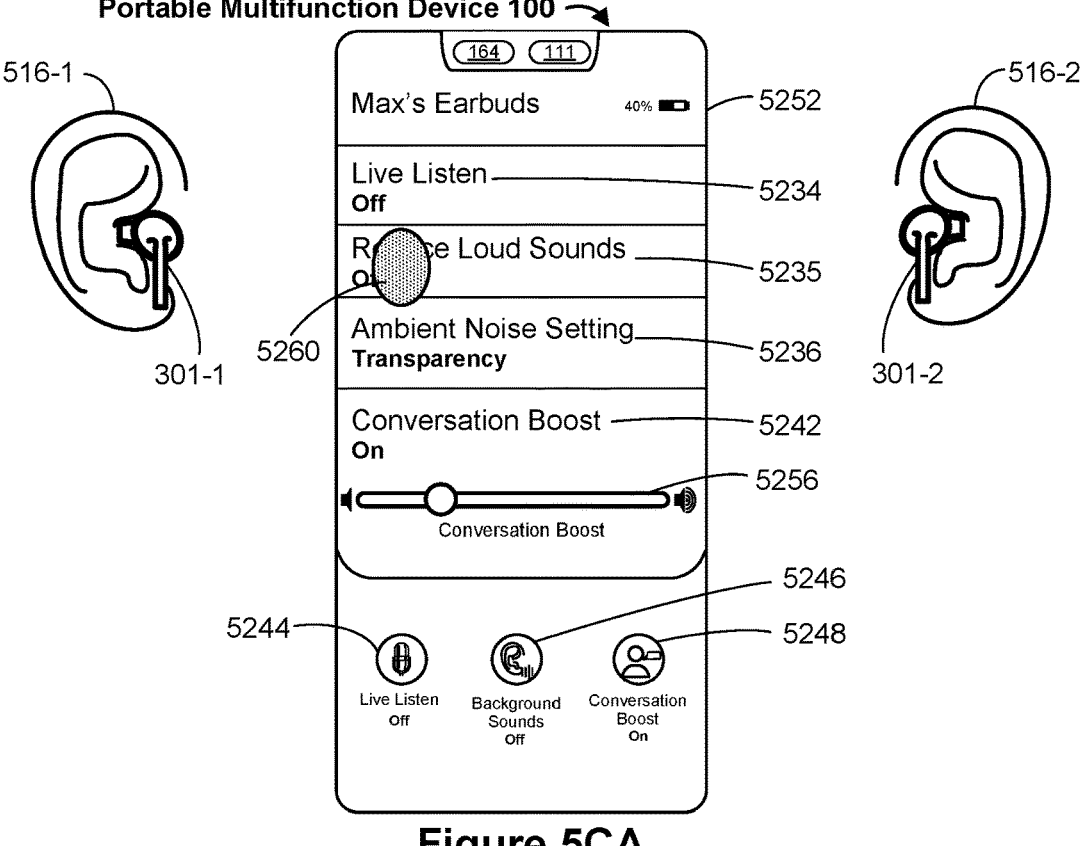
Figure 5C:
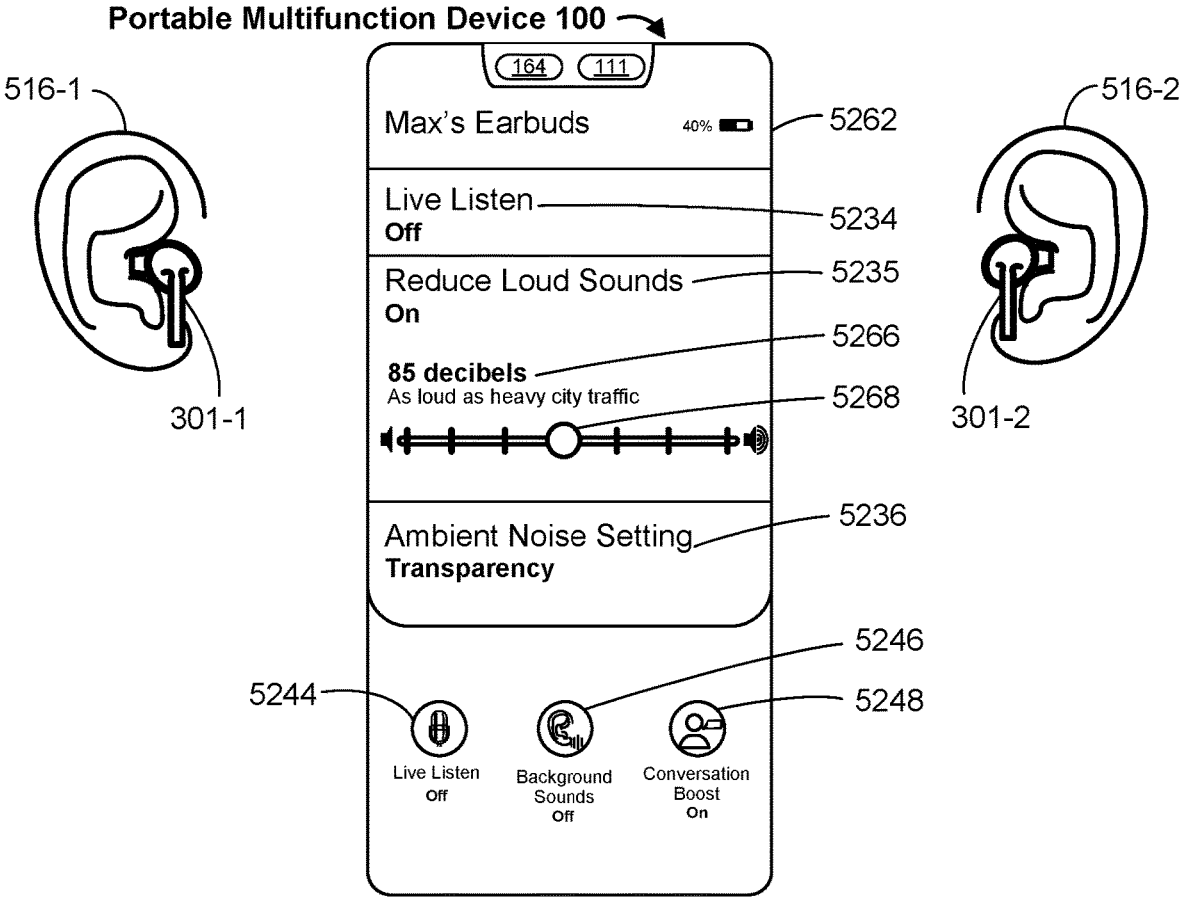

FIG. 5Z shows wireless accessory case 480 and associated wearable audio output device 301-1 within a threshold distance of device 100. Wireless accessory case 480 is open (e.g., lid 367 is up) in FIG. 5Z and one wearable audio output device 301 (wearable audio output device 301-1) is inserted in case 480.

FIG. 5AA illustrates a transition from FIG. 5Z in response to an occurrence of a condition associated with wireless accessory case 480 (e.g., a closure of lid 367). In response to closure of lid 367, audio feedback 587 is provided via speaker(s) 345 indicating to the user that only one wearable audio output devices 301 is inside case 480 and user interface 590 is presented on device 100 (e.g., optionally displayed over a portion of another user interface, such as user interface 570 (see FIG. 5X)). In some embodiments, audio feedback 587 includes one or more tones and/or one or more spoken terms. In some embodiments, audio feedback 587 is different from audio feedback 585 (e.g., includes different tones, words, and/or frequencies) so that a user can distinguish between the conditions. User interface 590 includes a representation 592 of wireless accessory case 480, including a representation 594 of physical marking 574, and a representation 596 of wearable audio output device 301-1. User interface 576 further includes a notification 598 that case 480 includes only one wearable audio output devices 301.

FIG. 5AB shows wireless accessory case 480 and associated wearable audio output devices 301 within a threshold distance of device 100. Wireless accessory case 480 is closed (e.g., lid 367 is down) in FIG. 5AB and wearable audio output devices 301 are inserted in case 480. In the example of FIG. 5AB, wearable audio output devices 301 include physical markings 575 and wireless accessory case 480 includes physical marking 574.

FIG. 5AC illustrates a transition from FIG. 5AB in response to an occurrence of a condition associated with wireless accessory case 480 (e.g., an opening of lid 367). In response to opening lid 367, audio feedback 5001 is provided via speaker(s) 345 indicating to the user a charging status of wearable audio output devices 301 and user interface 5002 is presented on device 100 (e.g., optionally displayed over a portion of another user interface, such as user interface 570). In some embodiments, audio feedback 5001 includes one or more tones and/or one or more spoken terms. In some embodiments, audio feedback 5001 is different from at least one of audio feedback 585 and 587 (e.g., includes different tones, words, and/or frequencies) so that a user can distinguish between the conditions. User interface 5002 includes a representation 5012 of wireless accessory case 480, including a representation 5014 of physical marking 574, and a representation 5006 of wearable audio output devices 301, including representations 5008 of physical markings 575. User interface 5002 further includes an indication 5004 of the charging status of wearable audio output devices 301. In the example shown in FIG. 5AC, wearable audio output devices 301 are 40% charged. User interface 5002 also includes indication 5010 of the charging status of case 480. In the example shown in FIG. 5AC, case 480 is 10% charged.

FIG. 5AD illustrates a transition in response to an occurrence of a condition associated with wireless accessory case 480 (e.g., an opening of lid 367). In the example of FIG. 5AD, wireless accessory case 480 is empty (e.g., does not contain any wearable audio output devices). In response to opening lid 367, audio feedback 5018 is provided via speaker(s) 345 indicating to the user a charging status of wireless accessory case 480 (e.g., 15% charge). For example, when case 480 is opened while wearable audio output devices are inside, audio feedback indicating a charging status of the wearable audio output devices is provided. In this example, when case 480 is opened while empty (e.g., no wearable audio output devices are inside), audio feedback indicating a charging status of the case is provided. In some embodiments, audio feedback 5018 includes one or more tones and/or one or more spoken terms (e.g., recorded and/or simulated vocal outputs). In some embodiments, audio feedback 5018 is different from at least one of audio feedback 585, 587, and 5001 (e.g., includes different tones, words, and/or frequencies) so that a user can distinguish between the conditions.

FIG. 5AE illustrates a transition in response to an occurrence of a condition associated with wireless accessory case 480 (e.g., insertion of wearable audio output device 301-1).

In response to insertion of wearable audio output device 301-1, audio feedback 5020 is provided via speaker(s) 345 indicating to the user that wearable audio output device 301-1 has been inserted properly (e.g., has been electrically coupled to wireless accessory case 480). In some embodiments, audio feedback 5020 includes one or more tones and/or one or more spoken terms. In some embodiments, audio feedback 5020 is different from at least one of audio feedback 585, 587, 5001, and 5018 (e.g., includes different tones, words, and/or frequencies) so that a user can distinguish between the conditions.

FIG. 5AF shows wireless accessory case 480 including speaker(s) 345 (e.g., and associated apertures), input device 346, and a physical marking 574. FIG. 5AF further shows a user input 5024 (e.g., a tap or press input) at input device 346. FIG. 5AG illustrates a transition from FIG. 5AF in response to detection of user input 5024. In response to detecting user input 5024, audio feedback 5026 is provided via speaker(s) 345 indicating to the user that wireless accessory case 480 (and optionally wearable audio output devices inserted within case 480) is pairing with an electronic device (e.g., device 100).

FIG. 5AG further illustrates audio feedback 5028 being provided via speaker(s) 345 indicating to the user that wireless accessory case 480 (and optionally wearable audio output devices inserted within case 480) has completed pairing with the electronic device (e.g., in response to a user activation of button 507 in FIG. 5B). In some embodiments, audio feedback 5026 and/or 5028 includes one or more tones and/or one or more spoken terms. In some embodiments, audio feedback 5028 is different from 5026 (e.g., includes different tones, words, and/or frequencies) so that a user can distinguish between the conditions.

FIG. 5AH illustrates audio feedback 5029 being provided via speaker(s) 345 indicating to the user that wireless accessory case 480 has failed to pair with the electronic device (e.g., due to a device mismatch, permission setting, and/or connection issue). In some embodiments, audio feedback 5029 includes one or more tones and/or one or more spoken terms. In some embodiments, audio feedback 5029 is different from at least one of audio feedback 5026 and 5028 (e.g., includes different tones, words, and/or frequencies) so that a user can distinguish between the conditions.

FIG. 5AI shows wireless accessory case 480 including speaker(s) 345 (e.g., and associated apertures), input device 346, and a physical marking 574. FIG. 5AI further shows a user input 5030 (e.g., a long and/or deep press input) at input device 346. In some embodiments, user input 5024 in FIG. 5AF is a first type of input and user input 5030 is a second type of input, different from the first type. FIG. 5AI further illustrates a transition from FIG. 5AF in response to detection of user input 5030 (e.g., initiation of a factory reset). In response to detecting user input 5030, audio feedback 5032 is provided via speaker(s) 345 indicating to the user that wireless accessory case 480 (and optionally wearable audio output devices inserted within case 480) is initiating a factory reset. In some embodiments, wireless accessory case 480 provides additional audio feedback (e.g., distinct from audio feedback 5032) in accordance with completion of the factory reset.

FIG. 5AJ illustrates a device 100 and a wireless accessory case 480 in accordance with some embodiments. Device 100 shows a user interface 5035, e.g., displayed subsequent to user interface 400 in FIG. 5A, and in some embodiments in response to activation of an accessory locate user interface element (e.g., an icon or button). User interface 5035 corresponds to wireless accessory case 480 and includes label 5036 ("Max's charging case") and a button 5038 that, when activated by a user, causes a sound to be output at wireless accessory case 480.

FIG. 5AK illustrates a user input 5040 detected at button 5038 and a corresponding audio output 5042 at wireless accessory case 480. In some embodiments, wireless accessory case 480 provides audio output 5042 via speaker(s) 345 in response to user input 5040 being detected at a location that corresponds to button 5038. In some embodiments, audio output 5042 includes one or more tones and/or one or more spoken terms. In some embodiments, wireless accessory case 480 produces audio output 5042 multiple times. For example, activation of button 5038 toggles on audio output 5042, which repeats until a user activates button 5038 again (or the user activates another affordance to disable audio output 5042, or another predefined user input, such as button press or case lid movement, is detected at the wireless accessory case 480). In some embodiments, wireless accessory case 480 produces audio output 5042 a preset number of times (e.g., 5, 10, or 20) in response to activation of button 5038.

FIG. 5AL shows wireless accessory case 480 with wearable audio output devices 5046 and 5050 inserted inside. Wireless accessory case 480 in FIG. 5AL includes speaker(s) 345 (e.g., and associated apertures), input device 346, and physical marking 574. Wearable audio output device 5046 includes a physical marking 5048 (e.g., the same or similar to physical marking 574) and wearable audio output device 5050 includes a physical marking 5052 that is different from physical marking 5048. Wireless accessory case 480 is open (e.g., lid 367 is up) in FIG. 5AL.

FIG. 5AM illustrates a transition from FIG. 5AL in response to an occurrence of a condition associated with wireless accessory case 480 (e.g., a closure of lid 367). In response to closure of lid 367, one or more warning alerts are produced, for example audio feedback 5054 is provided via speaker(s) 345 indicating to the user that wearable audio output devices 301 are mismatched, and/or user interface 5056 is presented on device 100 (e.g., optionally displayed over a portion of another user interface, such as user interface 570). In some embodiments, audio feedback 5054 includes one or more tones and/or one or more spoken terms. In some embodiments, audio feedback 5054 includes information about the type of mismatch (e.g., different owners and/or different versions) and/or information about which wearable audio output device is different. User interface 5056 includes a representation 5058 of the wireless accessory case 480, including a representation 5060 of physical marking 574, a representation 5062 of wearable audio output device 5050, including a representation 5064 of physical marking 5052, and a representation 5063 of wearable audio output device 5046 including a representation 5065 of physical marking 5048. User interface 5056 also includes a notification 5057 that wearable audio output device 5050 has a different owner than wearable audio output device 5046 and/or wireless accessory case 480 (e.g., as indicated by physical marking 5052). In some embodiments, the owner of a device is based on an account to which the device is linked or associated (e.g., devices linked to a same account are considered to have a same owner). In some embodiments, the owner of the device is based on an identity of a person who purchased the device.

FIGS. 5AN and 5AO are similar to FIGS. 5AL and 5AM except that wearable audio output devices 5046 and 5050 in FIGS. 5AN and 5AO do not include physical markings (e.g., do not include physical markings 5048 and 5052) to distinguish them from each other. In some embodiments, wearable audio output devices 5046 and 5050 do not include personalized physical markings (e.g., markings set, selected, and/or accepted by the user). In some embodiments, user interface 5056 includes an indication 5086 of which wearable audio output device is associated with an owner that is different than wireless accessory case 480. In some embodiments, notification 5057 indicates which wearable audio output device is associated with an owner that is different than wireless accessory case 480.

FIG. 5AP shows wireless accessory case 480 with wearable audio output devices 5046 and 5070 inserted inside. Wireless accessory case 480 in FIG. 5AP includes speaker(s) 345 (e.g., and associated apertures), input device 346, and physical marking 574. Wearable audio output device 5046 includes a physical marking 5048 (e.g., the same or similar to physical marking 574) and wearable audio output device 5070 includes a physical marking 5072 (e.g., the same as physical marking 5048). Wireless accessory case 480 is open (e.g., lid 367 is up) in FIG. 5AP.

FIG. 5AQ illustrates a transition from FIG. 5AP in response to an occurrence of a condition associated with wireless accessory case 480 (e.g., a closure of lid 367). In response to closure of lid 367, audio feedback 5074 is provided via speaker(s) 345 indicating to the user that wearable audio output devices 301 are mismatched, and user interface 5076 is presented on device 100 (e.g., optionally displayed over a portion of another user interface, such as user interface 570). In some embodiments, audio feedback 5074 includes one or more tones and/or one or more spoken terms. In some embodiments, audio feedback 5074 includes information about the type of mismatch (e.g., different owners and/or different versions) and/or information about which wearable audio output device is different. User interface 5076 includes a representation 5078 of wireless accessory case 480, including a representation 5080 of physical marking 574, a representation 5082 of wearable audio output device 5070, including a representation 5084 of physical marking 5072, and a representation 5083 of wearable audio output device 5046 including a representation 5085 of physical marking 5048. User interface 5056 also includes a notification 5077 that wearable audio output device 5070 has a different version (e.g., a different hardware and/or software version) than wearable audio output device 5046 and/or wireless accessory case 480. In some embodiments, user interface 5056 includes an indication 5087 of the version associated with one or both of the wearable audio output devices 5046 and 5070 in the wireless accessory case 480. In some embodiments, a wearable audio output device having a different version is due to the wearable audio output device being a different generation of device.

FIG. 5AR illustrates a device 100 and a wireless accessory case 480 in accordance with some embodiments. Device 100 shows a user interface 5090, e.g., displayed subsequent to user interface 400 in FIG. 5A, and in some embodiments in response to activation of an accessory user interface element (e.g., an icon or button). User interface 5090 corresponds to wireless accessory case 480 (labeled as "Max's charging case") and includes a volume control element 5091 that, when interacted with by a user, adjusts a volume of the audio output of speaker(s) 345. Wireless accessory device 480 is within a threshold communication distance of device 100 and has a volume level indicated by volume level 5094 in FIG. 5AR, where volume level 5094 corresponds to volume level indicator 5092 in user interface 5090. FIG. 5AS illustrates a user input 5095 detected at volume control element 5091. Input 5095 is a swipe gesture as indicated by the downward arrow in FIG. 5AS.

FIG. 5AT illustrates a transition from FIG. 5AR in response to input 5095. In response to input 5095 (e.g., and in accordance with a determination that input 5095 is a swipe gesture moving in a direction toward a lower volume (e.g., a downward swipe)), wireless accessory case 480 adjusts a volume of audio output to volume level 5097 (e.g., a lower volume level than volume level 5094), which corresponds to volume level indicator 5096 in user interface 5090. FIG. 5AU illustrates a user input 5098 detected at volume control element 5091. In some embodiments, input 5098 is a tap or press input.

FIG. 5AV illustrates a transition from FIG. 5AT in response to input 5098. In response to input 5098 (e.g., and in accordance with a determination that input 5098 is a tap gesture at a location that corresponds to zero volume level on volume control element 5091), wireless accessory case 480 disables audio output of speaker(s) 345 as indicated by volume indicator 5100, which corresponds to volume level indicator 5099 of user interface 5090. In some embodiments, input 5098 (e.g., a tap or press gesture) causes wireless accessory case 480 to toggle audio output of speaker(s) 345 (e.g., regardless of a location of input 5098 on volume control element 5091). In some embodiments, input 5098 is a press gesture and a volume level of wireless accessory case 480 is adjusted in accordance with a location and/or duration of the press gesture.

FIG. 5AW illustrates device 100 including volume buttons 5104 (e.g., volume-up button 5104-1 and volume-down button 5104-2) and ringer switch 5102. FIG. 5AW also shows wireless accessory device 480 within a threshold communication distance of device 100. FIG. 5AW further shows an indicator 5106 of a ringer status of device 100 and an indicator 5108 of a volume level of wireless accessory device 480.

FIG. 5AX illustrates a transition from FIG. 5AW. In particular, FIG. 5AX shows device 100 and a user's hand providing an input 5110 at volume-down button 5104-2 (e.g., to disable a ringer of device 100). Although FIG. 5AX shows input 5110 provided at volume-down button 5104-2, input 5110 could similarly be provided at ringer switch 5102 (e.g., to toggle a state of the ringer between enabled and disabled).

FIG. 5AY illustrates a transition from FIG. 5AX. In particular, FIG. 5AY illustrates that, in response to input 5110 at volume-down button 5104-2, the ringer for device 100 is disabled (e.g., device 100 is set to a silent state) as illustrated by ringer status indicator 5112. FIG. 5AY further shows audio output of wireless accessory case 480 disabled (e.g., volume level of speaker(s) 345 set to zero) as indicated by volume indicator 5114.

FIG. 5AZ illustrates a device 100 and a wireless accessory case 480 in accordance with some embodiments. Wireless accessory case 480 in FIG. 5AZ is beyond a communication threshold distance 5119 (e.g., is not in active communication with device 100) and has a non-zero volume level as indicated by volume level indicator 5108.

FIG. 5AZ illustrates settings user interface 5117, e.g., displayed over the entirety (or substantially all, e.g., greater than 95%, 96%, 97%, 98%, or 99%) of the user interface shown in FIG. 5A (e.g., in response to detecting a swipe gesture or activation of a button or icon). In some embodiments, user interface 400 of FIG. 5A is at least partially obscured or blurred behind settings user interface 5117 such that distinct features of user interface 400 of FIG. 5A are not discernible. Settings user interface 5117 includes a plurality of controls for various features of device 100. Notably, settings user interface 5117 includes a focus mode control 5118.

FIG. 5BA illustrates input 5120 (e.g., a press gesture that meets an intensity threshold that is above a nominal contact detection intensity threshold, or a long press gesture that is maintained on touch-sensitive display system 112 for at least a threshold amount of time) at focus mode control 5118.

FIG. 5BB illustrates a transition from FIG. 5BA. In particular, FIG. 5BB shows a focus mode user interface 5121, which is displayed (e.g., in place of, or overlaid with, user interface 5117) in response to input 5120. Focus mode user interface 5121 includes controls for two or more focus modes, for example a do-not-disturb control 5126, a personal control 5128, and a sleep control 5130. Do-not-disturb control 5126, when activated by a user, causes at least a subset of incoming calls and/or notifications at device 100 to be silenced. In some embodiments, the do-not-disturb controls are customizable by a user (e.g., the user is able to set which types of incoming calls and/or notifications are silenced). Personal control 5128, when activated by a user, causes at least a subset of incoming calls and/or notifications at device 100 to be silenced (e.g., the same or different subset as do-not-disturb control 5126). Sleep control 5130, when activated by a user, causes at least a subset of incoming calls and/or notifications at device 100 to be silenced (e.g., the same or different subset as do-not-disturb control 5126 and/or personal control 5128). For example, personal control 5128 sets notifications and ringer settings during a user's personal time and sleep control 5130 sets notifications and ringer settings during a user's sleep time.

FIG. 5BC illustrates input 5132 (e.g., a press gesture that meets an intensity threshold that is above a nominal contact detection intensity threshold, or a long press gesture that is maintained on touch-sensitive display system 112 for at least a threshold amount of time) at do-not-disturb control 5126.

FIG. 5BD illustrates a transition from FIG. 5BC. In particular, FIG. 5BD shows do-not-disturb mode enabled in response to input 5132 as illustrated by indicator 5136. FIG. 5BD further shows wireless accessory device 480 beyond threshold distance 5119 and having a non-zero volume level as indicated by volume level indicator 5108 (e.g., wireless accessory device 480 is not affected by the do-not-disturb mode being enabled at device 100).

FIG. 5BE illustrates a transition from FIG. 5BD. In particular, FIG. 5BE shows wireless accessory device 480 inside threshold distance 5119 and audio output of wireless accessory case 480 being disabled (e.g., volume level of speaker(s) 345 set to zero) as indicated by volume indicator 5138. In some embodiments, in accordance with moving inside threshold distance 5119, wireless accessory case 480 establishes a communicative connection with device 100. In some embodiments, after establishing a communicative connection, wireless accessory case 480 receives information regarding do-not-disturb mode being enabled at device 100 and disables audio output in response to the received information.

FIG. 5BF illustrates a transition from FIG. 5BE. In particular, FIG. 5BF shows wireless accessory device 480 beyond threshold distance 5119 and audio output of wireless accessory case 480 being disabled (e.g., volume level of speaker(s) 345 set to zero) as indicated by volume indicator 5138. In some embodiments, in accordance with moving beyond threshold distance 5119, wireless accessory case 480 maintains audio settings (e.g., does not adjust volume of audio output). In some embodiments, in accordance with moving beyond threshold distance 5119, wireless accessory case 480 maintains audio settings established while wireless accessory case 480 was in communication with device 100.

FIG. 5BG illustrates a transition from FIG. 5BE. In particular, FIG. 5BG shows wireless accessory device 480 beyond threshold distance 5119 and audio output of wireless accessory case 480 being enabled (e.g., volume level of speaker(s) 345 set to a non-zero value) as indicated by volume level indicator 5108. In some embodiments, in accordance with moving beyond threshold distance 5119, wireless accessory case 480 enables audio output (e.g., enables audio output at a volume level that was established prior to audio output being disabled). In some embodiments, wireless accessory case 480 enables audio output in accordance with a user setting (e.g., a user preference regarding whether to maintain silence settings when not in communication with an electronic device).

FIG. 5BH illustrates a transition from FIG. 5BC. In particular, FIG. 5BH shows do-not-disturb mode enabled in response to input 5132 as illustrated by indicator 5136. FIG. 5BH further shows wireless accessory device 480 and wearable audio output devices 5142 in communication with one another and beyond threshold distance 5119. FIG. 5BH also shows wireless accessory device 480 having a non-zero volume level as indicated by volume level indicator 5108 (e.g., wireless accessory device 480 is not affected by the do-not-disturb mode being enabled at device 100).

FIG. 5BI illustrates a transition from FIG. 5BH. In particular, FIG. 5BI shows wearable audio output devices 5142 inside threshold distance 5119 while in communication with wireless accessory case 480, which is beyond threshold distance 5119. FIG. 5BI further shows audio output of wireless accessory case 480 being disabled (e.g., volume level of speaker(s) 345 set to zero) as indicated by volume indicator 5150. In some embodiments, in accordance with wearable audio output devices 5142 moving inside threshold distance 5119, wearable audio output devices 5142 establish a communicative connection with device 100. In some embodiments, after establishing a communicative connection, wearable audio output devices 5142 receive information regarding do-not-disturb mode being enabled at device 100. In some embodiments, after receiving the information regarding the do-not-disturb mode, wearable audio output devices 5142 transmits the information regarding the do-not-disturb mode to wireless accessory case 480. In some embodiments, in response to wireless accessory case 480 receiving the information regarding the do-not-disturb mode being enabled at device 100, wireless accessory case 480 disables audio output. Thus, FIGS. 5AR-5BI illustrate various ways to adjust volume (e.g., increase volume, decrease volume, disable audio output, and/or enable audio output) of audio output at wireless accessory case 480.

FIGS. 5BJ-5CB illustrate example user interfaces and user interactions for adjusting the audio output of wearable audio output devices in accordance with some embodiments.

FIG. 5BJ illustrates example user interface 5158, which is similar to user interface 400 as shown in, and described with reference to, FIG. 4A, and also shown in FIG. 5A. Additionally, FIG. 5BJ shows swipe gesture 5160 beginning from an initial position in the upper right corner of touch-sensitive display system 112 and moving downward across touch-sensitive display system 112. FIG. 5BK illustrates that in response to a first portion of swipe gesture 5160 from the initial position in FIG. 5BJ to a second position in FIG. 5BK, device 100 displays a first portion of a settings user interface 5164 (sometimes also called a control panel user interface) over at least a portion of user interface 5158.

FIG. 5BL illustrates settings user interface 5164 displayed over the entirety (or substantially all, e.g., greater than 95%, 96%, 97%, 98%, or 99%) of user interface 5158 (e.g., in response to ceasing to detect swipe gesture 5160, optionally after further downward movement of swipe gesture 5160 across touch-sensitive display system 112). In some embodiments, settings user interface 5164 is displayed in response to a user activation of a settings icon (e.g., icon 446, shown in FIG. 4A). In some embodiments, user interface 5158 is at least partially obscured or blurred behind settings user interface 5164 such that distinct features of user interface 5158 are not discernible. Settings user interface 5164 includes a plurality of controls for various features of device 100. Notably, settings user interface 5164 includes volume control 5166. Upward and downward swipe inputs on volume control 5166 may be provided to increase or decrease, respectively, the volume of audio outputs from device 100 (e.g., via wearable audio output devices 301).

FIG. 5BM illustrates a user input 5168 detected at volume control 5166. Input 5168 is a swipe gesture as indicated by the upward arrow in FIG. 5BM. FIG. 5BN illustrates a transition from FIG. 5BM in response to input 5168. In response to input 5168 (e.g., and in accordance with a determination that input 5168 is a swipe gesture moving in a direction toward a higher volume (e.g., an upward swipe)), a volume of audio output at wearable audio output devices 301 is increased to volume level 5180. FIG. 5BO illustrates a user input 5182 (e.g., a different type of input from input 5168) detected at volume control 5166. In some embodiments, input 5182 is a tap, press, long press, and/or deep press input.

FIG. 5BP illustrates a transition from FIG. 5BO. In particular, FIG. 5BP shows an audio control user interface 5184, which is displayed (e.g., in place of, or overlaid with, user interface 5164) in response to input 5182. Audio control user interface 5184 includes volume control 5196, which is an enlarged version of volume control 5166 (FIG. 5BN), and which allows for finer (e.g., more granular) volume control. User interface 5164 also includes noise control 5194, spatial audio control 5192, and conversation boost control 5190. FIG. 5BP shows wearable audio output devices 301 operating with a spatial audio mode disabled and a conversation mode disabled, as indicated by indicator 5191. Additionally, as indicated by indicator 5195 in FIG. 5BP, wearable audio output devices 301 are operating in a transparency (e.g., active pass-through) audio output mode in which one or more pass-through audio components are output so that the user can hear a greater amount of ambient sound from the surrounding physical environment than would otherwise be perceivable to the user (e.g., as described herein with reference to FIG. 3F).

FIG. 5BQ illustrates a user input 5198 detected at conversation boost control 5190. In some embodiments, input 5198 is a tap, press, long press, and/or deep press input. FIG. 5BR illustrates a transition from FIG. 5BQ. In particular, FIG. 5BR shows audio control user interface 5200, in which display of noise control 5194, spatial audio control 5192, and conversation boost control 5190 is replaced with display of a conversation boost adjustment control 5206 and a boost level indicator 5204. In response to input 5198 (e.g., and in accordance with a determination that input 5198 is a tap or press gesture at conversation boost control 5190, or otherwise meets predefined input activation criteria), noise control 5194, spatial audio control 5192, and conversation boost control 5190 cease to be displayed and conversation boost adjustment control 5206 and boost level indicator 5204 are displayed. In some embodiments, conversation boost adjustment control 5206 and boost level indicator 5204 are displayed concurrently with noise control 5194 and/or spatial audio control 5192 in response to input 5198. In some embodiments, conversation boost adjustment control 5206, when adjusted by a user (e.g., by performing a drag gesture with respect to boost level indicator 5204), adjusts a boost level (e.g., an amplification) of conversation audio that is being picked up by one or more microphones of the wearable audio output devices (e.g., microphone(s) 302), conversation audio that is being picked up by one or more microphones of the electronic device (e.g., microphone 113), or conversation audio that is being picked up by one or more external microphones.

FIG. 5BS illustrates a user input 5210 detected at noise control 5194 in audio control user interface 5184. In some embodiments, input 5210 is a tap, press, long press, and/or deep press input. FIG. 5BS also illustrates that wearable audio output devices 301 are operating with conversation boost enabled as illustrated by indicator 5209 in user interface 5184. FIG. 5BT illustrates a transition from FIG. 5BS. In particular, FIG. 5BT shows audio control user interface 5201, in which display of noise control 5194, spatial audio control 5192, and conversation boost control 5190 is replaced with display of an expanded noise management control 5211, which includes representations of a plurality of available audio output modes (e.g., three available audio output modes) for wearable audio output devices 301, each of which is associated with a different audio output mode available for wearable audio output devices 301. In particular, expanded noise management control 5211 includes pass-through icon 5216, bypass icon 5214, and active noise control icon 5212. Active noise control icon 5212 represents an active noise control ("ANC") audio output mode in which one or more audio-cancelling audio components are output to at least partially cancel ambient sound from the surrounding physical environment that would otherwise be perceivable to the user. Bypass icon 5214 represents a bypass audio output mode in which neither audio-cancelling audio components nor pass-through audio components are provided (e.g., any amount of ambient sound that the user perceives is due to physical attenuation by the wearable audio output devices 301 (and any attached eartips) in the user's ears). Selection indicator 5217 displayed over pass-through icon 5216 (e.g., and not displayed over either bypass icon 5214 or active noise control icon 5212) indicates that the audio pass-through mode represented by pass-through icon 5216 is the mode in which wearable audio output devices 301 are currently operating. In response to input 5210 (e.g., and in accordance with a determination that input 5210, shown in FIG. 5BS, is a tap or press gesture at noise control 5194), noise control 5194, spatial audio control 5192, and conversation boost control 5190 cease to be displayed and expanded noise management control 5211 is displayed. In some embodiments, expanded noise management control 5211 is displayed concurrently with spatial audio control 5192 and/or conversation boost control 5190 in response to input 5210.

FIG. 5BU illustrates a user input 5218 detected at active noise control icon 5212 in audio control user interface 5201. In some embodiments, input 5218 is a tap, press, long press, and/or deep press input. FIG. 5BV illustrates a transition from FIG. 5BU. In particular, FIG. 5BV shows audio control user interface 5184, which is displayed in response to input 5218. In FIG. 5BV, noise control 5194 is set to ANC (e.g., in accordance with detection of user input 5218 at active noise control icon 5212). FIG. 5BV also shows spatial audio disabled as shown by spatial audio control 5192 and conversation boost mode enabled, but not active, as shown by conversation boost control 5190 and indicator 5219. In some embodiments, conversation boost mode is disabled while ANC is active. In some embodiments, conversation boost mode is only enabled while pass-through mode is enabled.

FIG. 5BW illustrates settings user interface 5164 including a hearing control 5222 and a user input 5224 detected at hearing control 5222. In some embodiments, input 5224 is a tap, press, long press, and/or deep press input. FIG. 5BX illustrates a transition from FIG. 5BW. In particular, FIG. 5BX shows a hearing user interface 5230, which includes a plurality of activatable control options for wearable audio output devices 301, such as the following, or a subset or superset thereof:

> background sounds control 5232 that, when activated, initiates a process for producing background sound at wearable audio output devices 301;
> live listen control 5234 that, when activated, initiates a process for providing audio data at wearable audio output devices 301, where the audio data is captured via a microphone at device 100;
> reduce loud sounds control 5235 that, when activated, initiates a process to reduce a volume of sounds that meet one or more criteria;
> ambient noise control 5236 for setting audio output modes available for wearable audio output devices 301 (e.g., active noise cancelation mode, bypass mode, and/or pass-through mode);
> conversation boost control 5242 that, when activated, initiates a process for adjusting audio output of wearable audio output devices 301 to boost conversation audio;
> live listen control 5244 for toggling live listen mode on and off;
> background sounds control 5246 for toggling background sounds mode on and off; and
> conversation boost control 5248 for toggling conversation boost mode on and off.

In the example of FIG. 5BX, wearable audio output devices 301 are operating in pass-through mode, as indicated by ambient noise control 5236. In some embodiments, selecting an option of the activatable control options in settings user interface 5164 assigns the selected type of operation to the operation of both wearable audio output devices 301.

FIG. 5BY illustrates a user input 5250 detected at conversation boost icon 5248. In some embodiments, input 5250 is a tap, press, long press, and/or deep press input. FIG. 5BZ illustrates a transition from FIG. 5BY. In particular, FIG. 5BZ shows hearing user interface 5252, in which background sounds control 5232 has ceased to be displayed, conversation boost mode is enabled as illustrated by conversation boost control 5242 and conversation boost icon 5248, and a conversation boost adjustment control 5256 is displayed. In response to input 5250 (e.g., and in accordance with a determination that input 5250 is a tap or press gesture at conversation boost icon 5248), background sounds control 5232 ceases to be displayed (e.g., to provide space to display conversation boost adjustment control 5256) and conversation boost adjustment control 5256 is displayed. In some embodiments, conversation boost adjustment control 5256 is displayed concurrently with background sounds control 5232 in response to input 5250 (e.g., a different control from hearing user interface 5230 ceases to be displayed and/or sizing/spacing of the controls is adjusted to concurrently display conversation boost adjustment control 5256 with the controls of user interface 5230).

FIG. 5CA illustrates a user input 5260 detected at reduce loud sounds control 5235. In some embodiments, input 5260 is a tap, press, long press, and/or deep press input. FIG. 5CB illustrates a transition from FIG. 5CA. In particular, FIG. 5CB shows hearing user interface 5262, in which conversation boost control 5242 (and conversation boost adjustment control 5256) has ceased to be displayed (e.g., but conversation boost mode is still enabled, as illustrated by conversation boost icon 5248), loud sound reduction mode is enabled as illustrated by reduce loud sounds control 5235, and a loud sound reduction adjustment control 5268 and associated information 5266 are displayed. In response to input 5260 (e.g., and in accordance with a determination that input 5260 is a tap or press gesture at reduce loud sounds control 5235), conversation boost control 5242 ceases to be displayed (e.g., to provide space to display loud sound reduction adjustment control 5268) and loud sound reduction adjustment control 5268 is displayed. In some embodiments, loud sound reduction adjustment control 5268, when adjusted by a user (e.g., by performing a drag gesture), adjusts a maximum audio output level (e.g., a maximum output decibel level) for wearable audio output devices 301. For example, while reduce loud sounds mode is enabled, wearable audio output devices 301 reduce any sounds that would otherwise be above the maximum audio output level.

FIGS. 6A-6C are flow diagrams illustrating method 600 of adjusting audio output of one or more wearable audio output devices in accordance with some embodiments. Method 600 is performed at a wearable audio output device (e.g., wearable audio output device 301, FIGS. 3B-3C) that includes a first portion (e.g., head portion 303) configured to be inserted in an ear of a user of the wearable audio output device and a second portion (e.g., stem portion 305) that extends from the first portion and includes one or more input device (e.g., input device(s) 308). In some embodiments, the first portion includes a speaker (e.g., speaker(s) 306) or other audio output device and optionally one or more elements to enable the speaker to be positioned in a respective physical arrangement relative to an ear of a person using the wearable audio output device. In some embodiments, the second portion includes a stem or other elongated portion extending from the first portion. In some embodiments, the wearable audio output device includes a housing with one or more physically distinguished portions. In some embodiments, the wearable audio output device includes one or more audio output devices (e.g., speaker(s) 306). In some embodiments, the wearable audio output device includes one or more placement sensors (e.g., sensor(s) 304). Some operations in method 600 are, optionally, combined and/or the order of some operations is, optionally, changed.

As described below, method 600 provides an improved interface for controlling audio outputs by changing an output volume of an audio output device, such as a wearable device, in response to a particular type of gesture. Providing additional control options for controlling audio outputs, such as changing the audio output mode, interacting with a digital assistant, or adjusting audio playback reduces power usage and improves battery life (e.g., by alleviating the need to power a display or power communication circuitry to communicate with a remote display) and allows for a user to not have to switch between multiple devices to interact with the audio output device (e.g., the user need not find/switch to other electronic devices (e.g., a smartphone or tablet) to control the audio outputs), as well as reducing the number of inputs needed for the user to control the audio outputs, and enhances the operability of the audio output device and makes the user-device interface more efficient (e.g., by helping the user to achieve an intended outcome and reducing user mistakes when operating/interacting with the audio output device), which, additionally, reduces power usage and improves battery life of the audio output device by enabling the user to use the audio output device more quickly and efficiently.

The wearable audio output device detects (602) an input via one or more input devices (e.g., input device(s) 308). In some embodiments, the one or more input devices include one or more capacitive sensors, one or more force sensors, one or more motion sensors, and/or one or more device orientation sensors.

In some embodiments, the one or more input devices include (604) a sequence of capacitive sensors arranged to detect user gestures. In some embodiments, the sequence of capacitive sensors are arranged in a column or row along a length of the second portion. In some circumstances, capacitive sensors consume less power and/or provide improved detection of user touch gestures than other types of sensors (e.g., force or pressure sensors).

In some embodiments, the wearable audio output device includes (606) a housing with one or more physically distinguished (e.g., indented, raised, and/or differently textured) portions (e.g., physically distinguished portion(s) 307, as shown in FIG. 3B) at a location corresponding to the sequence of capacitive sensors. In some embodiments, the one or more physically distinguished portions include a single groove that spans the sequence of capacitive sensors, a respective groove for each capacitive sensor, and/or other configuration of grooves spanning the location of the capacitive sensors. Providing a physically distinguished portion at a location corresponding to the capacitive sensors allows a user to locate and interact with the sensors quickly and efficiently (e.g., without requiring the user to visually locate the sensors), which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In response to detecting the input, in accordance with a determination that the input is a swipe gesture along a second portion of a wearable audio output device, the wearable audio output device adjusts (608) an output volume for the wearable audio output device based on movement of the swipe gesture along the second portion of the wearable audio output device. For example, FIGS. 5H-5I illustrate a swipe gesture along stem portion 305 and FIG. 5J illustrates a corresponding change in volume of audio output. In some embodiments, the swipe gesture includes movement of one or more fingers, or a pinch for stability and then a swipe to adjust, or another finger input. In some embodiments, the swipe gesture is a pinch-and-swipe gesture that includes two fingers concurrently in contact with the second portion of the wearable audio output device (e.g., the two fingers are a thumb and a second finger different from the thumb). For example, the user's thumb contacts the wearable audio output device to maintain stability while the user's second finger performs the swipe gesture (e.g., as illustrated in FIG. 5H). In some embodiments, the output volume for the wearable audio output device is adjusted in response to detecting the input and in accordance with determinations that (i) the input is a swipe gesture along the second portion of the wearable audio output device, and (ii)

the first portion of the wearable audio output device is inserted in an ear of the user (e.g., based on data from placement sensor(s) 304).

In some embodiments, the second portion is (610) a stem of the wearable audio output device (e.g., stem portion 305), and the swipe gesture includes movement of one or more fingers along a length of the stem (e.g., as illustrated in FIGS. 5H-5I and 5K-5L). Providing an elongated stem portion with sensors for detecting user inputs allows a user to locate and interact with the sensors quickly and efficiently (e.g., without requiring the user to visually locate the sensors), which enhances the operability of the device and makes the user-device interface more efficient.

In some embodiments, a first portion of the wearable audio output device includes (612) an audio output device configured to be inserted in the user's ear (e.g., speaker(s) 306) and one or more positioning elements (e.g., eartip 314, shown in FIG. 3F) configured to maintain the audio output device in the user's ear after insertion, and the second portion of the wearable audio output device is an elongated portion (e.g., stem portion 305) extending from the first portion. In some embodiments, the second portion extends in a downward direction while the first portion is inserted in a user's ear. In some embodiments, the second portion extends in front of (e.g., past) a user's earlobe while the first portion is inserted in the user's ear (e.g., as illustrated in FIG. 5G). Improving the fit of the wearable audio output devices via the positioning element(s) improves the seal between the wearable audio output devices and the user's ears, which enables audio to be played at a lower volume to produce the same effective audio volume perceived by the user (e.g., relative to when the wearable audio output devices are not properly fitted, in which case hearing some ambient noise may cause the user to increase the audio output volume), thereby further reducing power usage and improving battery life of the devices. In some situations, locating the sensor(s) in an elongated portion extending from the first portion improves the user-device interface by allowing a user to stabilize the device with a pinch gesture while performing input gestures and allowing a user to perform gestures away from the portion of the device that is inserted into the user's ear (e.g., to avoid interfering with the fit between the wearable audio output device and the user's ear).

In some embodiments, the wearable audio output device is (614) in communication with a second wearable audio output device (e.g., wearable audio output device 301-1 is in communication with wearable audio output device 301-2) to form a pair of wearable audio output devices, and adjusting the output volume for the wearable audio output device includes adjusting the output volume for both the wearable audio output device and the second wearable audio output device (e.g., as illustrated by respective output volume levels 518-1 and 518-2 in FIG. 5G and respective output volume levels 522-1 and 522-2 in FIG. 5J). Adjusting the output volume for both wearable audio output devices in response to a single gesture reduces the number of inputs needed, which enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the wearable audio output device detects (616) a second input via an input device of the second wearable audio output device, and, in response to detecting the second input, in accordance with a determination that the second input is a swipe gesture along a second portion of the second wearable audio output device, the wearable audio output device adjusts the output volume for both the wearable audio output device and the second wearable audio output device. For example, FIGS. 5H-5I illustrate a swipe gesture at wearable audio output device 301-2 and FIG. 5J illustrates a corresponding change in volume at each of wearable audio output devices 301-1 and 301-2. Additionally, FIGS. 5K-5L illustrate a swipe gesture at wearable audio output device 301-1 and FIG. 5M illustrates a corresponding change in volume at each of wearable audio output devices 301-1 and 301-2. Adjusting the output volume for both wearable audio output devices in response to a single gesture at either of the wearable audio output devices enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, in conjunction with adjusting the audio output volume for the wearable audio output device, the wearable audio output device provides (618) audio feedback (e.g., audio feedback 530) of volume adjustment to the user via an audio output device (e.g., speaker(s) 306) of the wearable audio output device. In some embodiments, the feedback is provided via a speaker in the first portion of the wearable audio output device, and/or in the second portion of the wearable audio output device. Providing audio feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, providing the audio feedback of volume adjustment includes (620) providing the audio feedback of volume adjustment at both the wearable audio output device and the second wearable audio output device (e.g., audio feedback 530-1 and 530-2). In some embodiments, the audio feedback corresponds to an increase or decrease in volume, and/or the volume reaching a maximum or minimum endpoint. Providing audio feedback to the user at each of the wearable audio output devices enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, in response to detecting the input, in accordance with a determination that the input is a non-swipe gesture, the wearable audio output device activates (622) a function of the wearable audio output device, where the function is distinct from adjusting the output volume. For example, FIG. 5O illustrates a non-swipe gesture and FIG. 5P illustrates a corresponding activation of a playback function. In some embodiments, the non-swipe gesture is a tap gesture, a double tap gesture, a squeeze gesture, or other finger input. In some embodiments, the input satisfies second gesture criteria, such as single squeeze gesture criteria that require that, after intensity applied by the input to the input device satisfies an intensity threshold (e.g., a predefined intensity threshold), the intensity applied by the input to the input device decreases below the intensity threshold (e.g., due to the input ceasing to remain in contact with the input device) within a threshold amount of time since the input intensity satisfied the intensity threshold, or, alternatively, since initial detection of the input via the input device. In some embodiments, the first wearable audio output device and the second wearable audio device have different behaviors. For example, the first wearable audio output device has a different set of assignments between type of input gesture and operation performed in response than the second wearable audio output device (e.g., a long squeeze gesture via the first wearable audio output device changes the audio output mode of the wearable audio output device, or both wearable audio output devices, while a different gesture, such as a short squeeze (e.g., single squeeze) gesture, via the second wearable audio output device changes the audio output mode of the second wearable audio output device, or both wearable audio output devices, and/or a long squeeze gesture via the second wearable audio output device performs a different operation, such as toggling playback of media content instead of changing audio output mode.

Detecting and being responsive in different ways to different types of gestures enhances operability of the device (e.g., provides flexibility without requiring a graphical user interface and/or cluttering the graphical user interface with additional displayed controls, as well as reducing the number of inputs needed to access this flexibility) and makes the user-device interface more efficient.

In some embodiments, the function of the wearable audio output device that is activated in response to detecting the input is (624) an audio playback function (e.g., a play, pause, or skip function). In some embodiments, the audio playback function toggles playback of a respective media audio component (e.g., that is independent of ambient sound from the physical environment, and that is based on media content from or obtained by the electronic device). For example, if the respective media audio component is being played when the audio playback function is activated, playing of the respective media audio component is paused; if the respective media audio component is paused when the audio playback function is activated, playing of the respective media audio component is resumed (e.g., as illustrated in FIG. 5P). In some embodiments, the media audio component is combined with one or more pass-through audio components (e.g., if the device is operating in a transparency mode) or one or more cancelation audio components (e.g., if the device is operating in a noise cancelation mode). In some embodiments, activation of the audio playback function skips any remaining portion of the respective media audio component and instead plays a different respective audio component (e.g., a second, next audio track from the electronic device). Adjusting audio playback functions in response to gestures at the wearable audio output device enhances operability of the device (e.g., provides flexibility without requiring a graphical user interface and/or cluttering the user interface with additional displayed controls, as well as reducing the number of inputs needed to access this flexibility) and makes the user-device interface more efficient.

In some embodiments, the function of the wearable audio output device that is activated in response to detecting the input is (626) an ambient noise adjustment function (e.g., adjusting active noise cancelation for ambient noise, transparency for ambient noise, and/or other ambient sound functions). For example, FIGS. 5Q-5R show a transparency mode being enabled in response to a user input at stem portion 305 of wearable audio output device 301-1. In some embodiments, when ambient sound from the physical environment is being actively passed through (e.g., the first ambient-sound audio level is non-zero), noise-cancelation is disabled (e.g., the audio-cancelling audio level is zero). In some embodiments, the ambient noise adjustment function activates a pass-through mode (or transparency mode or non-noise canceling mode) that allows the user to hear unaided audio (e.g., normal voices) from the user's environs. In some embodiments, when noise-cancelation is enabled (e.g., the audio-cancelling audio level is non-zero), no ambient sound from the physical environment is actively passed through (e.g., the first ambient-sound audio level is zero). In some embodiments, the ambient noise adjustment function activates an active noise control mode (ANC) and the wearable audio output device outputs one or more audio-cancelling audio components (e.g., one or more anti-phase audio signals, also called "audio-cancelation audio components") to at least partially cancel ambient sound from the surrounding physical environment that would otherwise be perceivable to the user. In some embodiments, an ambient sound waveform is detected by one or more microphones of the wearable audio output device, and an antiphase (or partially antiphase) audio signal waveform is produced by the wearable audio output device to at least partially cancel the ambient sound waveform.

Adjusting ambient noise control in response to gestures at the wearable audio output device enhances operability of the device (e.g., provides flexibility without requiring a graphical user interface and/or cluttering the user interface with additional displayed controls, as well as reducing the number of inputs needed to access this flexibility) and makes the user-device interface more efficient. Additionally, using different levels of pass-through audio components and cancellation audio components in different audio output modes provides the user with flexibility between different levels of audio immersion (via ambient audio cancellation) or audio transparency (via ambient audio pass-through) that can be achieved with a gesture, e.g., a gesture detected at an input device of one of the wearable audio output devices.

In some embodiments, the function of the wearable audio output device that is activated in response to detecting the input is (628) a digital assistant function (e.g., invoking, interacting with, or dismissing a digital assistant). In some embodiments, a digital assistant comprises functionality for performing operations on a device in response to user inputs (e.g., audio and/or textual inputs such as spoken or typed commands). In some embodiments, invoking the digital assistant causes the digital assistant to be responsive to user inputs (gestures, phrases, and/or commands). In some embodiments, dismissing (and/or disabling) the digital assistant causes the digital assistant to not be responsive to user inputs. In some embodiments, the function causes a digital assistant invocation command to be sent to a network connected device, e.g., device 100, and the network connected device invokes the digital assistant and provides corresponding audio to the wearable audio output device, e.g., via wireless communication.

Invoking, interacting with, and/or dismissing a digital assistant in response to gestures at the wearable audio output device enhances operability of the device (e.g., provides flexibility without requiring a graphical user interface and/or cluttering the user interface with additional displayed controls, as well as reducing the number of inputs needed to access this flexibility) and makes the user-device interface more efficient.

In some embodiments, the wearable audio output device provides (630), in conjunction with activating (622) the function of the wearable audio output device, audio feedback (e.g., audio feedback 540) of the activation of the function via the audio output device (e.g., in the first portion and/or second portion) and forgoes providing the audio feedback at the second wearable audio output device of the pair of wearable audio output devices. For example, FIG. 5R shows audio feedback 540 provided at wearable audio output device 301-1 and no audio feedback provided at wearable audio output device 301-2. Providing audio feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the wearable audio output device detects (632) a third input via the one or more input devices, and, in response to detecting the third input: (i) in accordance with a determination that the third input is a swipe gesture along the second portion of the wearable audio output device and a determination that the first portion of the wearable audio output device is inserted in an ear of the user, the wearable audio output device adjusts the output volume for the wearable audio output device; and (ii) in accordance with a determination that the third input is the swipe gesture along the second portion of the wearable audio output device and a determination that the first portion of the wearable audio output device is not inserted in an ear of the user, the wearable audio output device forgoes adjusting the output volume for the wearable audio output device. In some embodiments, wearable audio output devices 301 are configured to adjust volume levels in response to user swipe inputs only while wearable audio output devices 301 are inserted in an ear of a user (e.g., determined based on data from placement sensor(s) 304). Forgoing adjusting volume while the wearable audio output device is not inserted in an ear of the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the one or more input devices include (634) a first type of sensor (e.g., a touch sensor) and a second type of sensor (e.g., a force sensor), the input is detected via the first type of sensor, the device detects a fourth input via the second type of sensor, and, in response to detecting the fourth input, the wearable audio output device activates a function of the wearable audio output device that is distinct from adjusting the output volume (e.g., sensor types can include capacitive, force, motion (e.g., accelerometer), and orientation). In some embodiments, the one or more input devices include an input device that is pressure-sensitive (sometimes also called "intensity-sensitive"). For example, the input device responds to squeeze inputs (e.g., inputs where intensity (also called pressure) is applied to the input device when held and pinched between two fingers) that satisfy an intensity threshold, which in some embodiments is greater than a nominal contact detection intensity threshold that would be used for touch inputs. In some embodiments, the one or more input devices include an input device that is touch-sensitive (e.g., the input device responds to touch inputs, such as by a finger or stylus, that satisfy a nominal contact detection intensity threshold). Including multiple types of sensors in the device expands the number and/or type of gestures that can be detected at the device. Expanding the number and/or type of gestures that can be detected enhances operability of the device (e.g., provides flexibility without requiring a graphical user interface and/or cluttering the user interface with additional displayed controls, as well as reducing the number of inputs needed to access this flexibility) and makes the user-device interface more efficient.

In some embodiments, the wearable audio output device establishes (636) a connection (e.g., pairing the devices, or adding the wearable audio output device to a user account associated with the electronic device) between an electronic device and the wearable audio output device, and, after (e.g., in response to) establishing the connection, the electronic device causes a user interface (e.g., user interface 514-1 and/or 514-2) to be displayed, the user interface illustrating a simulated swipe gesture and corresponding output volume adjustment. For example, the user interface is displayed as part of a usage tutorial that is shown in conjunction with: pairing the wearable audio output device, adding the wearable audio output device to a user account (e.g., via a QR code), or activating the wearable audio output device for a first time while connected to the electronic device.

Displaying simulated gestures and corresponding functions and/or adjustments provides visual feedback to the user by indicating operation and states of the device. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

It should be understood that the particular order in which the operations in FIGS. 6A-6C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, and 900) are also applicable in an analogous manner to method 600 described above with respect to FIGS. 6A-6C. For example, the inputs, gestures, functions, and feedback described above with reference to method 600 optionally have one or more of the characteristics of the inputs, gestures, functions, and feedback described herein with reference to other methods described herein (e.g., methods 700, 800, and 900). For brevity, these details are not repeated here.

FIGS. 7A-7C are flow diagrams illustrating method 700 for displaying status information of an electronic accessory in accordance with some embodiments. Method 700 is performed at an electronic device (e.g., device 300, FIG. 3, or portable multifunction device 100, FIG. 1A) including, or in communication with, a display generation component and, optionally, a touch-sensitive surface. In some embodiments, the display generation component is a touch-screen display. In some embodiments, the display is separate from a touch-sensitive surface. Some operations in method 700 are, optionally, combined and/or the order of some operations is, optionally, changed.

As described below, method 700 provides an improved interface for presenting information about an electronic accessory (e.g., headphones or an earbud case) at an electronic device that is in communication with the electronic accessory in response to detecting an occurrence of a respective condition associated with the electronic accessory, which is presented with a representation of the electronic accessory that includes a representation of a physical marking on the electronic accessory. Providing the representation of the electronic accessory with the representation of the physical marking to the user enhances identification (e.g., distinguishing between multiple electronic accessories of a same type) and security (e.g., distinguishing between electronic accessories owned by the user and electronic accessories owned by other users) and makes the user-device interface more efficient (e.g., by helping the user to interact with the desired electronic accessory), which, additionally, reduces power usage and improves battery life of the devices by enabling the user to control the devices more quickly and efficiently.

The electronic device detects (702) occurrence of a respective condition associated with an electronic accessory (e.g., wireless accessory case 480), distinct from the electronic device, the electronic accessory in communication with the electronic device (e.g., wired or wireless communication). In some embodiments, the electronic device is a smartphone or tablet. In some embodiments, the electronic accessory is a set of headphones, a smartwatch, a findable electronic device, a stylus, or an earbud case.

In some embodiments, the occurrence of the respective condition includes (704) a wireless coupling event (e.g., pairing and/or handshaking) between the electronic device and the electronic accessory. For example, FIGS. 5A-5D illustrate a pairing event between device 100 and earbud set 503. In some embodiments, the wireless coupling event comprises detecting a pairing request from the electronic accessory. In some embodiments, the wireless coupling event comprises detecting a broadcast signal from the electronic accessory and/or sending a pairing request to the electronic accessory. In some embodiments, the wireless coupling event comprises completing a pairing process between the electronic device and the electronic accessory (e.g., establishing a communication channel between the electronic device and the electronic accessory and/or storing connection information to facilitate future connections with the electronic accessory). In some embodiments, the wireless coupling event comprises detecting the presence of a previously-paired electronic accessory. In some embodiments, the wireless coupling event comprises a disconnect and/or dissociation between the electronic device and the electronic accessory (e.g., in response to a "forget this device" command). Providing representation of an electronic accessory with a representation of a physical marking in response to a wireless coupling event provides improved security and privacy by distinguishing between multiple electronic accessories that would otherwise be indistinguishable, or more difficult to distinguish, in a user interface for the wireless coupling event, particularly in instances where the electronic accessories are associated with different users and/or user accounts.

In some embodiments, the occurrence of the respective condition includes (706) a proximity-based communication between the electronic device and the electronic accessory. For example, FIG. 5T illustrates a proximity-based communication between wireless accessory case 480-1 and device 100. In some embodiments, the occurrence of the respective conditions comprises the electronic device and the electronic accessory satisfying one or more proximity criteria (e.g., being close enough to wirelessly communicate with one another, and/or being within a predefined physical distance of one another). In some embodiments, the one or more proximity criteria comprise a one or more communication quality criteria (e.g., a signal strength and/or stability requirement). In some embodiments, the proximity-based communication comprises a wireless coupling communication (e.g., an advertising, pairing, and/or handshaking communication). Providing representation of an electronic accessory with a representation of a physical marking in response to a proximity-based communication provides improved security and privacy by distinguishing between multiple electronic accessories that would otherwise be indistinguishable, or more difficult to distinguish, in a user interface for the proximity-based communication, particularly in instances where the electronic accessories are associated with different users and/or user accounts.

In some embodiments, the occurrence of the respective condition includes (708) a status change event at the electronic accessory, and a user interface corresponding to the respective condition includes status information corresponding to the status change event. For example, FIG. 5D illustrates earbud set 503 communicatively connecting to device 100 and user interface 504-2 includes indication 512 of the connection. Providing representation of an electronic accessory with a representation of a physical marking in response to a status change event provides improved security and privacy by distinguishing between multiple electronic accessories that would otherwise be indistinguishable, or more difficult to distinguish, in a user interface for the status change event, particularly in instances where the electronic accessories are associated with different users and/or user accounts.

In some embodiments, the status change event includes (710) a change in an opened or closed state of the electronic accessory. For example, FIGS. 5X-5Y show lid 367 of wireless accessory case 480 closing and a corresponding user interface 576 displayed on device 100. In some embodiments, the electronic accessory is a charging case, and the status change event involves a user opening and/or closing the charging case. For example, in response to a user closing the charging case, the user interface shows the representation of the charging case and information about a current charge level of the charging case (e.g., as illustrated in FIG. 5AC). As another example, in response to a user opening the charging case, the user interface shows the representation of the charging case (e.g., representation 5012) and a representation of one or more accessories (e.g., representation 5006) within the charging case (e.g., with information about a current charge level of the one or more accessories within the charging case). Providing representation of an electronic accessory with a representation of a physical marking in response to a change in an opened or closed state of the electronic accessory provides improved security and privacy by distinguishing between multiple electronic accessories that would otherwise be indistinguishable, or more difficult to distinguish, in a user interface for the status change event and provides enhanced feedback about a state of the electronic accessory.

In some embodiments, the status change event includes (712) an electrical charging event at the electronic accessory (e.g., as illustrated in FIG. 5Y or FIG. 5AC). For example, the electrical charging event involves a user connecting the electronic accessory to a power source (e.g., an outlet, charging station, and/or charging case) and, in response, the user interface shows the representation of the electronic accessory and information indicating that it is currently charging (e.g., indication 5004, FIG. 5AC, of the charging status of wearable audio output devices 301). As another example, the electrical charging event involves a user disconnecting the electronic accessory from a power supply and, in response, the user interface shows the representation of the electronic accessory and information indicating a current charge level of the electronic accessory. Providing representation of an electronic accessory with a representation of a physical marking in response to an electrical charging event provides improved security and privacy by distinguishing between multiple electronic accessories that would otherwise be indistinguishable, or more difficult to distinguish, in a user interface for the electrical charging event and provides enhanced feedback about a state of the electronic accessory.

In some embodiments, the occurrence of the respective condition includes (714) an error event (e.g., a mismatch event as shown in FIG. 5AM), and a user interface corresponding to the respective condition includes error information corresponding to the error event (e.g., notification 5057). In some embodiments, the error event involves the electronic accessory failing to establish a connection (e.g., a Bluetooth and/or Wi-Fi connection) with the electronic device, and the error information includes information about the failure (e.g., and information about how to correct the failure). For example, the electronic accessory is a wearable audio output device, and the error event is a failure to pair with the electronic device. In this example, the error information includes instructions to reset the wearable audio output device. In some embodiments, the error event involves the electronic accessory failing to charge while connected to a power source, and the error information includes a notification of the failure (e.g., and information about how to correct the failure). In some embodiments, the error event involves a software error such as firmware, an operating system, and/or an application failing to execute. Providing representation of an electronic accessory with a representation of a physical marking in response to an error event provides improved security and privacy by distinguishing between multiple electronic accessories that would otherwise be indistinguishable, or more difficult to distinguish, in a user interface for the error event, particularly in instances where the electronic accessories are associated with different users and/or user accounts.

In response to detecting the occurrence of the respective condition, the electronic device causes (716) a user interface (e.g., user interface 5056) corresponding to the respective condition to be displayed via the display generation component (e.g., touch-sensitive display system 112), the user interface including a representation of the electronic accessory (e.g., representation 5058 of wireless accessory case 480).

Causing the user interface to be displayed includes (718): (i) in accordance with a determination that the electronic accessory includes a first physical marking (e.g., engraving, embossing, and/or printed, painted or otherwise applied markings), causing a representation of the first physical marking (e.g., representation 544-1 of physical marking 482-1) to be displayed in the user interface (e.g., without including a representation of another, second physical marking, that is included in a different electronic accessory); and (ii) in accordance with a determination that the electronic accessory includes a second physical marking that is different from the first physical marking, causing a representation of the second physical marking to be displayed in the user interface (e.g., representation 544-2 of physical marking 482-2), e.g., without including a representation of the first physical marking.

In some embodiments, the first physical marking is (720) specified or selected by a user while purchasing the electronic accessory (e.g., via user interface 550 shown in FIG. 5W). For example, the first physical marking is a personalized marking, a marking selected from a group of markings, or a marking suggested by a computer system, such as the electronic device, that the user accepts. Providing users with physical markings specified or selected by the user provides improved security and privacy by distinguishing between multiple electronic accessories that would otherwise be indistinguishable, or more difficult to distinguish, particularly in instances where the electronic accessories are associated with different users and/or user accounts.

In some embodiments, in accordance with a determination that the electronic accessory does not include the first physical marking, the electronic device causes (722) the user interface that includes the representation of the electronic accessory to be displayed without the representation of the first physical marking. For example, wireless accessory case 480-3 (shown in FIG. 5S) does not include a physical marking 482 and user interface 504-1 is displayed with representation 542-3 of wireless accessory case 480-3 without any representation 544 of a physical marking 482, e.g., as shown in FIG. 5V. Providing representation of an electronic accessory without a representation of a physical marking distinguishes the electronic accessory from other electronic accessories that include physical markings. Distinguishing between multiple electronic accessories when interacting with one of them via a user interface improves security and privacy of the interaction(s).

In some embodiments, the representation of the electronic accessory is (724) a three-dimensional representation of the electronic accessory. For example, the electronic accessory is a wireless accessory case, and the representation is a three-dimensional model of the wireless accessory case. Providing a three-dimensional representation of an electronic accessory improves security and privacy by distinguishing between multiple electronic accessories that would be indistinguishable, or more difficult to distinguish, with a two-dimensional representation.

In some embodiments, the user interface includes (726) one or more animated movements (e.g., rotation, shifting, and/or lateral movement) of the representation of the electronic accessory. For example, FIG. 5T shows arrows 543 in user interface 504-1 that indicate movement of representation 542-1 of wireless accessory case 480-1. Providing a representation of an electronic accessory with animated movement(s) improves security and privacy by distinguishing between multiple electronic accessories that would be indistinguishable, or more difficult to distinguish, with a static representation (e.g., the representation of the physical marking is not fully visible in a static representation).

In some embodiments, the electronic device detects (728) the occurrence of a respective condition associated with a second electronic accessory (e.g., wireless accessory case 480-2), distinct from the electronic device (e.g., device 100) and the electronic accessory (e.g., wireless accessory case 480-1), the second electronic accessory in communication with the electronic device and having a same device type as the electronic accessory (e.g., wireless accessory cases), and, in response to detecting the occurrence of the respective condition associated with the second electronic accessory, in accordance with a determination that the second electronic accessory does not include the first physical marking, the electronic device causes a second user interface corresponding to the respective condition to be displayed via the display generation component, where the second user interface includes a representation of the second electronic accessory without a representation of the first physical marking. For example, if the second electronic accessory includes a third physical marking, the second user interface includes a representation of the second electronic accessory with a representation of the third physical marking; and if second electronic accessory does not include a personalized physical marking, the second user interface includes a representation of the second electronic accessory without a representation of a personalized physical marking. In accordance with some embodiments, the user interfaces described previously with respect to the electronic accessory are displayed in response to occurrences of respective conditions associated with the second electronic accessory and include the representation of the second electronic accessory (e.g., in addition to, or alternatively to the representation of the electronic accessory). Providing representation of an electronic accessory without a representation of a physical marking distinguishes the electronic accessory from other electronic accessories that include physical markings. Distinguishing between multiple electronic accessories when interacting with one of them via a user interface improves security and privacy of the interaction(s).

In some embodiments, the second electronic accessory includes (730) a third physical marking, distinct from the first physical marking, and the second user interface includes the representation of the second electronic accessory with the representation of the third physical marking. In some embodiments, the occurrence of the respective condition associated with the second electronic accessory is further associated with the electronic accessory and the user interface includes the representation of the electronic accessory with the representation of the first physical marking and the representation of the second electronic accessory with the representation of the third physical marking. For example, FIG. 5AM shows user interface 5056 with a representation 5062 of wearable audio output device 5050 that includes a representation 5064 of physical marking 5052 and a representation 5063 of wearable audio output device 5046 that includes a representation 5065 of physical marking 5048. Providing representation of a second electronic accessory with a representation of a third physical marking distinguishes the second electronic accessory from other electronic accessories (e.g., the first electronic device with the first physical marking). Distinguishing between multiple electronic accessories when interacting with one of them via a user interface improves security and privacy of the interaction(s).

In some embodiments, while the user interface is being displayed, the electronic device detects (732) a user input corresponding to a user interface element on the user interface, where the user interface element corresponds to a function of the electronic accessory, and, in response to the user input, the electronic device activates the function of the electronic accessory. For example, the occurrence of the respective condition comprises a pairing request from the electronic accessory and the user interface element comprises a selectable connection element (e.g., button 507, as shown in FIGS. 5B-5C) that corresponds to a pairing function for initiating (or continuing, or confirming) pairing between the electronic device and the electronic accessory. In this example, the user input corresponds to the selectable connection element and activates the pairing function. As another example, the occurrence of the respective conditions is an error event, and the user interface includes a selectable troubleshooting element that corresponds to a troubleshooting function. In this example, the user input corresponds to the selectable troubleshooting element and activates the troubleshooting function. Providing representation of a second electronic accessory with a representation of a third physical marking distinguishes the second electronic accessory from other electronic accessories (e.g., the first electronic device with the first physical marking). Distinguishing between multiple electronic accessories when interacting with one of them via a user interface improves security and privacy of the interaction(s). Additionally, providing the distinguishing features with the user interface elements reduces the number of inputs needed to identify/validate the electronic accessory prior to interaction (e.g., via activation of the function corresponding to the user interface element).

It should be understood that the particular order in which the operations in FIGS. 7A-7C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, and 900) are also applicable in an analogous manner to method 700 described above with respect to FIGS. 7A-7C. For example, the inputs, gestures, functions, and feedback described above with reference to method 700 optionally have one or more of the characteristics of the inputs, gestures, functions, and feedback described herein with reference to other methods described herein (e.g., methods 600, 800, and 900). For brevity, these details are not repeated here.

FIGS. 8A-8D are flow diagrams illustrating method 800 of presenting status information at an accessory charging case in accordance with some embodiments. Method 800 is performed at an accessory charging case (e.g., electronic accessory case 342, FIGS. 3D-3E) that includes a speaker (e.g., speaker(s) 345). In some embodiments, the accessory charging case includes a lid (e.g., lid 367 or hinged lid 486). In some embodiments, the accessory charging case includes one or more input devices (e.g., input device(s) 346). In some embodiments, the accessory charging case is a charging case for a wireless accessory to another device, the wireless accessory including one or more of a smartwatch, one or more earbuds, wireless headphones, a stylus, or a fitness tracker. Some operations in method 800 are, optionally, combined and/or the order of some operations is, optionally, changed.

As described below, method 800 provides an improved interface for presenting status notifications at an accessory charging case. Providing audio notifications at the charging case reduces power usage and improves battery life (e.g., by alleviating the need to power a display or power communication circuitry to communicate with a remote display) and allows for a user to not have to switch between multiple devices to interact with the charging case and/or associated accessories (e.g., the user need not find/switch to other electronic devices (e.g., a smartphone or tablet) to receive the status notification), as well as reducing the number of inputs needed for the user to receive notifications, and enhances the operability of the charging case and makes the user-device interface more efficient (e.g., by helping the user to achieve an intended outcome and reducing user mistakes when operating/interacting with the charging case), which, additionally, reduces power usage and improves battery life of the charging case by enabling the user to use the charging case more quickly and efficiently.

The accessory charging case detects (802) a first event that includes a change in an opened or closed state of an accessory charging case. For example, FIGS. 5X-5Y illustrate a closing event (e.g., lid closing) for wireless accessory device 480. As another example, FIGS. 5AB-5AC illustrate an opening event (e.g., lid opening) for wireless accessory device 480.

In response to detecting the change in the opened or closed state of the accessory charging case, the case causes (804) a speaker (e.g., speaker(s) 345) of the accessory charging case to generate an audio notification (e.g., audio feedback 5001) corresponding to a status for at least one of the accessory charging case and one or more accessories associated with (e.g., communicatively coupled with, and/or linked to a same user account as) the accessory charging case. In some embodiments, the speaker of the accessory charging case generates an audio notification corresponding to a status of the accessory charging case and an audio notification corresponding to a status of the one or more accessories associated with the accessory charging case. In some embodiments, the speaker of the accessory charging case generates an audio notification corresponding to a status of the accessory charging case without generating an audio notification corresponding to a status of the one or more accessories. In some embodiments, the speaker of the accessory charging case generates an audio notification corresponding to a status of the one or more accessories without generating an audio notification corresponding to a status of the accessory charging case.

In some embodiments, the audio notification includes (806) one or more words describing the status for at least one of the accessory charging case and the one or more accessories associated with the accessory charging case. For example, FIG. 5AO shows audio feedback 5054 that includes the words "Alert, mismatched earbuds." In some embodiments, the audio notification includes one or more sounds (e.g., tones and/or beeps) and does not include any words.

Providing audio notifications with word(s) describing the status provides improved audio feedback to the user by indicating a relevant state of the system, which enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently (e.g., without the need for a display device and/or graphical user interface).

In some embodiments, the status corresponds to (808) a charge state of at least one of the one or more accessories associated with the accessory charging case (e.g., currently charging, charging complete, or charging terminated). For example, FIG. 5AC shows audio feedback 5001 that includes information regarding a charge state of wearable audio output devices 301. In some embodiments, audio notification is different for each state of the one or more accessories (e.g., so the user can differentiate between different states). For example, an audio notification for a charging-initiated status includes a beep having a first tone and an audio notification for a charging-complete status includes a beep having a second tone, distinct from the first tone. As another example, an audio notification for a charging-initiated status includes a first number of beeps and an audio notification for a charging-complete status includes a second number of beeps, distinct from the first number of beeps. As another example, each audio notification includes one or more words that describe the corresponding charge state (e.g., one or more words that distinguish between the charge states). Providing audio information about a charge state of at least one of the one or more accessories associated with the accessory charging case improves feedback to the user by indicating a relevant state of the system, which enhances the operability of the devices and makes the user-device interface more efficient.

In some embodiments, the status includes (810) a state of communicatively coupling between the accessory charging case and at least one of the one or more accessories associated with the accessory charging case (e.g., pairing initiated, in-progress, completed, or failed). In some embodiments, audio notification is different for each state of communicative coupling between the accessory charging case and at least one of the one or more accessories associated with the accessory charging chase (e.g., so the user can differentiate between different states). Providing audio information about the state of communicatively coupling improves feedback to the user by indicating a relevant state of the system, which enhances the operability of the devices and makes the user-device interface more efficient.

In some embodiments, the accessory charging case is configured to (812) concurrently hold a plurality of accessories (e.g., wearable audio output devices 301-1 and 301-2), the first event includes a closure of the accessory charging case, and the status corresponds to a determination that the accessory charging case contains only a subset of the plurality of accessories. For example, FIGS. 5Z-5AA show closure of wireless accessory case 480 with only wearable audio output device 301-1 inside and corresponding audio feedback 587. Providing audio information about the charging case including only a subset of the accessories improves feedback to the user by indicating a relevant state of the system, which enhances the operability of the devices and makes the user-device interface more efficient.

In some embodiments, the status corresponds to (814) a reset event for the accessory charging case (e.g., a soft reset, hard reset, and/or factory reset event). For example, FIG. 5AI shows input 5030 at input device 346 causing initiation of a factory reset and corresponding audio feedback 5032. An example of a soft reset event includes closing applications that were executing, clearing data in volatile memory, and/or cycling power off for the accessory charging case. An example of a hard reset event includes clearing memory associated with hardware of the accessory charging case and/or updating a driver for the hardware (e.g., updating with a stable driver from a manufacturer of the hardware). An example of a factory reset includes restoring and/or reverting settings, firmware, and/or software for the accessory charging case to a same state as when the accessory charging case shipped from the factory. An example of a factory reset includes removing user data, settings applied by the user, and/or applications installed by the user. For example, a factory reset event includes resetting (e.g., deleting and/or removing) wireless connection information (e.g., pairing information and/or Wi-Fi network information). Providing audio information about the reset event improves feedback to the user by indicating a relevant state of the system, which enhances the operability of the devices and makes the user-device interface more efficient.

In some embodiments, the status includes (815) a charge state of the accessory charging case not meeting one or more preset criteria (e.g., the charge state of the accessory charging case is determined to be insufficient to fully charge an accessory associated with the charging case, or the charge state is below a preset threshold (e.g., below 50%, 30%, or 20%)). For example, FIG. 5AD shows audio feedback 5018 indicating that wireless accessory case 480 has only 15% charge. In some embodiments, the one or more preset criteria are static criteria and correspond to an amount of charge required to fully charge the one or more accessories associated with the accessory charging case from any charge state (e.g., an amount of charge required to fully charge the one or more accessories from a completely drained state). In some embodiments, the one or more preset criteria are dynamic criteria and correspond to an amount of charge required to fully charge the one or more accessories associated with the accessory charging case from a current charge state. For example, the one or more accessories is a wearable audio output device having a current charge state of 40 percent of full charge and the one or more preset criteria correspond to an amount of charge required to fully charge the wearable audio output device from the 40 percent charged state. Providing audio information about the charge state of the accessory charging case improves feedback to the user by indicating a relevant state of the system, which enhances the operability of the devices and makes the user-device interface more efficient.

In some embodiments, the status corresponds to (818) a determination that the accessory charging case contains a plurality of accessory devices and a determination that the plurality of accessory devices are mismatched. For example, FIGS. 5AL-5AM show closure of wireless accessory case 480 with mismatched wearable audio output devices 5046 and 5050 inside and corresponding audio feedback 5054. Providing audio information about the mismatched accessory devices improves feedback to the user by indicating a relevant state of the system, which enhances the operability of the devices and makes the user-device interface more efficient.

In some embodiments, the first event includes (820) an opening of the accessory charging case. For example, FIG. 5AD shows opening of wireless accessory case 480 and corresponding audio feedback 5018. Providing audio information upon opening of the wireless accessory case improves feedback to the user by indicating a relevant state of the system, which enhances the operability of the devices and makes the user-device interface more efficient.

In some embodiments, the accessory charging case is (822) in communication with a display generation component, and the case causes a user interface to be displayed via a display generation component, the user interface including a mismatch notification. For example, FIG. 5AM shows closure of wireless accessory case 480 with mismatched wearable audio output devices 5046 and 5050 inside and corresponding user interface 5056 with notification 5057. Providing visual information about the mismatched accessory devices improves feedback to the user by indicating a relevant state of the system, which enhances the operability of the devices and makes the user-device interface more efficient.

In some embodiments, the user interface further includes (824) a representation of the accessory charging case (e.g., representation 5058) and respective representations of the plurality of accessory devices (e.g., representations 5062 and 5063, as shown in FIG. 5AM). Providing visual representations of the accessory devices and the accessory charging case improves feedback to the user by indicating a relevant state of the system, which enhances the operability of the devices and makes the user-device interface more efficient.

In some embodiments, the determination that the plurality of accessory devices are mismatched includes (826) a determination that individual accessories of the plurality of accessory devices have different owners (e.g., are linked to, or associated with, different user accounts), and the user interface further includes ownership information for the plurality of accessory devices (e.g., as illustrated in FIG. 5AM). For example, the ownership information includes names or identifiers for the owners of the individual accessories and/or an indication of which accessories have ownership that differs from an ownership of the accessory charging case. Providing audio information about the mismatched ownership of the accessory devices improves feedback to the user by indicating a relevant state of the system, which enhances the operability of the devices and makes the user-device interface more efficient. Additionally, providing audio information about the mismatched ownership improves security/privacy by identifying devices that are associated with other users and/or user accounts.

In some embodiments, the determination that the plurality of accessory devices are mismatched includes (828) a determination that individual accessories of the plurality of accessory devices have different hardware and/or software versions, and the user interface further includes version information for the plurality of accessory devices (e.g., the version information includes version numbers or identifiers for each of the plurality of accessory devices). For example, FIGS. 5AP-5AQ show closure of wireless accessory case 480 with mismatched wearable audio output devices 5046 and 5070 inside and corresponding displayed indications 5087 of the versions associated with the wearable audio output devices 5046 and 5070 in the wireless accessory case 480. Providing version information about the mismatched versions for the accessory devices improves feedback to the user by indicating a relevant state of the system, which enhances the operability of the devices and makes the user-device interface more efficient.

In some embodiments, the case detects (830) a second event that includes a change in charging state of at least one of the accessory charging case and the one or more accessories associated with the accessory charging case, and, in response to detecting the second event, the case causes the speaker to generate a second audio notification, distinct from the audio notification, corresponding to the change in charging state. For example, audio feedback 5001 provided via speaker(s) 345 in FIG. 5AC, may be generated in response to detecting a change in charging status of wearable audio output devices 301 or accessory charging case 480. Providing audio information about a change in charging state for at least one of the accessory charging case and the one or more accessories associated with the accessory charging case improves feedback to the user by indicating a relevant state of the system, which enhances the operability of the devices and makes the user-device interface more efficient.

In some embodiments, the change in charging state includes (832) initiation or termination of charging for at least one of the one or more accessories associated with the accessory charging case. For example, FIGS. 5X-5AY show closure of wireless accessory case 480 and initiation of charging of wearable audio output devices 301 and corresponding audio feedback 585. Providing audio information about initiation or termination of charging for at least one of the one or more accessories associated with the accessory charging case improves feedback to the user by indicating a relevant state of the system, which enhances the operability of the devices and makes the user-device interface more efficient.

In some embodiments, in accordance with a user request to locate the accessory charging case (e.g., or an accessory associated with the charging case), the case causes (834) the speaker to generate a third audio notification corresponding to the user request, where the third audio notification is distinct from (e.g., and optionally has a different audio waveform than an audio waveform of) the audio notification (e.g., of operation 804). For example, FIGS. 5AJ-5AK show user input 5040 detected at button 5038 that, when activated by a user, causes audio output 5042 to be output at wireless accessory case 480. In some embodiments, the user request is to locate an accessory device rather than the accessory charging case (e.g., an accessory device inside the charging case, paired with the charging case, or associated with the charging case), and in response the accessory device generates an audio notification (e.g., in accordance with a determination that the accessory is inside the charging case or in communication with the charging case). Providing an audio notification in response to a user request to locate the accessory charging case or an accessory device inside the charging case improves security/privacy by assisting a user in quickly locating a lost or stolen accessory charging case and/or accessory device.

In some embodiments, the case detects (836) a third event comprising a change of state of the accessory charging case, and, in response to detecting the third event: (i) in accordance with a determination that a sound setting for the accessory charging case is in an enabled state, the case causes the speaker to generate a fourth audio notification; and (ii) in accordance with a determination that the sound setting for the accessory charging case is in a disabled state, the case forgoes causing the fourth audio notification to be generated. For example, FIG. 5AV shows wireless accessory case 480 having disabled audio outputs (e.g., as illustrated by volume indicator 5100). In some embodiments, in response to an event while wireless accessory case 480 has disabled audio outputs, wireless accessory case 480 forgoes causing an audio notification to be generated. In some embodiments, a user input is detected at the accessory charging case (e.g., via a hardware or software button), and, in response to the user input, the sound setting is set to the disabled state (or toggled off). Forgoing providing an audio notification in accordance with a sound setting being in a disabled state improves security/privacy by preventing undesirable audio notifications (e.g., while the user is in a crowded/public location). Additionally, forgoing undesirable audio notifications reduces power usage and improves battery life of the device.

In some embodiments, an electronic device (e.g., electronic device 100) distinct from the accessory charging case causes (838) a user interface (e.g., user interface 5090) to be displayed via a display generation component, the user interface including a control element (e.g., volume control element 5091) for the sound setting for the accessory charging case, detects an input that corresponds to the control element (e.g., user input 5098), and, in response to detecting the input, causes the sound setting for the accessory charging case to be set to the disabled state (e.g., as illustrated by volume level indicator 5099 in FIG. 5AV). In some embodiments, in response to detecting the input, the electronic device causes the sound setting for the accessory charging case to be toggled from a prior state to a new state. For example, the accessory charging case forgoes generating audio notifications while the sound setting is in the disabled state (e.g., forgoes generating an audio notification in response to detecting events occurring at the accessory charging case and/or involving the accessory charging case). In some embodiments, generating audio notifications via the speaker is conditional on the sound setting being set to an enabled state. In some embodiments, the accessory charging case includes a haptic output device and, in response to events occurring at the accessory charging case and/or involving the accessory charging case, the haptic output device generates haptic feedback (e.g., in addition to or alternatively to generating audio notifications). Displaying the user interface with the control element for the sound setting reduces the number of inputs needed to set the sound setting for the accessory charging case to the disabled state.

In some embodiments, after setting the sound setting for the accessory charging case to the disabled state, the case detects (840) a fourth event including a change in an opened or closed state of the accessory charging case, and, in response to detecting the fourth event and in accordance with the sound setting being in the disabled state, the case forgoes causing the speaker to generate an audio notification corresponding to a status for the accessory charging case and/or one or more accessories associated with the accessory charging case (e.g., forgoes generating audio feedback 5018 and/or 5020). In some embodiments, causing the speaker to generate the audio notification corresponding to the status for at least one of the accessory charging case and the one or more accessories associated with the accessory charging case is in accordance with a determination that the sound setting is set to an enabled state. Forgoing providing an audio notification in accordance with a sound setting being in a disabled state improves security/privacy by preventing undesirable audio notifications (e.g., while the user is in a crowded/public location). Additionally, forgoing undesirable audio notifications reduces power usage and improves battery life of the device.

In some embodiments, the case sets (842) the sound setting to the disabled state in accordance with an audio output silencing setting (e.g., a ring silencing setting and/or an audio notification silencing setting) being enabled at an electronic device that is communicatively coupled to the accessory charging case (e.g., as illustrated in FIGS. 5AX-5AY). In some embodiments, a user input corresponding to the ring silencing setting is detected at a companion device (e.g., at the electronic device 100, e.g., via a hardware or software affordance); and, in response to the user input, the ring silencing setting is enabled (or toggled on). In some embodiments, while the audio output silencing setting is enabled, the electronic device forgoes generating audio notifications in response to an incoming phone call, text message, voicemail, electronic mail, and/or calendar events. In some embodiments, the electronic device includes a hardware switch configured to toggle the audio output silencing setting between enabled and disabled states. In some embodiments, the electronic device includes a hardware volume button and a first type of user input at the hardware volume button causes the audio output silencing setting to be enabled. In some embodiments, the electronic device causes an audio control user interface to be displayed and the audio control user interface includes a selectable silencing element that, when selected, causes the audio output silencing setting to be enabled. Alternatively, the audio control user interface of the electronic device includes a volume control element that enables the user to set audio output volume to zero. Configuring the sound setting of the accessory case based on the audio output silencing setting or volume control setting of the electronic device avoids requiring the user to configure sound settings of the device and accessory case individually, which reduces the number of inputs needed to perform the operations.

In some embodiments, the case sets (844) the sound setting to the disabled state in accordance with a focus mode being active at an electronic device that is communicatively coupled to the accessory charging case. For example, FIGS. 5BB-5BE illustrate activation of a focus mode (e.g., a do-not-disturb mode) and a corresponding silencing of wireless accessory device 480 as illustrated by volume indicator 5138. Configuring the sound setting of the accessory case based on the focus mode of the device avoids requiring the user to configure sound settings of the device and accessory case individually, which reduces the number of inputs needed to perform the operation.

In some embodiments, the sound setting for the accessory charging case is (846) set to the disabled state in accordance with the electronic device being communicatively coupled to at least one of the one or more accessories associated with the accessory charging case. For example, FIGS. 5BH-5BI illustrate wearable audio output devices 5142 moving inside threshold distance 5119 while in communication with electronic device 100 and wireless accessory case 480, and corresponding silencing of wireless accessory device 480 as illustrated by volume indicator 5150. Configuring the sound setting of the accessory case based on settings of a device in communication with one or more accessories associated with the accessory charging case avoids requiring the user to configure sound settings of the device and accessory case individually, which reduces the number of inputs needed to perform the operation. Additionally, configuring the sound setting of the accessory case based on settings of a device in communication with one or more accessories associated with the accessory charging case avoids requiring the user to connect the accessory charging case and the device directly, which reduces the number of inputs/user interactions required to perform the operation.

In some embodiments, an enablement state of the sound setting is (848) stored at the accessory charging case (e.g., is stored in memory 349). In some embodiments, the setting state is synchronized with the electronic device (or server system or other device associated with the same user account) in accordance with a communicative coupling being established between the electronic device and the accessory charging device). For example, in accordance with the accessory charging state being paired or connected to a first user device (e.g., a phone, laptop, or other electronic device), the accessory charging case obtains sound setting information from the first user device (e.g., based on a silence setting of the first user device) that, in this example, causes the sound setting to be set to the enabled state. Further, the accessory charging case internally maintains that setting until the setting is changed by the first user device or another user device. To continue the example, the accessory charging case subsequently pairs or connects with a second user device and obtains second sound setting information from the second user device. In this example, the second sound setting information causes the sound setting to be set to the disabled state (e.g., in accordance with the second user device having an audio output silencing setting enabled). Saving the enablement state of the sound setting and reusing the same enablement state avoids requiring the user to subsequently configure the enablement state of the sound setting when subsequently interacting with the accessory case, which reduces the number of inputs needed to perform the operation.

It should be understood that the particular order in which the operations in FIGS. 8A-8D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, and 900) are also applicable in an analogous manner to method 800 described above with respect to FIGS. 8A-8D. For example, the inputs, gestures, functions, and feedback described above with reference to method 800 optionally have one or more of the characteristics of the inputs, gestures, functions, and feedback described herein with reference to other methods described herein (e.g., methods 600, 700, and 900). For brevity, these details are not repeated here.

FIGS. 9A-9C are flow diagrams illustrating method 900 of adjusting audio output of a wearable audio output device in accordance with some embodiments. Method 900 is performed at an electronic device (e.g., device 300, FIG. 3, or portable multifunction device 100, FIG. 1A) including, or in communication with, a display generation component and, optionally, a touch-sensitive surface. In some embodiments, the electronic device is a desktop computer, a laptop computer, a tablet, a smartphone, a smart watch, or other computing device. In some embodiments, the display generation component is a touch-screen display. In some embodiments, the display is separate from a touch-sensitive surface. Some operations in method 900 are, optionally, combined and/or the order of some operations is, optionally, changed.

As described below, method 900 provides an improved interface for controlling audio outputs by changing the audio output mode of an audio output device, such as a wearable device, between audio pass-through and conversation boost in response to a particular type of gesture. Providing additional control options for controlling audio outputs, such as changing the audio output mode in response to particular gestures reduces clutter on the user interface, reduces the number of inputs needed to perform the control options, enhances the operability of the electronic device, and makes the user-device interface more efficient (e.g., by helping the user to achieve an intended outcome and reducing user mistakes when operating/interacting with the electronic device), which, additionally, reduces power usage and improves battery life of the electronic device by enabling the user to use the electronic device more quickly and efficiently.

The electronic device causes (902) a user interface to be displayed (e.g., user interface 5164), the user interface including a volume control element (e.g., volume control 5166, shown in FIGS. 5BL-5BO) for one or more wearable audio output devices (e.g., headphones or earbuds).

The electronic device detects (904) an input that corresponds to the volume control element (e.g., detects via a touchscreen, motion sensors, rotatable input element, button, or the like).

In response to detecting the input: (i) in accordance with a determination that the input is a first type of gesture (e.g., the input satisfies first gesture criteria, such as swipe gesture criteria that require application of a touch input and movement of the touch input), the electronic device adjusts (906) a volume of the audio output of the one or more wearable audio output devices; and, (ii) in accordance with a determination that the input is a second type of gesture (e.g., a tap, double tap, or a long press), the electronic device causes display of a conversation boost element for the one or more wearable audio output devices that, when selected, initiates a process for adjusting audio output of the one or more wearable audio output devices to boost conversation audio, corresponding to conversations with audio that is accessible to the one or more wearable audio output devices, relative to other audio being output by the one or more wearable audio output devices. For example, FIG. 5BM shows user input 5168 (e.g., a swipe or drag gesture) and FIG. 5BN shows a corresponding change in volume of audio output. To further the example, FIG. 5BO shows user input 5182 (e.g., a tap or press gesture) and FIG. 5BP shows corresponding user interface 5184 with conversation boost control 5190. In some embodiments, the electronic device concurrently displays a volume control element and a conversation boost element (e.g., as shown in user interface 5184, as shown in FIG. 5BP). In some embodiments, the first type of gesture is a swipe, a drag, a rotation, and/or an air gesture. In some embodiments, the conversation audio includes conversation audio that is being picked up by one or more microphones of the wearable audio output devices, conversation audio that is being picked up by one or more microphones of the electronic device, and/or conversation audio that is being picked up by one or more external microphones. In some embodiments, the second type of gesture is a double tap gesture that meets one or more gesture criteria that require two single tap gestures performed within a threshold amount of time of each other and within a threshold distance of each other. In some embodiments, in response to activation (e.g., by a force press or long press on an input device (a touch-sensitive surface or mechanical button) of the volume control element, the electronic device updates the user interface (or replaces display of the (e.g., first) user interface with display of a second user interface) to include the conversation boost element. In some embodiments, the conversation boost element is conditionally displayed (at least in part) in accordance with a determination that the one or more wearable audio output devices is in communication with the electronic device and that the one or more wearable audio output devices are in use (e.g., by playing audio or being inserted in the user's ear). In some embodiments, while the one or more wearable audio output devices are not in communication with the electronic device and/or not in use, the conversation boost element is not displayed.

In some embodiments, selection of the conversation boost element initiates (908) the process for adjusting audio output of the one or more wearable audio output devices to boost conversation audio while active noise cancelation for ambient noise is disabled at the one or more wearable audio output devices. For example, the conversation boost is not active while in a noise cancelation mode (e.g., as illustrated in FIG. 5BV), or while noise control is disabled (e.g., while noise cancelation is off, as opposed to being in transparency mode). In some embodiments, selection of the conversation boost element initiates the process for adjusting audio output of the one or more wearable audio output devices to boost conversation audio while transparency for ambient sound is enabled (e.g., is greater than zero or another preset threshold) at the one or more wearable audio output devices. Adjusting audio output to boost conversation audio only while ANC is disabled enhances the operability of the devices and reduces power usage and improves battery life of the devices.

In some embodiments, the first type of gesture is (910) a swipe gesture at a location that corresponds to the volume control element and the volume is adjusted in accordance with movement of the swipe gesture (e.g., as illustrated in FIGS. 5BM-5BN), and the second type of gesture is a press gesture at the location that corresponds to the volume control element (e.g., as illustrated in FIG. 5BO). Detecting and being responsive in different ways to different types of gestures enhances operability of the device (e.g., provides flexibility without cluttering the user interface with additional displayed controls, as well as reducing the number of inputs needed to access this flexibility) and makes the user-device interface more efficient.

In some embodiments, in response to detecting the input, in accordance with a determination that the input is a third type of gesture, the electronic device activates (912) an audio function that is distinct from the volume adjustment and the display of the conversation boost element (e.g., the function changes an audio setting or mode of the wearable audio output devices). For example, the third type of gesture is a long press and/or a deep press and the audio function changes an audio mode (e.g., a noise control mode). Detecting and being responsive in different ways to different types of gestures enhances operability of the device (e.g., provides flexibility without cluttering the user interface with additional displayed controls, as well as reducing the number of inputs needed to access this flexibility) and makes the user-device interface more efficient.

In some embodiments, in accordance with the determination that the input is the second type of gesture, the electronic device causes (914) display of an audio control user interface (e.g., user interface 5184, FIG. 5BP) that includes a plurality of elements (e.g., noise control 5194, spatial audio control 5192, and conversation boost control 5190) for operation for the one or more wearable audio output devices, where the plurality of elements includes the conversation boost element (e.g., conversation boost control 5190). Displaying the audio control user interface in response to a particular type of gesture enhances operability of the electronic device (e.g., provides flexibility without cluttering the user interface with additional displayed controls, as well as reducing the number of inputs needed to access this flexibility) and makes the user-device interface more efficient.

In some embodiments, the plurality of elements includes (916) an ambient noise control element (e.g., noise control 5194) and one or more spatial audio control elements (e.g., spatial audio control 5192). For example, the spatial audio control settings include a balance setting, a stereo setting, and/or an amplification setting. In some embodiments, when selected, the ambient noise control element causes activation of an ambient noise adjustment function. In some embodiments, the ambient noise control element, when selected, adjusts active noise cancelation for ambient noise, transparency for ambient sound, and/or other ambient sound functions. For example, increasing transparency for ambient sound includes using external microphones at the one or more wearable audio output devices to capture audio and play it via one or more speakers at the one or more wearable audio output devices. In some embodiments, the electronic device or the one or more wearable audio output devices includes one or more pass-through audio components (e.g., active when the device or one or more wearable audio output devices is operating in the transparency mode) and one or more cancelation audio components (e.g., active when the device or one or more wearable audio output devices is operating in a noise cancelation mode). Presenting an ambient noise control element and a conversation boost element enhances operability of the device (e.g., provides flexibility by reducing the number of inputs needed) and makes the user-device interface more efficient.

In some embodiments, the plurality of elements includes (920) a live listen element (e.g., live listen control 5234, shown in FIG. 5BX) that, when selected, initiates a process for providing audio data at the one or more wearable audio output devices, where the audio data is captured via a microphone at the electronic device. In some embodiments, selection of the live listen element causes a live listen mode to be enabled (e.g., selection of the live listen element toggles the live listen mode). In some embodiments, while the live listen mode is enabled, audio data is captured via one or more microphones at the electronic device and transmitted to a remote audio output device (e.g., a headset, earbuds, or device including a speaker component) for playback to a user. For example, audio data captured via the one or more microphones is transmitted to a paired headset (or one or more wearable audio output devices) worn by the user so that the user is provided playback of sounds occurring around the electronic device. Presenting a live listen element and a conversation boost element enhances operability of the device (e.g., provides flexibility by reducing the number of inputs needed) and makes the user-device interface more efficient.

In some embodiments, the plurality of elements includes (922) a background sound element (e.g., background sounds control 5232, shown in FIG. 5BX) that, when selected, initiates a process for producing background sound at the one or more wearable audio output devices (e.g., producing white noise, water sounds (e.g., ocean or rain sounds), or other sounds intended to mask environmental noise). Presenting a background sound element and a conversation boost element enhances operability of the device (e.g., provides flexibility by reducing the number of inputs needed) and makes the user-device interface more efficient.

In some embodiments, the plurality of elements includes (924) an element (e.g., reduce loud sounds control 5235, shown in FIG. 5BX) that, when selected, initiates a process to reduce a volume of sounds that meet one or more criteria (e.g., the one or more criteria comprise a maximum decibel threshold that is set by the electronic device and/or the user). In some embodiments, a maximum decibel slider is displayed with (or in response to selection of) the element for reducing loud sounds, e.g., as shown in FIG. 5CB. Presenting a reduce loud sounds element and a conversation boost element enhances operability of the device (e.g., provides flexibility by reducing the number of inputs needed) and makes the user-device interface more efficient.

In some embodiments, the electronic device detects (926) a second input that corresponds to the volume control element, and, in response to the second input: (i) in accordance with a determination that the second input is the second type of gesture and at least one of the one or more wearable audio output devices is operating in a transparency mode (e.g., as illustrated by noise control 5194 in FIG. 5BQ), the electronic device causes display of the conversation boost element; and (ii) in accordance with a determination that the second input is the second type of gesture and the one or more wearable audio output devices are not operating in the transparency mode, the electronic device forgoes causing the conversation boost element to be displayed (e.g., display of the conversation boost element is replaced with display of a control element for noise control or spatial audio control). In some embodiments, conversation boost control 5190 is not displayed in user interface 5184 in accordance with an ANC mode being active. Forgoing displaying the conversation boost element while the device is not operating in the transparency mode enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, while the conversation boost element is displayed, the electronic device detects (928) a third input (e.g., a tap, double tap, or long press gesture) that corresponds to the conversation boost element, in response to detecting the third input, the electronic device causes a conversation boost adjustment control to be displayed, e.g., as shown in FIGS. 5BR-5BQ. Further, while the conversation boost adjustment control is displayed, the electronic device detects a fourth input that corresponds to the conversation boost adjustment control, and, in response to detecting the fourth input, the electronic device adjusts an amount of adjustment applied to the conversation audio in accordance with the fourth input. For example, FIG. 5BQ shows input 5198 at conversation boost control 5190 and FIG. 5BR shows display of conversation boost adjustment control 5206 in response to input 5198. For example, the fourth input is a swipe, drag, rotation, or air gesture and the adjustment is based on movement and/or direction of the gesture. In some embodiments, display of the conversation boost slider replaces display of the conversation boost element. In some embodiments, the conversation boost slider is displayed adjacent to the conversation boost element (e.g., the conversation boost slider replaces one or more other elements in the user interface, such as control element(s) for transparency and/or spatial audio) Alternatively, in some embodiments, the conversation boost slider is (automatically) displayed in response to detecting the first input, or in response to the detecting the first input and satisfaction of additional criteria (e.g., passage of at least a predefined amount of time while continuing to display the (settings) user interface). In some embodiments, the amount of adjustment and/or direction of adjustment (e.g., increase or decrease) corresponds to movement, direction, location, duration, force, and/or pressure of the fourth input. In some embodiments, the fourth input is a particular type of input (e.g., tap) and the amount of adjustment is preset for the particular type of input (e.g., 5, 10, 20, 25, 40, or 50 percent or 5, 10, 25, 50, or 100 units (e.g., dB) increase per tap). Displaying the conversation boost adjustment control and adjusting the amount of adjustment applied to the conversation audio in accordance with an input at the conversation boost adjustment control enhances operability of the device (e.g., provides flexibility without cluttering the user interface with additional displayed controls, as well as reducing the number of inputs needed to access this flexibility) and makes the user-device interface more efficient.

In some embodiments, the electronic device detects (930) a sequence of one or more inputs including a fifth input (e.g., a tap, double tap, or long press gesture) that corresponds to an accessibility user interface element (e.g., hearing control 5222, FIG. 5BW), and, in response to detecting the fifth input, the electronic device causes the accessibility user interface (e.g., user interface 5230, FIG. 5BX) to be displayed, the accessibility user interface including the conversation boost element (e.g., conversation boost control 5242). For example, the accessibility user interface element is displayed within a control center UI or settings menu for the one or more wearable audio output devices. In some embodiments, the sequence of one or more inputs includes one or more of: an input corresponding to an accessibility element (e.g., that when selected causes an accessibility user interface to be displayed) in a settings user interface, an input corresponding an audio element (e.g., that when selected causes an audio accessibility user interface to be displayed) in the accessibility user interface, and an input corresponding to a wearable audio output device accommodation element (e.g., that when selected causes a wearable audio output device accommodation user interface to be displayed) in the audio accessibility user interface. In some embodiments, the sequence of one or more inputs includes an input corresponding to a control center element (e.g., that when selected causes a control center user interface to be displayed) in a settings user interface, and/or an input corresponding to a hearing element (e.g., that when selected causes a hearing user interface to be displayed) in the control center user interface. In some embodiments, the sequence of one or more inputs includes one or more of: an input corresponding to an audio control center element (e.g., that when selected causes an audio control center user interface to be displayed) in a control center interface, an input corresponding to a wearable audio output device accommodation element (e.g., that when selected causes a wearable audio output device accommodation user interface to be displayed) in the audio control center user interface, and an input corresponding to an ambient noise control element in the wearable audio output device accommodation user interface. Displaying the accessibility user interface in response to the sequence of one or more inputs enhances operability of the device (e.g., provides flexibility without cluttering the user interface with additional displayed controls) and makes the user-device interface more efficient.

It should be understood that the particular order in which the operations in FIGS. 9A-9C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, and 800) are also applicable in an analogous manner to method 900 described above with respect to FIGS. 9A-9C. For example, the inputs, gestures, functions, and feedback described above with reference to method 900 optionally have one or more of the characteristics of the inputs, gestures, functions, and feedback described herein with reference to other methods described herein (e.g., methods 600, 700, and 800). For brevity, these details are not repeated here.

The operations described above with reference to FIGS. 6A-6C, 7A-7C, 8A-8D, and 9A-9C are, optionally, implemented by components depicted in FIGS. 1A-1B, 3C, and 3E. For example, detection operation 904, adjustment operation 906, and activation operation 912 are, optionally, implemented by event sorter 170, event recognizer 180, and event handler 190. Event monitor 171 in event sorter 170 detects a contact on touch-sensitive display system 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, 3C, and 3E.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at a wearable audio output device that includes a first portion configured to be inserted in a user's ear and a stem that extends from the first portion of the wearable audio output device, the stem including one or more input devices arranged along a physically-distinguished portion of the stem that is physically distinguished from other portions of the stem, wherein the physically-distinguished portion comprises an indented, raised, or differently-textured portion spanning the one or more of input devices:
      detecting an input at the physically-distinguished portion via the one or more input devices; and
      in response to detecting the input, in accordance with a determination that the input is a swipe gesture along the physically-distinguished portion of the wearable audio output device, adjusting an output volume for the wearable audio output device based on movement of the swipe gesture along the physically-distinguished portion of the wearable audio output device.

2. The method of claim 1, wherein:
   the swipe gesture comprises movement of one or more fingers along a length of the stem.

3. The method of claim 1, wherein:
   the first portion comprises an audio output device configured to be inserted in the user's ear and one or more positioning elements configured to maintain the audio output device in the user's ear after insertion; and
   the stem of the wearable audio output device comprises an elongated portion extending from the first portion.

4. The method of claim 1, wherein the one or more input devices comprise a sequence of capacitive sensors arranged to detect user gestures.

5. The method of claim 4, wherein the stem of the wearable audio output device comprises a housing with the physically-distinguished portion spanning a location corresponding to the sequence of capacitive sensors.

6. The method of claim 1, wherein:
   the wearable audio output device is in communication with a second wearable audio output device to form a pair of wearable audio output devices; and
   adjusting the output volume for the wearable audio output device comprises adjusting the output volume for both the wearable audio output device and the second wearable audio output device.

7. The method of claim 6, further comprising:
   detecting a second input via an input device of the second wearable audio output device; and
   in response to detecting the second input, in accordance with a determination that the second input is a swipe gesture along a stem of the second wearable audio output device, adjusting the output volume for both the wearable audio output device and the second wearable audio output device.

8. The method of claim 6, further comprising, in conjunction with adjusting the output volume for the wearable audio output device, providing audio feedback of volume adjustment to a user of the wearable audio output device via an audio output device of the wearable audio output device.

9. The method of claim 8, wherein providing the audio feedback of volume adjustment comprises providing the audio feedback of volume adjustment at both the wearable audio output device and the second wearable audio output device.

10. The method of claim 8, further comprising, in response to detecting the input, in accordance with a determination that the input is a non-swipe gesture, activating a function of the wearable audio output device, wherein the function is distinct from adjusting the output volume.

11. The method of claim 10, further comprising providing, in conjunction with activating the function of the wearable audio output device, audio feedback of the activation of the function via the audio output device and forgoing providing the audio feedback at the second wearable audio output device of the pair of wearable audio output devices.

12. The method of claim 10, wherein the function of the wearable audio output device comprises an audio playback function.

13. The method of claim 10, wherein the function of the wearable audio output device comprises an ambient noise adjustment function.

14. The method of claim 10, wherein the function of the wearable audio output device comprises a digital assistant function.

15. The method of claim 1, further comprising:
detecting a third input via the one or more input devices; and
in response to detecting the third input:
    in accordance with a determination that the third input is a swipe gesture along the stem of the wearable audio output device and a determination that the first portion of the wearable audio output device is inserted in an ear of a user of the wearable audio output device, adjusting the output volume for the wearable audio output device; and
    in accordance with a determination that the third input is the swipe gesture along the stem of the wearable audio output device and a determination that the first portion of the wearable audio output device is not inserted in an ear of the user of the wearable audio output device, forgoing adjusting the output volume for the wearable audio output device.

16. The method of claim 1, wherein the one or more input devices comprise a first type of sensor and a second type of sensor;
    wherein the input is detected via the first type of sensor; and
    the method further comprises:
        detecting a fourth input via the second type of sensor; and
        in response to detecting the fourth input, activating a function of the wearable audio output device that is distinct from adjusting the output volume.

17. The method of claim 1, further comprising:
at an electronic device distinct from the wearable audio output device, the electronic device in communication with a display generation component:
    establishing a connection between the electronic device and the wearable audio output device; and
    after establishing the connection, causing a user interface to be displayed via the display generation component, the user interface illustrating a simulated swipe gesture and corresponding output volume adjustment.

18. A wearable audio output device, comprising:
a first portion configured to be inserted in a user's ear;
a stem that extends from the first portion and includes one or more input devices and a physically-distinguished portion of the stem that is physically distinguished from other portions of the stem, wherein the physically-distinguished portion comprises an indented, raised, or differently-textured portion spanning the one or more of input devices;
one or more processors; and
memory storing one or more programs, wherein the one or more programs are configured to be executed by the one or more processors, the one or more programs including instructions for:
    detecting an input at the physically-distinguished portion via the one or more input devices; and
    in response to detecting the input, in accordance with a determination that the input is a swipe gesture along the physically-distinguished portion of the wearable audio output device, adjusting an output volume for the wearable audio output device based on movement of the swipe gesture along the physically-distinguished portion of the wearable audio output device.

19. A non-transitory computer readable storage medium storing one or more programs, the one or more programs comprising instructions that, when executed by a wearable audio output device that includes a first portion configured to be inserted in a user's ear and a stem that extends from the first portion and includes one or more input devices and a physically-distinguished portion of the stem that is physically distinguished from other portions of the stem, wherein the physically-distinguished portion comprises an indented, raised, or differently-textured portion spanning the one or more of input devices, cause the wearable audio output device to:
    detect an input at the physically-distinguished portion via the one or more input devices; and
    in response to detecting the input, in accordance with a determination that the input is a swipe gesture along the physically-distinguished portion of the wearable audio output device, adjust an output volume for the wearable audio output device based on movement of the swipe gesture along the physically-distinguished portion of the wearable audio output device.

20. The wearable audio output device of claim 18, wherein:
    the swipe gesture comprises movement of one or more fingers along a length of the stem.

21. The wearable audio output device of claim 18, wherein:
    the first portion comprises an audio output device configured to be inserted in the user's ear and one or more positioning elements configured to maintain the audio output device in the user's ear after insertion; and
    the stem of the wearable audio output device comprises an elongated portion extending from the first portion.

22. The wearable audio output device of claim 18, wherein the one or more input devices comprise a sequence of capacitive sensors arranged to detect user gestures.

23. The wearable audio output device of claim 22, wherein the stem comprises a housing with the physically-distinguished portion spanning a location corresponding to the sequence of capacitive sensors.

24. The wearable audio output device of claim 18, wherein:
    the wearable audio output device is in communication with a second wearable audio output device to form a pair of wearable audio output devices; and
    adjusting the output volume for the wearable audio output device comprises adjusting the output volume for both the wearable audio output device and the second wearable audio output device.

25. The wearable audio output device of claim 24, wherein the one or more programs include instructions for:
    detecting a second input via an input device of the second wearable audio output device; and
    in response to detecting the second input, in accordance with a determination that the second input is a swipe gesture along a stem of the second wearable audio output device, adjusting the output volume for both the wearable audio output device and the second wearable audio output device.

26. The wearable audio output device of claim 24, wherein the one or more programs include instructions for, in conjunction with adjusting the output volume for the wearable audio output device, providing audio feedback of volume adjustment to a user of the wearable audio output device via an audio output device of the wearable audio output device.

27. The wearable audio output device of claim 18, wherein the one or more programs include instructions for:
    detecting a third input via the one or more input devices; and in response to detecting the third input:

in accordance with a determination that the third input is a swipe gesture along the stem of the wearable audio output device and a determination that the first portion of the wearable audio output device is inserted in an ear of a user of the wearable audio output device, adjusting the output volume for the wearable audio output device; and in accordance with a determination that the third input is the swipe gesture along the stem of the wearable audio output device and a determination that the first portion of the wearable audio output device is not inserted in an ear of the user of the wearable audio output device, forgoing adjusting the output volume for the wearable audio output device.

28. The wearable audio output device of claim 18, wherein the one or more input devices comprise a first type of sensor and a second type of sensor;

wherein the input is detected via the first type of sensor; and the one or more programs include instructions for:

detecting a fourth input via the second type of sensor; and in response to detecting the fourth input, activating a function of the wearable audio output device that is distinct from adjusting the output volume.

29. The wearable audio output device of claim 18, wherein the one or more programs include instructions for:

at an electronic device distinct from the wearable audio output device, the electronic device in communication with a display generation component:

establishing a connection between the electronic device and the wearable audio output device; and after establishing the connection, causing a user interface to be displayed via the display generation component, the user interface illustrating a simulated swipe gesture and corresponding output volume adjustment.

30. The non-transitory computer readable storage medium of claim 19, wherein:

the swipe gesture comprises movement of one or more fingers along a length of the stem.

31. The non-transitory computer readable storage medium of claim 19, wherein:

the first portion comprises an audio output device configured to be inserted in the user's ear and one or more positioning elements configured to maintain the audio output device in the user's ear after insertion; and the stem of the wearable audio output device comprises an elongated portion extending from the first portion.

32. The non-transitory computer readable storage medium of claim 19, wherein the one or more input devices comprise a sequence of capacitive sensors arranged to detect user gestures.

33. The non-transitory computer readable storage medium of claim 32, wherein the stem of the wearable audio output device comprises a housing with the physically-distinguished portion spanning a location corresponding to the sequence of capacitive sensors.

34. The non-transitory computer readable storage medium of claim 19, wherein:

the wearable audio output device is in communication with a second wearable audio output device to form a pair of wearable audio output devices; and adjusting the output volume for the wearable audio output device comprises adjusting the output volume for both the wearable audio output device and the second wearable audio output device.

35. The non-transitory computer readable storage medium of claim 34, wherein the one or more programs include instructions that, when executed by the wearable audio output device, cause the wearable audio output device to:

detect a second input via an input device of the second wearable audio output device; and in response to detecting the second input, in accordance with a determination that the second input is a swipe gesture along a stem of the second wearable audio output device, adjust the output volume for both the wearable audio output device and the second wearable audio output device.

36. The non-transitory computer readable storage medium of claim 34, wherein the one or more programs include instructions that, when executed by the wearable audio output device, cause the wearable audio output device to, in conjunction with adjusting the output volume for the wearable audio output device, provide audio feedback of volume adjustment to a user of the wearable audio output device via an audio output device of the wearable audio output device.

37. The non-transitory computer readable storage medium of claim 19, wherein the one or more programs include instructions that, when executed by the wearable audio output device, cause the wearable audio output device to:

detect a third input via the one or more input devices; and in response to detecting the third input:

in accordance with a determination that the third input is a swipe gesture along the stem of the wearable audio output device and a determination that the first portion of the wearable audio output device is inserted in an ear of a user of the wearable audio output device, adjust the output volume for the wearable audio output device; and in accordance with a determination that the third input is the swipe gesture along the stem of the wearable audio output device and a determination that the first portion of the wearable audio output device is not inserted in an ear of the user of the wearable audio output device, forgo adjusting the output volume for the wearable audio output device.

38. The non-transitory computer readable storage medium of claim 19, wherein the one or more input devices include a first type of sensor and a second type of sensor;

wherein the input is detected via the first type of sensor; and the one or more programs include instructions that, when executed by the wearable audio output device, cause the wearable audio output device to:

detect a fourth input via the second type of sensor; and in response to detecting the fourth input, activate a function of the wearable audio output device that is distinct from adjusting the output volume.

39. The non-transitory computer readable storage medium of claim 19, wherein the one or more programs include instructions that, when executed by the wearable audio output device, cause the wearable audio output device to:

at an electronic device distinct from the wearable audio output device, the electronic device in communication with a display generation component:

establish a connection between the electronic device and the wearable audio output device; and after establishing the connection, cause a user interface to be displayed via the display generation component, the user interface illustrating a simulated swipe gesture and corresponding output volume adjustment.

* * * * *